(12) United States Patent
Ebrahimi Afrouzi et al.

(10) Patent No.: US 11,747,813 B1
(45) Date of Patent: *Sep. 5, 2023

(54) METHOD FOR DEVELOPING NAVIGATION PLAN IN A ROBOTIC FLOOR-CLEANING DEVICE

(71) Applicants: Ali Ebrahimi Afrouzi, San Diego, CA (US); Lukas Fath, York (CA); Chen Zhang, Richmond (CA)

(72) Inventors: Ali Ebrahimi Afrouzi, San Diego, CA (US); Lukas Fath, York (CA); Chen Zhang, Richmond (CA)

(73) Assignee: AI Incorporated, Toronto (CA)

( * ) Notice: Subject to any disclaimer, the term of this patent is extended or adjusted under 35 U.S.C. 154(b) by 151 days.

This patent is subject to a terminal disclaimer.

(21) Appl. No.: 17/316,018

(22) Filed: May 10, 2021

Related U.S. Application Data

(63) Continuation of application No. 16/446,574, filed on Jun. 19, 2019, now Pat. No. 11,036,230, which is a continuation-in-part of application No. 15/449,531, filed on Mar. 3, 2017, now Pat. No. 10,368,711.

(60) Provisional application No. 62/746,688, filed on Oct. 17, 2018, provisional application No. 62/740,580, filed on Oct. 3, 2018, provisional application No. 62/740,573, filed on Oct. 3, 2018, provisional application No. 62/735,137, filed on Sep. 23, 2018, provisional application No. 62/688,497, filed on Jun. 22, 2018, provisional application No. 62/303,225, filed on Mar. 3, 2016.

(51) Int. Cl.
*G05D 1/02* (2020.01)
*G05D 1/00* (2006.01)

(52) U.S. Cl.
CPC ......... *G05D 1/0212* (2013.01); *G05D 1/0016* (2013.01); *G05D 2201/0203* (2013.01); *G05D 2201/0215* (2013.01)

(58) Field of Classification Search
CPC .............. G05D 1/0212; G05D 1/0016; G05D 2201/0203; G05D 2201/0215; G05D 1/0219; A47L 11/4011; A47L 11/4061; A47L 11/4066; A47L 2201/04; B25J 9/161; B25J 9/1664; B25J 11/0085
USPC ...................................... 701/2; 700/245, 257
See application file for complete search history.

(56) References Cited

U.S. PATENT DOCUMENTS

| | | | |
|---|---|---|---|
| 4,803,640 A * | 2/1989 | Mitomi | G05B 19/425 901/3 |
| 6,249,780 B1 * | 6/2001 | Mizokawa | G05B 19/042 706/11 |
| 6,732,826 B2 | 5/2004 | Song | |
| 7,430,455 B2 | 9/2008 | Casey | |
| 8,463,438 B2 | 6/2013 | Jones | |
| 8,838,274 B2 | 9/2014 | Jones | |
| 9,128,486 B2 | 9/2015 | Chiappetta | |

(Continued)

*Primary Examiner* — Jaime Figueroa

(57) ABSTRACT

Provided is a tangible, non-transitory, machine readable medium storing instructions that when executed by a processor of a robotic device effectuates operations including, receiving, by the processor, a sequence of one or more commands; executing, by the robotic device, the sequence of one or more commands; saving, by the processor, the sequence of one or more commands in memory after a predetermined amount of time from receiving a most recent one or more commands; and re-executing, by the robotic device, the saved sequence of one or more commands.

20 Claims, 107 Drawing Sheets

(56) References Cited

U.S. PATENT DOCUMENTS

| | | | | |
|---|---|---|---|---|
| 10,368,711 | B1 | 8/2019 | Ebrahimi Afrouzi | |
| 2005/0225442 | A1* | 10/2005 | Kanayama | G08B 25/008 340/539.13 |
| 2005/0234679 | A1* | 10/2005 | Karlsson | G05D 1/0248 702/181 |
| 2006/0154642 | A1* | 7/2006 | Scannell, Jr. | G08B 7/066 455/404.1 |
| 2007/0078564 | A1* | 4/2007 | Hoshino | G06V 40/10 700/245 |
| 2007/0157307 | A1* | 7/2007 | Katoh | H04L 63/105 726/14 |
| 2014/0371907 | A1* | 12/2014 | Passot | G06N 3/008 700/257 |
| 2015/0217449 | A1* | 8/2015 | Meier | G05D 1/0088 901/1 |
| 2015/0283702 | A1* | 10/2015 | Izhikevich | G06N 3/008 700/257 |
| 2015/0283703 | A1* | 10/2015 | Izhikevich | G06N 20/00 700/258 |
| 2016/0059412 | A1* | 3/2016 | Oleynik | B25J 9/0018 700/250 |

* cited by examiner

FIG. 7A
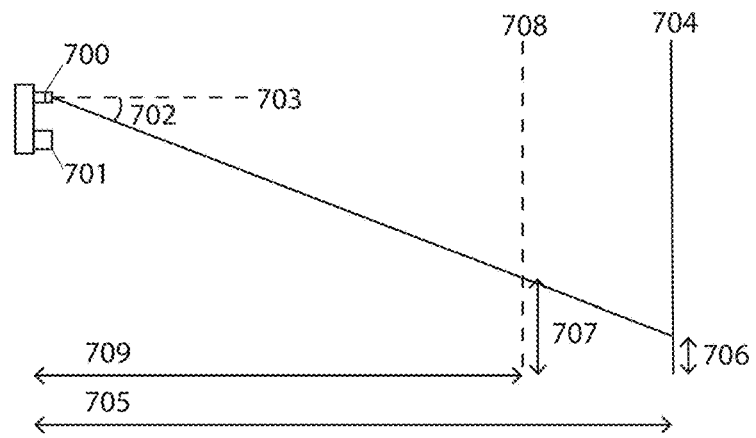
FIG. 7B
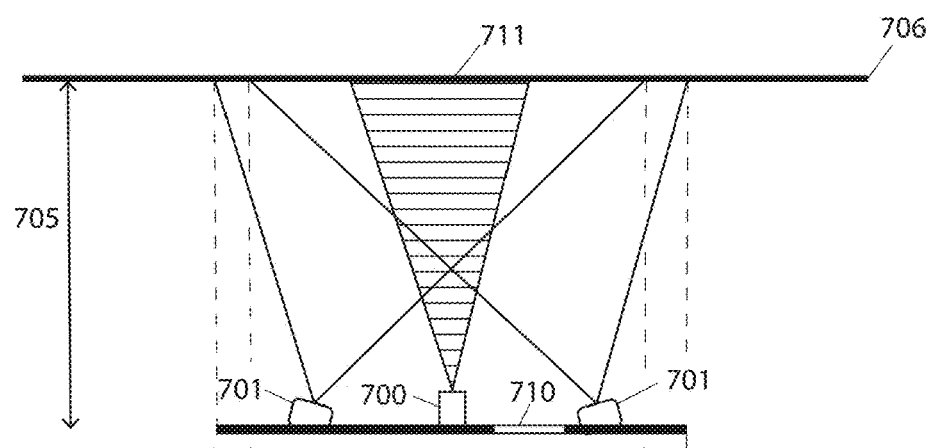
FIG. 7C

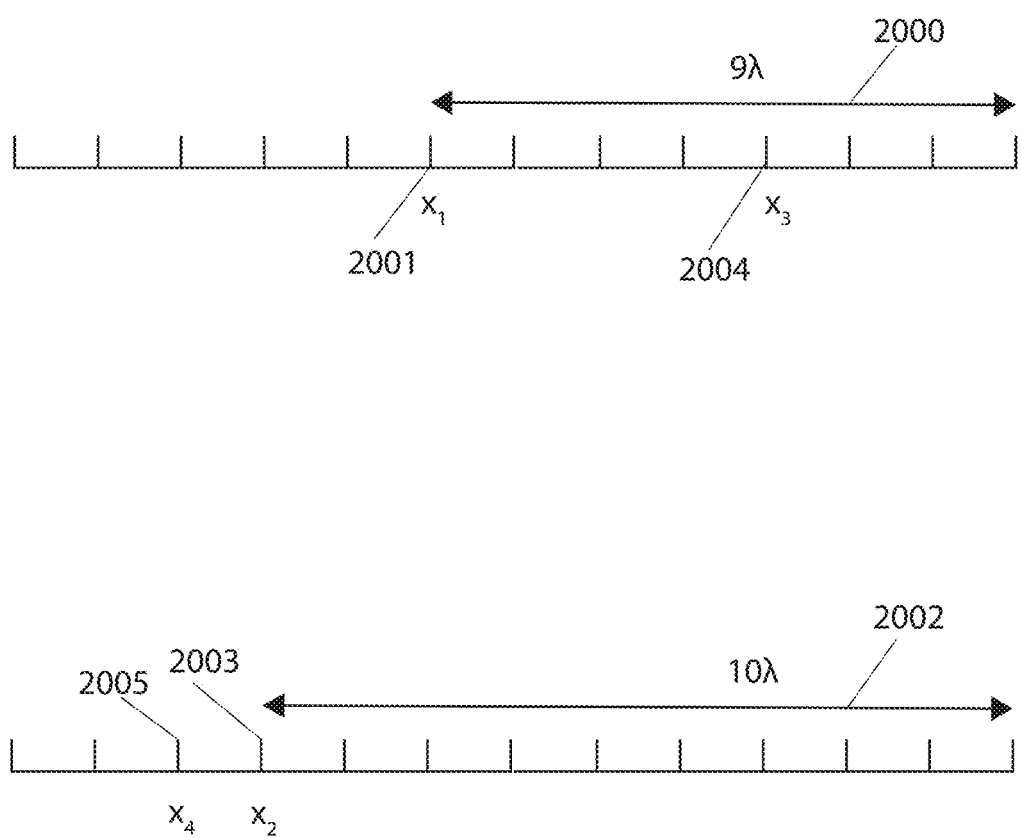

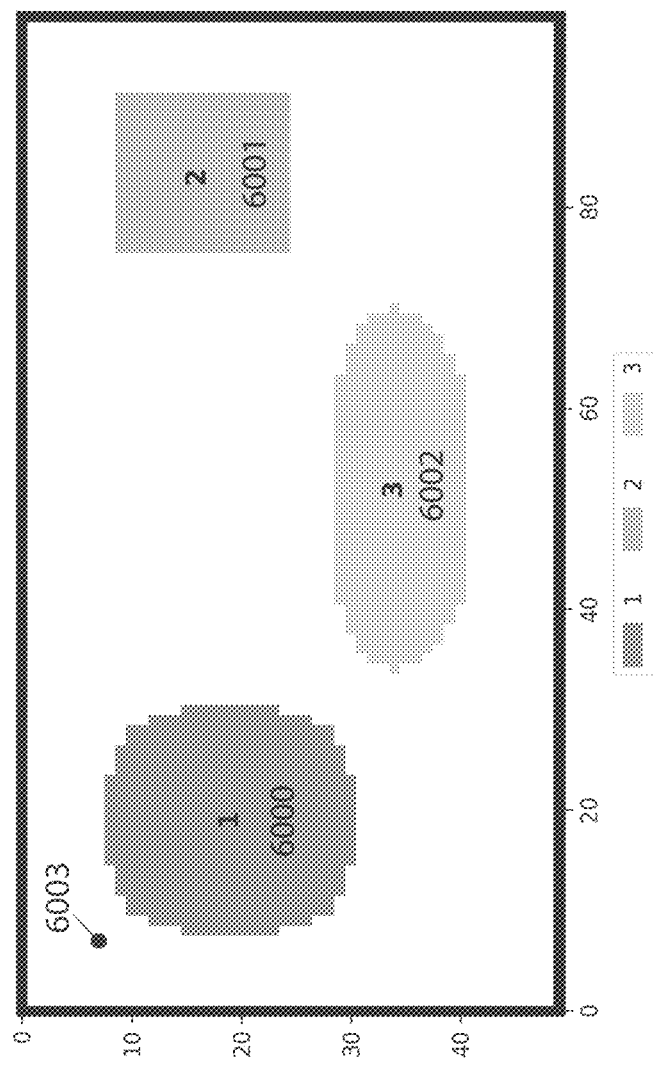

Total Cost: 122

Total Cost: 104

Total Cost: 106

Total Cost: 104

Total Cost: 104

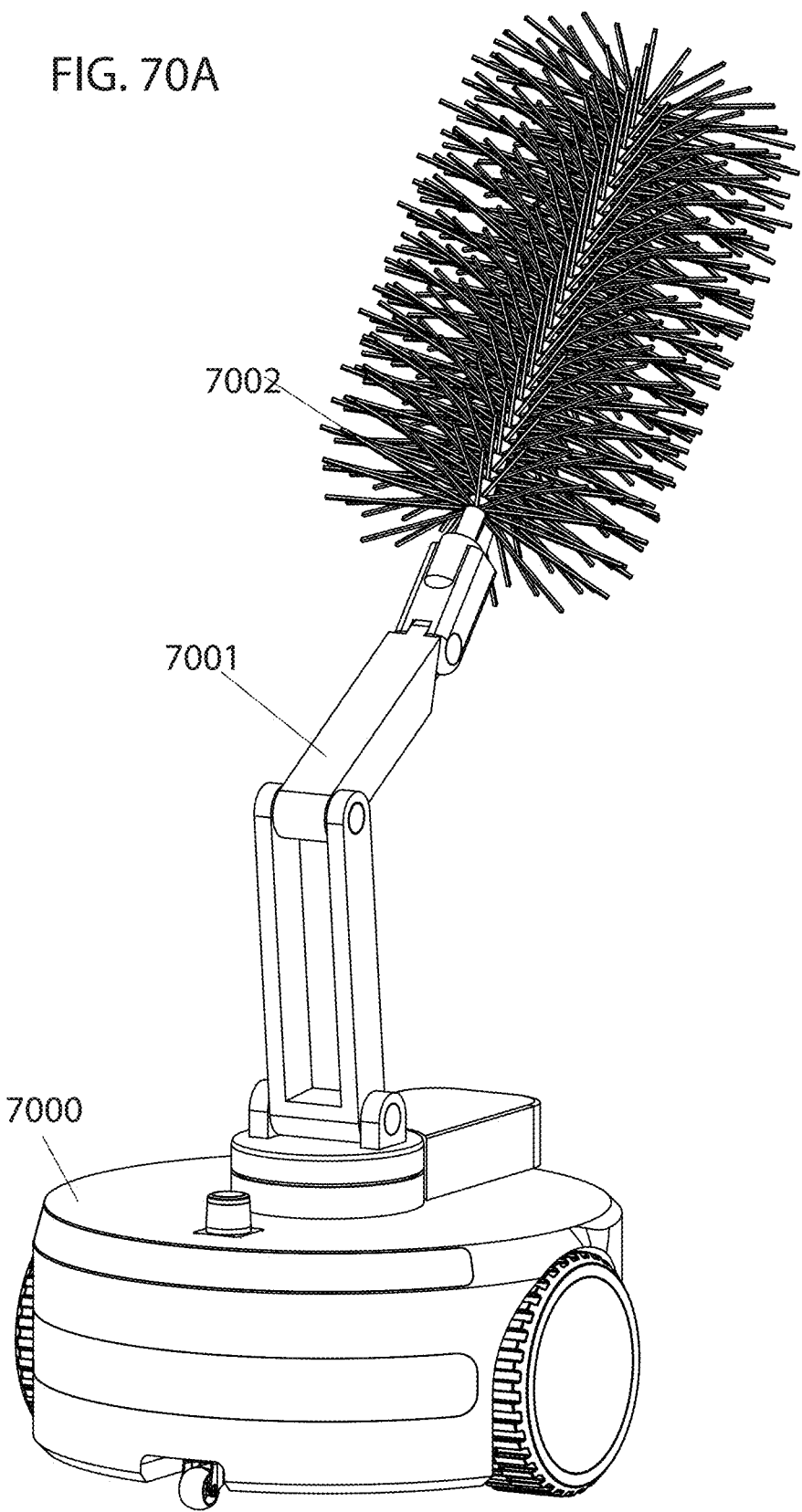

METHOD FOR DEVELOPING NAVIGATION PLAN IN A ROBOTIC FLOOR-CLEANING DEVICE

CROSS-REFERENCE TO RELATED APPLICATIONS

This application is a Continuation of U.S. Non-Provisional patent application Ser. No. 16/446,574, filed Jun. 19, 2019, which is a Continuation-in-Part of U.S. Non-Provisional patent application Ser. No. 15/449,531, filed Mar. 2, 2017 which claims the benefit of U.S. Provisional Patent Application No. 62/303,225, filed Mar. 3, 2016, each of which is hereby incorporated by reference herein.

U.S. Non-Provisional patent application Ser. No. 16/446, 574 claims the benefit of U.S. Provisional Patent Application Nos. 62/746,688, filed Oct. 17, 2018, 62/688,497, filed Jun. 22, 2018, 62/740,573, filed Oct. 3, 2018, 62/740,580, filed Oct. 3, 2018, 62/735,137, filed Sep. 23, 2018, each of which is hereby incorporated by reference herein.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 16/185,000, 16/041, 286, 15/406,890, 14/673,633, 16/163,530, 16/297,508, 15/955,480, 15/425,130, 15/955,344, 15/243,783, 15/954, 335, 15/954,410, 15/257,798, 15/674,310, 15/224,442, 15/683,255, 14/817,952, 15/619,449, 16/198,393, and 16/239,410, and, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to navigation methods of robotic floor-cleaning devices.

BACKGROUND

Various methods have been devised for navigating robotic floor-cleaning devices automatically. However, paths derived automatically are often less efficient and desirable as compared to paths selected by a user. A user may more quickly and easily identify areas to avoid by a robotic floor-cleaning device, such as, an area with a lot of cords and cables or containing a fragile piece of furniture. A need exists for a method to replicate a human's ability to identify an ideal path for a robotic floor-cleaning device.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a tangible, non-transitory, machine readable medium storing instructions that when executed by a processor of a robotic device effectuates operations including, receiving, by the processor, a sequence of one or more commands; executing, by the robotic device, the sequence of one or more commands; saving, by the processor, the sequence of one or more commands in memory after a predetermined amount of time from receiving a most recent one or more commands; and re-executing, by the robotic device, the saved sequence of one or more commands

BRIEF DESCRIPTION OF DRAWINGS

FIGS. 7A-7C illustrate an example of distance estimation using a variation of a depth perceiving device, according to some embodiments.

FIG. 20 illustrates an example of alternative localization scenarios wherein localization is given in multiples of $\lambda$, according to some embodiments.

FIGS. 60A-60C illustrate example measures of area and distance from the center of a zone used in assigning a numerical value to boundary nodes of a zone, according to some embodiments.

FIGS. 70A and 70B illustrate an example of a car washing robot, according to some embodiments.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a method for developing a navigation plan for a robotic floor-cleaning device. In some embodiments, a robotic floor-cleaning device includes, a shell, a chassis, a set of wheels, at least one motor connected for powering the wheels, a control unit to control movement of the robotic floor cleaning device, an input/output means electrically coupled to the control unit, a memory unit to store data, a processor, and a means for cleaning a work surface (e.g., brush, mopping cloth, steam cleaner, scrubber, UV sterilizer, etc.). In some embodiments, the robotic floor-cleaning device may further include a network card for wireless communications, sensors, a rechargeable power source (solar, electrical, or both), a clock or other synchronizing device, radio frequency (RF) transmitter and receiver, infrared (IR) transmitter and receiver, a user interface, etc. Examples of sensors include infrared (IR) sensors, tactile sensors, sonar sensors, gyroscopes, ultrasonic sensors, cameras, odometer sensors, optical flow sensors, light detection and ranging (LIDAR) sensors, depth cameras, imaging sensors, light illuminators, depth or distance sensors, optical encoders, time-of-light sensors, TSSP sensors, etc. Other types of robotic floor-cleaning devices with other configurations may also be used.

Figure 1:
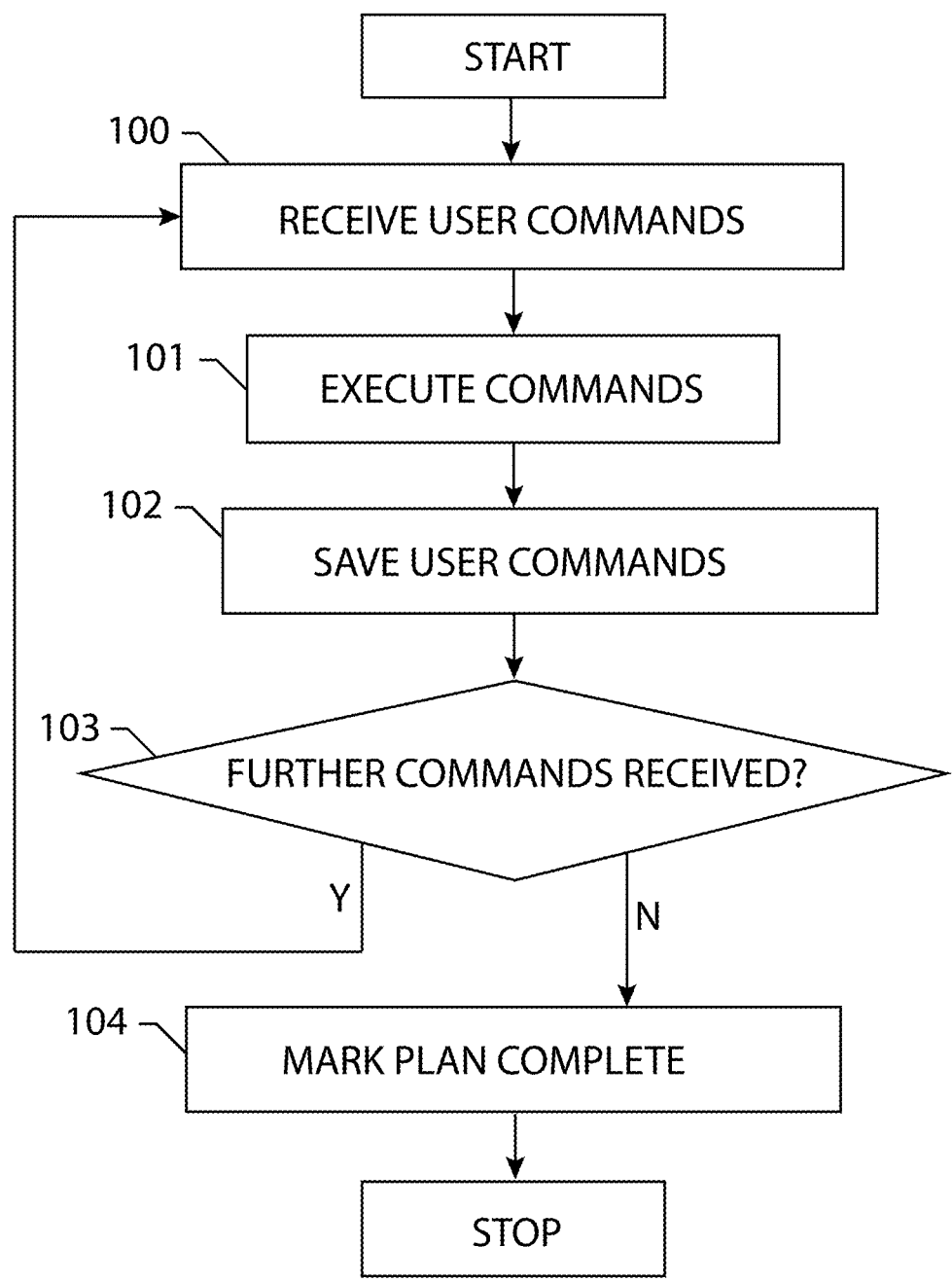
FIG. 1 illustrates an example of a process for saving a user-input navigation plan, according to some embodiments.

FIG. 1 illustrates an example of a process for saving a user-input navigation plan. In a first step 100, a processor of a robotic floor-cleaning device receives input from a user commanding navigational movement via an input device. In a next step 101, the processor actuates the robotic floor-cleaning device to execute the commands. In a next step 102, the processor of the robotic floor-cleaning device saves the user commands in a memory unit. If, in a next step 103, the processor of the robotic floor-cleaning device continues to receive inputs, the method repeats steps 100, 101, and 102 until such a time as no further user input is received for a predetermined length of time. When no further user input is received during the predetermined length of time, the method proceeds to a next step 104 in which the navigational plan is marked as complete by the processor. Any number of navigational plans may be saved in the memory unit, subject only to the limits of the memory unit.

The processor of the robotic floor-cleaning device may access saved navigational plans at any time and re-execute the pattern commanded by the user. In some embodiments, the robotic floor-cleaning device further comprises a clock. In some embodiments, the processor commands the robotic floor-cleaning device to re-execute a pattern commanded by a user at the same time of day as when the original commands were input by the user or received by the processor. In some embodiments, the processor commands the robotic floor-cleaning device to re-execute a pattern commanded by a user on the same day of the week as when the original commands were input by the user or received by the processor.

In some embodiments, the method further comprises suggesting a navigational plan to a user via an input/output means before executing it.

In some embodiments, the input/output device is wireless and can send and receive signals to and from remote devices, such as remote controls and smartphones.

In some embodiments, inputs from a user and outputs from the robotic floor cleaning device may be provided through a software application installed on an internet-connected device, such as a smartphone, a computer, or a tablet.

In some embodiments, the processor of the robotic floor-cleaning device is paired with an application of a communication device. Examples of a communication device include, a mobile phone, a tablet, a laptop, a desktop computer, a specialized computing device, a remote control, or other device capable of communication with the robotic floor-cleaning device. In some embodiments, the application of the communication device may be used to communicate settings and operations to the processor. In some embodiments, the graphical user interface of the application is used by a user to provide commands, such as navigational commands, and to choose settings, operations, and preferences of the robot. In some instances, the application is used to display a map of the environment and the graphical user interface may be used by the user to modify the map (e.g., modify, add, or delete perimeters, doorways, and objects and obstacles such as furniture, walls, etc.), modify or create a navigation path of the robotic floor-cleaning device, create or modify subareas of the environment, label areas of an environment (e.g., kitchen, bathroom, bedroom, etc.), choose particular settings (e.g., average and maximum travel speed, average and maximum driving speed of an operational tool, RPM of an impeller, etc.) and operations (e.g., steam cleaning, mopping, vacuuming, UV sterilization, etc.) for different areas of the environment, input characteristics of areas of an environment (e.g., obstacle density, floor type, floor transitions, activity level, etc.), create an operation schedule that is repeating or non-repeating for different areas of the environment (e.g., vacuum the living room and kitchen in the morning on Wednesdays), etc. Further descriptions of a graphical user interface of an application of a communication device that may be used are described in U.S. patent application Ser. Nos. 15/272,752 and 15/949,708, the entire contents of which are hereby incorporated by reference.

In some embodiments, the processor of the robotic floor-cleaning device creates a map of its environment. In some embodiments, the processor incorporates the location of the robotic floor-cleaning device during which the user commands were received into the map of the environment. In some embodiments, the processor commands the robotic floor-cleaning device to re-execute a pattern commanded by a user when positioned at the same location.

One skilled in the art will appreciate that various mapping techniques, such as SLAM technology, or receiving a map of the environment from an external source, may be used without departing from the scope of the invention.

In some embodiments, the processor of the robotic floor-cleaning device creates a map of the environment. In some embodiments, a camera of the robotic floor-cleaning device captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In some embodiments, the robot with attached camera rotates to observe a second field of view partly overlapping the first field of view and captures a depth image of objects within the second field of view (e.g., differing from the first field of view due to a difference in camera pose). In some embodiments, the processor compares the readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, wherein the robotic floor-cleaning device is holding the communication device, the processor infers the angular disposition of the robotic floor-cleaning device from the size of the area of overlap and uses the angular disposition to adjust odometer information to overcome the inherent noise of an odometer. Further, in some embodiments, it is not necessary that the value of overlapping readings from the first and second fields of view be the exact same for the area of overlap to be identified. It is expected that readings will be affected by noise, resolution of the equipment taking the readings, and other inaccuracies inherent to measurement devices. Similarities in the value of readings from the first and second fields of view can be identified when the values of the readings are within a tolerance range of one another. The area of overlap may also be identified by the processor by recognizing matching patterns among the readings from the first and second fields of view, such as a pattern of increasing and decreasing values. Once an area of overlap is identified, in some embodiments, the processor uses the area of overlap as the attachment point and attaches the two fields of view to form a larger field of view. Since the overlapping readings from the first and second fields of view within the area of overlap do not necessarily have the exact same values and a range of tolerance between their values is allowed, the processor uses the overlapping readings from the first and second fields of view to calculate new readings for the overlapping area using a moving average or another suitable mathematical convolution. This is expected to improve the accuracy of the readings as they are calculated from the combination of two separate sets of readings. The processor uses the newly calculated readings as the readings for the overlapping area, substituting for the readings from the first and second fields of view within the area of overlap. In some embodiments, the processor uses the new readings as ground truth values to adjust all other readings outside the overlapping area.

Once all readings are adjusted, a first segment of the map is complete. In other embodiments, combining readings of two fields of view may include transforming readings with different origins into a shared coordinate system with a shared origin, e.g., based on an amount of translation or rotation of the camera between frames. The transformation may be performed before, during, or after combining. The method of using the camera to capture readings within consecutively overlapping fields of view and the processor to identify the area of overlap and combine readings at identified areas of overlap is repeated, e.g., until at least a portion of the environment is discovered and a map is constructed. Additional mapping methods that may be used by the processor to generate a map of the environment are described in U.S. patent application Ser. Nos. 16/048,179, 16/048,185, 16/163,541, 16/163,562, 16/163,508, and 16/185,000, the entire contents of which are hereby incorporated by reference.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix can be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, can be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an IMU. In some embodiments, the translation and rotation of the camera between frames is measured by two separate movement measurement devices (e.g., optical encoder and gyroscope of the robotic floor-cleaning device) and the movement of the robot is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 2A:
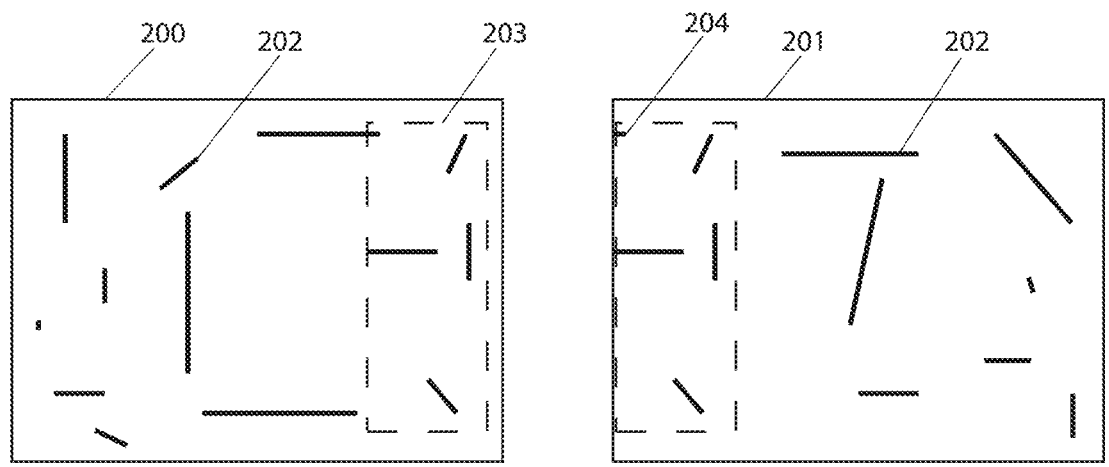
FIGS. 2A-2C illustrate how an overlapping area is detected in some embodiments using raw pixel intensity data and the combination of data at overlapping points.
Figure 2B:
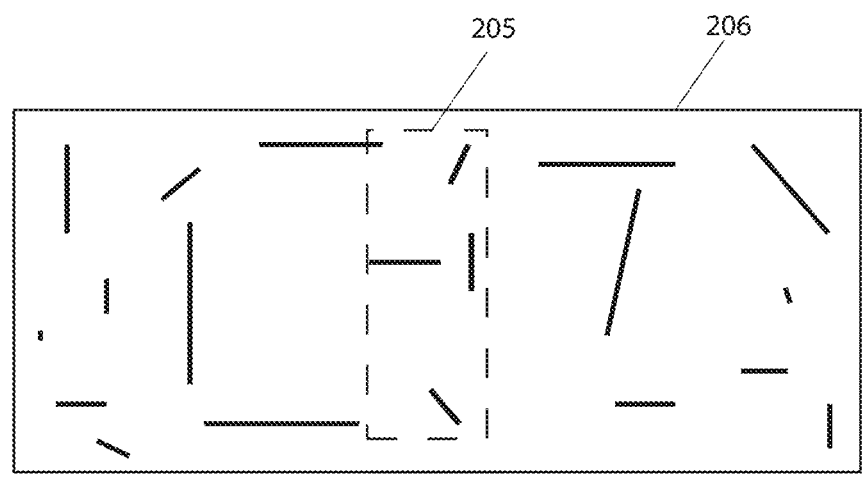
Figure 2C:
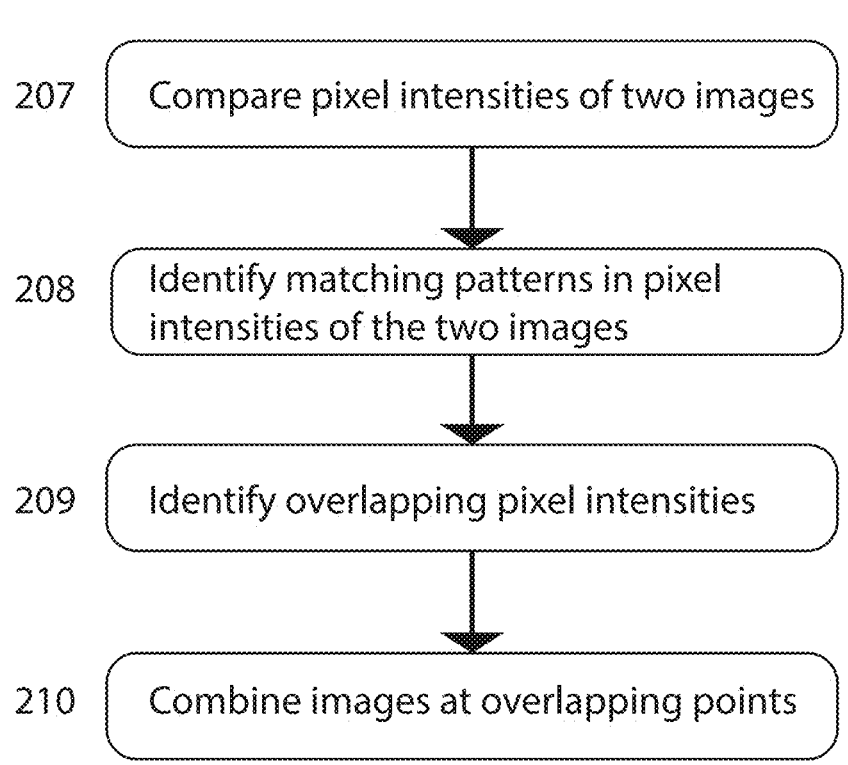

FIGS. 2A and 2B illustrate an example of identifying an area of overlap using raw pixel intensity data and the combination of data at overlapping points. In FIG. 2A, the overlapping area between overlapping image 200 captured in a first field of view and image 201 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 202 represent pixels with high pixel intensity value (such as those above a certain threshold) in each image. Area 203 of image 200 and area 204 of image 201 capture the same area of the environment and, as such, the same pattern for pixel intensity values is sensed in area 203 of image 200 and area 204 of image 201. After identifying matching patterns in pixel intensity values in image 200 and 201, an overlapping area between both images may be determined. In FIG. 2B, the images are combined at overlapping area 205 to form a larger image 206 of the environment. In some cases, data corresponding to the images may be combined. For instance, depth values may be aligned based on alignment determined with the image. FIG. 2C illustrates a flowchart describing the process illustrated in FIGS. 2A and 2B wherein a processor of a robot at first stage 207 compares pixel intensities of two images captured by a sensor of the robot, at second stage 208 identifies matching patterns in pixel intensities of the two images, at third stage 209 identifies overlapping pixel intensities of the two images, and at fourth stage 210 combines the two images at overlapping points.

Figure 3A:
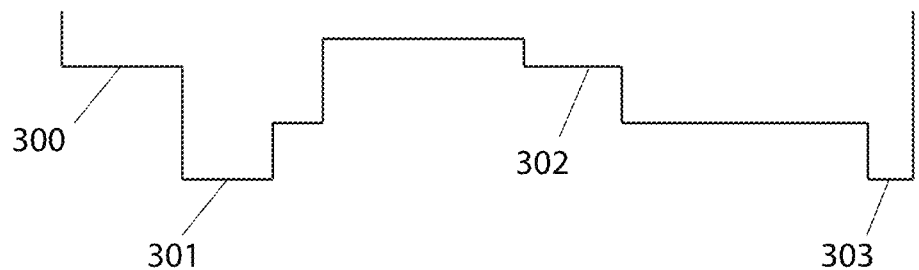
FIGS. 3A-3C illustrate how an overlapping area is detected in some embodiments using raw pixel intensity data and the combination of data at overlapping points.
Figure 3B:
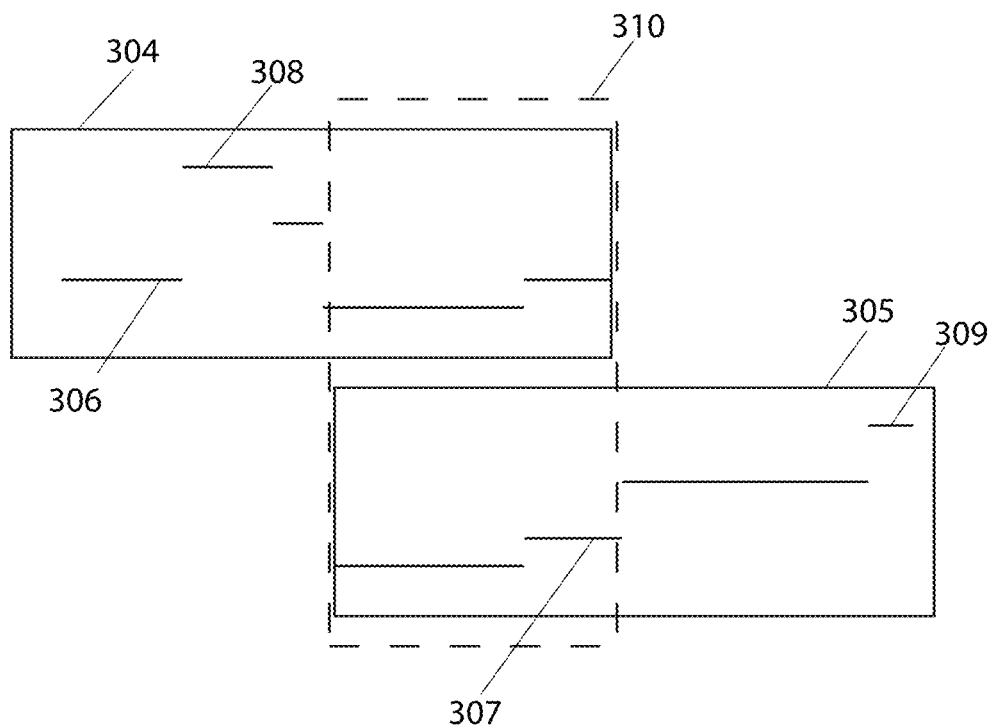
Figure 3C:
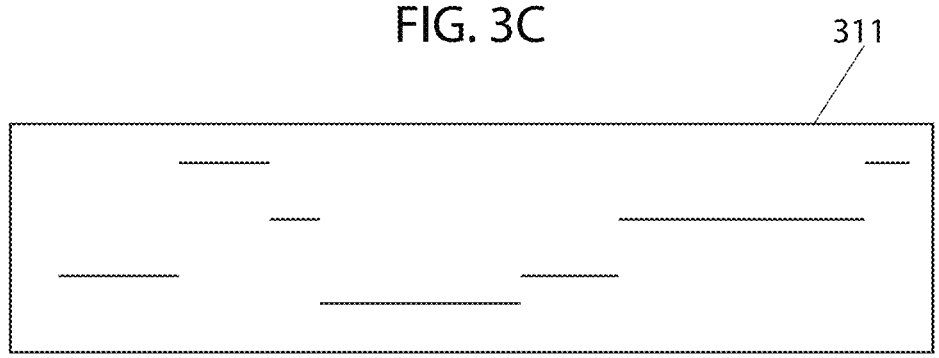

FIGS. 3A-3C illustrate another example of identifying an area of overlap using raw pixel intensity data and the combination of data at overlapping points. FIG. 3A illustrates a top (plan) view of an object, such as a wall, with uneven surfaces wherein, for example, surface 300 is further away from an observer than surface 301 or surface 302 is further away from an observer than surface 303. In some embodiments, at least one infrared line laser positioned at a downward angle relative to a horizontal plane coupled with at least one image sensor may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from an image sensor in the horizontal plane. The position of the laser line (or feature of a structured light pattern) in the image map be detected by finding pixels with intensity above a threshold. The position of the line laser in the captured image may be related to a distance from the surface upon which the line laser is projected. In FIG. 3B, captured images 304 and 305 of the laser line projected onto the object surface for two different fields of view are shown. Projected laser lines with lower position, such as laser lines 306 and 307 in images 304 and 305 respectively, correspond to object surfaces 300 and 302, respectively, further away from the infrared illuminator and image sensor. Projected laser lines with higher position, such as laser lines 308 and 309 in images 304 and 305 respectively, correspond to object surfaces 301 and 303, respectively, closer to the infrared illuminator and image sensor. Captured images 304 and 305 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 304 and 305 bound within dashed lines 310 have similar arrangement of pixel intensities as both images captured a same portion of the object within their field of view. Therefore, images 304 and 305 may be combined at overlapping points to construct larger image 311 of the environment shown in FIG. 3C. The position of the laser lines in image 311, indicated by pixels with intensity value above a threshold intensity, may be used to infer depth of surfaces of objects from the infrared illuminator and image sensor (see, U.S. patent application Ser. No. 15/674,310, the entire contents of which is hereby incorporated by reference).

In some embodiments, the processor of the robot identifies a gap in the map. In some embodiments, the processor navigates to the area in which the gap exists for further exploration, capturing new images with the camera while exploring. New data is captured by the camera and combined with the existing map at overlapping points until the gap in the map no longer exists.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

In some embodiments, the robotic floor-cleaning device uses readings from its sensors to generate at least a portion of the map of the environment using the techniques described above (e.g., stitching readings together at overlapping points). In some embodiments, readings from other external sensors (e.g., closed circuit television) are used to generate at least a portion of the map. In some embodiments, a depth perceiving device is used to measure depth to objects in the environment and depth readings are used to generate a map of the environment as described above. Depending on the type of depth perceiving device used, depth may be perceived in various forms. The depth perceiving device may be a depth sensor, a camera, a camera coupled with IR illuminator, a stereovision camera, a depth camera, a time-of-flight camera or any other device which can infer depths from captured depth images. For example, in one embodiment the depth perceiving device may capture depth images containing depth vectors to objects, from which the processor can calculate the Euclidean norm of each vector, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In another example, the depth perceiving device infers depth of an object based on the time required for a light (e.g., broadcast by a depth-sensing time-of-flight camera) to reflect off of the object and return. In a further example, depth to objects may be inferred using the quality of pixels, such as brightness, intensity, and color, in captured images of the objects, and in some cases, parallax and scaling differences between images captured at different camera poses For example, a depth perceiving device may include a laser light emitter disposed on a baseplate emitting a collimated laser beam creating a projected light point on surfaces substantially opposite the emitter, two image sensors disposed on the baseplate, positioned at a slight inward angle towards to the laser light emitter such that the fields of view of the two image sensors overlap and capture the projected light point within a predetermined range of distances, the image sensors simultaneously and iteratively capturing images, and an image processor overlaying the images taken by the two image sensors to produce a superimposed image showing the light points from both images in a single image, extracting a distance between the light points in the superimposed image, and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured. In some embodiments, the preconfigured table may be constructed from actual measurements of distances between the light points in superimposed images at increments in a predetermined range of distances between the baseplate and the projection surface.

Figure 4A:
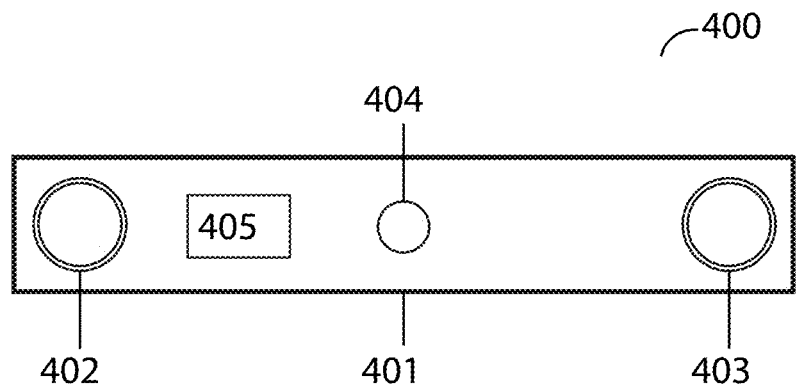
FIGS. 4A and 4B illustrates an example of a depth perceiving device, according to some embodiments.
Figure 4B:
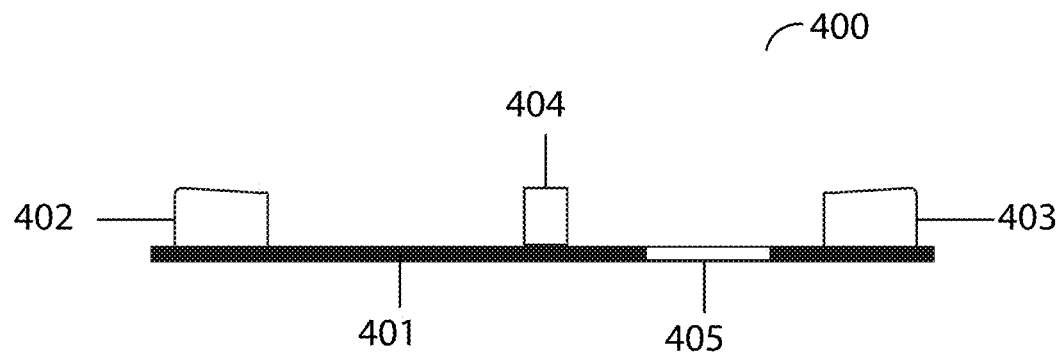
Figure 5:
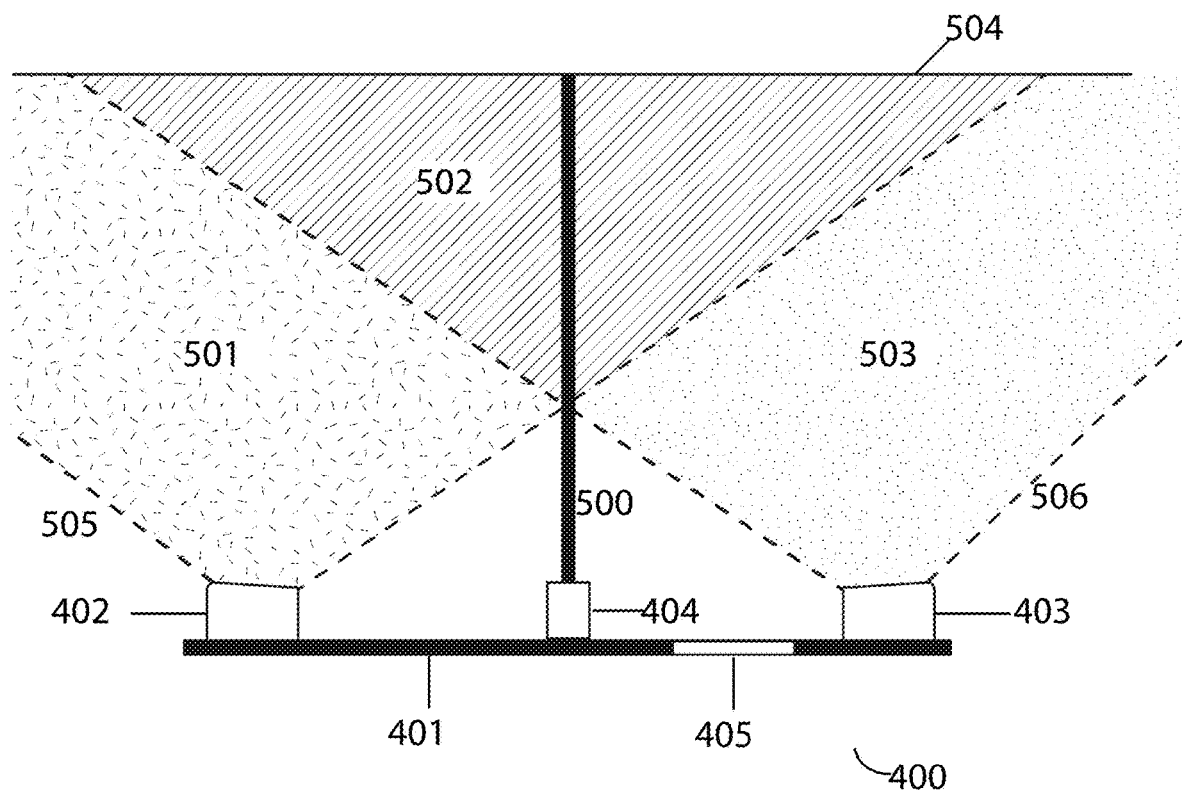
FIG. 5 illustrates an overhead view of an example of a depth perceiving device and fields of view of its image sensors, according to some embodiments.

FIGS. 4A and 4B illustrate a front elevation and top plan view of an embodiment of the depth perceiving device 400 including baseplate 401, left image sensor 402, right image sensor 403, laser light emitter 404, and image processor 405. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. FIG. 5 illustrates an overhead view of depth perceiving device 400 including baseplate 401, image sensors 402 and 403, laser light emitter 404, and image processor 405. Laser light emitter 404 is disposed on baseplate 401 and emits collimated laser light beam 500. Image processor 405 is located within baseplate 401. Area 501 and 502 together represent the field of view of image sensor 402. Dashed line 505 represents the outer limit of the field of view of image sensor 402 (it should be noted that this outer limit would continue on linearly, but has been cropped to fit on the drawing page). Area 503 and 502 together represent the field of view of image sensor 403. Dashed line 506 represents the outer limit of the field of view of image sensor 403 (it should be noted that this outer limit would continue on linearly, but has been cropped to fit on the drawing page). Area 502 is the area where the fields of view of both image sensors overlap. Line 504 represents the projection surface. That is, the surface onto which the laser light beam is projected.

In some embodiments, each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well. In some embodiments, the emitted laser point captured in an image is detected by the image processor by identifying pixels with high brightness, as the area on which the laser light is emitted has increased brightness. After superimposing both images, the distance between the pixels with high brightness, corresponding to the emitted laser point captured in each image, is determined.

Figure 6A:
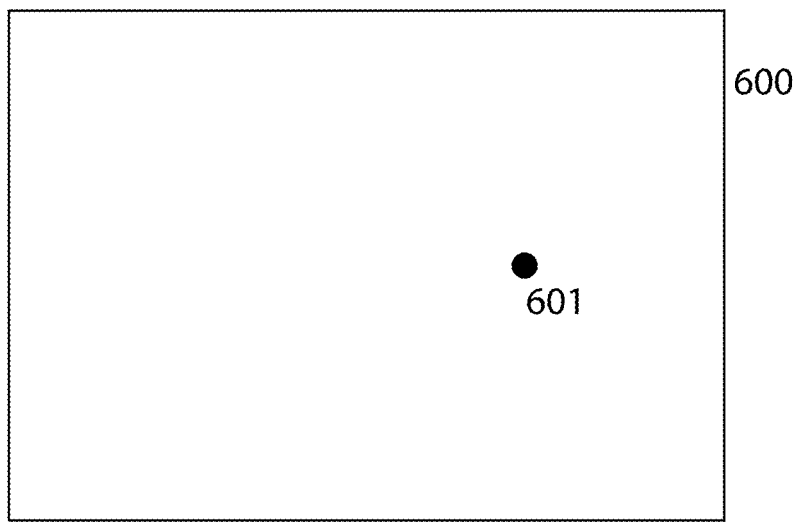
FIGS. 6A-6C illustrate an example of distance estimation using a variation of a depth perceiving device, according to some embodiments.
Figure 6B:
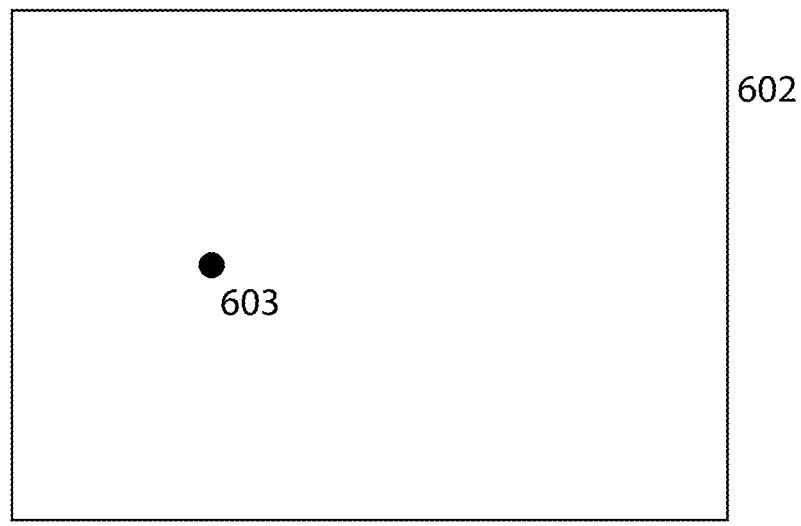
Figure 6C:
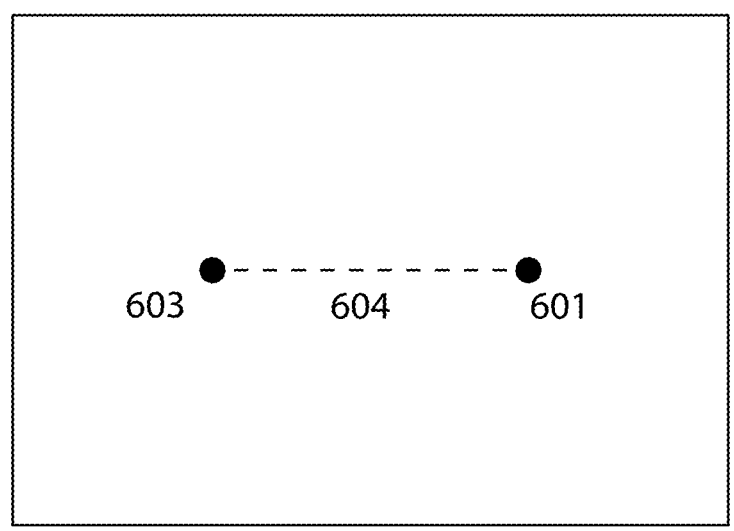

FIG. 6A illustrates an embodiment of the image captured by left image sensor 402. Rectangle 600 represents the field of view of image sensor 402. Point 601 represents the light point projected by laser beam emitter 404 as viewed by image sensor 402. FIG. 6B illustrates an embodiment of the image captured by right image sensor 403. Rectangle 602 represents the field of view of image sensor 403. Point 603 represents the light point projected by laser beam emitter 404 as viewed by image sensor 402. As the distance of the baseplate to projection surfaces increases, light points 601 and 603 in each field of view will appear further and further toward the outer limits of each field of view, shown respectively in FIG. 5 as dashed lines 505 and 506. Thus, when two images captured at the same time are overlaid, the distance between the two points will increase as distance to the projection surface increases. FIG. 6C illustrates the two images of FIG. 6A and FIG. 6B overlaid. Point 601 is located a distance 604 from point 603, the distance extracted by the image processor 405. The distance 604 is then compared to figures in a preconfigured table that co-relates distances between light points in the superimposed image with distances between the baseplate and projection surfaces to find an estimate of the actual distance from the baseplate to the projection surface upon which the laser light was projected.

In some embodiments, the two image sensors are aimed directly forward without being angled towards or away from the laser light emitter. When image sensors are aimed directly forward without any angle, the range of distances for which the two fields of view may capture the projected laser point is reduced. In these cases, the minimum distance that may be measured is increased, reducing the range of distances that may be measured. In contrast, when image sensors are angled inwards towards the laser light emitter, the projected light point may be captured by both image sensors at smaller distances from the obstacle.

In some embodiments, the image sensors may be positioned at an angle such that the light point captured in each image coincides at or before the maximum effective distance of the distance sensor, which is determined by the strength and type of the laser emitter and the specifications of the image sensor used.

In some embodiments, the depth perceiving device further includes a plate positioned in front of the laser light emitter with two slits through which the emitted light may pass. In some instances, the two image sensors may be positioned on either side of the laser light emitter pointed directly forward or may be positioned at an inwards angle towards one another to have a smaller minimum distance to the object that may be measured. The two slits through which the light may pass results in a pattern of spaced rectangles. In some embodiments, the images captured by each image sensor may be superimposed and the distance between the rectangles captured in the two images may be used to estimate the distance to the projection surface using a preconfigured table relating distance between rectangles to distance from the surface upon which the rectangles are projected. The preconfigured table may be constructed by measuring the distance between rectangles captured in each image when superimposed at incremental distances from the surface upon which they are projected for a range of distances.

In some instances, a line laser is used in place of a point laser. In such instances, the images taken by each image sensor are superimposed and the distance between coinciding points along the length of the projected line in each image may be used to determine the distance from the surface using a preconfigured table relating the distance between points in the superimposed image to distance from the surface. In some embodiments, the depth perceiving device further includes a lens positioned in front of the laser light emitter that projects a horizontal laser line at an angle with respect to the line of emission of the laser light emitter. The images taken by each image sensor may be superimposed and the distance between coinciding points along the length of the projected line in each image may be used to determine the distance from the surface using a preconfigured table as described above. The position of the projected laser line relative to the top or bottom edge of the captured image may also be used to estimate the distance to the surface upon which the laser light is projected, with lines positioned higher relative to the bottom edge indicating a closer distance to the surface. In some embodiments, the position of the laser line may be compared to a preconfigured table relating the position of the laser line to distance from the surface upon which the light is projected. In some embodiments, both the distance between coinciding points in the superimposed image and the position of the line are used in combination for estimating the distance to the projection surface. In combining more than one method, the accuracy, range, and resolution may be improved.

FIG. 7A illustrates an embodiment of a side view of a depth perceiving device including a laser light emitter and lens 700, image sensors 701, and image processor (not shown). The lens is used to project a horizontal laser line at a downwards angle 702 with respect to line of emission of laser light emitter 703 onto object surface 704 located a distance 705 from the depth perceiving device. The projected horizontal laser line appears at a height 706 from the bottom surface. As shown, the projected horizontal line appears at a height 707 on object surface 708, at a closer distance 709 to laser light emitter 700, as compared to object 704 located a further distance away. Accordingly, in some embodiments, in a captured image of the projected horizontal laser line, the position of the line from the bottom edge of the image would be higher for objects closer to the distance estimation system. Hence, the position of the project laser line relative to the bottom edge of a captured image may be related to the distance from the surface FIG. 7B illustrates a top view of the depth perceiving device including laser light emitter and lens 700, image sensors 701, and image processor 710. Horizontal laser line 711 is projected onto object surface 706 located a distance 705 from the baseplate of the distance measuring system. FIG. 7C illustrates images of the projected laser line captured by image sensors 701. The horizontal laser line captured in image 712 by the left image sensor has endpoints 713 and 714 while the horizontal laser line captured in image 715 by the right image sensor has endpoints 716 and 717. FIG. 7C illustrates images of the projected laser line captured by image sensors 701. The horizontal laser line captured in image 712 by the left image sensor has endpoints 713 and 714 while the horizontal laser line captured in image 715 by the right image sensor has endpoints 716 and 717. FIG. 7C also illustrates the superimposed image 718 of images 712 and 715. On the superimposed image, distances 719 and 720 between coinciding endpoints 716 and 713 and 717 and 714, respectively, along the length of the laser line captured by each camera may be used to estimate distance from the baseplate to the object surface. In some embodiments, more than two points along the length of the horizontal line may be used to estimate the distance to the surface. In some embodiments, the position of the horizontal line 721 from the bottom edge of the image may be simultaneously used to estimate the distance to the object surface as described above. In some configurations, the laser emitter and lens may be positioned below the image sensors, with the horizontal laser line projected at an upwards angle with respect to the line of emission of the laser light emitter. In one embodiment, a horizontal line laser is used rather than a laser beam with added lens. Other variations in the configuration are similarly possible. For example, the image sensors may both be positioned to the right or left of the laser light emitter as opposed to either side of the light emitter as illustrated in the examples.

In some embodiments, noise, such as sunlight, may cause interference causing the image processor to incorrectly identify light other than the laser as the projected laser line in the captured image. The expected width of the laser line at a particular distance may be used to eliminate sunlight noise. A preconfigured table of laser line width corresponding to a range of distances may be constructed, the width of the laser line increasing as the distance to the obstacle upon which the laser light is projected decreases. In cases where the image processor detects more than one laser line in an image, the corresponding distance of both laser lines is determined. To establish which of the two is the true laser line, the image processor compares the width of both laser lines and compares them to the expected laser line width corresponding to the distance to the object determined based on position of the laser line. In some embodiments, any hypothesized laser line that does not have correct corresponding laser line width, to within a threshold, is discarded, leaving only the true laser line. In some embodiments, the laser line width may be determined by the width of pixels with high brightness. The width may be based on the average of multiple measurements along the length of the laser line.

In some embodiments, noise, such as sunlight, which may be misconstrued as the projected laser line, may be eliminated by detecting discontinuities in the brightness of pixels corresponding to the hypothesized laser line. For example, if there are two hypothesized laser lines detected in an image, the hypothesized laser line with discontinuity in pixel brightness, where for instance pixels 1 to 10 have high brightness, pixels 11-15 have significantly lower brightness and pixels 16-25 have high brightness, is eliminated as the laser line projected is continuous and, as such, large change in pixel brightness along the length of the line are unexpected. These methods for eliminating sunlight noise may be used independently, in combination with each other, or in combination with other methods during processing.

Figure 8:
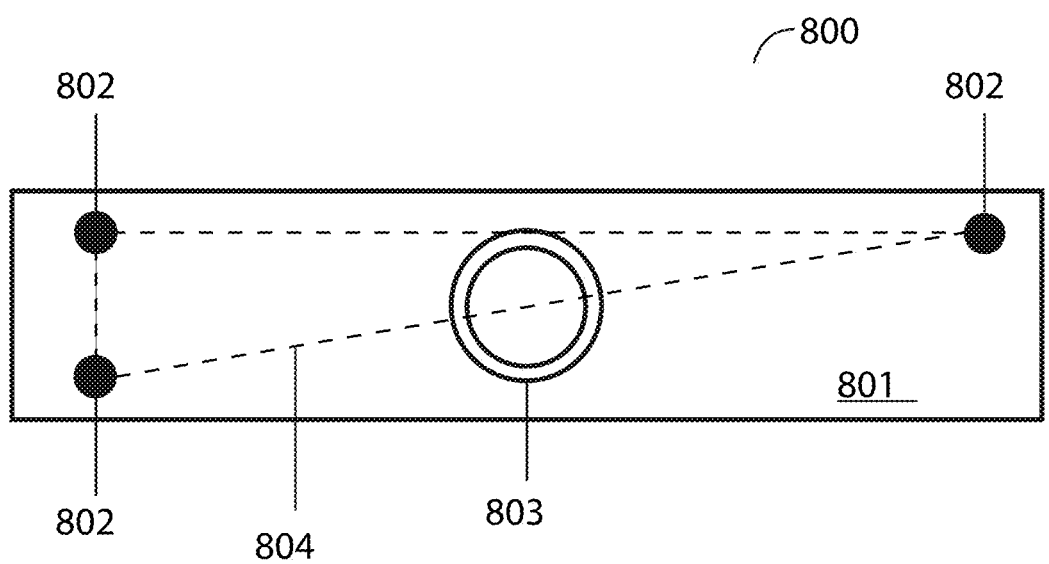
FIG. 8 illustrates an example of a depth perceiving device, according to some embodiments.
Figure 9:
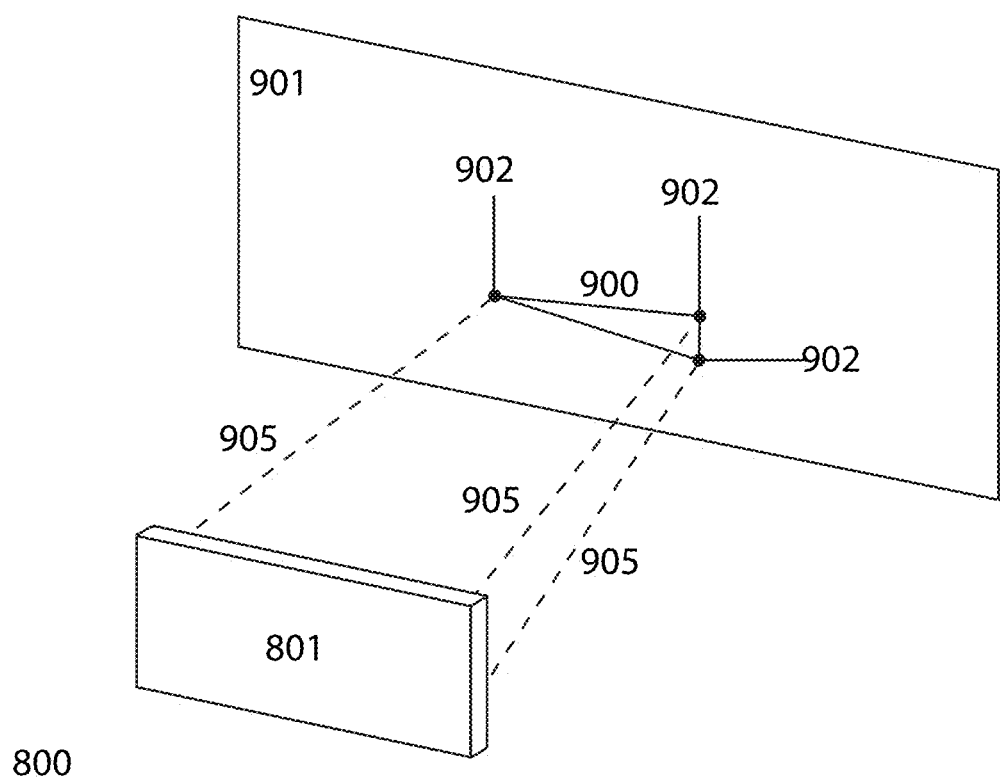
FIG. 9 illustrates a schematic view of a depth perceiving device and resulting triangle formed by connecting the light points illuminated by three laser light emitters, according to some embodiments.

In another example, a depth perceiving device includes an image sensor, an image processor, and at least two laser emitters positioned at an angle such that they converge. The laser emitters project light points onto an object, which is captured by the image sensor. The image processor may extract geometric measurements and compare the geometric measurement to a preconfigured table that relates the geometric measurements with depth to the object onto which the light points are projected. In cases where only two light emitters are used, they may be positioned on a planar line and for three or more laser emitters, the emitters are positioned at the vertices of a geometrical shape. For example, three emitters may be positioned at vertices of a triangle or four emitters at the vertices of a quadrilateral. This may be extended to any number of emitters. In these cases, emitters are angled such that they converge at a particular distance. For example, for two emitters, the distance between the two points may be used as the geometric measurement. For three or more emitters, the image processer measures the distance between the laser points (vertices of the polygon) in the captured image and calculates the area of the projected polygon. The distance between laser points and/or area may be used as the geometric measurement. The preconfigured table may be constructed from actual geometric measurements taken at incremental distances from the object onto which the light is projected within a specified range of distances. Regardless of the number of laser emitters used, they shall be positioned such that the emissions coincide at or before the maximum effective distance of the depth perceiving device, which is determined by the strength and type of laser emitters and the specifications of the image sensor used. Since the laser light emitters are angled toward one another such that they converge at some distance, the distance between projected laser points or the polygon area with projected laser points as vertices decrease as the distance from the surface onto which the light is projected increases. As the distance from the surface onto which the light is projected increases the collimated laser beams coincide and the distance between laser points or the area of the polygon becomes null. FIG. 8 illustrates a front elevation view of a depth perceiving device 800 including a baseplate 801 on which laser emitters 802 and an image sensor 803 are mounted. The laser emitters 802 are positioned at the vertices of a polygon (or endpoints of a line, in cases of only two laser emitters). In this case, the laser emitters are positioned at the vertices of a triangle 804. FIG. 9 illustrates the depth perceiving device 800 projecting collimated laser beams 905 of laser emitters 802 (not shown) onto a surface 901. The baseplate 801 and laser emitters (not shown) are facing a surface 901. The dotted lines 905 represent the laser beams. The beams are projected onto surface 901, creating the light points 902, which, if connected by lines, form triangle 900. The image sensor (not shown) captures an image of the projection and sends it to the image processing unit (not shown). The image processing unit extracts the triangle shape by connecting the vertices to form triangle 900 using computer vision technology, finds the lengths of the sides of the triangle, and uses those lengths to calculate the area within the triangle. The image processor then consults a pre-configured area-to-distance table with the calculated area to find the corresponding distance.

Figure 10:
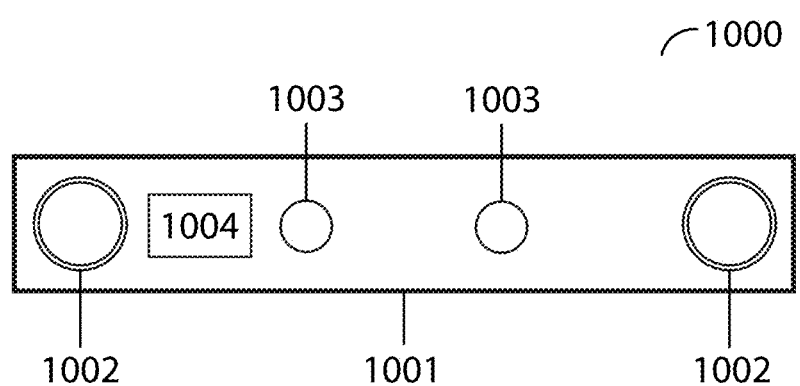
FIG. 10 illustrates an example of a depth perceiving device, according to some embodiments.
Figure 11:
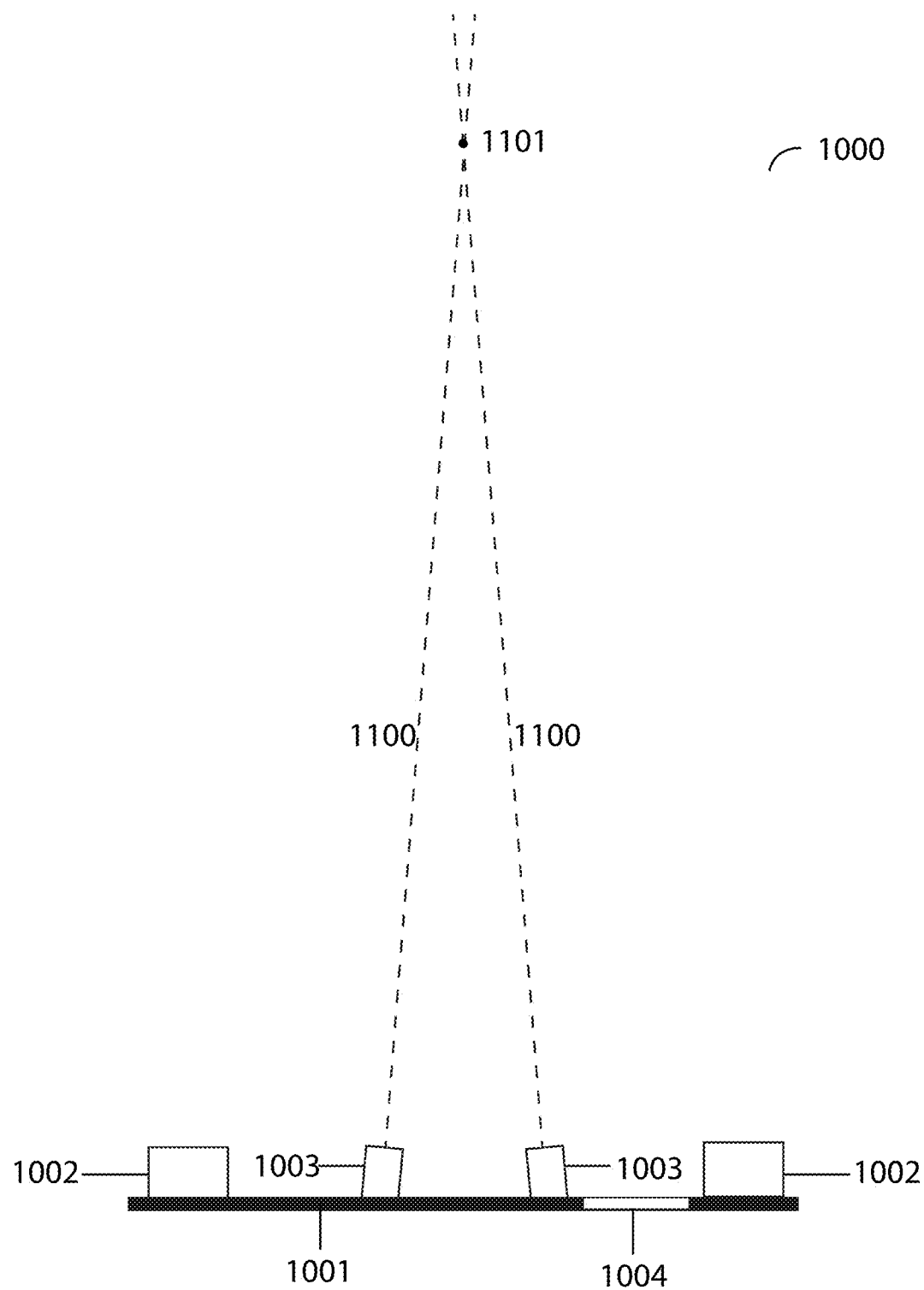
FIG. 11 illustrates an example of a depth perceiving device, according to some embodiments.

In some embodiments, a second image sensor is included to improve accuracy of the depth perceiving device. FIG. 10 illustrates a front elevation view of an example of a depth perceiving device 1000 including a baseplate 1001, image sensors 1002, laser light emitters 1003, and image processors 1004. The laser light emitters 1003 are positioned with a slight inward angle toward each other, with the point of convergence being a predetermined distance from the baseplate. The one or more image sensors shall be positioned such that the fields of view thereof will capture laser projections of the laser light emitters within a predetermined range of distances. FIG. 11 illustrates an overhead view of the depth perceiving device. Laser light emitters 1003 are disposed on baseplate 1001 and emit collimated laser light beams 1100, which converge at point 1101. Image sensors 1002 are located on either side of the laser light emitters. Image processor 1004 is located within baseplate 1001. In some embodiments, the maximum effective distance of the depth perceiving device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 201, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence.

Figure 12:
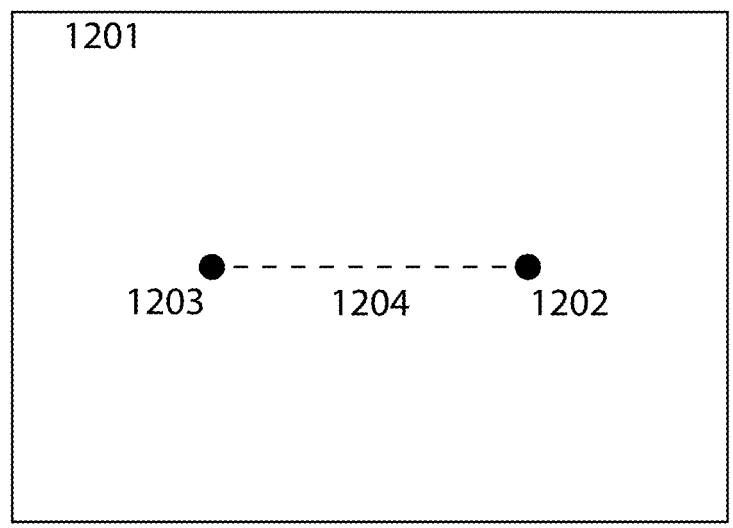
FIG. 12 illustrates an image captured by an image sensor, according to some embodiments.

In some embodiments, the one or more image sensors simultaneously and iteratively capture images at discrete time intervals. FIG. 12 illustrates an image 1200 captured by image sensor 1002. Rectangle 1201 represents the field of view of image sensor 1002. Points 1202 and 1203 represent the light points projected by the laser light emitters 1003. As the distance of the baseplate to projection surfaces increases, the light points 1202, 1203 will appear closer and closer together until the distance between them is null, after which point the light points will diverge from each other. Thus, the distance 1204 between the two points may be analyzed to determine the distance to the projection surface at the time that an image is captured. The image 1201 is sent to the image processor, which extracts the distance 3804 between the two points (if any). The distance 1204 is then compared to figures in a preconfigured table that co-relates distances between light points in the system with distances between the baseplate and projection surfaces to find an estimate of the actual distance from the baseplate to the projection surface at the time the image of the laser light projections was captured. In some embodiments, the process of capturing an image, sending it to an image processor, and extracting the distance between the light points is performed simultaneously using a second image sensor, and the data extracted from images from the first image sensor is combined with the data extracted from the second image sensor to obtain a more accurate aggregate reading before consulting the preconfigured table.

Figure 13A:
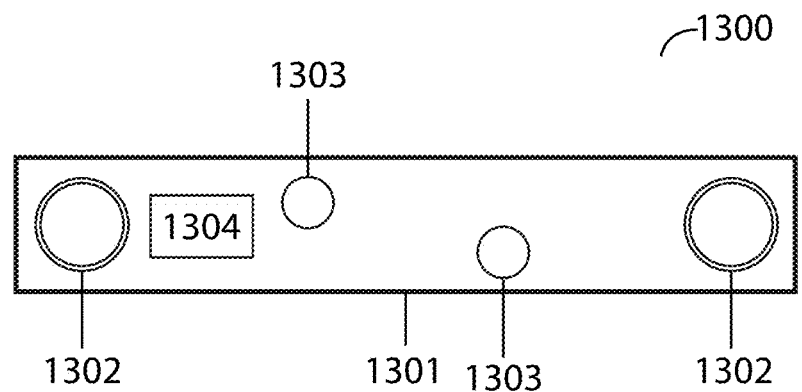
FIGS. 13A and 13B illustrate an example of a depth perceiving device, according to some embodiments.
Figure 13B:
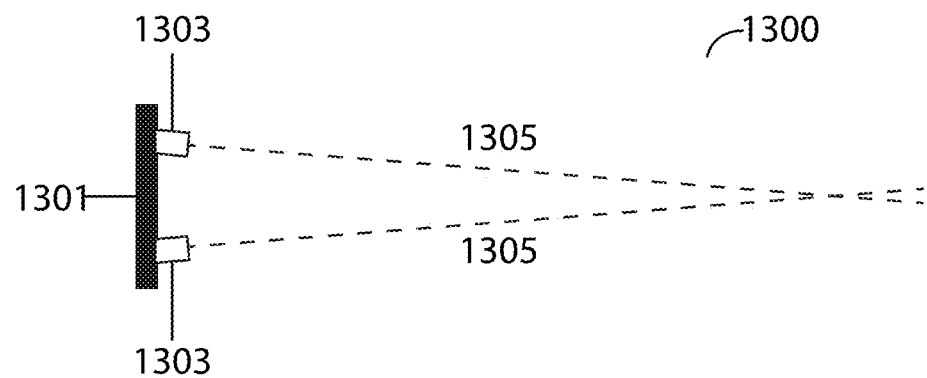
Figure 14A:
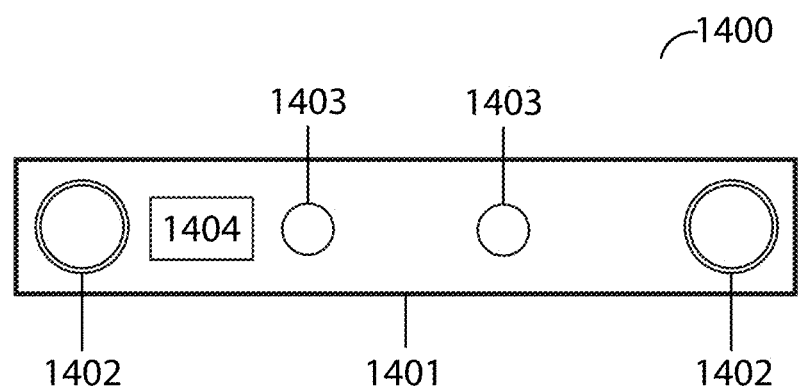
FIGS. 14A and 14B illustrate an example of a depth perceiving device, according to some embodiments.
Figure 14B:
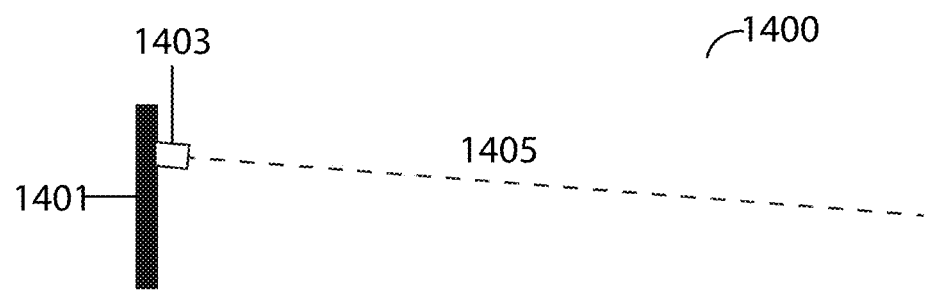

Other configurations of the laser light emitters are possible. For example, in FIG. 13A a depth perceiving device 1300 includes laser light emitters 1303 positioned at different heights on the baseplate 1301, image sensors 1302 and image processor 1304. The laser beams will still converge, but the light points will move in a vertical plane in addition to a horizontal plane of captured images as the distance to the projection surface changes. This additional data will serve to make the system more accurate. FIG. 13B illustrates a side view of the depth perceiving device 1300 wherein the laser beam emissions 1305 can be seen converging in a vertical plane. In another example, in FIG. 14A a depth perceiving device 1400 includes laser light emitters 1403 positioned on baseplate 1401 at a downward angle with respect to a horizontal plane, image sensors 1402, and image processor 1404. The laser beams will still converge, but, in a similar manner as previously described, the light points will move in a vertical plane in addition to a horizontal plane of the image as the distance to the projection surface changes. FIG. 14B illustrates a side view of the depth perceiving device 1400, wherein the laser beam emissions 1405 can be seen angled downward.

In some embodiments, ambient light may be differentiated from illumination of a laser in captured images by using an illuminator which blinks at a set speed such that a known sequence of images with and without the illumination is produced. For example, if the illuminator is set to blink at half the speed of the frame rate of a camera to which it is synched, the images captured by the camera produce a sequence of images wherein only every other image contains the illumination. This technique allows the illumination to be identified as the ambient light would be present in each captured image or would not be contained in the images in a similar sequence as to that of the illumination. In embodiments, more complex sequences may be used. For example, a sequence wherein two images contain the illumination, followed by three images without the illumination and then one image with the illumination may be used. A sequence with greater complexity reduces the likelihood of confusing ambient light with the illumination. This method of eliminating ambient light may be used independently, or in combination with other methods for eliminating sunlight noise. For example, in some embodiments, the depth perceiving device further includes a band-pass filter to limit the allowable light.

Traditional spherical camera lenses are often affected by spherical aberration, an optical effect that causes light rays to focus at different points when forming an image, thereby degrading image quality. In cases where, for example, the distance is estimated based on the position of a projected laser point or line, image resolution is important. To compensate for this, in some embodiments, a camera lens with uneven curvature may be used to focus the light rays at a single point. Further, with traditional spherical camera lens, the frame will have variant resolution across it, the resolution being different for near and far objects. To compensate for this uneven resolution, in some embodiments, a lens with aspherical curvature may be positioned in front of the camera to achieve uniform focus and even resolution for near and far objects captured in the frame. In some embodiments both cameras (or otherwise imaging sensors of the depth perceiving device) are placed behind a single camera lens.

In some embodiments, two-dimensional imaging sensors may be used. In other embodiments, one-dimensional imaging sensors may be used. In some embodiments, one-dimensional imaging sensors may be combined to achieve readings in more dimensions. For example, to achieve similar results as two-dimensional imaging sensors, two one-dimensional imaging sensors may be positioned perpendicularly to one another. In some instances, one-dimensional and two-dimensional imaging sensors may be used together.

In some embodiments, two CMOS cameras combined into one special chip may be used. Alternatively, in some embodiments, a silicon based chip implementing a light (i.e., LED) transmitter and/or a camera or imager and/or a receiver may be used. In some embodiments, a camera implemented on a board or on a silicon chip or in combination with a silicon chip to provide RGB and depth information may be used. These embodiments may be implemented in a single independent frame such as a sensor module or system on a chip, or may be implemented into the body of a robot, using the chassis or body of the robot as a frame. The embodiments described herein may be implemented in a single chip or combined modules inside one chip. The embodiments described herein may be implemented in software and/or hardware. For example, methods and techniques for extracting 2D or 3D described may be implemented in various ways.

Figure 15A:
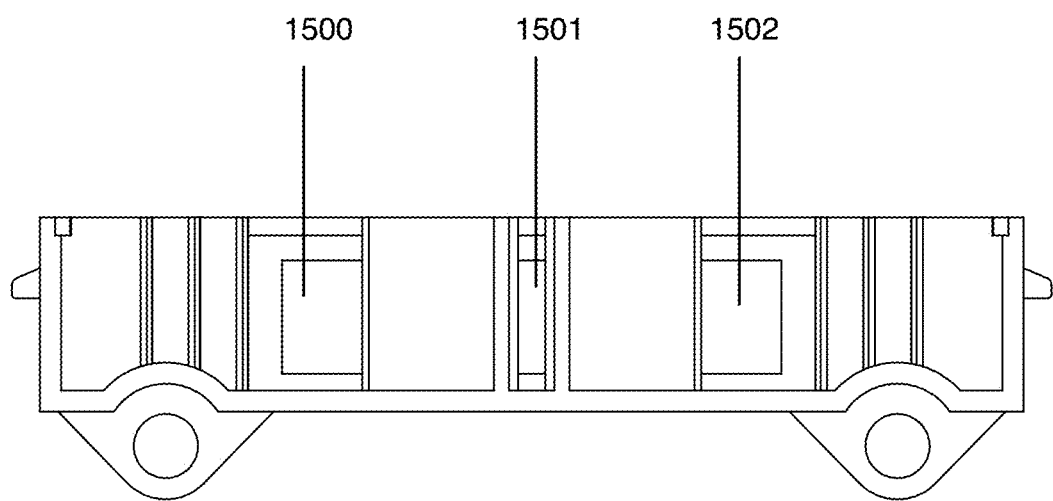
FIGS. 15A-15E illustrate an example of a mechanical filter for a light source, according to some embodiments.
Figure 15B:
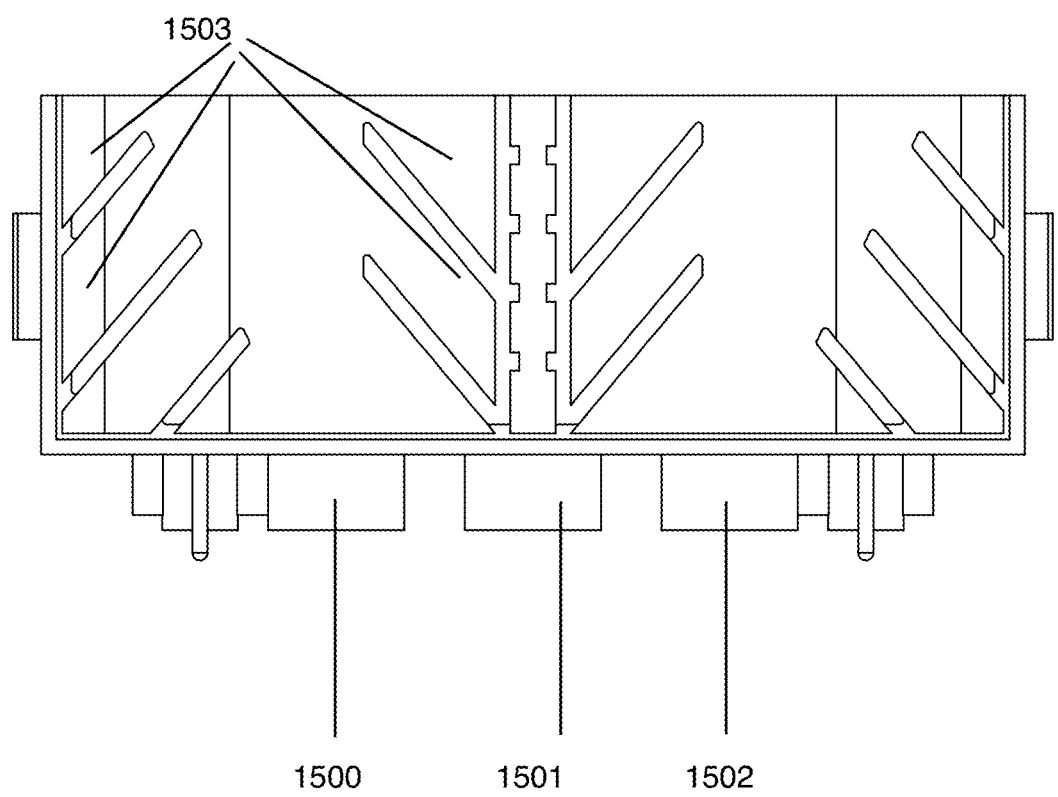
Figure 15C:
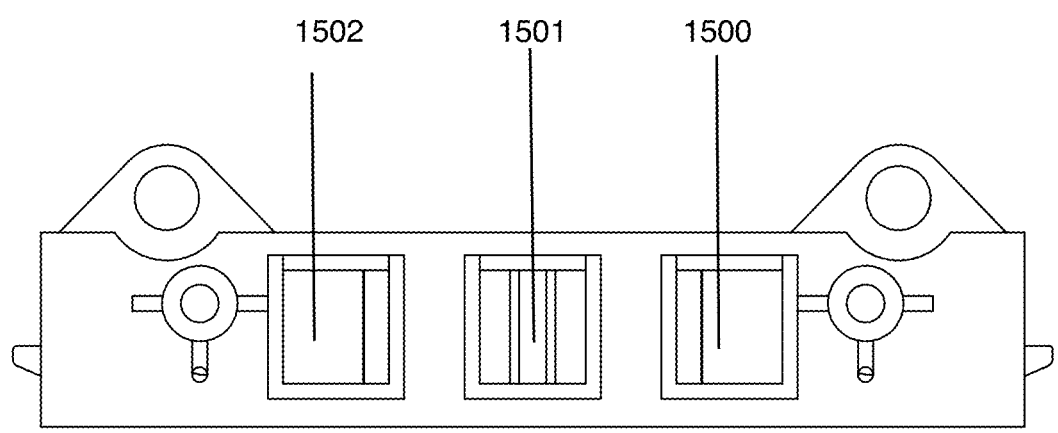
Figure 15D:
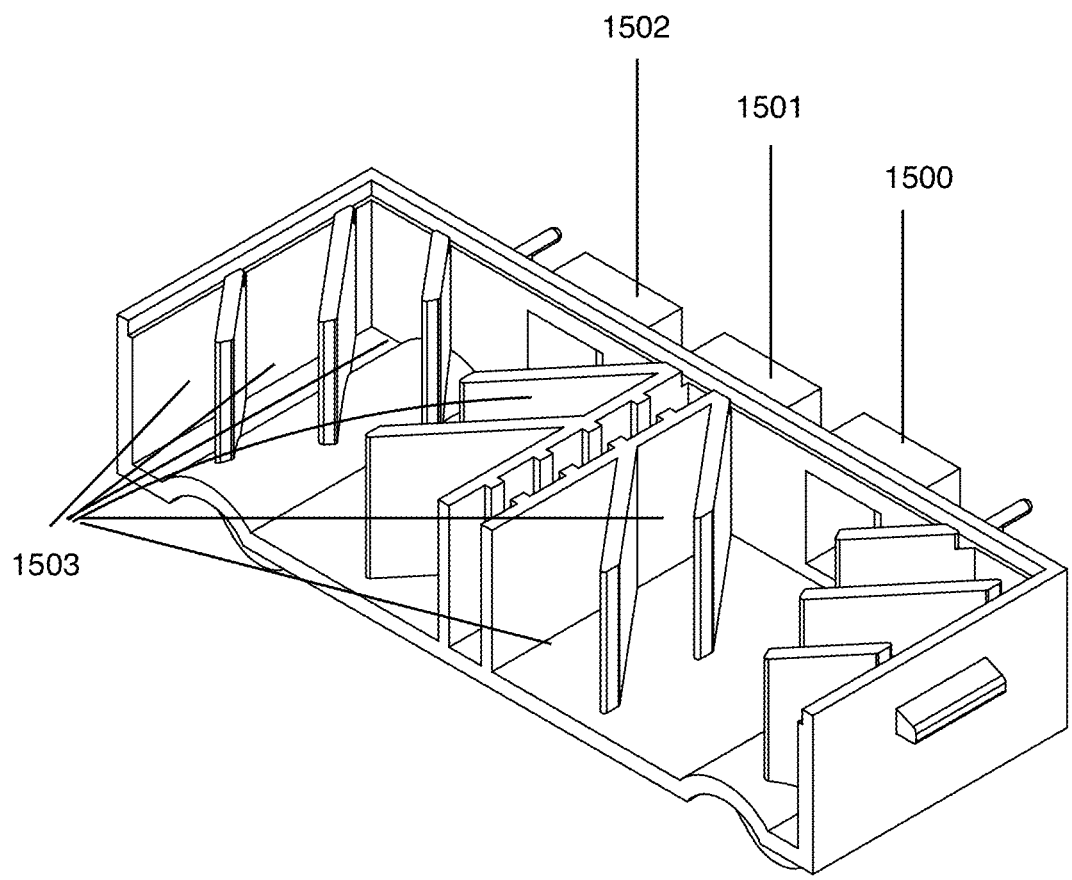
Figure 15E:
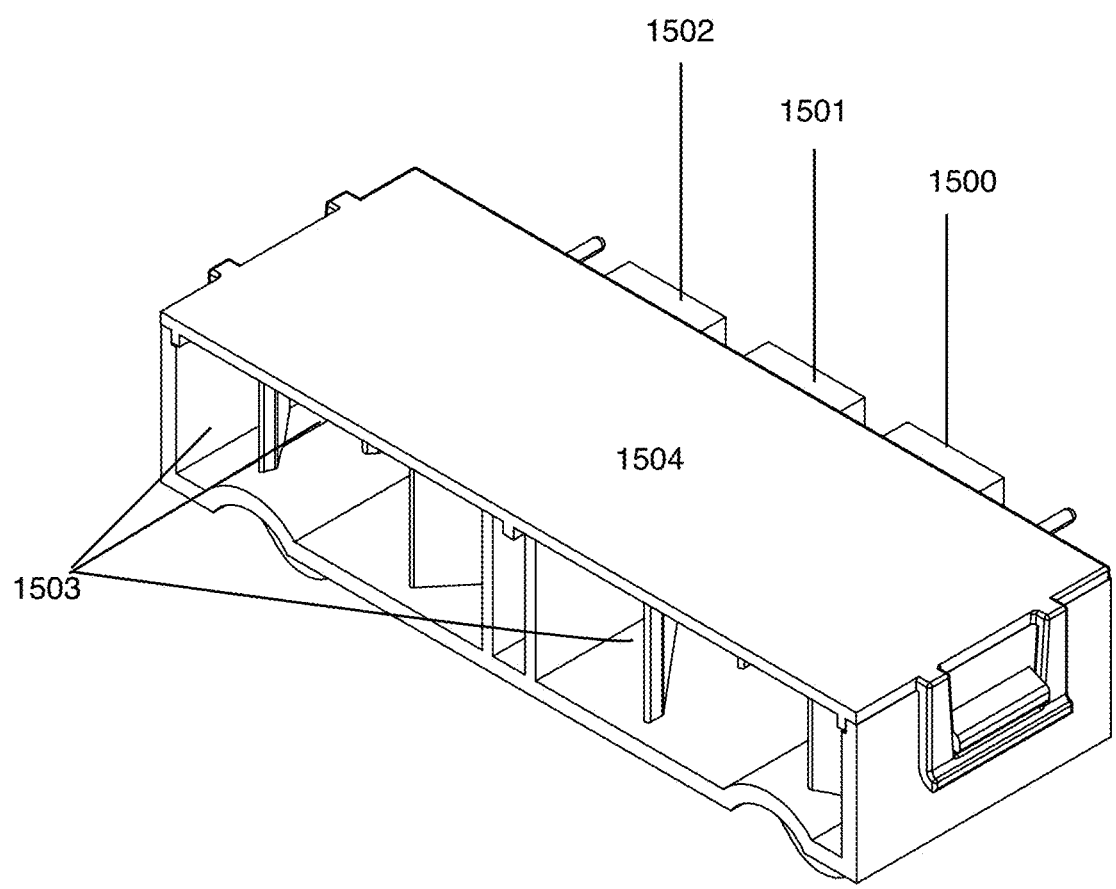
Figure 16A:
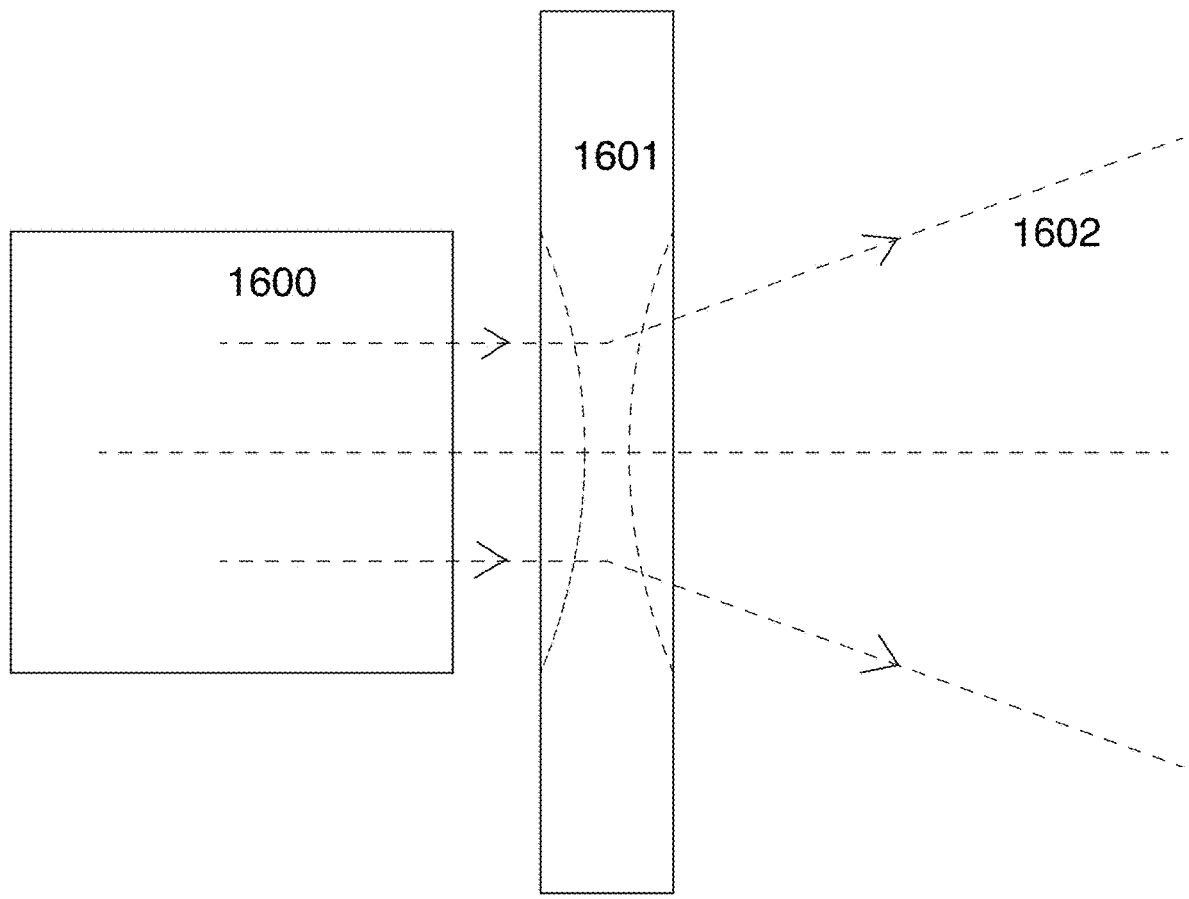
FIGS. 16A-16E illustrate examples of a lens used to converge and diverge light emitted by a light emitter, according to some embodiments.
Figure 16B:
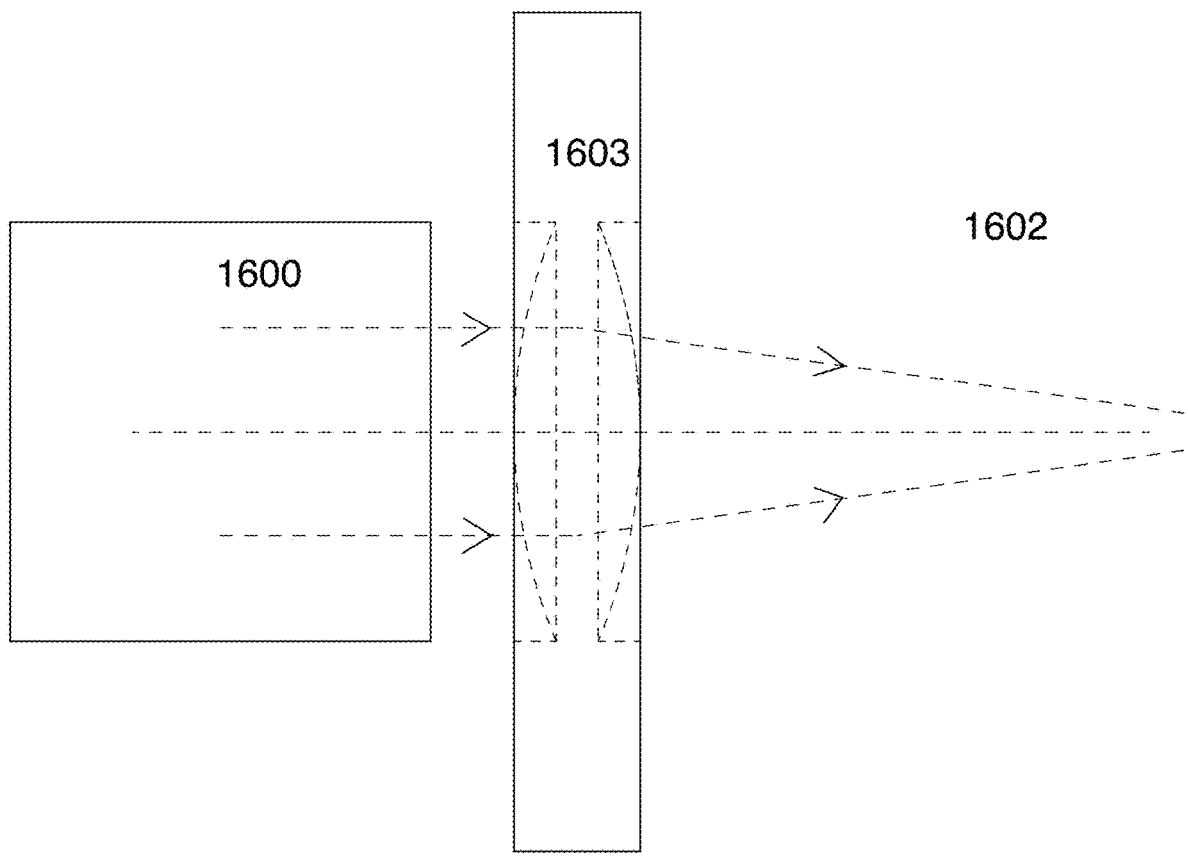
Figure 16C:
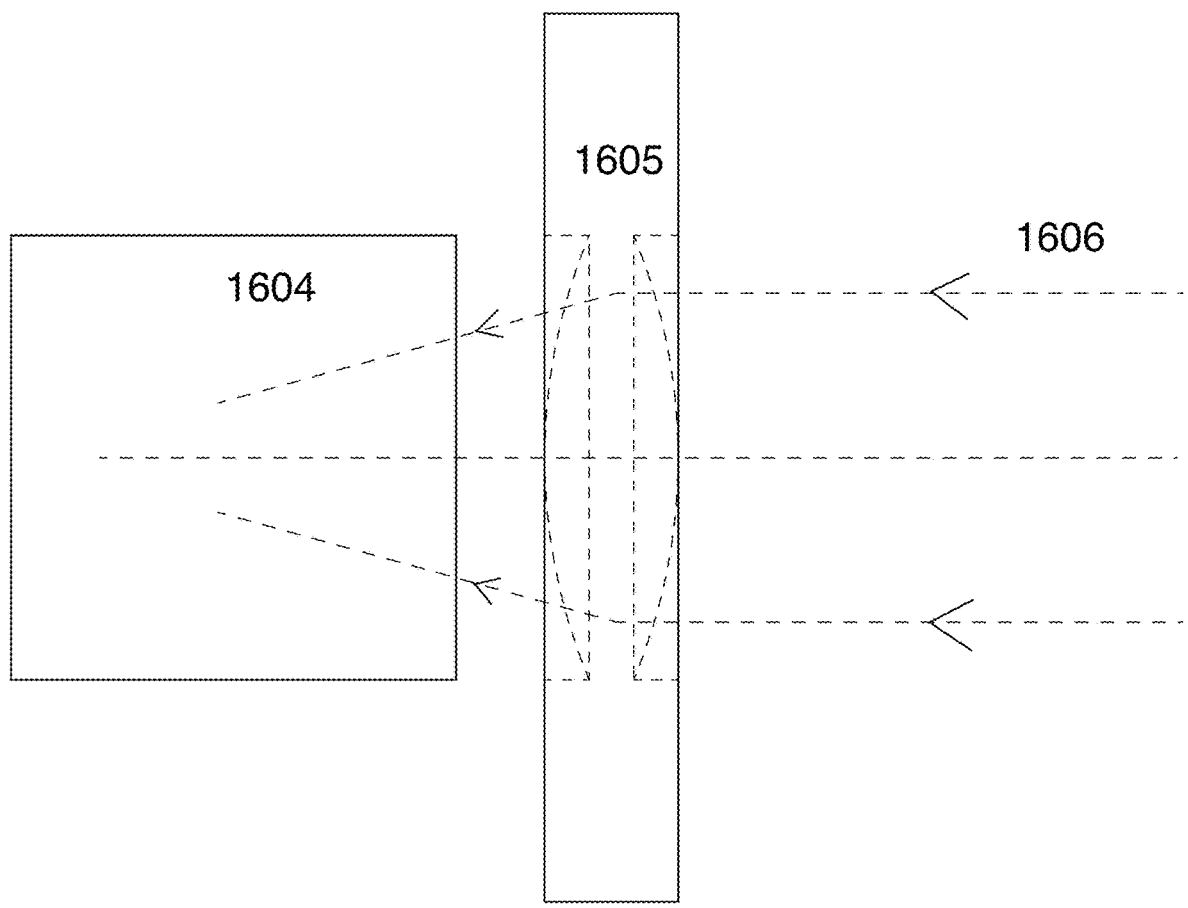
Figure 16D:
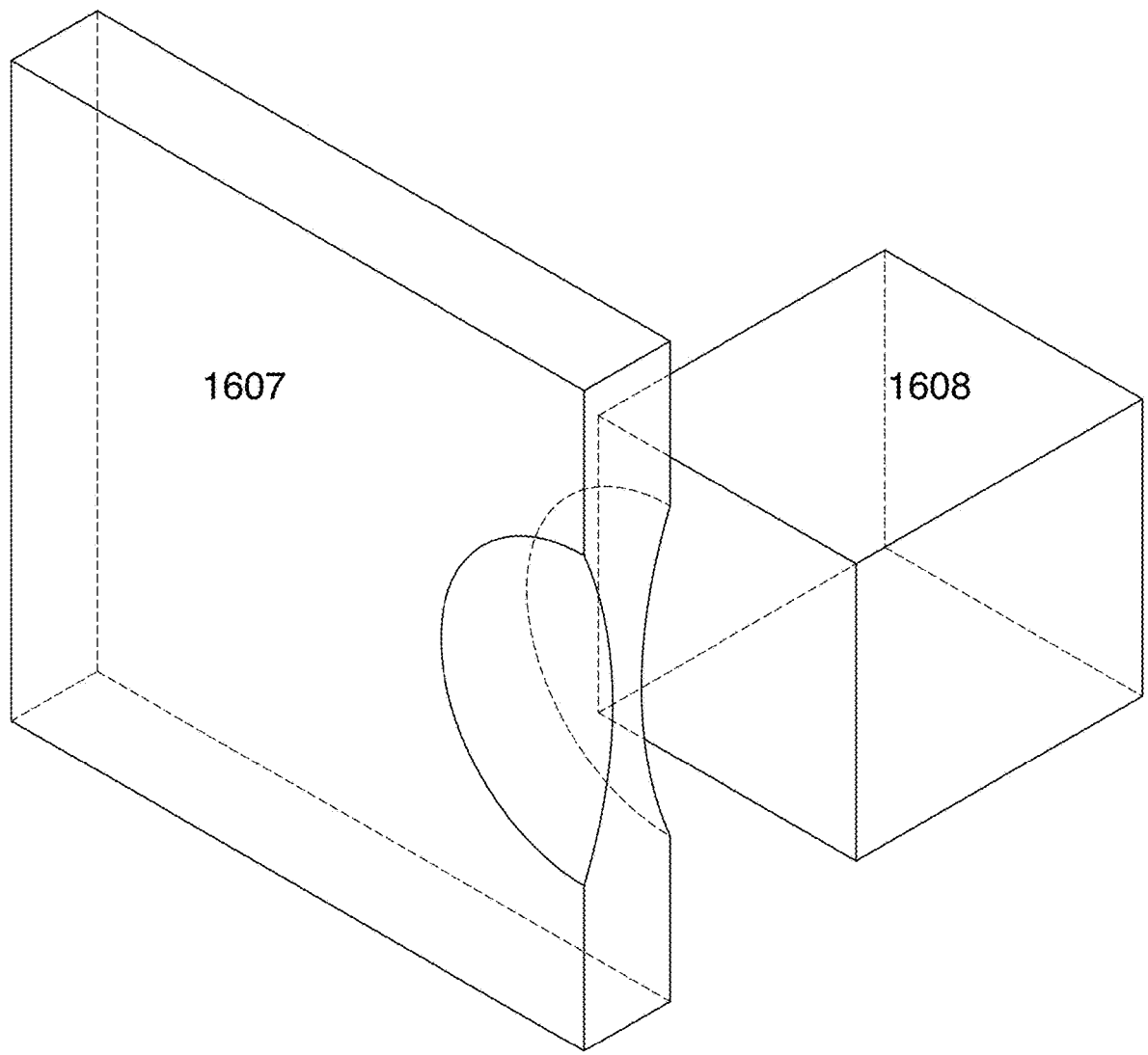
Figure 16E:
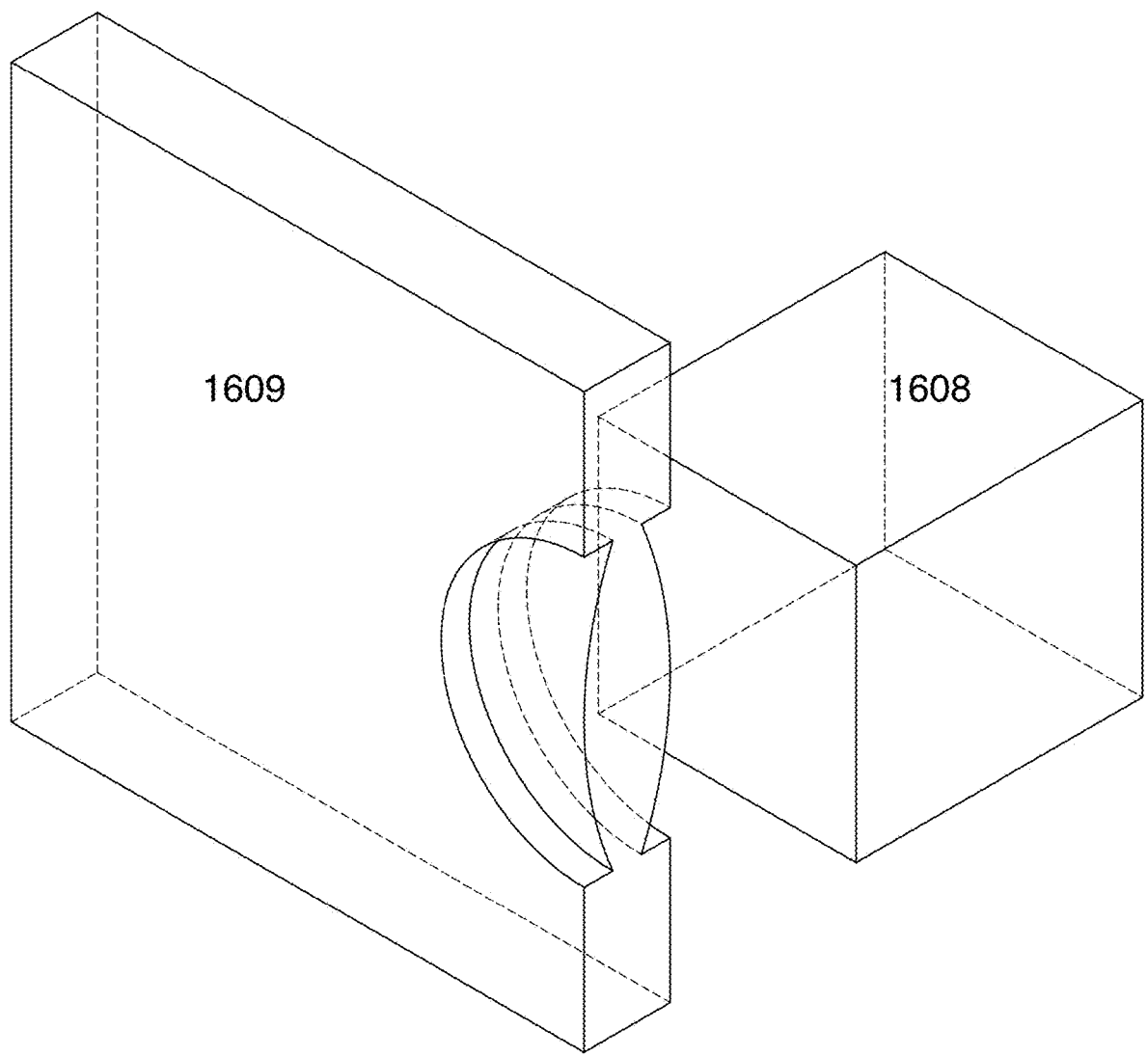

In some embodiments, a single laser diode with an optical lens arrangement may be used to generate two or more points. The arrangement of the lens may create a plurality of disconnected points instead of a line. The arrangement may control the distance and divergence or convergence of the points. In some embodiments, there may be a physical barrier with perforation arranged in front the lens or emitted laser line to create points. In some embodiments, mirrors may be used to generate two or more points. In some embodiments, multiple laser diodes are used to create light points. In some embodiments, a single light source may be used to generate an arrangement of points using a mechanical filter such as that shown in FIGS. 15A-15E. FIGS. 15A and 15C illustrate a front and rear view, respectively, of the mechanical filter with openings 1500, 1501, and 1502 through which light may pass. FIGS. 15B and 15D illustrate a top plan and top perspective view of the mechanical filter with openings 1500, 1501, and 1502, and reflection absorbers 1503. FIG. 15E illustrates the constructed mechanical filter with top cover 1504. FIG. 15F illustrates the mechanical filter and light source 1505. Light beams 1506 are absorbed by reflection absorbers 1503, while light beams 1507 pass through openings 1500, 1501, and 1502 (light beam not shown for clarity of figure). The mechanical filter generates three light points from single light source 1505. The mechanical filter is designed such that light receiving angle is 52 degrees and light reflector walls are 40 degrees with respect to a vertical. In some embodiments, lenses are used to diverge or converge light emitted by a light emitter. In some embodiments, these lenses are used as sensor windows as described above. For example, FIG. 16A illustrates a light emitter 1600 with diverging lens 1601, causing light 1602 to diverge. FIG. 16B illustrates a light emitter 1600 with converging lens 1603, causing light 1602 to converge. FIG. 16C illustrates a light receiver 1604 with converging lens 1605, causing light 1606 to converge. FIG. 16D illustrates a concave lens 1607 positioned on a sensor window of sensor 1608. FIG. 16E illustrates a convex lens 1609 positioned on a sensor window of sensor 1608.

Figure 17A:
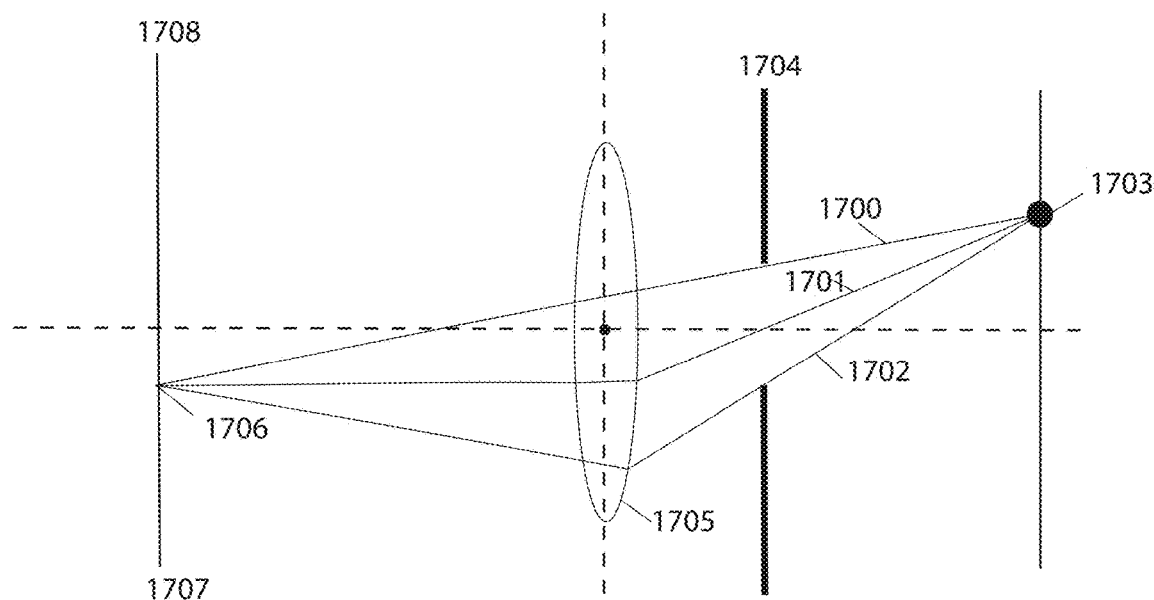
FIGS. 17A and 17B illustrate depth from de-focus technique, according to some embodiments.
Figure 17B:
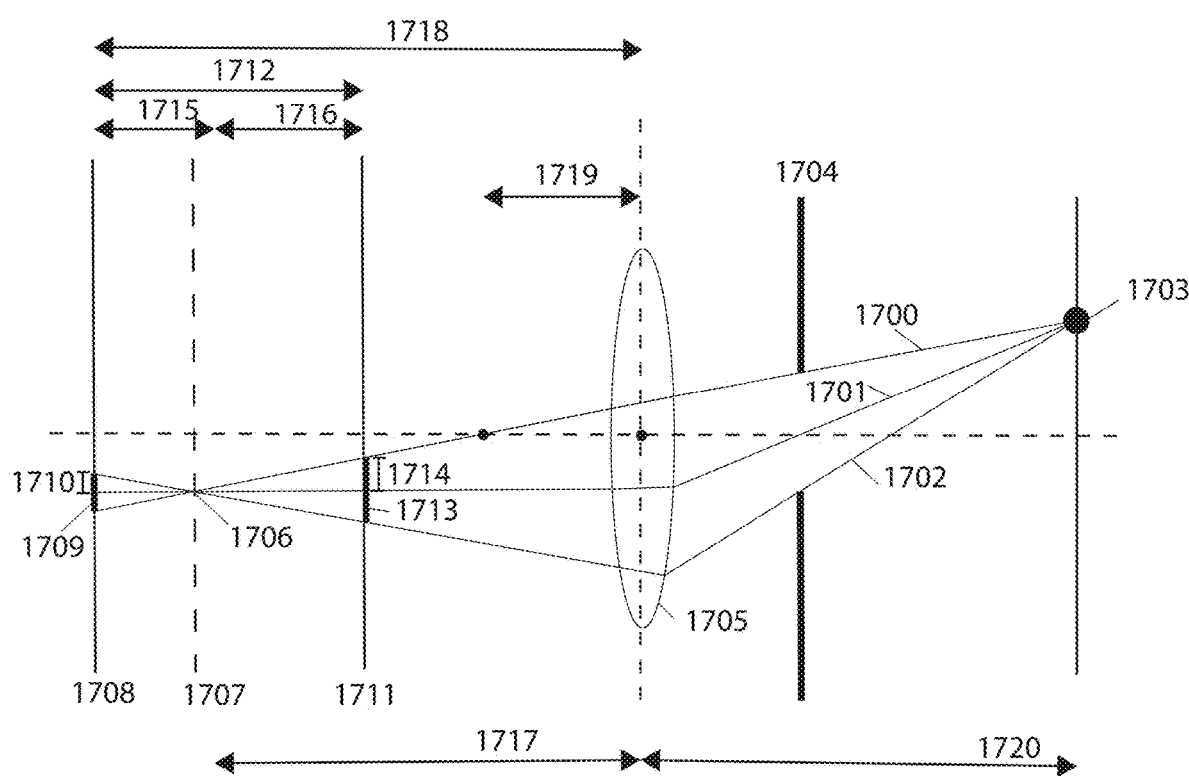

In some embodiments, depth from de-focus technique may be used to estimate the depths of objects captured in images. FIGS. 17A and 17B illustrate an embodiment using this technique. In FIG. 17A, light rays 1700, 1701, and 1702 are radiated by object point 1703. As light rays 1700, 1701 and 1702 pass aperture 1704, they are refracted by lens 1705 and converge at point 1706 on image plane 1707. Since image sensor plane 1708 coincides with image plane 1707, a clear focused image is formed on image plane 1707 as each point on the object is clearly projected onto image plane 1707. However, if image sensor plane 1708 does not coincide with image plane 1707 as is shown in FIG. 17B, the radiated energy from object point 1703 is not concentrated at a single point, as is shown at point 1706 in FIG. 17A, but is rather distributed over area 1709 thereby creating a blur of object point 1703 with radius 1710 on displaced image sensor plane 1708. In some embodiments, two de-focused image sensors may use the generated blur to estimate depth of an object, known as depth from de-focus technique. For example, with two image sensor planes 1708 and 1711 separated by known physical distance 1712 and with blurred areas 1709 having radii 1710 and 1713 having radii 1714, distances 1715 and 1716 from image sensor planes 1708 and 1711, respectively, to image plane 1707 may be determined using $$R_1 = \frac{L\delta_1}{2v}, R_2 = \frac{L\delta_2}{2v}, \text{ and } \beta = \delta_1 + \delta_2 \cdot R_1 \text{ and } R_2$$

are blur radii 1710 and 1714 determined from formed images on sensor planes 1708 and 1711, respectively. $\delta_1$ and $\delta_2$ are distances 1715 and 1716 from image sensor planes 1708 and 1711, respectively, to image plane 1707. L is the known diameter of aperture 1704, v is distance 1717 from lens 1705 to image plane 1707 and $\beta$ is known physical distance 1712 separating image sensor planes 1708 and 1711. Since the value of v is the same in both radii equations ($R_1$ and $R_2$), the two equations may be rearranged and equated and using $\beta=\delta_1+\delta_2$, both $\delta_1$ and $\delta_2$ may be determined. Given $\gamma$, known distance 1718 from image sensor plane 1708 to lens 1705, v may be determined using $v=\gamma-\delta_1$. For a thin lens, v may be related to $f$, focal length 1719 of lens 1705 and u, distance 1720 from lens 1705 to object point 1703 using $$\frac{1}{f} = \frac{1}{v} + \frac{1}{u}.$$

Given that $f$ and v are known, the depth of the object u may be determined.

Other depth perceiving devices that may be used to collect data from which depth may be inferred are described in U.S. patent application Ser. Nos. 15/243,783, 15/954,335, 15/954,410, 15/257,798, 15/674,310, 15/224,442, and 15/683,255, the entire contents of which are hereby incorporated by reference.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

Figure 18A:
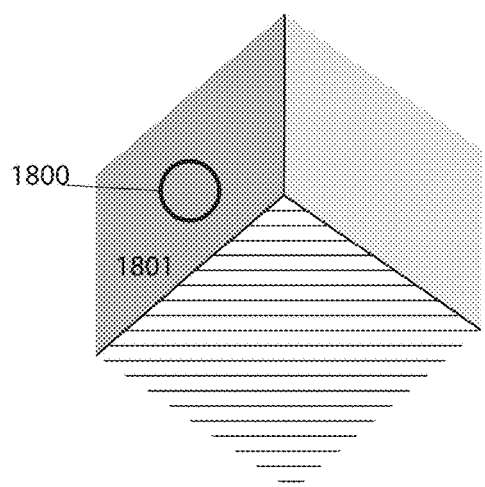
FIGS. 18A-18F illustrate an example of a corner detection method, according to some embodiments.
Figure 18B:
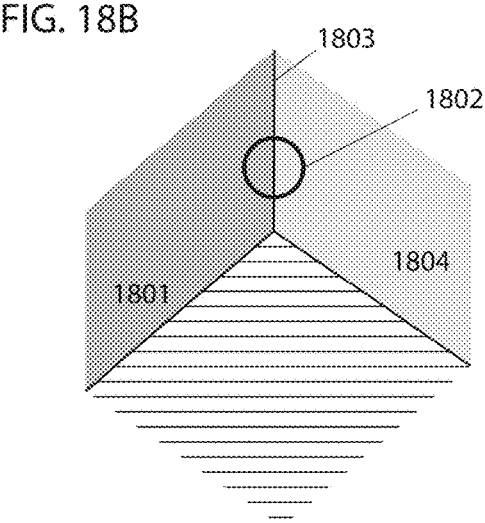
Figure 18C:
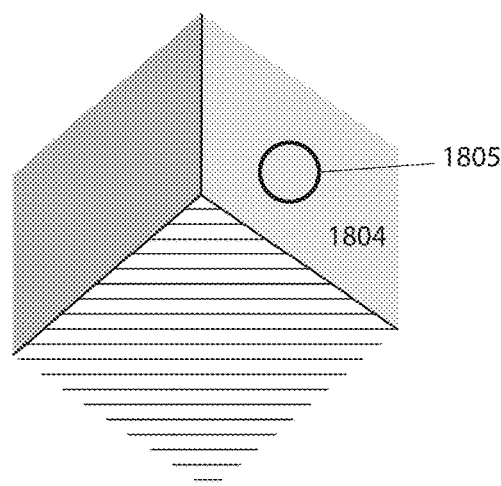
Figure 18D:
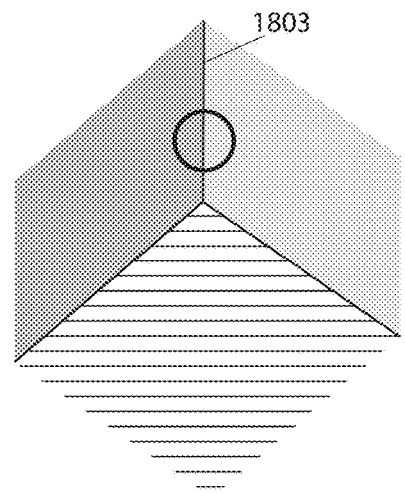
Figure 18E:
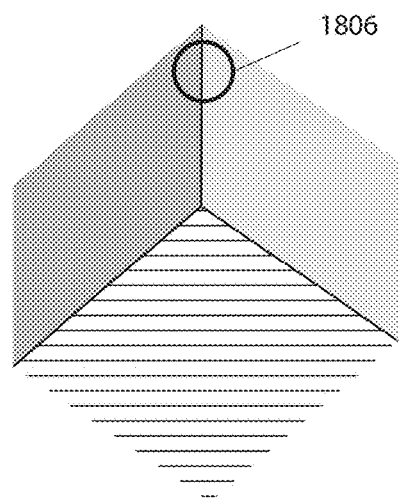
Figure 18F:
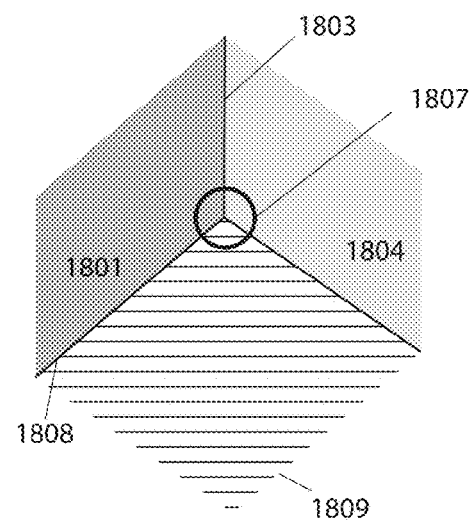

In some embodiments, the camera continues to capture images of the environment after the map is created such that any changes to the work environment are integrated into an updated map (e.g., a new piece of furniture being placed in a room). In some embodiments, the processor uses data from the camera to identify features of the environment. For example, in some embodiments, the processor may detect an edge and a corner using pixel intensity of an image as changes in intensity are usually observable at edges and corners. FIGS. 18A-18F illustrate an example of how a corner may be detected by a processor by a sliding window that moves across an image. The process begins with the processor considering area 1800 on wall 1801 and observing the changes in color intensity as shown in FIG. 18A. After observing insignificant changes in color intensity, the processor moves on and considers area 1802 with edge 1803 joining walls 1801 and 1804 and observes large changes in color intensity along edge 1803 as illustrated in FIG. 18B. In FIG. 18C the processor moves to the right to consider another area 1805 on wall 1804 and observes no changes in color intensity. In FIG. 18D it returns back to edge 1803 then moves upward to consider area 1806 as shown in FIG. 18E and observes changes in color intensity along edge 1803. Finally, in FIG. 18F the processor moves down to consider area 1807 with edges 1803 and 1808 joining walls 1801 and 1804 and floor 1809. Changes in color intensity are observed along edge 1803 and along edge 1807. Upon discovering changes in color intensity in two directions by the processor, a corner is identified. Upon discovering changes in color intensity in one direction by the processor, an edge is identified. In other instances, changes in pixel intensities may be identified by a processor of a camera. These large changes in intensity may be mathematically represented by entropy where high entropy signifies large changes in pixel intensity within a particular area. The processor may determine the entropy using $$H(X) = -\sum_{i=1}^{n} P(x_i) \log P(x_i),$$

wherein $X=(x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by counting the number of pixels within a specified area of interest with pixel intensity value $x_i$ and dividing that number by the total number of pixels within the area considered. If there are no changes or very small changes in pixel intensity in an area then $H(X)$ will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching unity would be indicative of a large change in pixel values. Other methods for edge or corner detection may be used by the processor. In some embodiments, other features can be identified to further capture the identity of the environment or objects within the environment. In some instances, features are compared with a previously created map.

The robotic floor-cleaning device may, for example, use the map to autonomously navigate the environment during operation, e.g., accessing the map to determine that a candidate route is blocked by an obstacle denoted in the map, to select a route with a route-finding algorithm from a current point to a target point, or the like. To avoid incorrect detection of an obstacle, in some embodiments, each location within the map is assigned an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

Some embodiments may reference previous maps during subsequent mapping operations. For example, embodiments may apply Bayesian techniques to SLAM and update priors in existing maps based on mapping measurements taken in subsequent sessions. In some embodiments, the processor localizes itself during mapping or during operation. In some embodiments, methods of localization are inherently independent from mapping and path planning but may be used in tandem with any mapping or path planning method or may be used independently to localize the robotic floor-cleaning device irrespective of the path or map of the environment. In some embodiments, the processor uses quantum SLAM. In some embodiments, the processor may determine the motion of the robotic floor-cleaning device using Newton's motion equation $F=md^2x/dt^2$, wherein F is the force causing the robotic floor-cleaning device to move, m is the mass of the robotic floor-cleaning device, x is the position of the robotic floor-cleaning device, t is time, and d signifies the derivative. In some embodiments, the processor may determine the motion of the robotic floor-cleaning device using $$F = -\frac{\partial V}{\partial x},$$

wherein V is potential energy causing motion of the robotic floor-cleaning device and ∂ signifies a partial derivative. In some embodiments, the processor combines the two motion equations to form a motion function m $$\frac{d^2 x}{dt^2} = -\frac{\partial V}{\partial x}$$

used by the processor to determine the position of the robotic floor-cleaning device at a given time, the equation in accordance with Newton's Second Law. Given the position of the mass (i.e., the robot) at any given time x(t), the processor may determine the velocity $$\left(v = \frac{dx}{dt}\right),$$

momentum (p=mv), and kinetic energy $$\left(T = \frac{1}{2} m v^2\right),$$

among other dynamic variables of the robot. Given the initial state variables, i.e. the position $x(t_0)$ and velocity $x'(t_0)$ of a particle (i.e., the robot), the processor may determine the trajectory of the particle. Using the initial position and velocity of the robotic floor-cleaning device, the processor determines the position x of the robot at a later time $(t_0+\Delta t)$ using $x(t_0+\Delta t)=x(t_0)+x'(t_0) \Delta t$. The equation holds true if the velocity is constant in the time interval $[t_0, t_0+\Delta t]$, otherwise it is an approximation. In some embodiments, the processor iteratively repeats the process to determine the trajectory at time $(t_0+2\Delta t)$ and so on. With the motion function being second order in time, $x(t_0)$ and $x'(t_0)$, are required to specify a trajectory. This is equivalent to identifying two space-time points $(x_i, t_i)$ and $(x_f, t_f)$.

Rather than consider a single position x, the processor generalizes to n-dimensions $(x_1, x_2, \ldots, x_n)$ such that the spatial configuration of the robotic floor-cleaning device is represented as a point in an n-dimensional configuration space, otherwise known as a Hilbert Space. In some embodiments, the configuration space is a subset of the Hilbert Space. In some embodiments, the processor generalizes the motion equation $$m_j \frac{d^2 x_j}{dt^2} = -\frac{\partial V}{\partial x_j}.$$

Figure 19A:
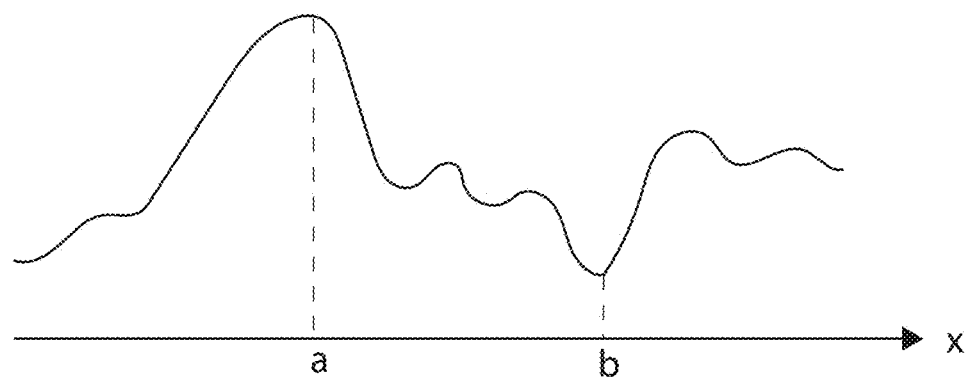
FIGS. 19A-19C illustrate an embodiment of a localization process of a robot, according to some embodiments.

In some embodiments, the processor integrates the motion equation to determine the trajectory of the robotic floor-cleaning device. Since the trajectory equation applies for all possible paths, a function dependent on not only the position x at time t but also on the path is required. In practice, the robotic floor-cleaning device may take any possible path. In some embodiments, the processor uses the Lagrangian function to predict such trajectory as it is a function of position, velocity, and time, and equal to the difference in kinetic energy and potential energy. In some embodiments, the processor determines an action S[x(t)] for each path from $(x_i, t_i)$ to $(x_f, t_f)$ using $S[x(t)]=\int_{t_i}^{t_f} L(x_i, x_f) dt$. In some embodiments, the processor represents all possible locations resulting from possible actions S (or paths) or the action space by a field $|\Psi(x,t)|^2$. By definition, a field is a physical quantity represented by a number or tensor that has a value for each point in space and time. For example, the surface wind velocity on a weather map can be considered a field since a vector describing the speed and direction of the movement of air is assigned to each point on the map for each time point t. In another example, surface temperature on the planet can be considered a field as a surface temperature exists for each point on the planet at a given time. In the case of the robotic floor-cleaning device, the field $|\Psi(x,t)|^2$ describes the likelihood of possible locations of the robotic floor-cleaning device at time t in some embodiments. This is shown in FIG. 19A, where possible locations of the robotic floor-cleaning device in a one-dimensional space are illustrated. As can be seen in this example, the robotic floor-cleaning device is more likely to be at a location x=a with a higher peak than at a location x=b. The illustration provided is one-dimensional for simplicity.

Figure 19B:
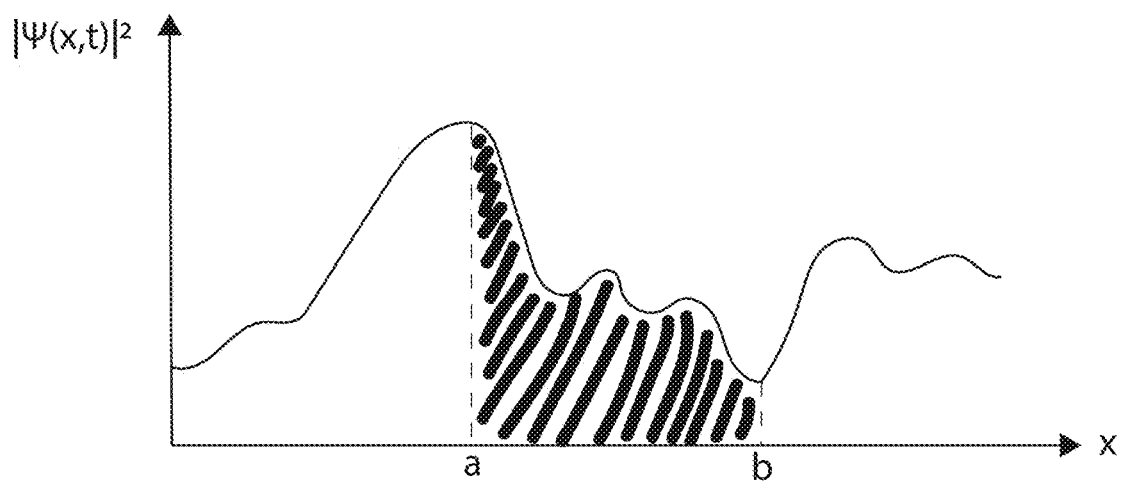

Given that the field $|\Psi(x,t)|^2$ describes the likelihood of possible locations of the robotic floor-cleaning device at time t, in some embodiments, the processor determines the likelihood of the location of the robotic floor-cleaning device being between two points a and b at a time t using $\int_a^b |\Psi(x,t)|^2 dx$, the area under the curve $|\Psi(x,t)|^2$, as shown in FIG. 19B. In some embodiments, the processor normalizes the function $|\Psi(x,t)|^2$ by multiplying by a value $c=1/\sqrt{A}$, where A is a potential value other than 1. By normalizing, the above integral becomes equal to unity, $\int_a^b |\Psi(x,t)|^2 dx = 1$. In some embodiments, the integral provides the probability of x having a value between a and b at a given time t since the area bound in the integral summates to unity. In some embodiments, the normalized function $|\Psi(x,t)|^2$ may be a probability density function (PDF) and the processor determines the probability of the robotic floor-cleaning device being located at a particular location by determining the integral of the PDF, i.e., $\int_a^b |\Psi(x,t)|^2 dx = P(a<x<b, t)$. Since $|\Psi(x,t)|^2$ is a linear differential equation that may be normalized, the processor may determine the expectation of the location x of the robotic floor-cleaning device in some embodiments using $<x> = \int_{-\infty}^{\infty} x|\Psi(x,t)|^2 dx$. Additionally, given the velocity $$v = \frac{dx}{dt},$$

the processor may determine the expected value of velocity of the robotic floor-cleaning device in some embodiments using $$\langle v \rangle = \frac{d\langle x \rangle}{dt} = \frac{d}{dt} \int_{-\infty}^{\infty} x|\Psi(x, t)|^2 dx.$$

In some embodiments, the processor obtains readings of the surroundings from one or more sensors internal or external to the robotic floor-cleaning device. Readings may be of various forms. For example, readings may be visual readings captured by an image sensor, distance readings taken by a distance sensor, time-of-flight readings taken by a time-of-flight camera, WI-FI signal strength readings taken by a WI-FI module or decibel readings observed by an acoustic sensor. Different types of readings may be used independently or simultaneously for quantum SLAM. In some embodiments, the processor infers a position x of the robotic floor-cleaning device in a global coordinate system at time t of the reading, thereby localizing the robotic floor-cleaning device. In some embodiments, the location is given by x=(x, y, θ) in two dimensions and x=(x,y,z), O=($R_x$, $R_y$, $R_z$) in three dimensions, wherein R is a rotation matrix.

Figure 19C:
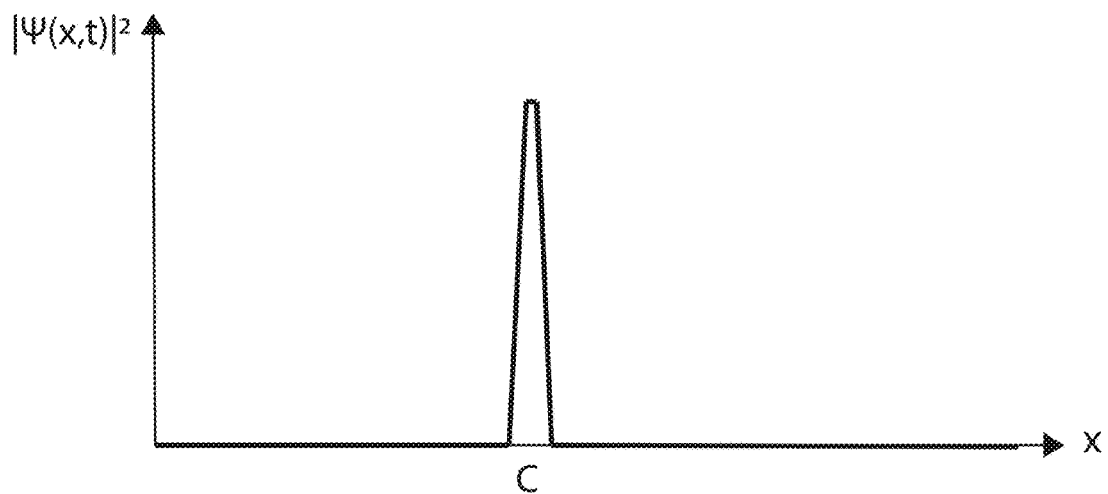

In some embodiments, localization of the robotic floor-cleaning device occurs at the time a reading is taken and is represented by a position x with respect to the surroundings, such as objects, obstacles or perimeters, regardless of the method used for localization and the type of sensor or measurement device. For example, if a measurement device of the robotic floor-cleaning device measures distance to an object, the instant the measurement is taken the processor localizes the robotic floor-cleaning device to be at some position x with respect to the object measured; if the measurement device measures noise in decibels, the processor localizes the robotic floor-cleaning device as being at some position x from the originator of the noise; and if the measurement device measures WI-FI strength, the processor localizes the robotic floor-cleaning device as being at some position x from the originating point of the WI-FI signal. In some embodiments, the measurement process for localization is similar to a wave propagation. The immediate surroundings of the robotic floor-cleaning device are initially observed using at least one sensor followed by further distances into the surroundings as waves propagate, expanding the radius of observation. In some embodiments, the radius r of each propagating wave increases may by a value A. When the processor obtains a reading that can be used to account for localization, at that instant, the processor collapses the PDF to a Dirac Delta function with a spike at some value C for the location x of the robotic floor-cleaning device, as shown in FIG. 19C. The spike at some value C localizes the robotic floor-cleaning device as being at location C at that instant. If other readings are taken at that instant, the spike at some value C for the location x is confirmed but after that instant and with movement of the robotic floor-cleaning device, the processor reverts the function back to being spread over possible values of x, as shown in FIGS. 19A and 19B for example. In some embodiments, A is the localization resolution. For example, the processor uses multiples of A to describe the placement of the sensor against the surroundings. In some embodiments, the resolution of the reading is not the same as the localization resolution; therefore, the processor casts the reading into a possible location of the robotic floor-cleaning device in multiples of A. In some embodiments, the processor uses a probabilistic value to describe the likelihood of what multiple of A to interpret the reading to. In some embodiments, the processor determines the probabilistic value as logit $$(P(x)) = \log \frac{P(X)}{1 - P(x)},$$

wherein P(x) is the probability of $$x \text{ and } \frac{P(x)}{1 - P(x)}$$

is the odds of x being true. In this case x is a multiple of lambda.

In some embodiments, the processor generates a simulated representation of the environment for each considered possible position of the robot. In some embodiments, the processor compares the measurement against each simulated representation of the environment (e.g., a map) corresponding with a perspective of each of the considered possible positions of the robot. In some embodiments, the processor chooses the position of the robot that makes the most sense as the most feasible position of the robot. In some embodiments, the processor selects additional considered possible positions of the robot as a backup to the most feasible position of the robot. With each measurement, the certainty in the most feasible position of the robot chosen increases or decreases. In some embodiments, the processor retains interpretations of the localization of the robotic floor-cleaning device having lower probabilistic values, despite higher probabilistic values being indicative of a better interpretation of the localization of the robotic floor-cleaning device. This is important as the robotic floor-cleaning device may be localized differently for different multiples of λ and different localization results in a different map. For example, in FIG. 20 the processor uses a one-dimensional camera reading 2000 of 9λ to localize the robotic floor-cleaning device at location 2001 with value $x_1$ while a camera reading 2002 of 10λ is used to localize the robotic floor-cleaning device at location 2003 with value $x_2$. Since both readings localize the robotic floor-cleaning device to different locations, each reading may result in a different map. In some embodiments, each location may be possible and alternative scenarios may be evaluated by the processor. In some embodiments, the number of alternative scenarios to evaluate may be predetermined or the processor selects the alternative scenarios to evaluate in real-time. For example, the processor evaluates two possible scenarios, one where the robotic floor-cleaning device is localized at location 2001 with value $x_1$ and another where the robotic floor-cleaning device is localized at location 2003 with value $x_2$. However, other scenarios, such as localization of the robotic floor-cleaning device at locations 2004 and 2005 with values $x_3$ and $x_4$, respectively, may be evaluated by the processor as well. In some embodiments, the processor uses more than one dimension for localization. However, as the number of dimensions used increases, the number of alternative scenarios does as well, and localization may become computationally expensive. In some embodiments with low resolution and low dimensionality, the processor monitors 4 to 30 alternatives for example. In some embodiments where the resolution is higher, a higher number of alternative scenarios may be required. In some embodiments, the processor monitors, for example, between 35 to 200 alternative scenarios. In some embodiments, the processor uses an adaptive algorithm to increase and decrease the number of alternative scenarios as needed. In some embodiments, the processor replaces alternative scenarios monitored by other alternatives through a process of fitness proportionate selection wherein the processor uses a fitness function to assign a fitness to possible alternative scenarios. In some embodiments, the fitness level is used to associate a probability of selection with each alternative scenario. In some embodiments, the processor determines the fitness function using $$p_i = \frac{f_i}{\sum_{j=1}^{N} f_j},$$

wherein $f_i$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently monitored.

In some embodiments, wherein more than one reading is used for localization of the robotic floor-cleaning device, the location inferred by the processor has a higher certainty of being correct when readings are in-phase and agree with one another. In some embodiments, readings or measurements are a combination of readings or measurements from multiple sensors once processed by the processor. In some embodiments, readings from multiple sensors may disagree and produce imprecise localization by the processor as disagreeing readings place the robotic floor-cleaning device at different locations. For example, a spike at some position x of the robotic floor-cleaning device results when readings from multiple sensors are in agreement. The agreement of readings from multiple sensors results in a sharp maximum at some position x as the certainty of the localization increases from validation of readings from multiple sensors. However, in some embodiments it is possible that multiple readings from multiple sensors disagree resulting in the processor inferring different locations of the robotic floor-cleaning device. For example, the probability distribution may include two spikes, one being sharper than the other. Most readings from various sensors are in agreement forming the sharper spike corresponding with some position x, however, some readings from other sensors are in disagreement, resulting in the second dull spike corresponding with some position y of the robotic floor-cleaning device. Values for the position x of the robotic floor-cleaning device have higher probability of being the position of the robotic floor-cleaning device that values for the position y, as the majority of readings in agreement correspond to values for the position x.

Figure 21:
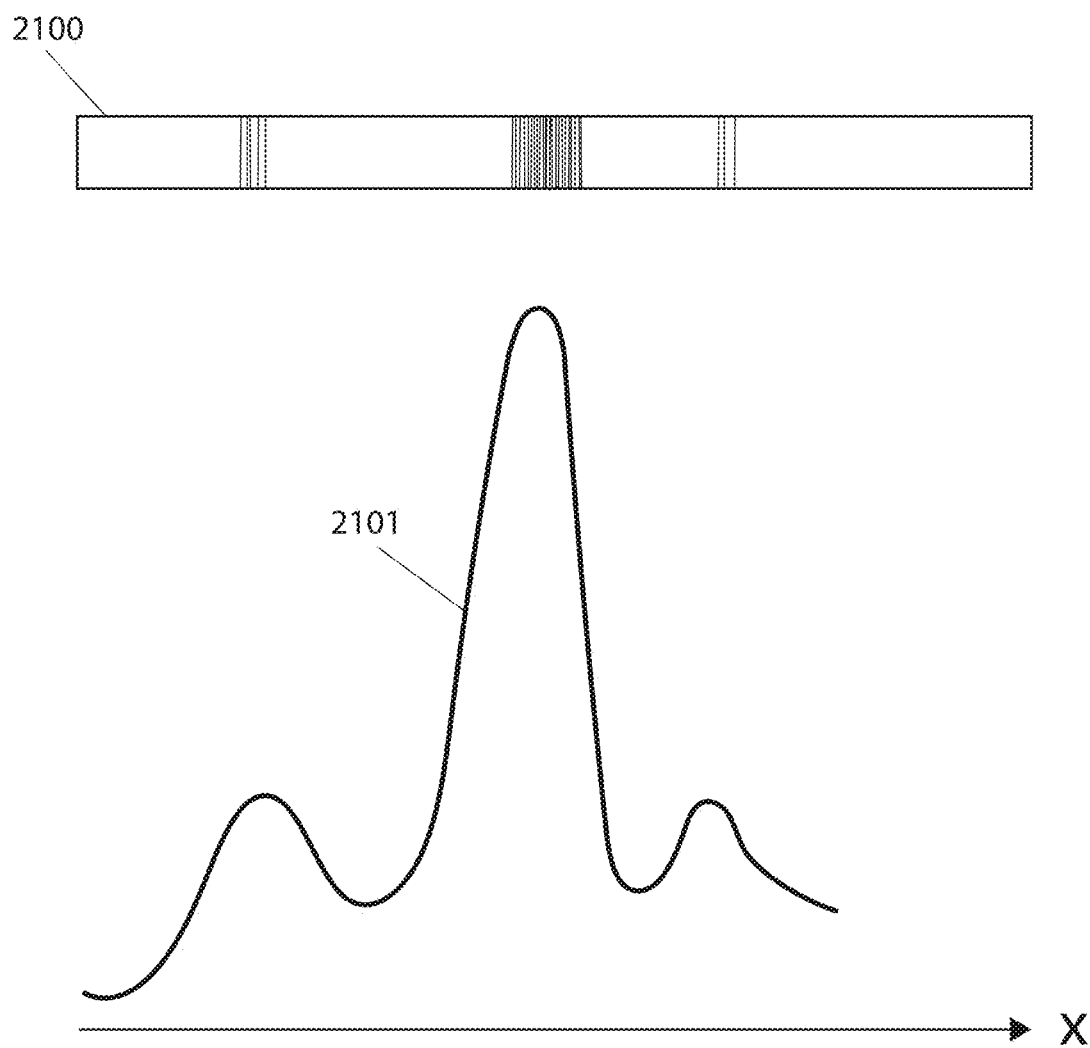
FIG. 21 illustrates an example of discretization of measurements, according to some embodiments.

In some embodiments, with some processing, the processor eliminates possible locations of the robotic floor-cleaning device such that the probability distribution function collapses to a Dirac Delta function, such as that shown in FIG. 19C. For example, in certain environments readings of some sensors may be considered less accurate than others and may therefore not considered or if the majority of readings from different sensors are in agreement the minority readings in disagreement are not considered or unrealistic readings are eliminated. In some embodiments, the processor discretizes measurements, as shown in FIG. 21 with discrete representation 2100 of possible positions x of the robotic floor-cleaning device in graph 2101. In some embodiments, the processor compares discrete values against a preprogrammed bias function. In some embodiments, the discretized values that are well matched with the noise and bias that are previously given to the robotic floor-cleaning device are given more importance by the processor. In some embodiments, a second reading is taken by the same or another sensor and values of the first and the second readings are compared and combined by the processor to form a more reliable reading. In some embodiments, the first reading and second reading are not of the same kind. For example, a first reading is from an odometer and a second reading is from a depth camera. In some embodiments, the processor compares the discretized values that are matched against a bias function to determine how they fit with a second discretized function. In processing of the information, as explained in the above embodiments, the reading that is used is assumed to be accurate enough to localize the robotic floor-cleaning device to some location C with a certain resolution.

In between readings, the robotic floor-cleaning device is in a state of superposition as it may only be localized by the processor when a reading is taken. Therefore, if the system is interpreted as a Copenhagen Interpretation wherein the physical system does not have definite properties prior to being measured and only the probabilities that readings will produce certain results may be predicted, it may be thought that measurement is what causes the robotic floor-cleaning device to be perceived at some location C at a given time or that measurement, in effect, localizes the robotic floor-cleaning device. For this reason, preparation and measurement are independent in some embodiments described herein. In some embodiments, preparation includes any action or control that causes the robotic floor-cleaning device to take a particular measurement. For example, preparation includes the robotic floor-cleaning device driving to a location wherein a particular reading is taken or includes a user placing the robotic floor-cleaning device or pushing the robotic floor-cleaning device to a location wherein a particular reading is taken. In some embodiments, the robotic floor-cleaning device is assumed to be in an eigenstate, the state where the limit of repeated readings converges to a specific value, when a sensor takes a reading of the surroundings. Thus, in some embodiments, preparation puts the system in an eigenstate.

Figure 22:
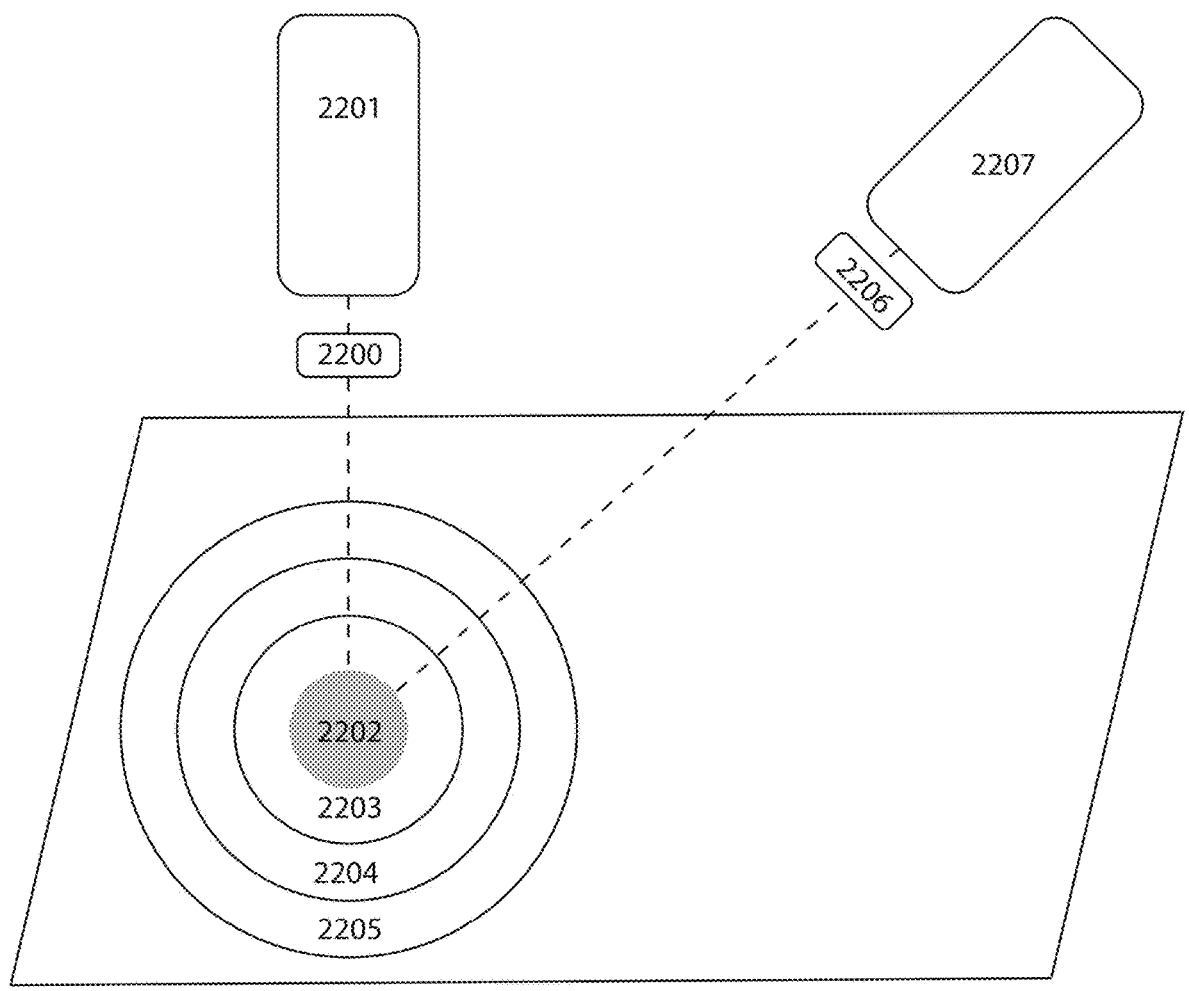
FIG. 22 illustrates an example of preparation of a state, according to some embodiments.

In some embodiments, the collection of actions and/or controls that cause the robotic floor-cleaning device to take the same particular reading are said to prepare the same state and are referred to as preparation operators. For example, FIG. 22 illustrates robotic floor-cleaning device 2200 being dropped by a machine or other device through a vertically oriented tube 2201 positioned directly above area 2202 on driving surface 2203. There is a high likelihood that this action will result in the robotic floor-cleaning device landing directly below tube 2201 in area 2202. It is also possible it may land in areas 2203, 2204 or 2205, though with less likelihood the further away the area is from area 2202 located directly beneath tube 2201. If the action were repeated n times, as n approaches infinity, the limit of the robotic floor-cleaning device landing at some area A converges to m/n, where m is the number of times the robotic floor-cleaning device lands in area A. The processor determines this convergence for areas 2202, 2203, 2204 and 2205. Based on the results, the area within which the robotic floor-cleaning device is most likely located in reality converges to a specific area, the area A with greatest value m. Convergence usually occurs after many repetitions of the same action or experiment. At the beginning of experimentation, observations may not converge. At the beginning of the experiment, results may seem divergent or it may appear that the possibility of the robotic floor-cleaning device landing in multiple areas is similar. However, as n increases, the area in which the robotic floor-cleaning device is most likely located converges to 2202. The processor determines convergence using $$P(A \mid C) = \lim_{n \to \infty} \frac{m}{n}.$$

This can be thought of as the propensity of the robotic floor-cleaning device landing in area A given condition C, which in this case is the action of the robotic floor-cleaning device being released through tube 2201, or otherwise the preparation operator. There may exist other preparation operators for the same state. For example, the action of robotic floor-cleaning device 2206 in FIG. 22 being released through tube 2207 angled at 45 degrees with the same set of probabilities of landing in areas 2202 through to 2205 is said to prepare the same state. In some embodiments, a mathematically equivalent experiment comprising n robotic floor-cleaning devices dropped at once producing the same results is said to prepare the same state. With the same logic, the limit of the robotic floor-cleaning device landing at some area A converges to m/n, with a greater number of robotic floor-cleaning devices landing in area 2202 as compared to areas 2203, 2204 and 2205. For a robotic floor-cleaning device in operation, the processor assumes any actions and/or controls that produce the same results prepare the same state. As an alternative to counting the number of times the robotic floor-cleaning device lands in an area A, the processor can apply the convergence in other ways. For example, if the mass of all robotic floor-cleaning devices were equivalent and each separate area was a weighing scale, the limit of the weight in area A converges as well, where m in this case is the total weight in area A and n is the total weight of all areas combined. The processor determines the number of robotic floor-cleaning devices in each area by dividing the total weight of an area by the weight of a single robotic floor-cleaning device. Given the results of the experiment the processor deduces, for example, that the robotic floor-cleaning device lands in area 2202. With the different preparations being mathematically equivalent, as n→∞, preparations are considered interchangeable. To visualize n→∞, repeatedly dropping a large number of robotic floor-cleaning devices a large number of times is envisioned wherein n×n=∞. Given the different possible preparations, the reading taken remains independent of the preparation or the method by which the robotic floor-cleaning device gets to areas 2202 through to 2205, for example. In operation, the processor determines convergence or propensity of landing in an area A over time. While only the probability of the robotic floor-cleaning device landing in areas 2202 to 2205 is discussed, the probability of the robotic floor-cleaning device being located at very remote areas is not zero as there is always a possibility that the robotic floor-cleaning device is located anywhere. However, in some embodiments, the processor compares all possible areas and their corresponding convergence results and eliminates areas with low probabilities, leaving only most intuitive and realistic areas for evaluation.

In some embodiments, having separated measurement and preparation, the processor interprets T discretely. For example, in the case of a vector ket|X⟩ of n linearly independent elements $(x_1, x_2, \ldots, x_n)$ in a subset of a Hilbert Space, a preparation vector ket|P⟩ acts on each element of vector ket|X⟩ such that a measurement produces an element in ket|Ψ⟩, an eigenvector describing all possible eigenstates of the robotic floor-cleaning device. Therefore, ket|Ψ⟩ is broken down by the processor to vectors acting on the space vector. Using Bra-Ket notation, the processor uses |Ψ⟩ =$C_1$|X⟩ +$C_2$|P1⟩ +$C_3$|P2⟩ + • • •, wherein C is an eigenvalue of scalar coefficient stretching the vector in the space. The processor uses this discrete approach to filter out states of the robotic floor-cleaning device with low possibility or without any possibility of being true. By describing localization in a subset of a Hilbert Space, localization of the robotic floor-cleaning device is not confined to a Cartesian coordinate system. Different sets of vectors are used by the processor in localization of the robotic floor-cleaning device whereby each set of vectors that cannot be represented as multiplication of other vectors increases the dimensionality of the system. For example, in some embodiments, the processor localizes the robotic floor-cleaning device against a certain type of floor assuming sensors are capable of processing and distinguishing floor types based on the reflection from the emitted light; against a room in which the robotic floor-cleaning device may be working wherein the room is represented as a graph of connected nodes; against a certain height measured relative to the driving surface given different heights are defined in the space; against a certain Wi-Fi strength; against presence or strength of light, sound, people, objects, or any other substance or material; against the slope of the environment; against the amount of power required by the system assuming different locations require different power, as in case of requiring more power for driving up a slope or requiring more power to rotate a wheel or main brush when on carpet; and against amp withdrawal. As a further example, the processor localizes the robotic floor-cleaning device against an edge at which two walls meet or a corner where multiple walls meet. In some cases, the readings taken provide less information of the observed surroundings than others but do provide, to some degree, a sense of the surroundings of the robotic floor-cleaning device. For example, a sensor captures a reading for which no objects, obstacles, or perimeters exist within the measurement range. Although the sensor does not measure any objects, obstacles, or perimeters, the processor still gains useful information about its surroundings. It can conclude that there are no objects, obstacles, or perimeters between the robotic floor-cleaning device and the maximum measurement range, thereby gaining a sense of the surroundings.

In some embodiments, the processor localizes the robotic floor-cleaning device within a phase space. In some embodiments, the phase space includes all possible states of the robotic floor-cleaning device. In some embodiments, a probability distribution may be used by the processor to approximate the likelihood of the state of the robotic floor-cleaning device being within a specific region of the phase space. In some embodiments, the processor determines a phase space probability distribution over all possible states of the robotic floor-cleaning device within the phase space using a statistical ensemble including a large collection of virtual, independent copies of the robotic floor-cleaning device in various states of the phase space. In some embodiments, the phase space consists of all possible values of position and momentum variables. In some embodiments, the processor chooses samples from the phase space for evaluation. In some embodiments, the phase space is discretized. In some embodiments, the discretized samples are filtered to only include classical mechanical attributes of the system (i.e., the robotic floor-cleaning device) into the data structure. In some embodiments, the processor represents the statistical ensemble by a phase space probability density function $\rho(p,q,t)$, q and p denoting position and velocity vectors. In some embodiments, the processor uses the phase space probability density function $\rho(p,q,t)$ to determine the probability $\rho(p,q,t)dq\,dp$ that the robotic floor-cleaning device at time t will be found in the infinitesimal phase space volume dq dp. In some embodiments, the phase space probability density function $\rho(p,q,t)$ has the properties $\rho(p,q,t) \geq 0$ and $\int \rho(p,q,t)d(p,q)=1$, $\forall t \geq 0$, and the probability of the position q lying within a position interval a, b is $P[a \leq q \leq b] = \int_a^b \int \rho(p,q,t)dpdq$. Similarly, the probability of the velocity p lying within a velocity interval c, d is $P[c \leq q \leq d] = \int_c^d \int \rho(p,q,t)dqdp$. In some embodiments, the processor determines values by integration over the phase space. For example, the processor determines the expectation value of the position q by $\langle q \rangle = \int q\,\rho(p,q,t)d(p,q)$.

In some embodiments, the processor evolves each state within the ensemble over time t according to an equation of motion. In some embodiments, the processor models the motion of the robotic floor-cleaning device using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function ρ(p,q,t) under a Hamiltonian H using the Liouville equation $$\frac{\partial \rho}{\partial t} = -\{\rho, H\},$$

wherein $\{\bullet,\bullet\}$ denotes the Poisson bracket and H is the Hamiltonian of the system. For two functions $f$, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function ρ(p,q,t) over time using the Fokker-Plank equation which describes the time evolution of a probability density function of a particle under drag and random forces. In comparison to the behavior of the robotic floor-cleaning device modeled by both the Hamiltonian and Liouville equations, which are purely deterministic, the Fokker-Planck equation includes stochastic behaviour. Given a stochastic process with $dX_t=\mu(X_t, t)dt+\sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density ρ(x,t) for $X_t$ satisfies the Fokker-Planck equation $$\frac{\partial \rho(x,t)}{\partial t} = -\sum_{i=1}^{M} \frac{\partial}{\partial x_i} [\mu_i(x, t)\rho(x, t)] + \sum_{i=1}^{M} \sum_{j=1}^{M} \frac{\partial^2}{\partial x_i \partial x_j} [D_{ij}(x, t)\rho(x, t)]$$

with drift vector $\mu=(\mu_1, \ldots, \mu_M)$ and diffusion tensor $$D = \frac{1}{2}\sigma\sigma^T.$$

In some embodiments, the processor adds stochastic forces to the motion of the robotic floor-cleaning device governed by the Hamiltonian H and the motion of the robotic floor-cleaning device is then given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$, denotes the gradient with respect to position p, $\nabla \bullet$ denotes divergence, and $$D = \frac{1}{2}\sigma_N \sigma_N^T$$

is the diffusion tensor.

In other embodiments, the processor incorporates stochastic behaviour by modeling the dynamics of the robotic floor-cleaning device using Langevin dynamics, which models friction forces and perturbation to the system, instead of Hamiltonian dynamics. The Langevian equations are given by $M\ddot{q}=-\nabla_q U(q)-\gamma p+\sqrt{2\gamma k_B T M}R(t)$, wherein $(-\gamma p)$ are friction forces, R(t) are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla p \cdot (\gamma M \nabla_p \rho)$ is a model of classical Brownian motion, modeling a diffusion process. In some embodiments, partial differential equations for evolving the probability density function over time may be solved by the processor using, for example, finite difference and/or finite element methods.

Figure 23A:
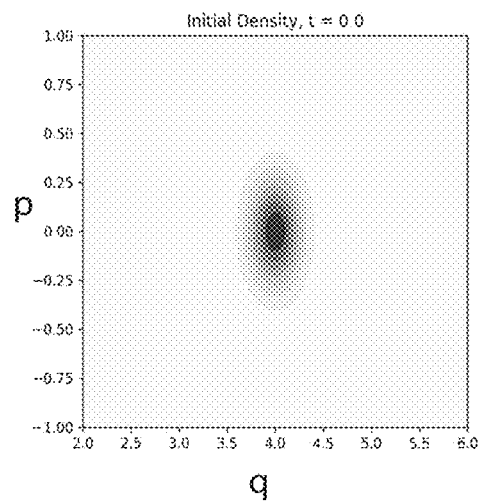
FIG. 23A illustrates an example of an initial phase space probability density of a robotic device, according to some embodiments.
Figure 23B:
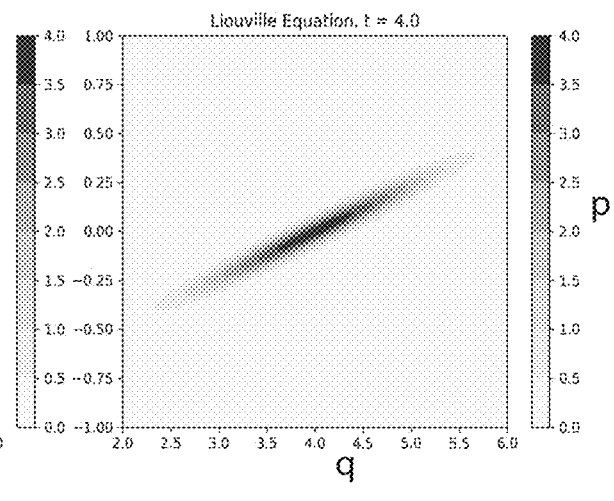
FIGS. 23B-23D illustrates examples of the time evolution of the phase space probability density, according to some embodiments.

FIG. 23A {Collab Local Map Patent} illustrates an example of an initial phase space probability density of a robotic floor-cleaning device, a Gaussian in (q,p) space. FIG. 23B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

Figure 23C:
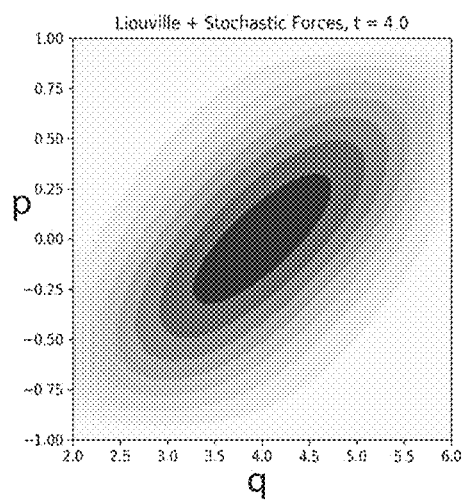
Figure 23D:
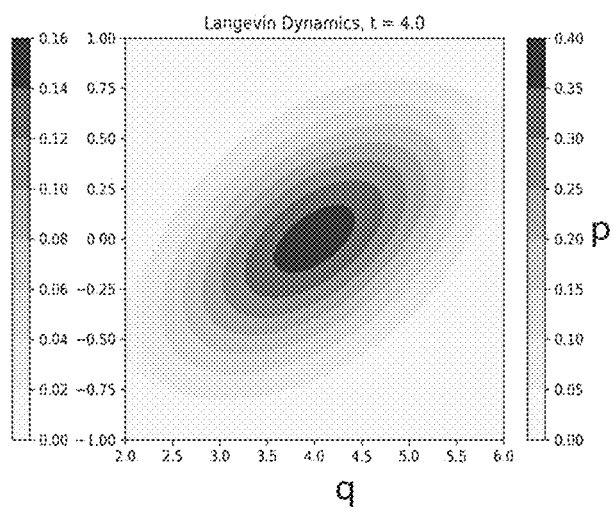

FIG. 23C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D \nabla_p \rho)$$

with D=0.1. FIG. 23D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with γ=0.5, T=0.2, and $k_B$=1. FIG. 23B illustrates that the Liouville equation incorporating Hamiltonian dynamics conserves momentum over time, as the initial density in FIG. 23A was only distorted in the q-axis (position). In comparison, FIGS. 23C and 23D illustrate diffusion along the p-axis (velocity) as well, as both evolution equations account for stochastic forces. With the Fokker-Planck equation incorporating Hamiltonian dynamics the density spread more equally (FIG. 23C) as compared to the Fokker-Planck equation incorporating Langevin dynamics where the density remained more confined (FIG. 23D) due to the additional friction forces.

In some embodiments, the processor may update the phase space probability distribution when the processor receives readings (or measurements or observations). Any type of reading that may be represented as a probability distribution that describes the likelihood of the state of the robotic floor-cleaning device being in a particular region of the phase space may be used. Readings may include measurements or observations acquired by sensors of the robotic floor-cleaning device or external devices such as a Wi-Fi™ camera. Each reading may provide partial information on the likely region of the state of the robotic floor-cleaning device within the phase space and/or may exclude the state of the robotic floor-cleaning device from being within some region of the phase space. For example, a depth sensor of the robotic floor-cleaning device may detect an obstacle in close proximity to the robotic floor-cleaning device. Based on this reading and using a map of the phase space, the processor may reduce the likelihood of the state of the robotic floor-cleaning device being any state of the phase space at a great distance from an obstacle. In another example, a reading of a floor sensor of the robotic floor-cleaning device and a floor map may be used by the processor to adjust the likelihood of the state of the robotic floor-cleaning device being within the particular region of the phase space coinciding with the type of floor sensed. In an additional example, a measured Wi-Fi™ signal strength and a map of the expected Wi-Fi™ signal strength within the phase space may be used by the processor to adjust the phase space probability distribution. As a further example, a Wi-Fi™ camera may observe the absence of the robotic floor-cleaning device within a particular room. Based on this observation the processor may reduce the likelihood of the state of the robotic floor-cleaning device being any state of the phase space that places the robotic floor-cleaning device within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor may update the current phase space probability distribution ρ(p, q, $t_i$) by re-calculating the phase space probability distribution based on an observation probability distribution m(p, q, $t_i$) using $$\bar{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor for a reading at time $t_i$ using an inverse sensor model. In some embodiments, wherein the observation probability distribution does not incorporate the confidence or uncertainty of the reading taken, the processor may incorporate the uncertainty into the observation probability distribution by determining an updated observation probability distribution $$\hat{m} = \frac{1 - \alpha}{c} + \alpha m$$

that may be used in re-calculating the current phase space probability distribution, wherein α is the confidence in the reading with a value of 0≤α≤1 and c=∫∫dpdq. At any given time, the processor may estimate a region of the phase space within which the state of the robotic floor-cleaning device is likely to be given the phase space probability distribution at the particular time.

Figure 24A:
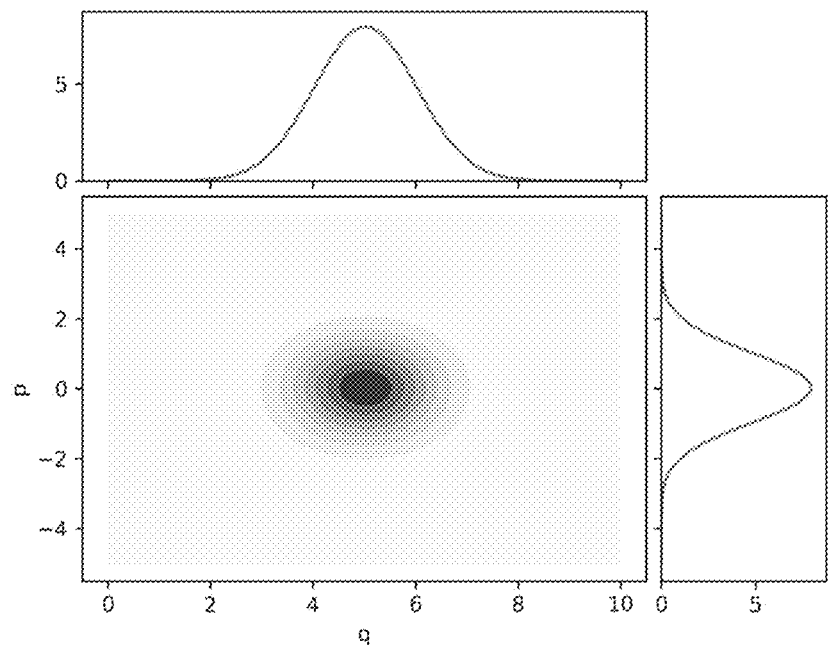
FIGS. 24A-24D illustrate examples of initial phase space probability distributions, according to some embodiments.
Figure 24B:
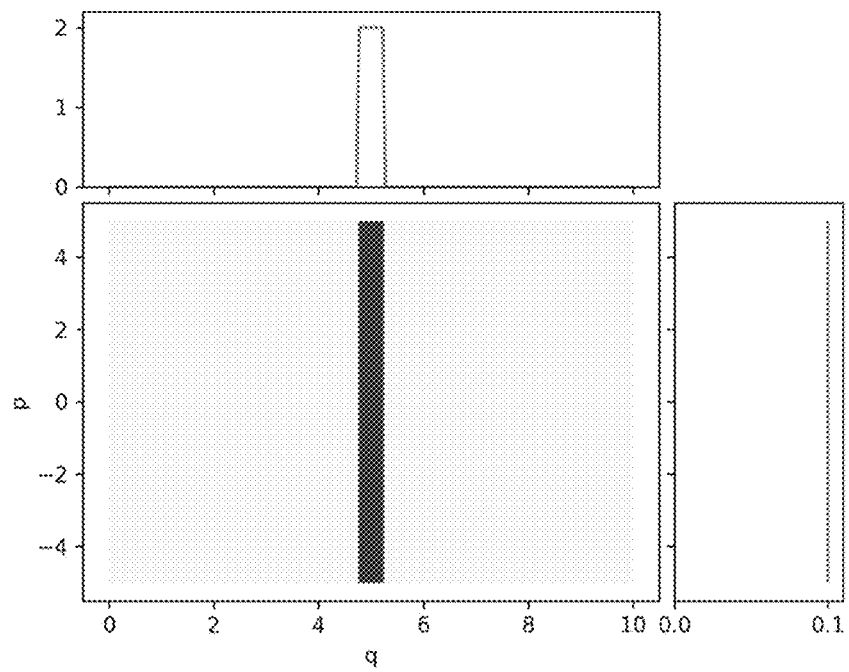
Figure 24C:
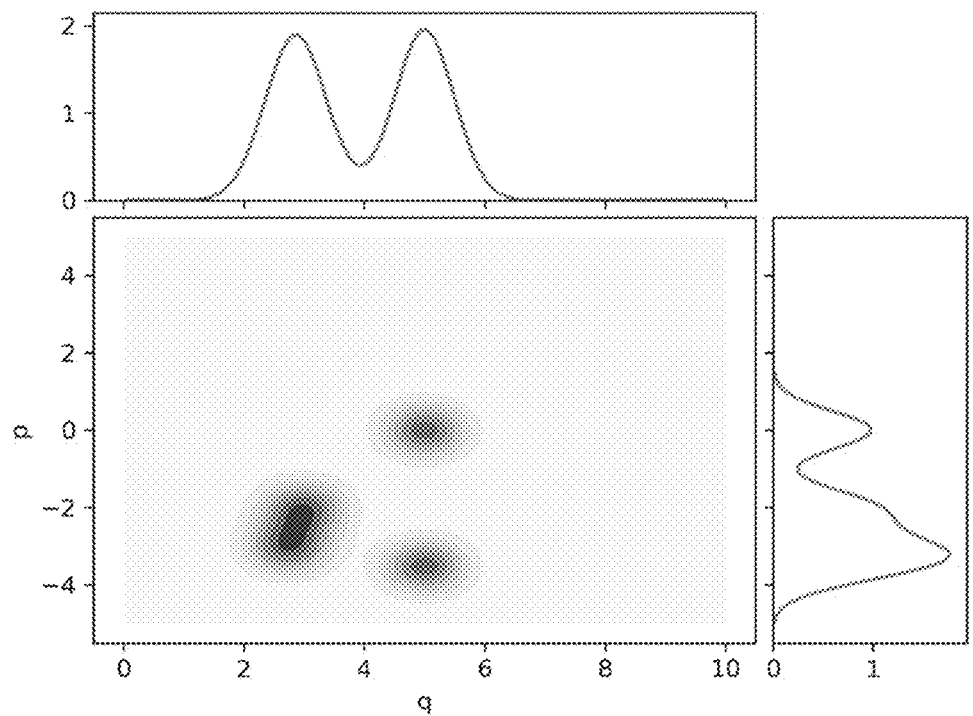
Figure 24D:
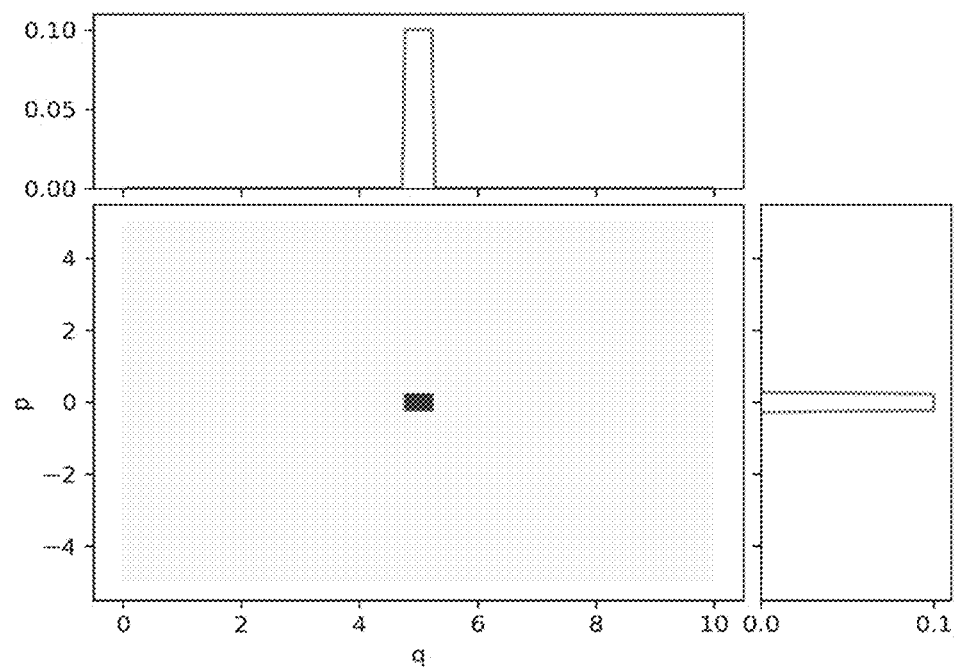

In one example, the processor uses a two-dimensional phase space of the robotic floor-cleaning device, including position q and velocity p. The processor confines the position of the robotic floor-cleaning device q to an interval [0, 10] and the velocity p to an interval [−5, +5], limited by the top speed of the robotic floor-cleaning device, therefore the phase space (p,q) is the rectangle D=[−5, 5]×[0, 10]. The processor uses a Hamiltonian function $$H = \frac{p^2}{2m},$$

with mass m and resulting equations of motion $\dot{p}$=0 and $\dot{q}$=p/m to delineate the motion of the robotic floor-cleaning device. The processor adds Langevin-style stochastic forces to obtain motion equations $$\dot{p} = -\gamma p + \sqrt{2\gamma m k_B T} R(t) \text{ and } \dot{q} = \frac{p}{m},$$

wherein R(t) denotes random forces and m=1. The processor initially generates a uniform phase space probability distribution over the phase space D. FIGS. 24A-24D illustrate examples of initial phase space probability distributions the processor may use. FIG. 24A illustrates a Gaussian distribution over the phase space, centered at q=5, p=0. The robotic floor-cleaning device is estimated to be in close proximity to the center point with high probability, the probability decreasing exponentially as the distance of the point from the center point increases. FIG. 24B illustrates uniform distribution for q∈[4.75, 5.25], p∈[−5, 5] over the phase space, wherein there is no assumption on p and q is equally likely to be in [4.75, 5.25]. FIG. 24C illustrates multiple Gaussian distributions and FIG. 24D illustrates a confined spike at q=5, p=0, indicating that the processor is certain of the state of the robotic floor-cleaning device.

In this example, the processor evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p\frac{\partial \rho}{\partial q} \text{ and } m = 1.$$

Figure 25A:
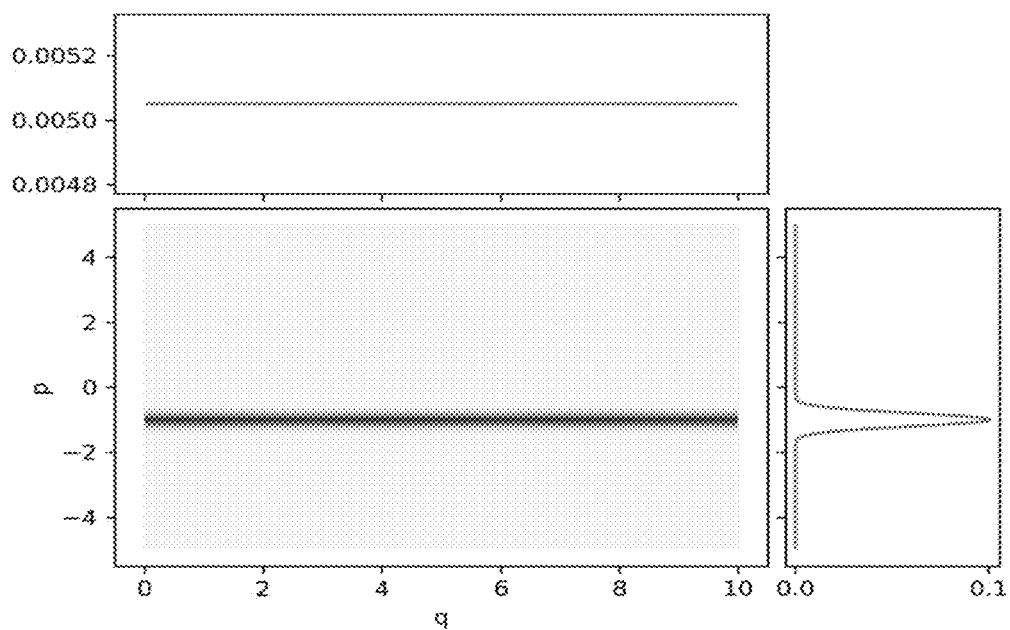
FIGS. 25A and 25B illustrate examples of observation probability distributions, according to some embodiments.
Figure 25B:
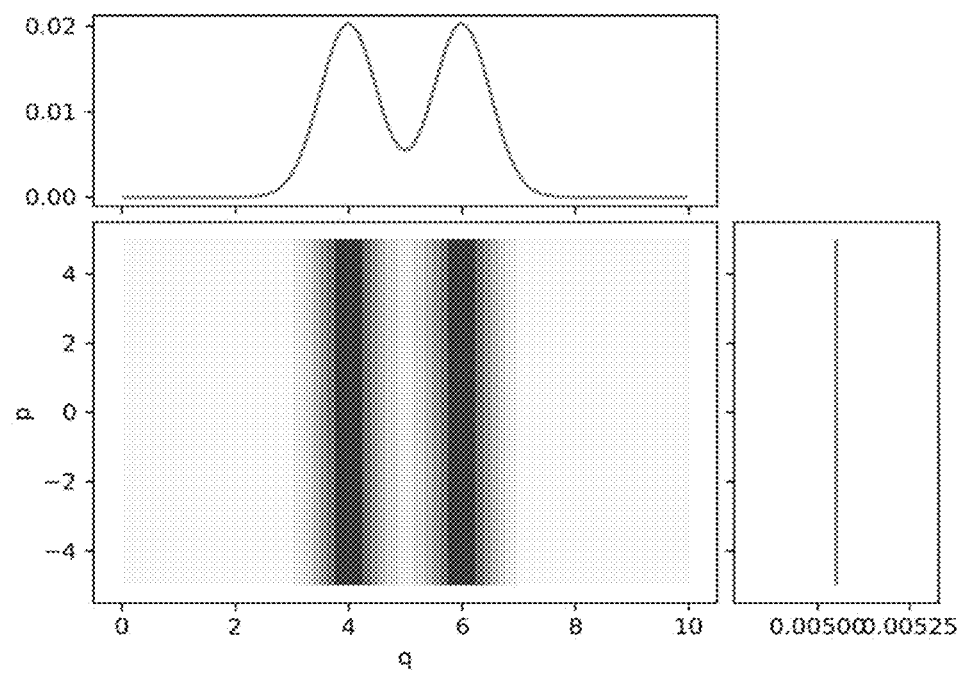

Thus, the processor solves $$\frac{\partial \rho}{\partial t} = -p\frac{\partial \rho}{\partial q} + \gamma\left(\rho + p\frac{\partial \rho}{\partial p}\right) + \gamma k_B T \frac{\partial^2 \rho}{\partial p^2} \text{ for } t > 0$$

with initial condition $\rho(p, q, 0) = \rho_0$ and homogenous Neumann boundary conditions. The boundary conditions govern what happens when the robotic floor-cleaning device reaches an extreme state. In the position state, this may correspond to the robotic floor-cleaning device reaching a wall, and in the velocity state, it may correspond to the motor limit. The processor updates the phase space probability distribution each time a new reading is received by the processor. FIGS. 25A and 25B illustrate examples of observation probability distributions for odometry measurements and distance measurements, respectively. FIG. 25A illustrates a narrow Gaussian observation probability distribution for velocity p, reflecting an accurate odometry sensor. Position q is uniform as odometry data does not indicate position. FIG. 25B illustrates a bimodal observation probability distribution for position q including uncertainty for an environment with a wall at q=0 and q=10. Therefore, for a distance measurement of four, the robotic floor-cleaning device is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor may determine an observation probability distribution of a reading using an inverse sensor model and the phase space probability distribution may be updated by the processor by re-calculating it using the observation probability distribution of the reading.

Figure 26:
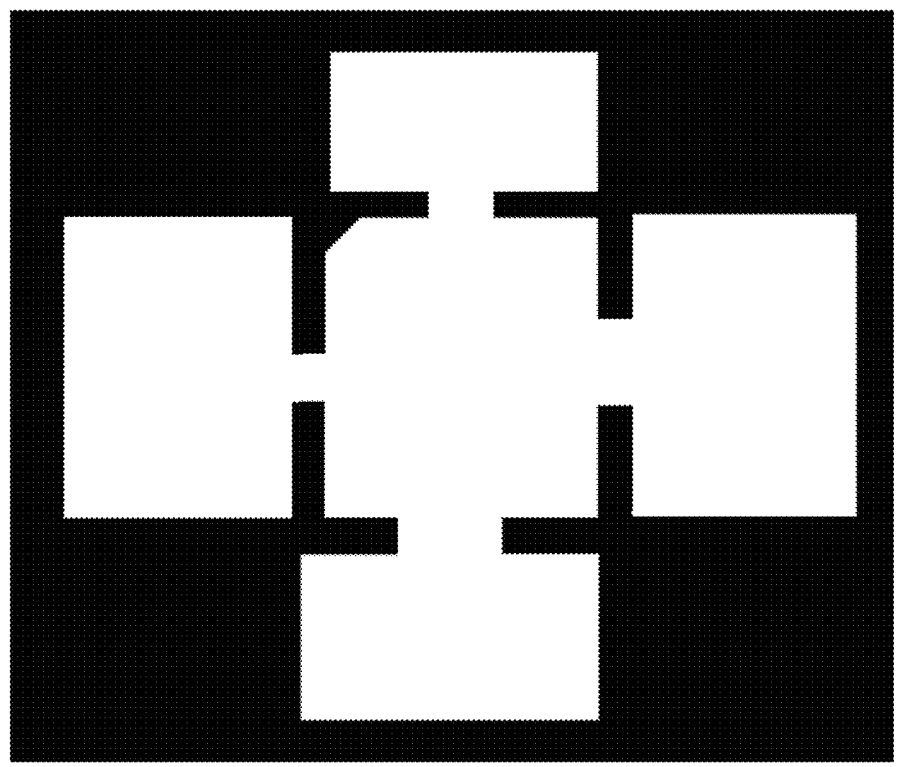
FIG. 26 illustrates an example of a map of an environment, according to some embodiments.
Figure 27A:
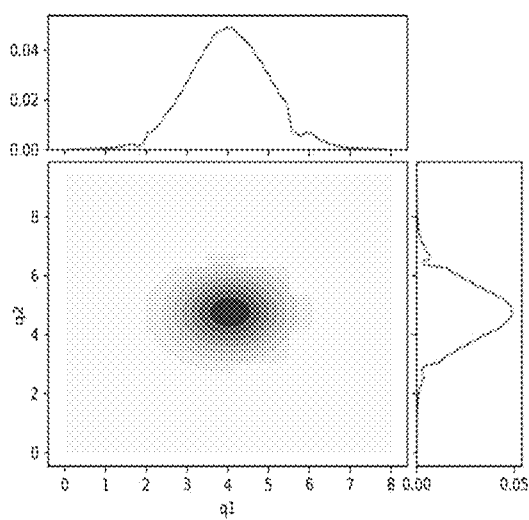
FIGS. 27A-27C illustrate an example of an evolution of a probability density reduced to the $q_1$, $q_2$ space at three different time points, according to some embodiments.
Figure 27B:
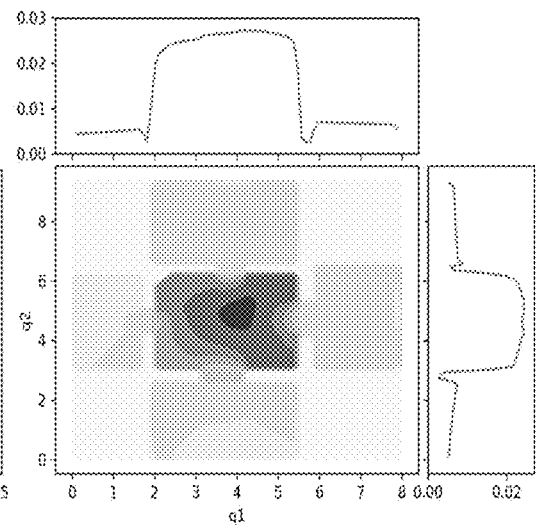
Figure 27C:
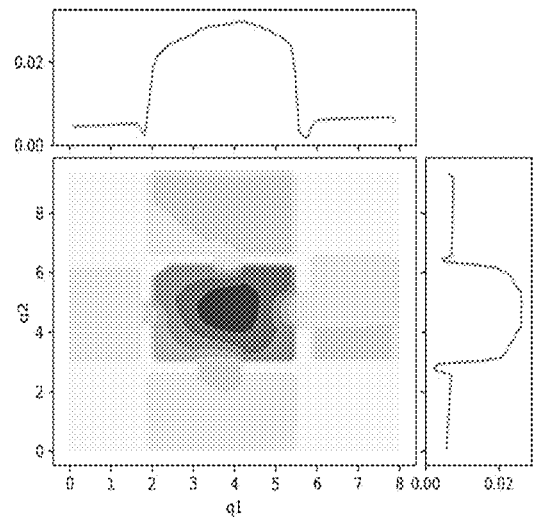
Figure 28A:
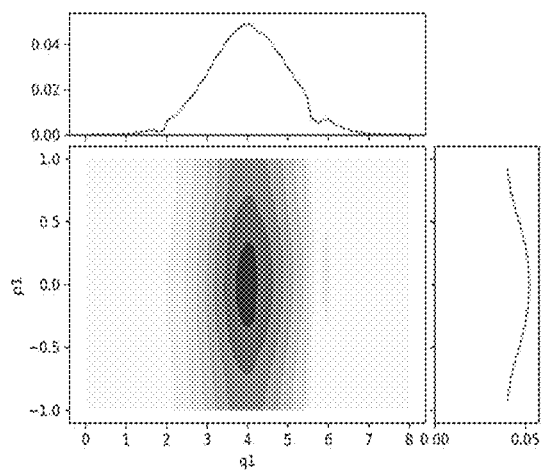
FIGS. 28A-28C illustrate an example of an evolution of a probability density reduced to the $p_1$, $q_1$ space at three different time points, according to some embodiments.
Figure 28B:
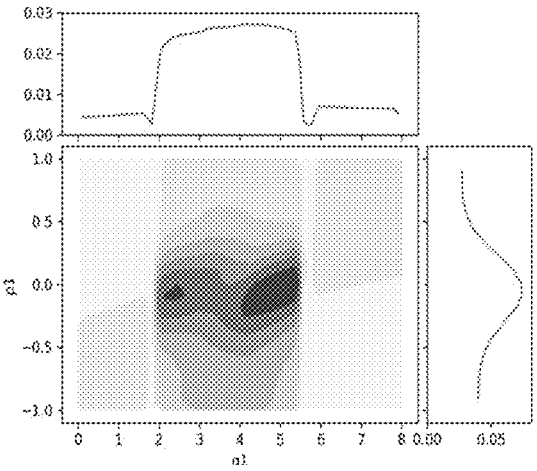
Figure 28C:
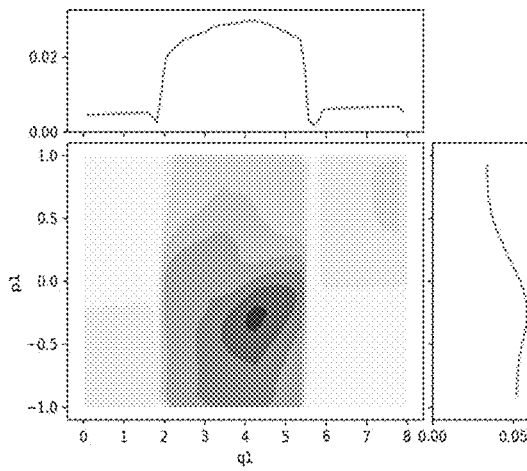
Figure 29A:
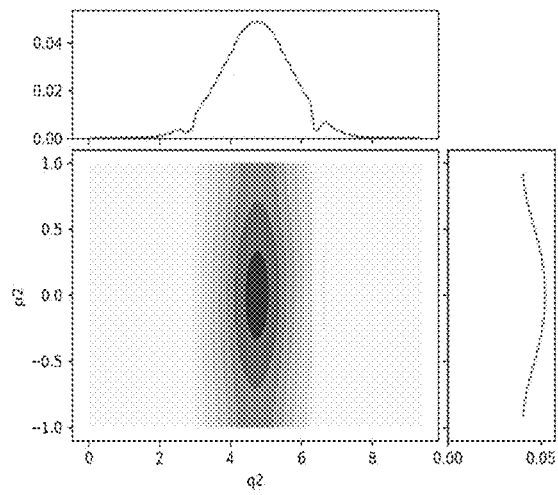
FIGS. 29A-29C illustrate an example of an evolution of a probability density reduced to the $p_2$, $q_2$ space at three different time points, according to some embodiments.
Figure 29B:
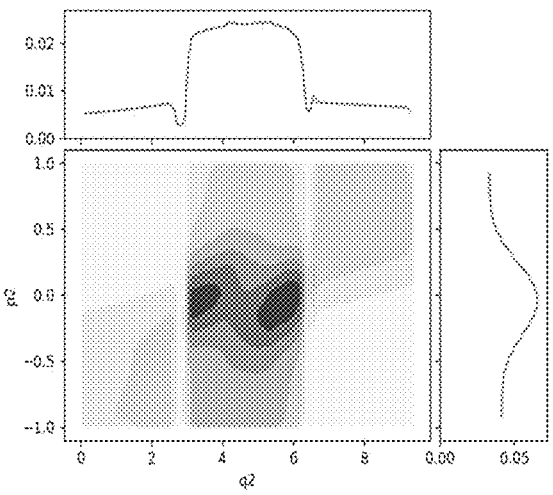
Figure 29C:
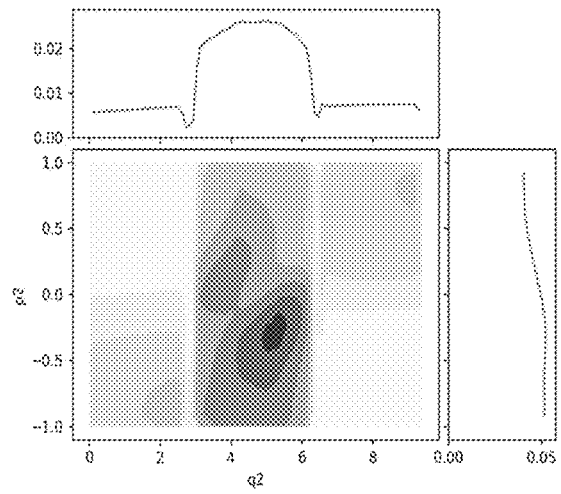
Figure 30:
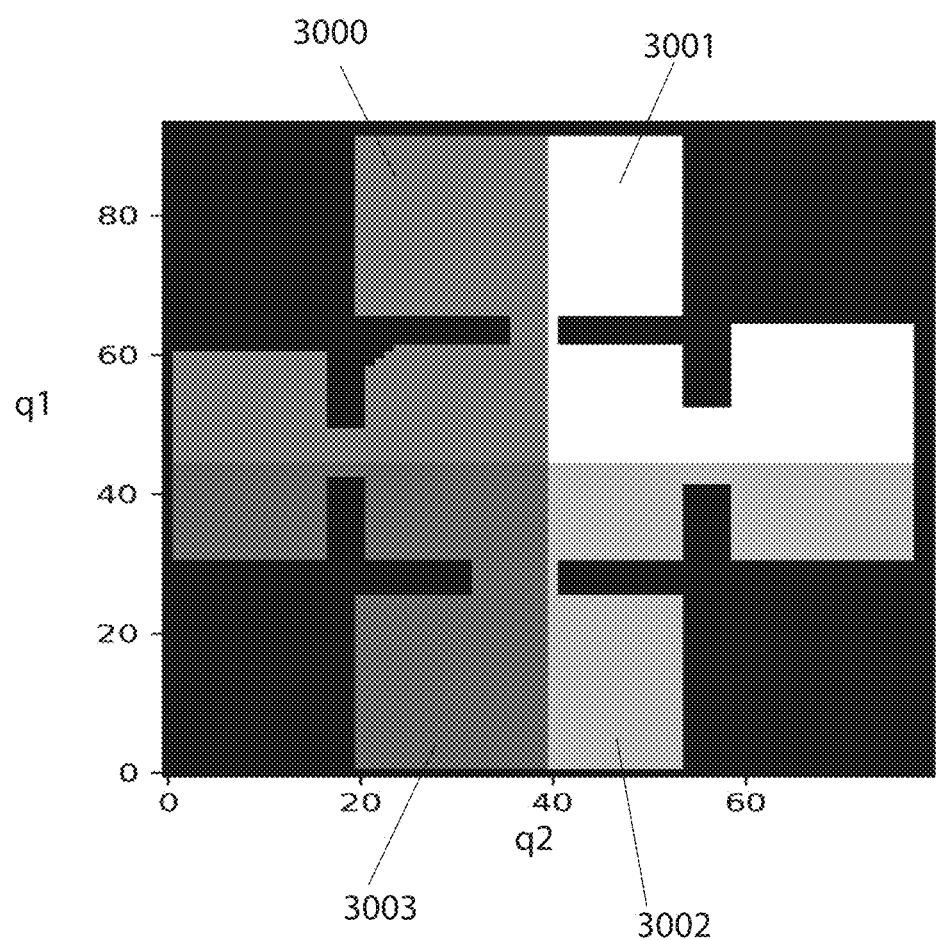
FIG. 30 illustrates an example of a map indicating floor types, according to some embodiments.

The example described may be extended to a four-dimensional phase space with position q=(x,y) and velocity $\mu=(p_x, p_y)$. The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

with $M=I_2$ (2D identity matrix), T=0.1, $\gamma$=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 26, wherein the white space is the area accessible to the robotic floor-cleaning device. The map describes the domain for $q_1, q_2 \in D$. In this example, the velocity is limited to $p_1, p_2 \in [-1, 1]$. The processor models the initial probability density $\rho(p, q, 0)$ as Gaussian, wherein p is a four-dimensional function. FIGS. 27A-27C illustrate the evolution of p reduced to the $q_1, q_2$ space at three different time points (i.e., the density integrated over $p_1, p_2, \rho_{red}=\iint\rho(p_1, p_2, q_1, q_2)dp_1dp_2$). It can be seen that with increased time, the initial density focused in the middle of the map starts to flow into other rooms. FIGS. 28A-28C illustrate the evolution of p reduced to the $p_1, q_1$ space and FIGS. 29A-29C illustrate the evolution of $\rho$ reduced to the $p_2, q_2$ space at the same three different time points to show how velocity evolves over time with position. The four-dimensional example is repeated but with the addition of floor sensor data observations. FIG. 30 illustrates a map of the environment indicating different floor types 3000, 3001, 3002, and 3003 with respect to $q_1, q_2$. Given that the sensor has no error, the processor may strongly predict the area within which the robotic floor-cleaning device is located based on the measured floor type, at which point all other hypothesized locations of the robotic floor-cleaning device become invalid. For example, the processor may use the distribution $$m(p_1, p_2, q_1, q_2) = \begin{cases} const > 0, & q_1, q_2 \text{ with the observed floor type} \\ 0, & \text{else} \end{cases}.$$

Figure 31:
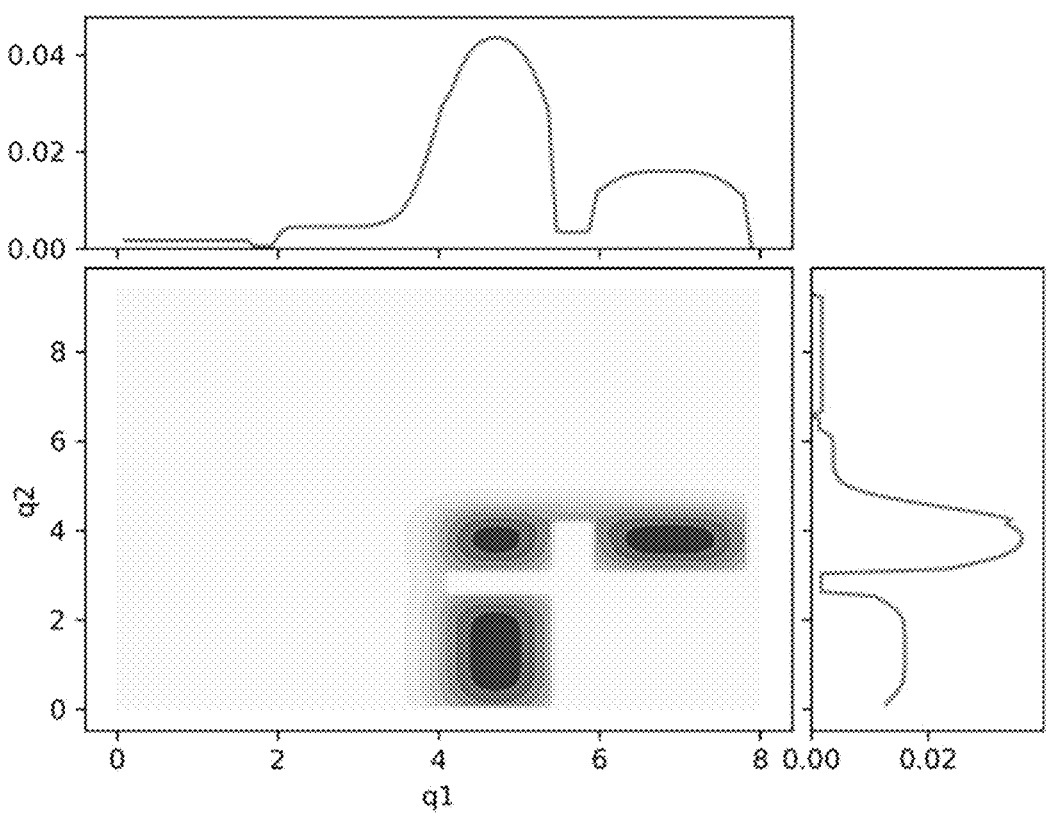
FIG. 31 illustrates an example of an updated probability density after observing floor type, according to some embodiments.
Figure 32:
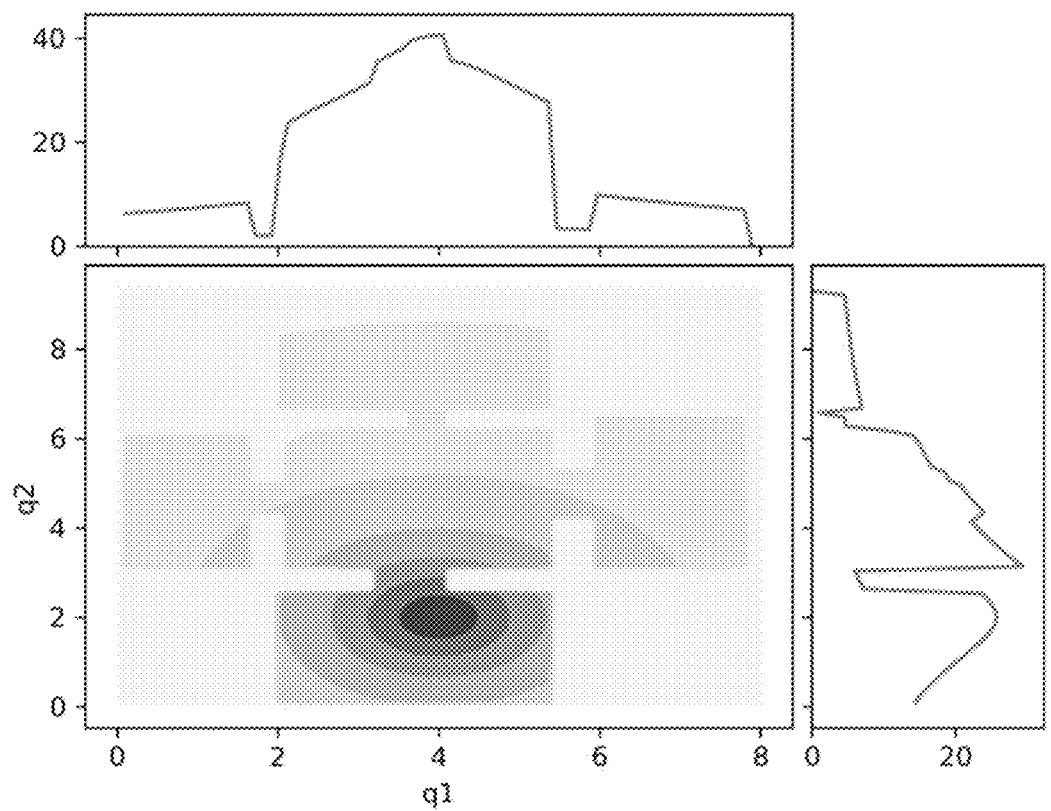
FIG. 32 illustrates an example of a Wi-Fi map, according to some embodiments.
Figure 33:
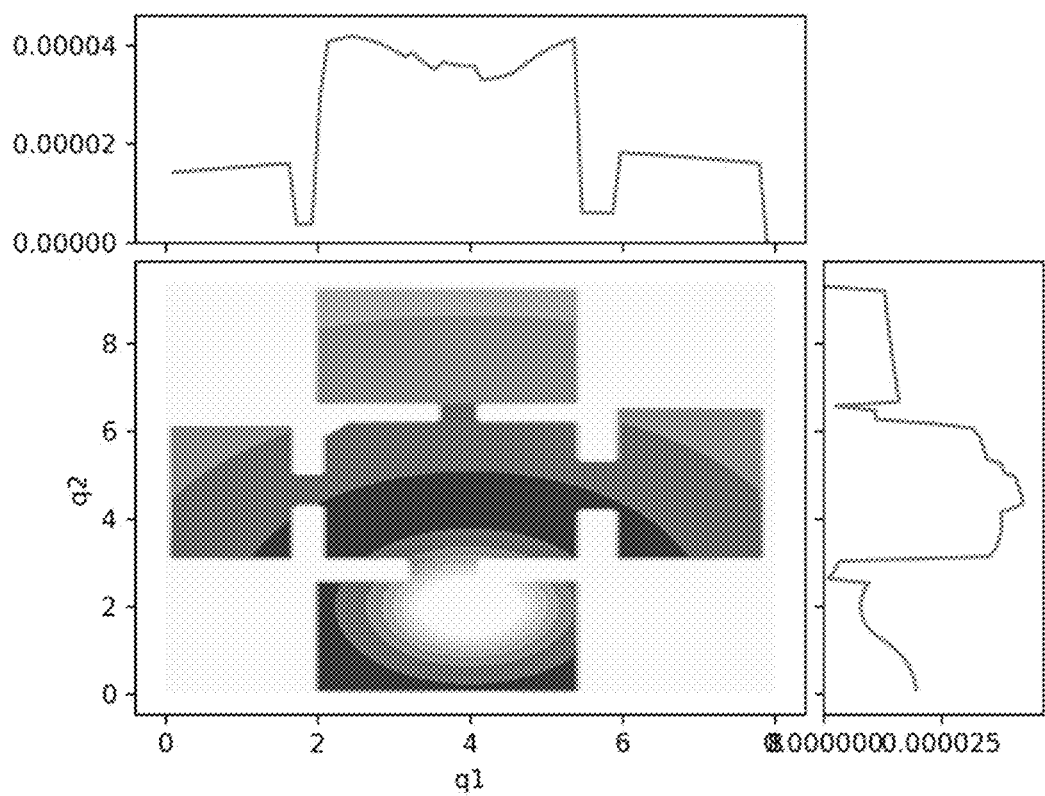
FIG. 33 illustrates an example of an updated probability density after observing Wi-Fi strength, according to some embodiments.
Figure 34:
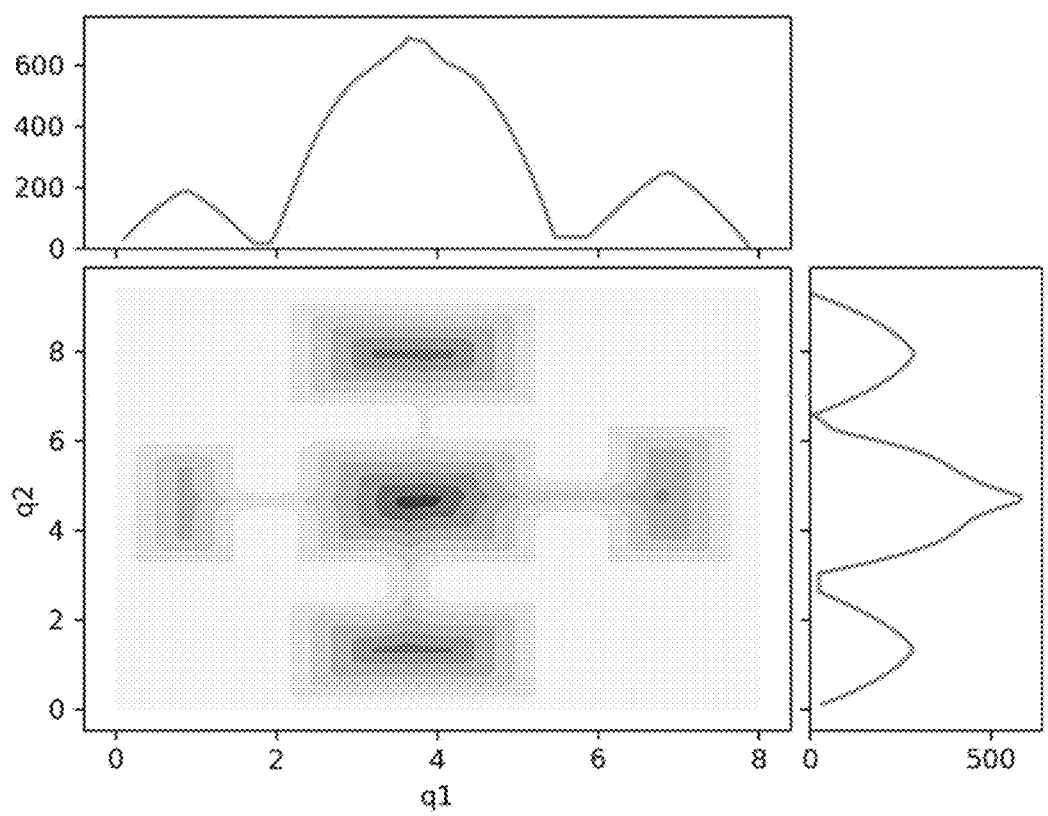
FIG. 34 illustrates an example of a wall distance map, according to some embodiments.
Figure 35:
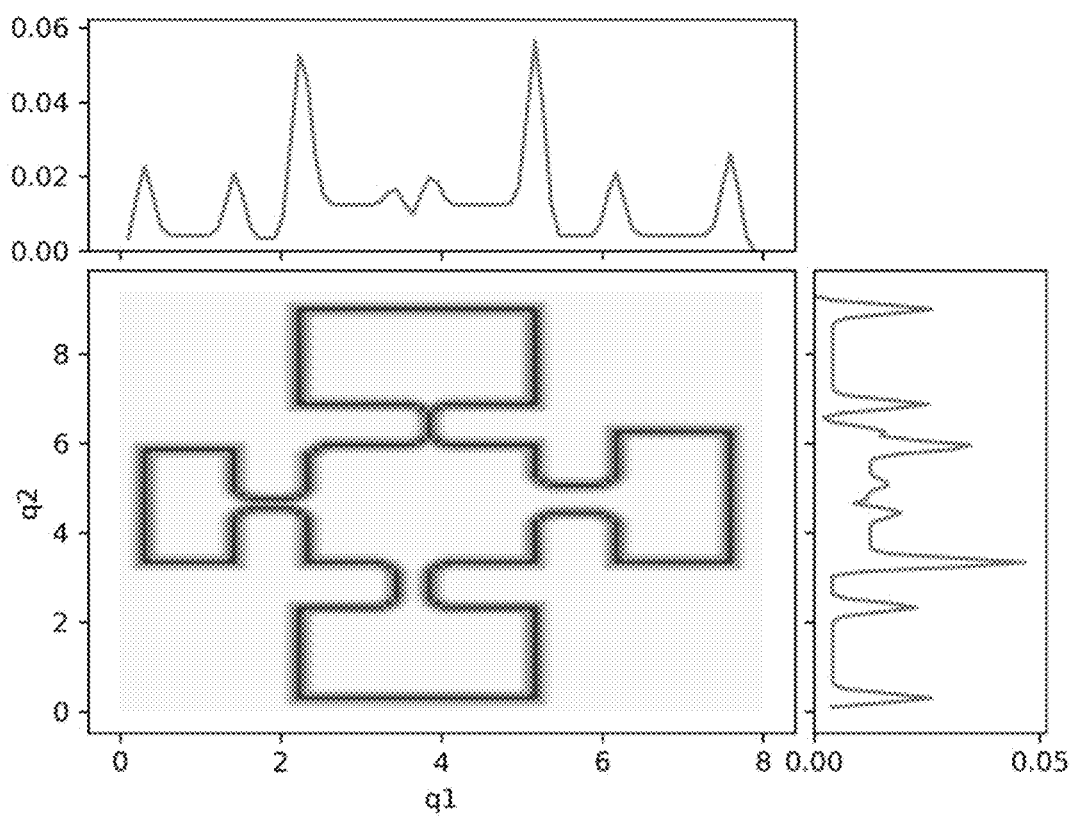
FIG. 35 illustrates an example of an updated probability density after observing distances to a wall, according to some embodiments.

If the sensor has an average error rate $\epsilon$, the processor may use the distribution $$m(p_1, p_2, q_1, q_2) = \begin{cases} c_1 > 0, & q_1, q_2 \text{ with } r_i \text{ the observed floor type} \\ c_2 > 0, & \text{else} \end{cases}$$

with $c_1, c_2$ chosen such that $\int_p \int_{D_{obs}} md(q_1, q_2)d(p_1, p_2)=1-\epsilon$ and $\int_p \int_{D_{obs}^c} md(q_1, q_2)d(p_1, p_2)=\epsilon$. $D_{obs}$ is the $q_1, q_2$ with the observed floor type and $D_{obs}^c$ is its complement. By construction, the distribution m has a probability $1-\epsilon$ for $q_1, q_2 \in D_{obs}$ and probability $\epsilon$ for $q_1, q_2 \in D_{obs}^c$. Given that the floor sensor measures floor type 3002, the processor updates the probability distribution for position as shown in FIG. 31. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 32, the processor may generate a density describing the possible location of the robotic floor-cleaning device based on a measured Wi-Fi signal strength. The darker areas in FIG. 32 represent stronger Wi-Fi signal strength and the signal source is at $q_1, q_2$=4.0, 2.0. Given that the robotic floor-cleaning device measures a Wi-Fi signal strength of 0.4, the processor generates the probability distribution for position shown in FIG. 33. The likely area of the robotic floor-cleaning device is larger since the Wi-Fi signal does not vary very much. For wall distance measurements, a wall distance map, such as that shown in FIG. 34 may be used by the processor to approximate the area of the robotic floor-cleaning device given a distance measured. Given that the robotic floor-cleaning device measures a distance of 3 distance units, the processor generates the probability distribution for position shown in FIG. 35. For example, the processor evolves the Fokker-Planck equation over time and as observations are successively taken, the processor re-calculates the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 36:
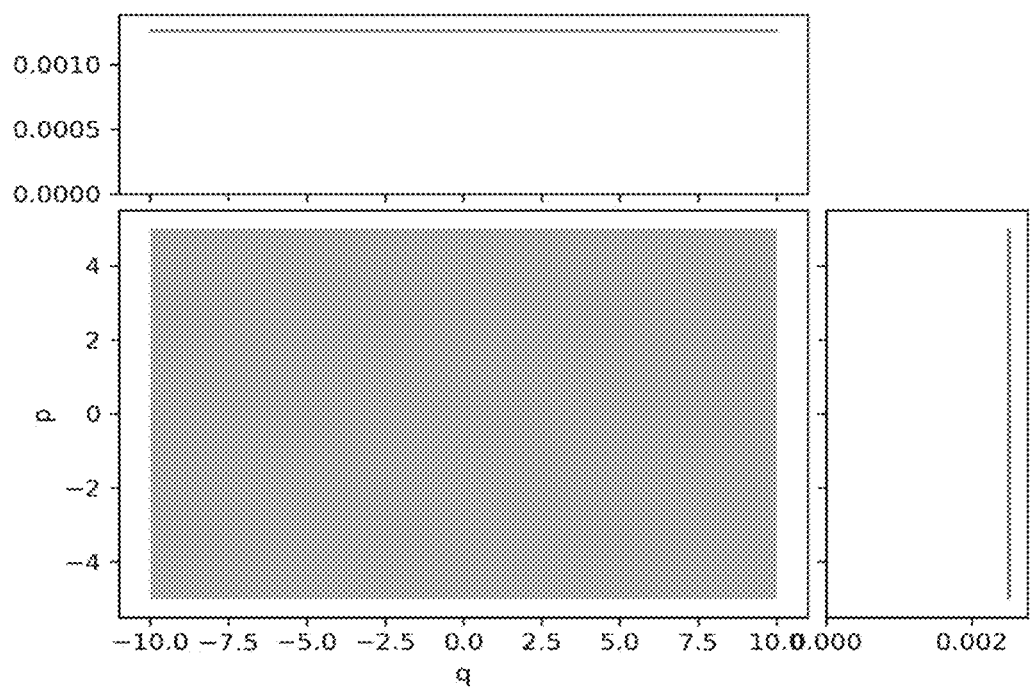
FIGS. 36-39 illustrate an example of an evolution of a probability density of a position of a robotic device as it moves and observes doors, according to some embodiments.
Figure 37:
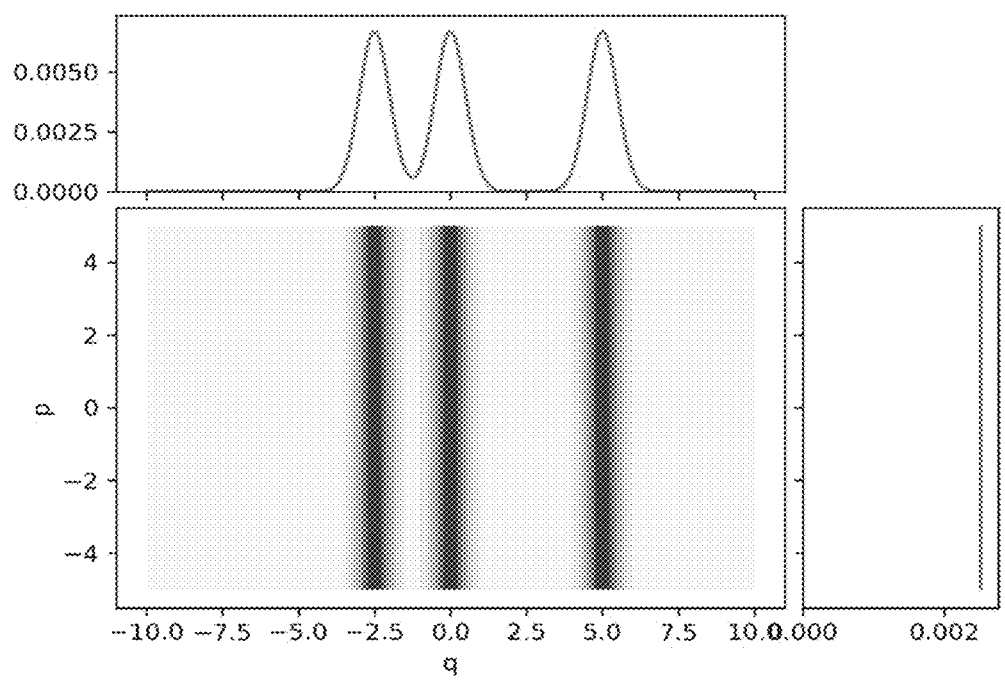
Figure 38:
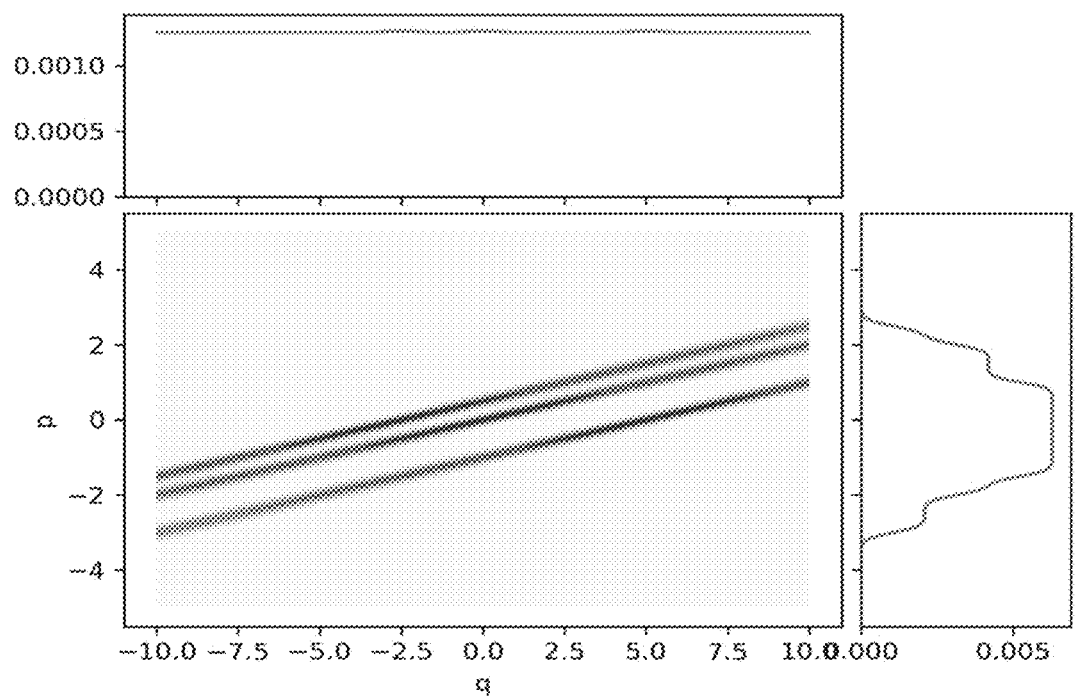
Figure 39:
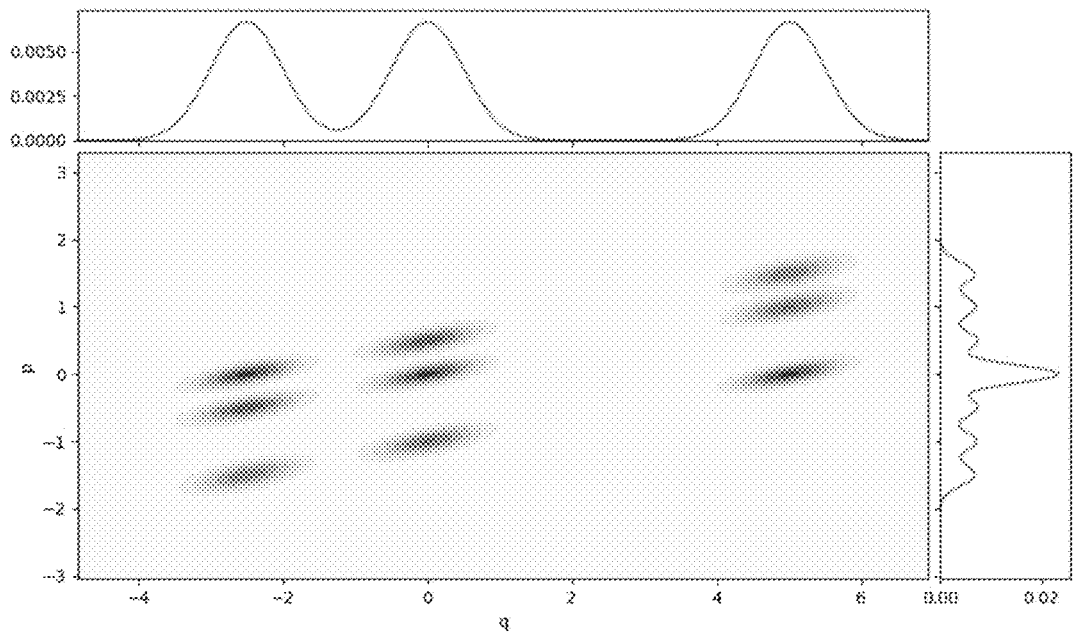

In another example, the robotic floor-cleaning device navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q \in [-10, 10]$ and $p \in [-5,5]$. The floor has three doors at $q_0$=−2.5, $q_1$=0, and $q_2$=5.0 and the processor is capable of determining when it is located at a door based on sensor data observed and the momentum of the robotic floor-cleaning device is constant, but unknown. Initially the location of the robotic floor-cleaning device is unknown, therefore the processor generates an initial state density such as that in FIG. 36. When the processor determines the robotic floor-cleaning device is in front of a door, the possible location of the robotic floor-cleaning device is narrowed down, but not the momentum. Therefore, the processor may update the probability density to that shown in FIG. 37. The processor evolves the probability density, and after five seconds the probability is as shown in FIG. 38, wherein the uncertainty in the position space has spread out again given that the momentum is unknown. However, the evolved probability density keeps track of the correlation between position and momentum. When the processor determines the robotic floor-cleaning device is in front of a door again, the probability density is updated to FIG. 39, wherein the density has significantly narrowed down, indicating a number of peaks representing possible location and momentum combinations of the robotic floor-cleaning device. For the left door, there is equal likelihood for p=0, p=−0.5, and p=−1.5. These momentum values correspond with the robotic floor-cleaning device travelling from one of the three doors in five seconds. This is seen for the other two doors as well.

In some embodiments, the processor models motion of the robotic floor-cleaning device using equations $\dot{x}$=v cos ω,
$\dot{y}$=v sin ω, and $\dot{\theta}$=ω, wherein v and ω are translational and rotational velocities, respectively. In some embodiments, translational and rotational velocities of the robotic floor-cleaning device are computed using observed wheel angular velocities $\omega_l$ and $\omega_r$ using $$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor evolves the probability density $\rho$=(x, y, θ, $\omega_l$, $\omega_r$)

$$\rho = (x, y, \theta, \omega_l, \omega_r) \text{ using } \frac{\partial \rho}{\partial t} = -\begin{pmatrix} v \cos \theta \\ v \cos \theta \\ \omega \end{pmatrix}.$$

$\nabla q \rho + \nabla_p \cdot (D \nabla_p \rho)$ wherein $$D = \frac{1}{2} \sigma_N \sigma_N^T$$

is a 2-by-2 diffusion tensor, q=(x, y, θ) and p=($\omega_l$, $\omega_r$). In some embodiments, the domain is obtained by choosing x, y in the map of the environment, θ ∈ [0, 2π), and $\omega_l$, $\omega_r$ as per the robotic floor-cleaning device specifications. In some embodiments, solving the equation may be a challenge given it is five-dimensional. In some embodiments, the model may be reduced by replacing odometry by Gaussian density with mean and variance. This reduces the model to a three-dimensional density $\rho$=(x, y, θ). In some embodiments, independent equations may be formed for $\omega_l, \omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \bar{v} \cos \theta \\ \bar{v} \cos \theta \\ \bar{\omega} \end{pmatrix} \cdot \nabla \rho + \nabla \cdot (D \nabla \rho), t > 0$$

wherein $$D = \begin{pmatrix} dv^2 \cos^2 \theta & dv^2 \sin \theta \cos \theta & 0 \\ dv^2 \sin \theta \cos \theta & dv^2 \sin^2 \theta & 0 \\ 0 & 0 & d\omega^2 \end{pmatrix},$$

$\bar{v}, \bar{\omega}$ represent the current mean velocities, and dv, dω the current deviation. In some embodiments, the processor determines $\bar{v}, \bar{\omega}$; from the mean and deviation of the left and right wheel velocities $\omega_L$ and $\omega_R$ using $$\begin{pmatrix} \bar{v} \\ \bar{\omega} \end{pmatrix} = J \begin{pmatrix} \bar{\omega}_L \\ \bar{\omega}_R \end{pmatrix}.$$

In some embodiments, the processor uses Neumann boundary conditions for x, y and periodic boundary conditions for θ.

Figure 40:
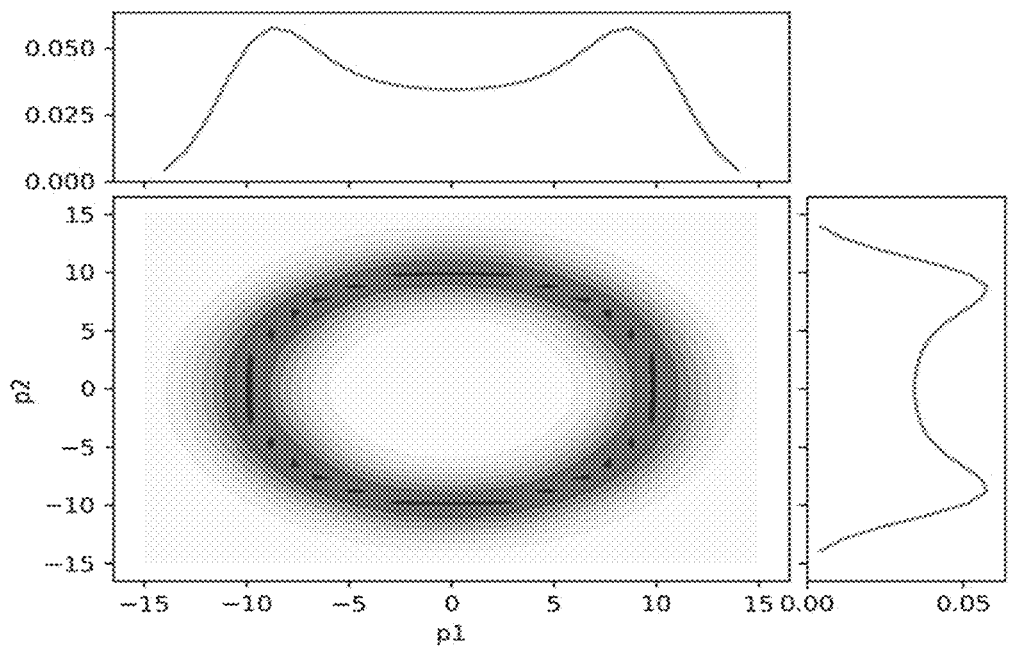
FIG. 40 illustrates an example of a velocity observation probability density, according to some embodiments.
Figure 41:
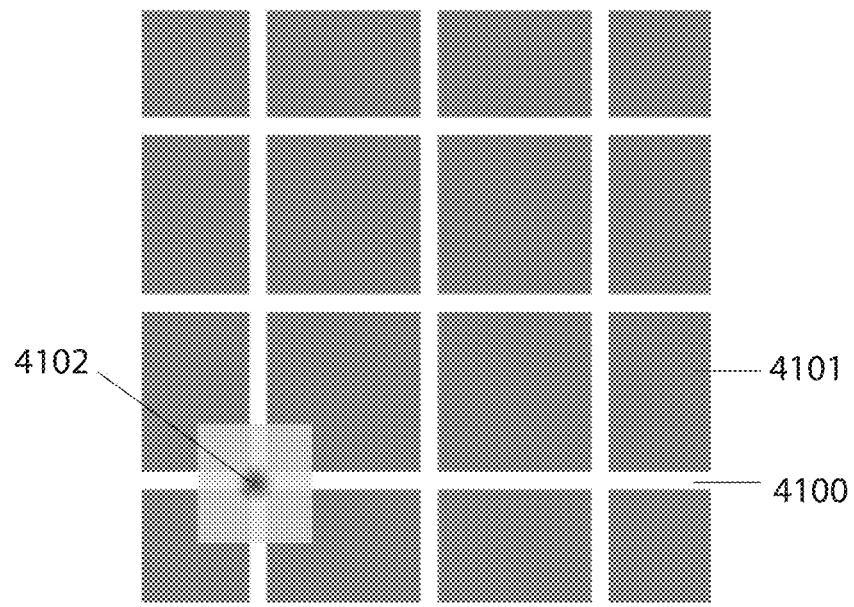
FIG. 41 illustrates an example of a road map, according to some embodiments.

In another example, the processor localizes a robotic floor-cleaning device with position coordinate q=(x,y) and momentum coordinate p=($p_x$, $p_y$). For simplification, the mass of the robotic floor-cleaning device is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D \nabla_p \rho),$$

wherein D is as defined above. The processor uses a moving grid, wherein the general location of the robotic floor-cleaning device is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the robotic floor-cleaning device. Velocity measurements provide no information on position, but provide information on $p_x^2+p_y^2$, the circular probability distribution in the p space, as illustrated in FIG. 40 with |p|=10 and large uncertainty. GPS position measurements provide no direct momentum information but provides a position density. The processor further uses a road map to exclude impossible states of the robotic floor-cleaning device. For instance, it is impossible to drive through buildings and if the velocity is high there is a higher likelihood that the robotic floor-cleaning device is on specific roads. FIG. 41 illustrates a road map used by the processor in this example, wherein white areas 4100 indicate roads and gray areas 4101 indicate no roads and the maximum off road speed is ±5 m/s. Position 4102 is the current probability density collapsed to the $q_1$, $q_2$ space. In combining the road map information with the velocity observations, the processor determines that is highly unlikely that with an odometry measurement of |p|=10 that the robotic floor-cleaning device is in a position off the road. In some embodiments, other types of information may be used to improve accuracy of localization. For example, a road map to correlate position and velocity, distance to and probability density of other robotic floor-cleaning devices using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D \nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x,t) with velocity v, diffusion coefficient a, $$\frac{\partial u}{\partial t} = a \frac{\partial^2 u}{\partial x^2} - v \frac{\partial u}{\partial x}$$

on a mesh $x_0, \ldots, x_J$, and times $t_0, \ldots, t_N$ may be approximated by a recurrence equation of the form $$\frac{u_j^{n+1} - u_j^n}{k} = a \frac{u_{j+1}^n - 2u_j^n + u_{j-1}^n}{h^2} - v \frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2}, \text{ and}$$

$$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $t_{n+½}$, the recurrence equation is $$\frac{u_j^{n+1} - u_j^n}{k} = \frac{1}{2}\left(a \frac{u_{j+1}^{n+1} - 2u_j^{n+1} + u_{j-1}^{n+1}}{h^2} - v \frac{u_{j+1}^{n+1} - u_{j-1}^{n+1}}{2h} + a \frac{u_{j+1}^n - 2u_j^n + u_{j-1}^n}{h^2} - v \frac{u_{j+1}^n - u_{j-1}^n}{2h}\right),$$

known as the Crank-Nicolson method. The processor obtains the new approximation $u_j^{n+1}$ by solving a system of linear equations, thus, the $t^2$ method is implicit and is numerically stable if k<$h^2$/a. In a similar manner, the processor may use a backward difference in time, obtaining a different implicit method $$\frac{u_j^{n+1} - u_j^n}{k} = a \frac{u_{j+1}^{n+1} - 2u_j^{n+1} + u_{j-1}^{n+1}}{h^2} - v \frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $L=-\{\bullet,H\}+\nabla_p \cdot (D\nabla_p)$. The processor discretizes the abstract equation in space (e.g., by FEM or FDM)

$$\frac{\partial \overline{\rho}}{\partial t} = \overline{L}\overline{\rho},$$

wherein $\overline{\rho}$, $\overline{L}$ are the projections of $\rho$, $L$ on the discretized space. The processor discretizes the equation in time using a numerical time integrator (e.g., Crank-Nicolson)

$$\frac{\overline{\rho}^{n+1} - \overline{\rho}^n}{h} = \frac{1}{2}(\overline{L}\overline{\rho}^{n+1} + \overline{L}\overline{\rho}^n),$$

leading to the equation $$\left(I - \frac{h}{2}\overline{L}\right)\overline{\rho}^{n+1} = \left(I + \frac{h}{2}\overline{L}\right)\overline{\rho}^n,$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Boundary conditions are essential in solving the partial differential equations. Boundary conditions are a set of constraints that determine what happens at the boundary of the domain while the partial differential equation describe the behaviour within the domain. In some embodiments, the processor uses one or more the following boundary conditions: reflecting, zero-flux (i.e., homogenous Neumann boundary conditions)

$$\frac{\partial \rho}{\partial \vec{n}} = 0$$

for p, q $\in \partial D$, $\vec{n}$ unit normal vector on boundary; absorbing boundary conditions (i.e., homogenous Dirichlet boundary conditions) $\rho=0$ for p, q $\in \partial D$; and constant concentration boundary conditions (i.e., Dirichlet) $\rho=\rho_0$ for p, q $\in \partial D$. To integrate the boundary conditions into FDM, the processor modifies the difference equations on the boundary, and when using FEM, they become part of the weak form (i.e., integration by parts) or are integrated in the solution space. In some embodiments, the processor uses Fenics for an efficient solution to partial differential equations.

In some embodiments, the processor uses quantum SLAM. In some embodiments, the processor may determine a probability density over all possible states of the robotic floor-cleaning device using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\Psi(\vec{r}, t)|^2$. In some embodiments, the processor normalizes the wave function which is equal to the total probability of finding the particle, or in this case the robotic floor-cleaning device, somewhere. The total probability of finding the robotic floor-cleaning device somewhere adds up to unity $\int |\Psi(\vec{r}, t)|^2 \, dr = 1$. In some embodiments, the processor may apply Fourier transform to the wave function $\Psi(\vec{r}, t)$ to yield the wave function $\Phi(\vec{p}, t)$ in the momentum space, with associated momentum probability distribution $\sigma(\vec{p}, t)=|\Phi(\vec{p}, t)|^2$. In some embodiments, the processor may evolve the wave function $\Psi(\vec{r}, t)$ using Schrödinger equation $$i\hbar \frac{\partial}{\partial t} \Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

is the imaginary unit, h is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$ and that is why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function (e.g., $$\Psi(\vec{r},t) = \Phi(\vec{r})e^{-\frac{iEt}{\hbar}},$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r},t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $$\varphi_k, |c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\Psi(\vec{r},t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle|$ (i.e., bra). The integral over the product of two functions is analogous to an inner product of abstract vectors, $\int\phi^*\psi d\tau=\langle\phi|\cdot|\psi\rangle\equiv\langle\phi|\psi\rangle$. In some embodiments, $\langle\phi|$ and $|\psi\rangle$ are state vectors of a system and the processor determines the probability of finding $\langle|$ in state $|\psi\rangle$ using $p(\langle\phi|,|\psi\rangle)=|\langle\phi|\psi\rangle|^2$. For a Hermitian operator $\hat{A}$ eigenkets and eigenvalues are denoted $A|n\rangle=a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A=\langle n|a_n$. For every physical property (energy, position, momentum, angular momentum, etc.) there exists an associated linear, Hermitian operator $\hat{A}$ (called am observable) which acts on the Hilbert space H. Given A has eigenvalues an and eigenvectors $|n\rangle$, and a system in state $|\phi\rangle$, the processor determines the probability of obtaining $a_n$ as an outcome of a measurement of A using $p(a_n)=|\langle n|\phi\rangle|^2$. In some embodiments, the processor evolves the time-dependent Schrodinger equation using $$i\hbar\frac{\partial|\psi\rangle}{\partial t} = \hat{H}|\psi\rangle.$$

Given a state $|\phi\rangle$ and a measurement of the observable A, the processor determines the expectation value of A using $\langle A\rangle=\langle\phi|A|\phi\rangle$, corresponding to $$\langle A\rangle = \frac{\int\phi^*\hat{A}\phi d\tau}{\int\phi^*\phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robotic floor-cleaning device, the processor evolves the wave function $\Psi(\vec{r},t)$ using the Schrödinger equation $$i\hbar\frac{\partial}{\partial t}\Psi(\vec{r},t) = \left[-\frac{\hbar^2}{2m}\nabla^2 + V(\vec{r})\right]\Psi(\vec{r},t).$$

In some embodiments, a solution is written in terms of eigenfunctions $\psi_n$ with eigenvalues $E_n$ of the time-independent Schrodinger equation $H\psi_n=E_n\psi_n$, wherein $\Psi(\vec{r},t)=\Sigma_{c_n}c_n e^{-iE_n t/\hbar}\psi_n$ and $c_n\int\Psi(\vec{r},0)\psi_n^* dr$. In some embodiments, the time evolution is expressed as a time evolution via a unitary operator $U(t)$, $\Psi(\vec{r},t)=U(t)\Psi(\vec{r},0)$ wherein $U(t)=e^{-iHt/\hbar}$. In some embodiments, the probability density of the Hilbert space may be updated by the processor each time an observation or measurement is received by the processor. For each observation with observation operator A the processor may perform an eigen-decomposition $A\omega_n=a_n\omega_n$, wherein the eigenvalue corresponds to the observed quantity. In some embodiments, the processor observes a value a with probability $0\leq p\leq 1$. In some embodiments, wherein the operator has a finite spectrum or a single eigenvalue is observed, the processor may collapse to the eigenfunction(s) with corresponding probability $$\Psi(\vec{r}, t) \to \gamma \sum_{n=1}^{N} p(a_n) d_n \omega_n,$$

wherein $d_n = \int \omega_n \Psi dr$, $p(a)$ is the probability of observing value a, and $\gamma$ is a normalization constant. In some embodiments, wherein the operator has continuous spectrum, the summation may be replaced by an integration $\Psi(\vec{r}, t) \to \gamma \int p(a) d_n \omega_n da$, wherein $d_n = \int \omega_n^* \Psi dr$.

For example, consider a robotic floor-cleaning device confined to move within an interval $$\left[-\frac{1}{2}, \frac{1}{2}\right].$$

For simplicity, the processor sets h=m=1, and an infinite well potential and the regular kinetic energy term are assumed. The processor solves the time-independent Schrodinger equations, resulting in wave functions $$\psi_n = \begin{cases} \sqrt{2} \sin\left(k_n\left(x - \frac{1}{2}\right)\right) e^{-i\omega_n t}, & -\frac{1}{2} < x < \frac{1}{2}, \\ 0, & \text{otherwise} \end{cases}$$

wherein $k_n = n\pi$ and $E_n = \omega_n = n^2 \pi^2$. In the momentum space this corresponds to the wave functions $$\phi_n(p, t) = \frac{1}{\sqrt{2\pi}} \int_{-\infty}^{\infty} \psi_n(x, t) e^{-ipx} dx = \frac{1}{\sqrt{\pi}} \frac{n\pi}{n\pi + p} \text{sinc}\left(\frac{1}{2}(n\pi - p)\right).$$

The processor takes suitable functions and computes an expansion in eigenfunctions. Given a vector of coefficients, the processor computes the time evolution of that wave function in eigenbasis. In another example, consider a robotic floor-cleaning device free to move on an x-axis. For simplicity, the processor sets h=m=1. The processor solves the time-independent Schrodinger equations, resulting in wave functions $$\psi_E(x, t) = A e^{\frac{i(px - Et)}{\hbar}},$$

wherein energy $$E = \frac{\hbar^2 k^2}{2m}$$

and momentum p=hk. For energy E there are two independent, valid functions with ±p. Given the wave function in the position space, in the momentum space, the corresponding wave functions are $$\phi_E(p, t) = e^{\frac{i(px - Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}} \int \psi(x, 0) e^{-\frac{ipx}{\hbar}} dx,$$

then the processor gets time dependence by taking the inverse Fourier resulting in $$\psi(x, t) = \frac{1}{\sqrt{2\pi\hbar}} \int \phi(p) e^{\frac{ipx}{\hbar}} e^{-\frac{iEt}{\hbar}} dp.$$

An example of a common type of initial wave function is a Gaussian wave packet, consisting of a momentum eigenfunctions multiplied by a Gaussian in position space $$\psi(x) = A e^{-\left(\frac{x}{a}\right)^2} e^{\frac{ip_0 x}{\hbar}},$$

wherein $p_0$ is the wave function's average momentum value and a is a rough measure of the width of the packet. In the momentum space, this wave function has the form $$\phi(p) = B e^{-\left(\frac{a(p - p_0)}{2\hbar}\right)^2},$$

which is a Gaussian function of momentum, centered on $p_0$ with approximate width $$\frac{2\hbar}{a}.$$

Figure 42A:
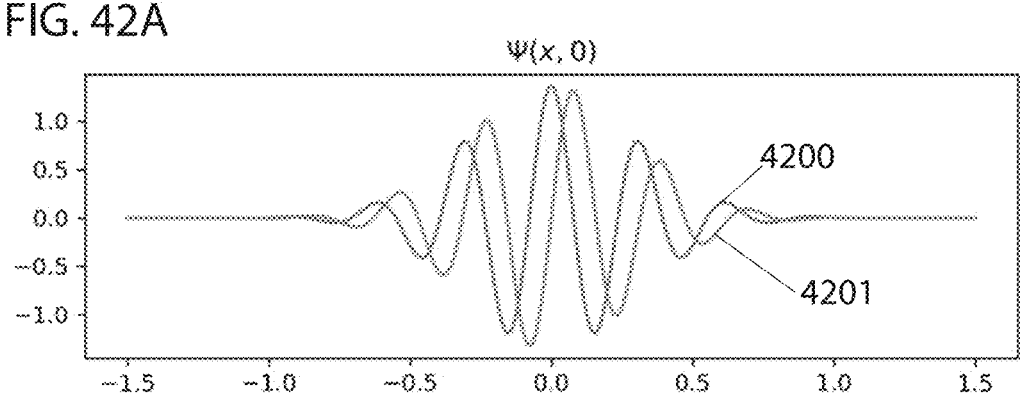
FIGS. 42A-42D illustrate an example of a wave packet, according to some embodiments.
Figure 42B:
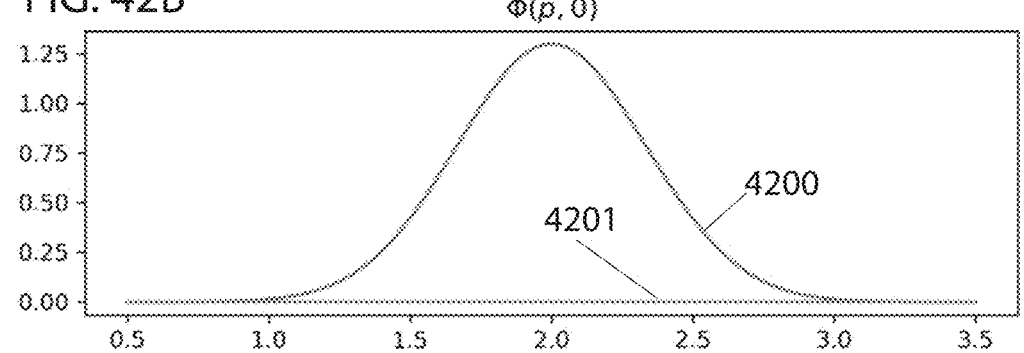
Figure 42C:
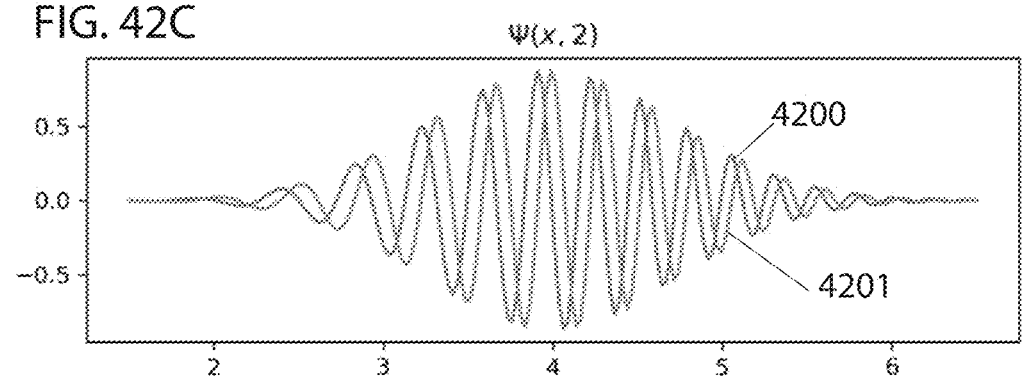
Figure 42D:
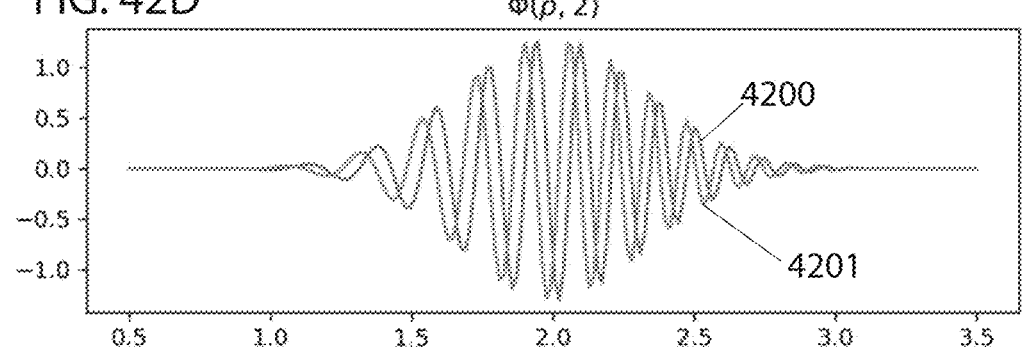

Note Heisenberg's uncertainty principle wherein in the position space width is ~a, and in the momentum space is ~1/a. FIGS. 42A and 42B illustrate an example of a wave packet at a first time point for $\psi(x)$ and $\phi(p)$, respectively, with $x_0$, $p_0$=0, 2, h=0.1, m=1, and a=3. 4200 are real parts and 4201 are imaginary parts. As time passes, the peak moves with constant velocity $$\frac{p_0}{m}$$

and the width of the wave packet in the position space increases. This happens because the different momentum components of the packet move with different velocities. In the momentum space, the probability density $|\phi(p,t)|^2$ stays constant over time. See FIGS. 42C and 42D for the same wave packet at time t=2.

Figure 43A:
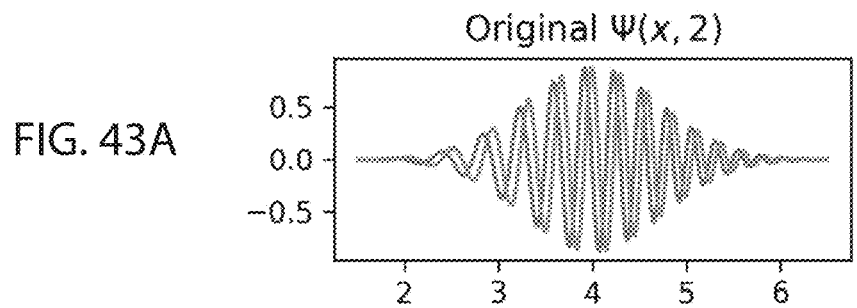
FIGS. 43A-43E illustrate an example of evolution of a wave function in a position and momentum space with observed momentum, according to some embodiments.
Figure 43B:
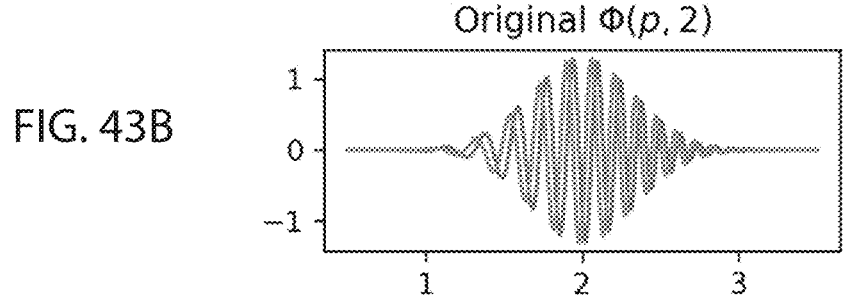
Figure 43C:
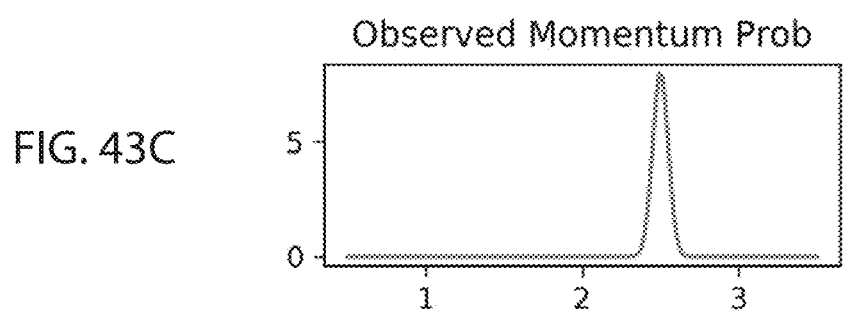
Figure 43D:
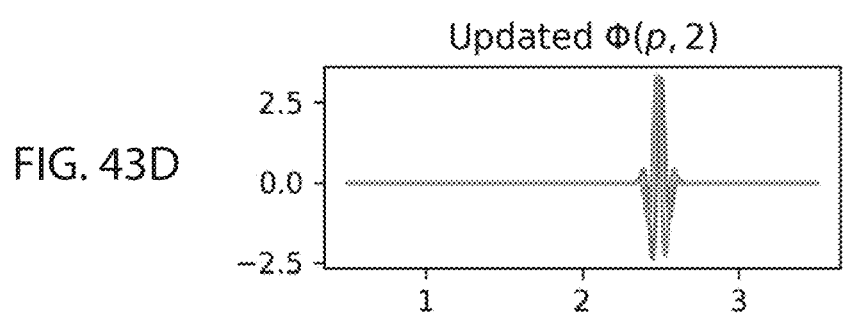
Figure 43E:
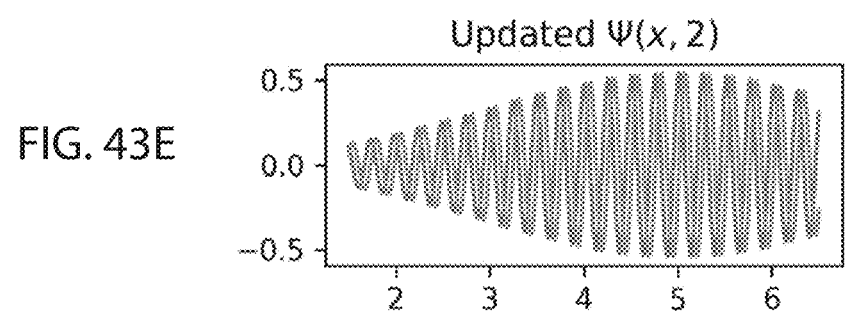
Figures 44A, 44B, 44C, 44D, 44E:
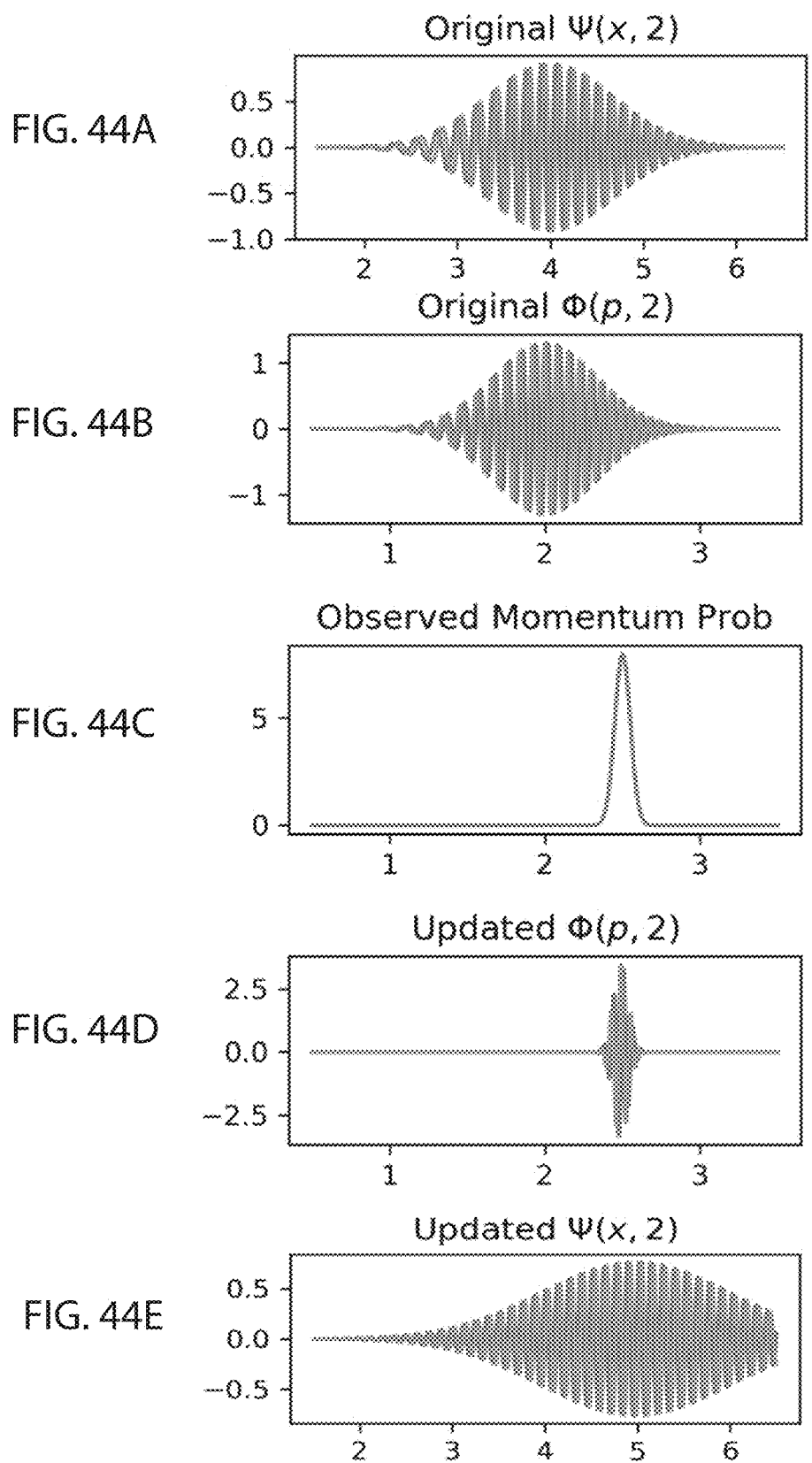
FIGS. 44A-44E illustrate an example of evolution of a wave function in a position and momentum space with observed momentum, according to some embodiments.
Figure 45A:
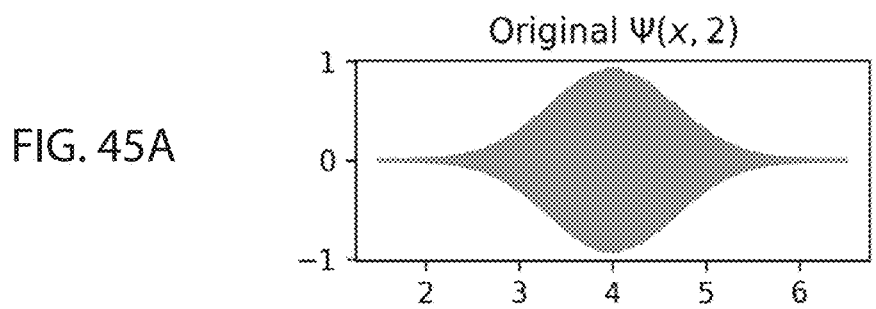
FIGS. 45A-45E illustrate an example of evolution of a wave function in a position and momentum space with observed momentum, according to some embodiments.
Figure 45B:
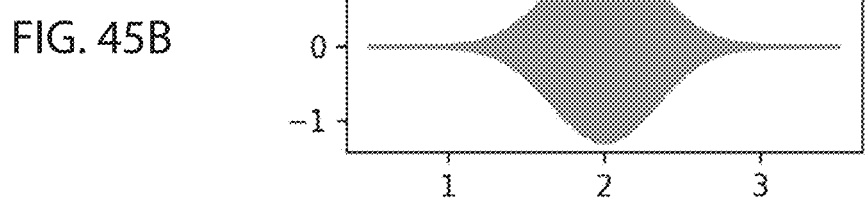
Figure 45C:
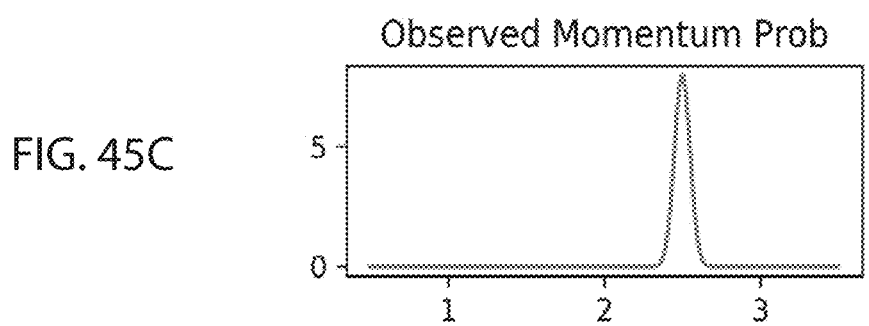
Figure 45D:
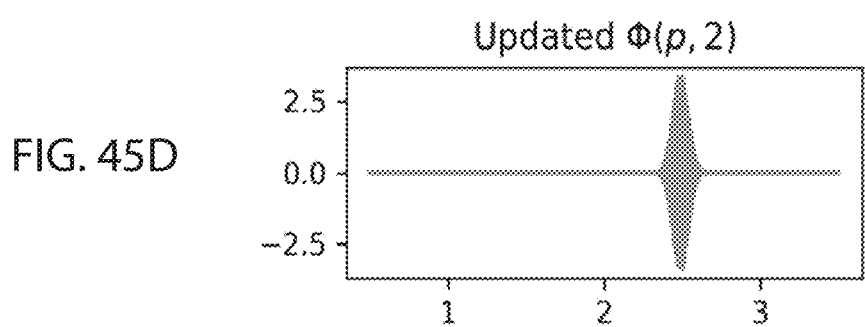
Figure 45E:
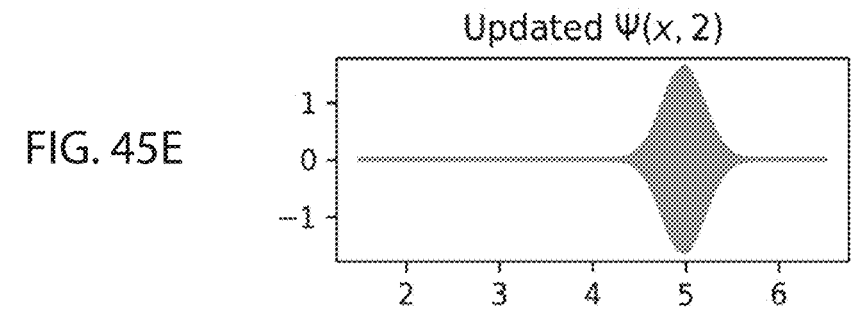
Figure 46A:
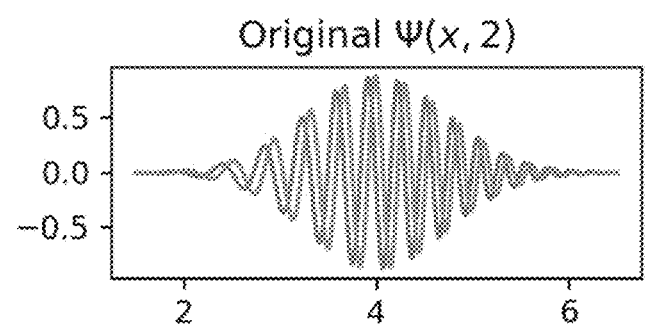
FIGS. 46A-46E illustrate an example of evolution of a wave function in a position and momentum space with observed momentum, according to some embodiments.
Figure 46B:
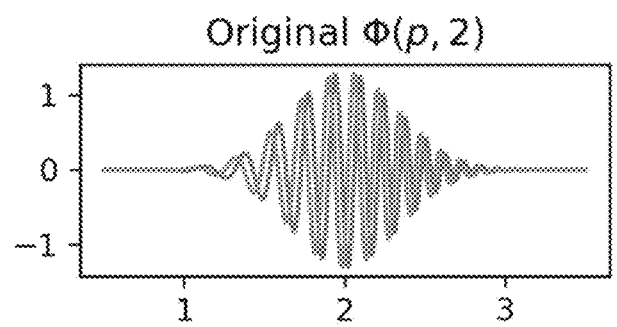
Figure 46C:
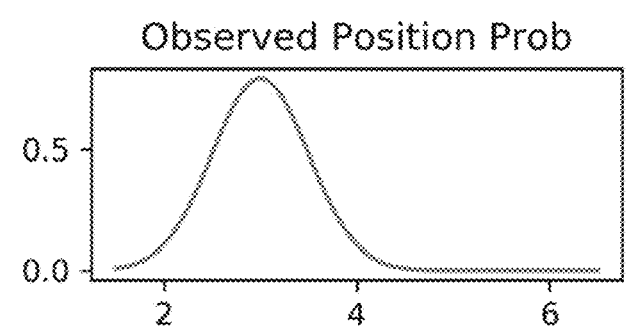
Figure 46D:
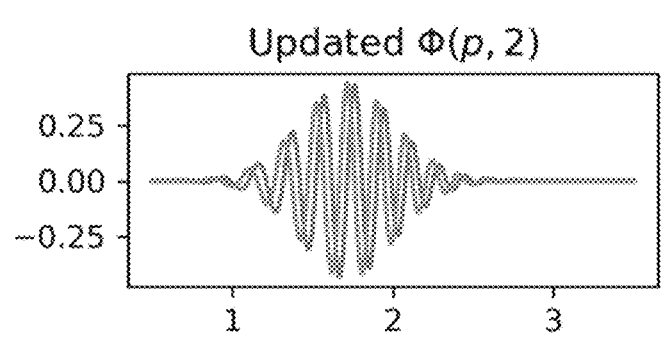
Figure 46E:
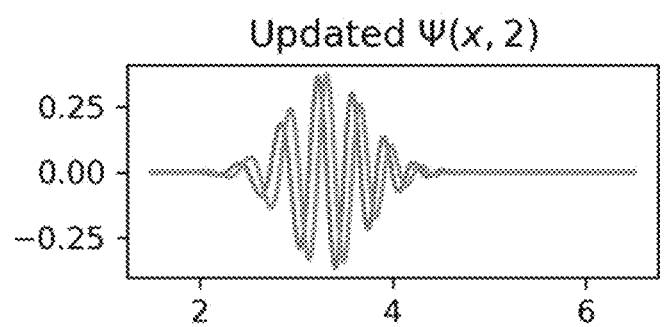

When modeling the robotic floor-cleaning device using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with σ=0.05, a strong assumption that the momentum is 2.5. Since the observation operator is the momentum operators, the wave function expressed in terms of the eigenfunctions of the observation operator is $\phi(p,t)$. The processor projects φ(p,t) into the observation space with probability $f$ by determining $\hat{\phi}(p,t)=f(p)\phi(p,t)$. The processor normalizes the updated $\hat{\phi}$ and takes the inverse Fourier transform to obtain the wave function in the position space. FIGS. 43A, 43B, 43C, 43D, and 43E illustrate the initial wave function in the position space ψ(x), the initial wave function in the momentum space φ(p), the observation density in the momentum space, the updated wave function in the momentum space $\hat{\phi}(p,t)$ after the observation, and the wave function in the position space ψ(x) after observing the momentum, respectively, at time t=2, with $x_0$, $p_0$=0, 2, h=0.1, m=1, and a=3. Note that in each figure the darker plots are the real parts while the lighter plots are the imaginary parts. The resulting wave function in the position space (FIG. 43D) may be unexpected after observing a very narrow momentum density (FIG. 43C) as it concludes that the position must have spread further out from the original wave function in the position space (FIG. 43A). This effect is due to Heisenberg's uncertainty principle. With decreasing h this effect diminishes, as can be seen in FIGS. 44A-44E and FIGS. 45A-45E, illustrating the same as FIGS. 43A-43E but with h=0.05 and h=0.001, respectively. Similar to observing momentum, position may also be observed and incorporated as illustrated in FIGS. 46A-46E which illustrate the initial wave function in the position space ψ(x), the initial wave function in the momentum space φ(p), the observation density in the position space, the updated wave function in the momentum space $\hat{\phi}(x,t)$ after the observation, and the wave function in the position space ψ(p) after observing the position, respectively, at time t=2, with $x_0$, $p_0$=0, 2, h=0.1, m=1, and a=3.

Figure 47A:
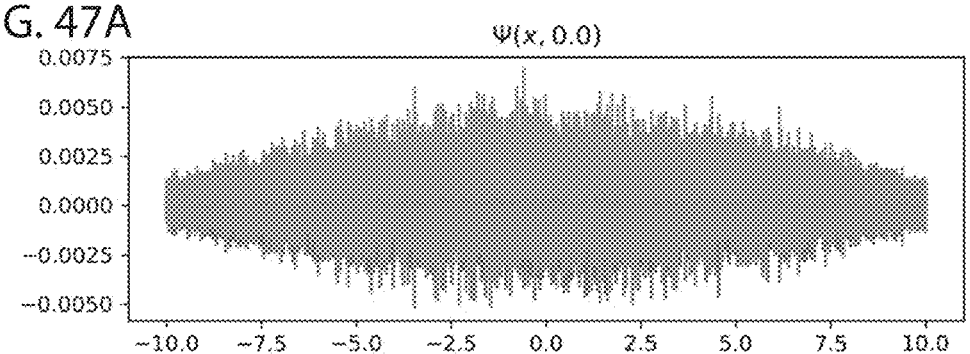
FIGS. 47A and 47B illustrate an example of an initial wave function of a state of a robotic device, according to some embodiments.
Figure 47B:
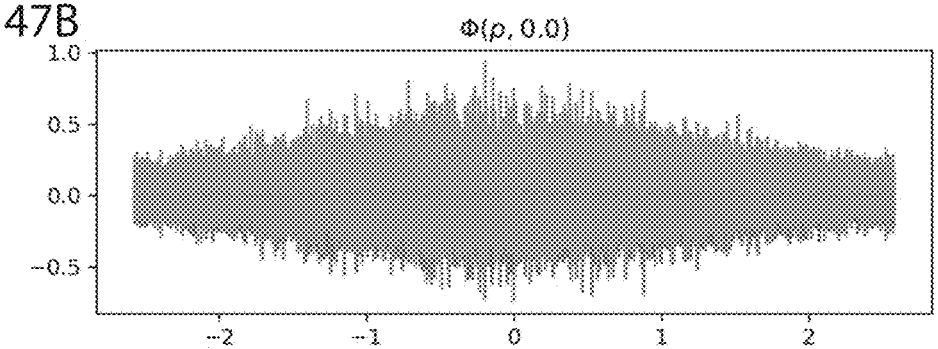
Figure 48A:
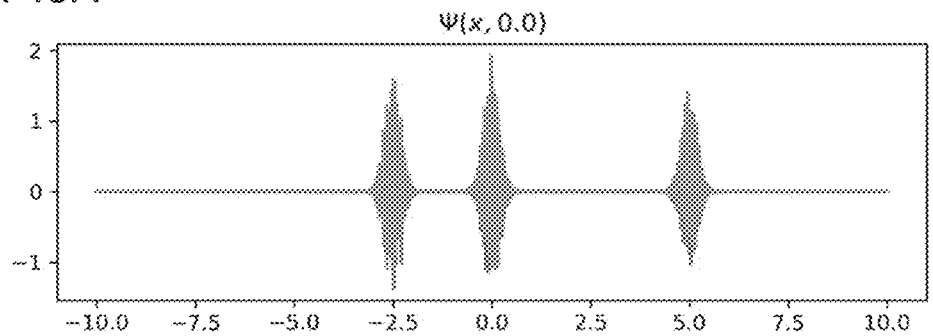
FIGS. 48A and 48B illustrate an example of a wave function of a state of a robotic device after observations, according to some embodiments.
Figure 48B:
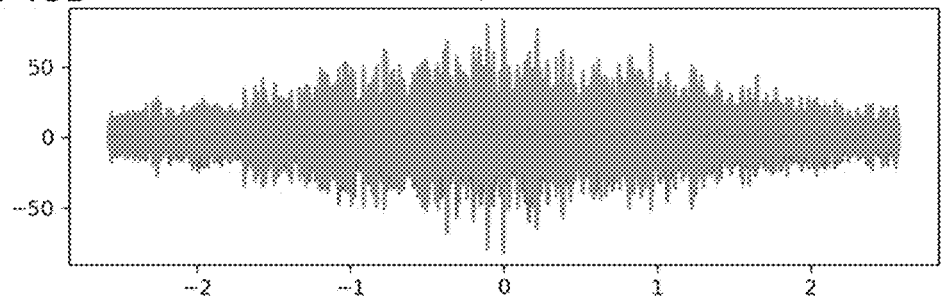
Figure 49A:
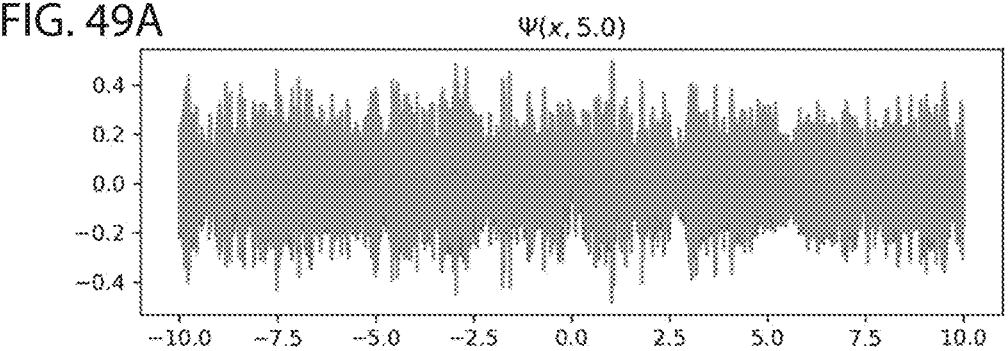
FIGS. 49A and 49B illustrate an example of an evolved wave function of a state of a robotic device, according to some embodiments.
Figure 49B:
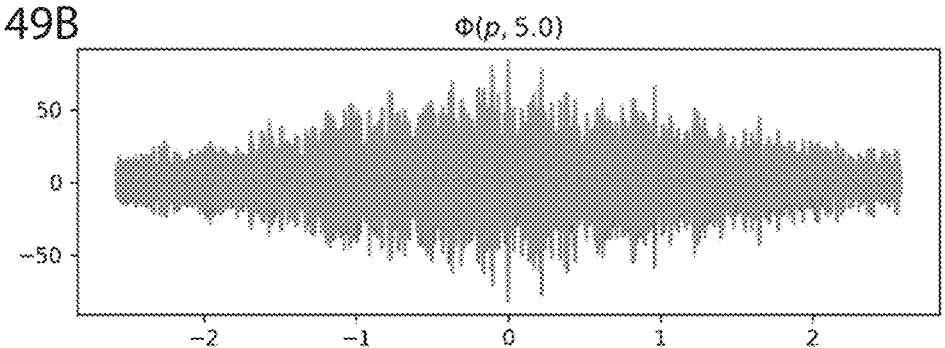
Figure 50A:
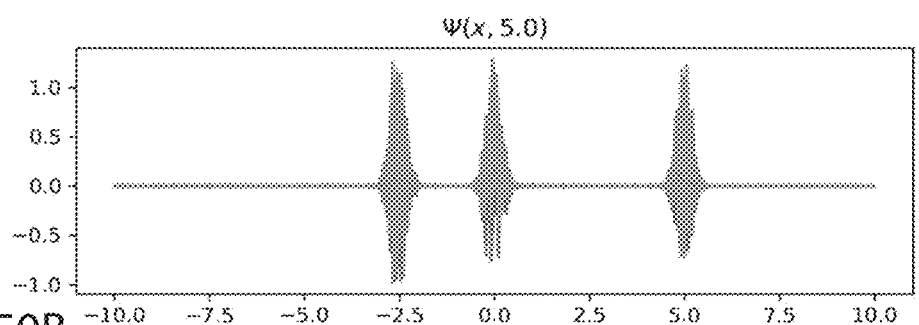
FIGS. 50A, 50B, 51A-51H, and 52A-52F illustrate an example of a wave function of a state of a robotic device after observations, according to some embodiments.
Figure 50B:
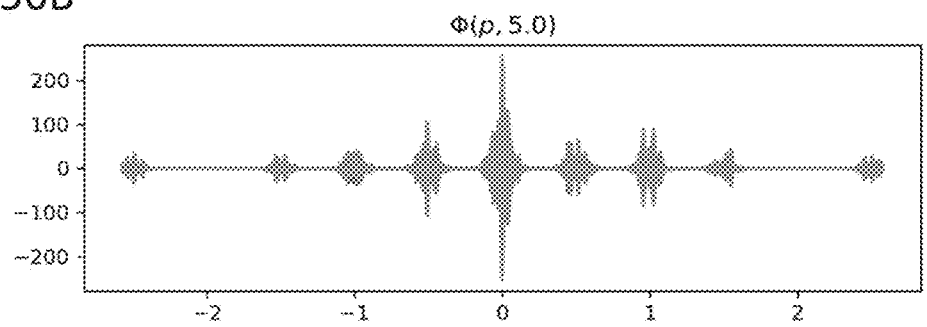
Figure 51A:
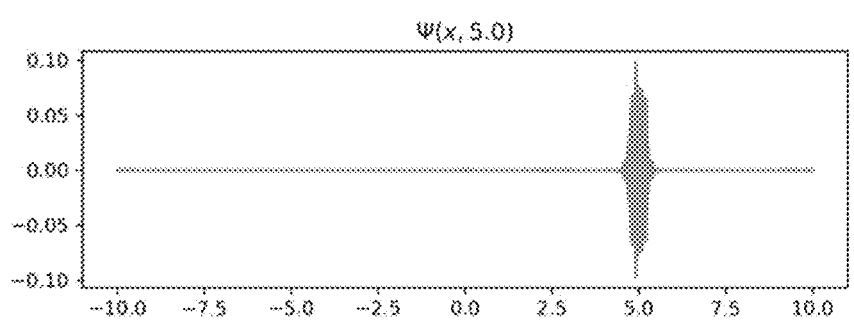
Figure 51B:
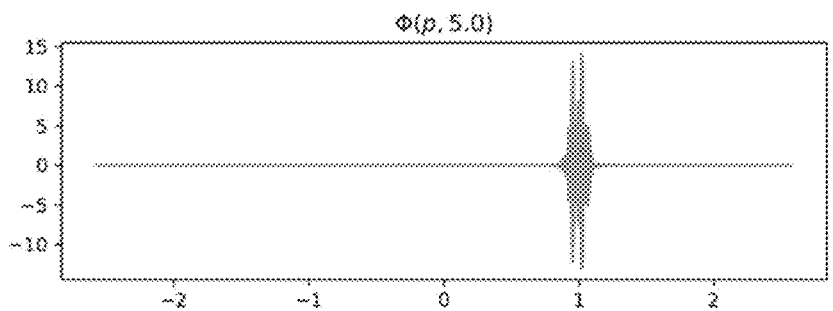
Figure 51C:
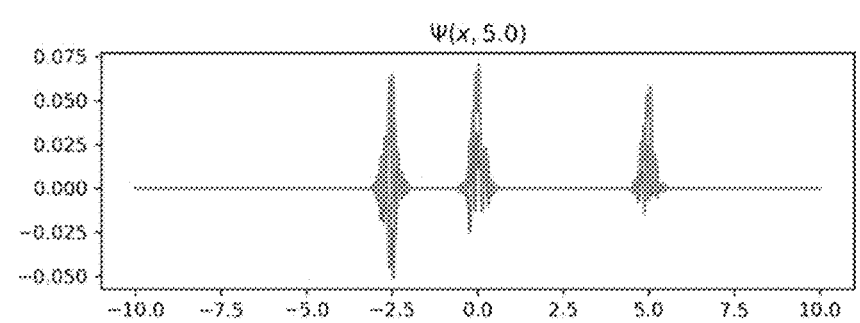
Figure 51D:
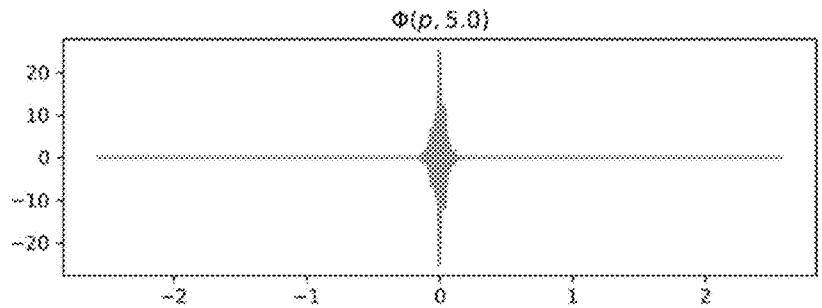
Figure 51E:
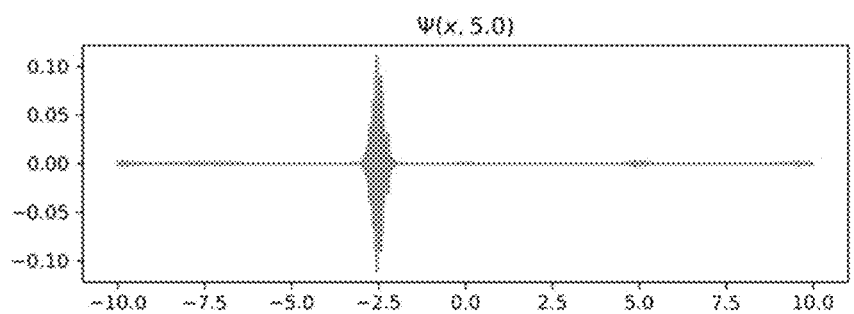
Figure 51F:
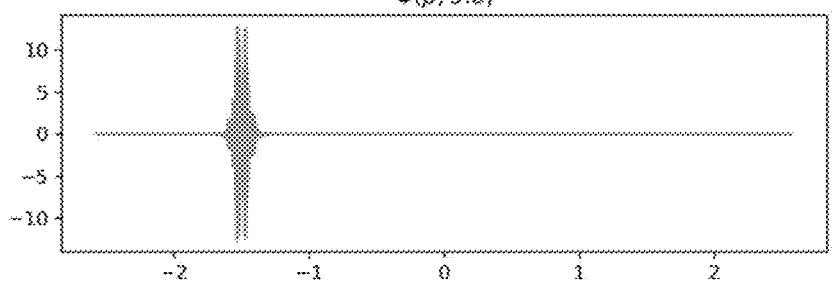
Figure 51G:
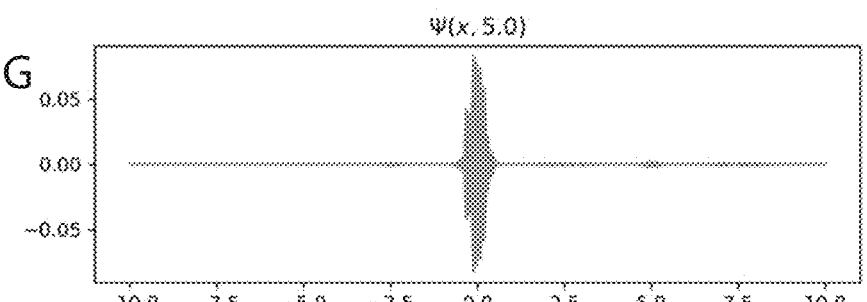
Figure 51H:
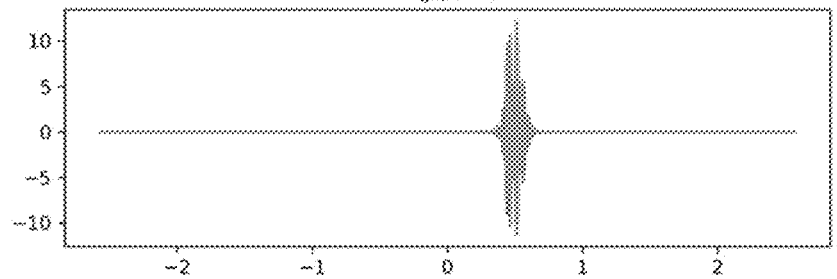
Figure 52A:
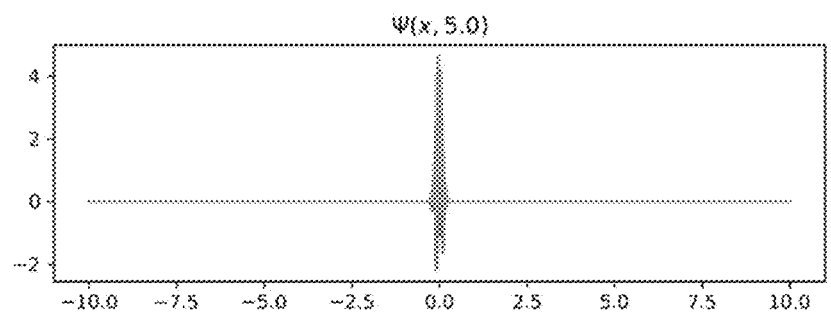
Figure 52B:
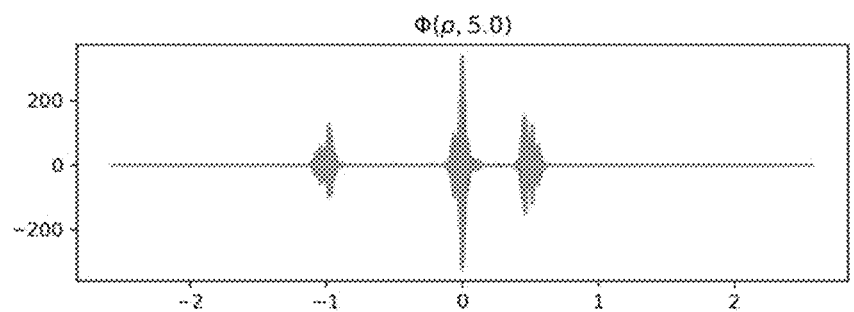
Figure 52C:
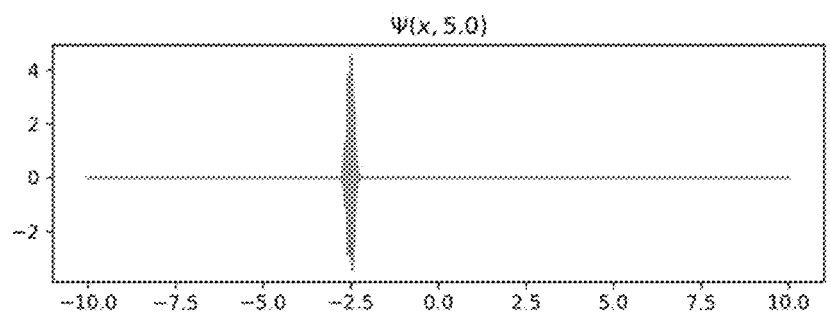
Figure 52D:
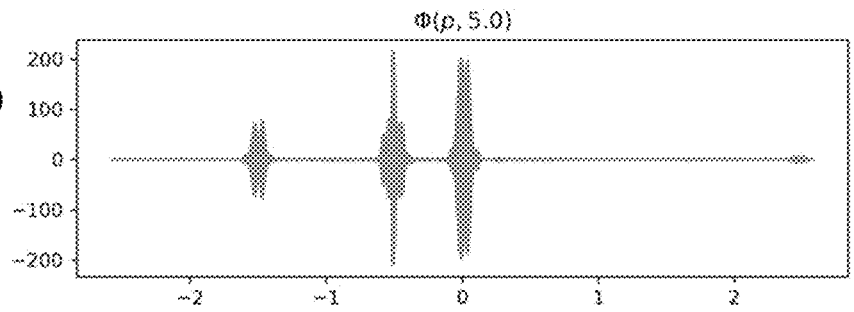
Figure 52E:
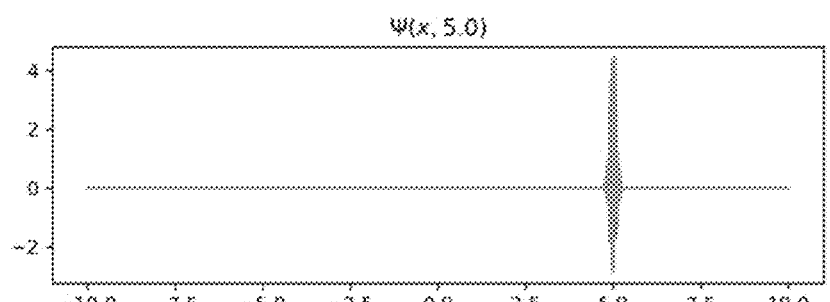
Figure 52F:
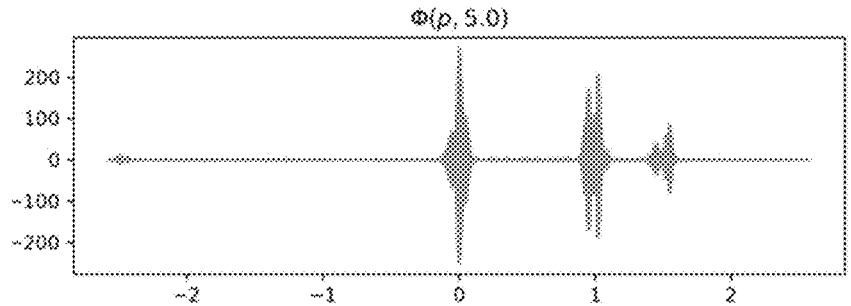

In quantum SLAM, wave functions represent probability amplitude of finding the system in some state. Physical pure states in quantum SLAM are represented as unit-norm vectors in a special complex Hilbert space and time evolution in this vector space is given by application of the evolution operator. Further, in quantum SLAM, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robotic floor-cleaning device navigates along a one-dimensional floor that includes three doors at doors at $x_0$=-2.5, $x_1$=0, and $x_2$=5.0 and the processor is capable of determining when it is located at a door based on sensor data observed and the momentum of the robotic floor-cleaning device is constant, but unknown. Initially the location of the robotic floor-cleaning device is unknown, therefore the processor generates initial wave functions of the state shown in FIGS. 47A and 47B. When the processor determines the robotic floor-cleaning device is in front of a door, the possible position of the robotic floor-cleaning device is narrowed down to three possible positions, but not the momentum, resulting in wave functions shown in FIGS. 48A and 48B. The processor evolves the wave functions with a Hamiltonian operator, and after five seconds the wave functions are as shown in FIGS. 49A and 49B, wherein the position space has spread out again given that the momentum is unknown. However, the evolved probability density keeps track of the correlation between position and momentum. When the processor determines the robotic floor-cleaning device is in front of a door again, the wave functions are updated to FIGS. 50A and 50B, wherein the wave functions have significantly narrowed down, indicating a number of peaks representing possible position and momentum combinations of the robotic floor-cleaning device. And in fact, if the processor observes another observation, such as momentum p=1.0 at t=5.0, the wave function in the position space also collapses to the only remaining possible combination, the location near x=5.0, as shown in FIGS. 51A and 51B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 51C and 51D illustrate the resulting wave function for a momentum observation of p=0.0 at t=5.0 instead. FIGS. 51E and 51F illustrate the resulting wave function for a momentum observation of p=-1.5 at t=5.0 instead. FIGS. 51G and 51H illustrate the resulting wave function for a momentum observation of p=0.5 at t=5.0 instead. Similarly, the processor collapses the momentum wave function when position is observed instead of momentum. FIGS. 52A and 52B illustrate the resulting wave function for a position observation of x=0.0 at t=5.0 instead. FIGS. 52C and 52D illustrate the resulting wave function for a position observation of x=-2.5 at t=5.0 instead. FIGS. 52E and 52F illustrate the resulting wave function for a position observation of x=5.0 at t=5.0 instead.

In some embodiments, wherein the state of the robotic floor-cleaning device within the space is initially unknown, the processor may generate a uniform probability distribution over the space. In other instances, any other probability distribution may be generated depending on the information known about the state of the robotic floor-cleaning device and the certainty of the information. Over time and as more measurements and observations are received by the processor, the probability distribution over all possible states of the robotic floor-cleaning device in the space evolves.

In some embodiments, the processor initially assumes the robotic floor-cleaning device is located somewhere within an area greater than the size of the robot, the location being the seed location of the robotic floor-cleaning device. This is due to initial uncertainty in the position and heading of the robotic floor-cleaning device and the surroundings. As more data is collected and the processor is more certain of the position of the robotic floor-cleaning device relative to its surroundings, the processor reduces the size of area within which the robotic floor-cleaning device is assumed to be located. On the other hand, as the robotic floor-cleaning device moves and noise, such as movement noise, is introduced, the processor increases the area within which the robotic floor-cleaning device is assumed to be located as uncertainty in the position of the robot increases. In some embodiments, the processor adjusts the shape of the area within which the robotic floor-cleaning device is assumed to be located within based on deviation between the measured and true heading and translation of the robotic floor-cleaning device as it moves. In some embodiments, the processor uses information on linear and angular undershoot and overshoot to help determine the shape of the area within which the robotic floor-cleaning device is assumed to be located within. Force is needed to cause linear and angular acceleration and a given amount of force can either be spent on linear overshooting or angular overshooting. If the robotic floor-cleaning device overshoots linearly it undershoots angularly and vice versa.

Figure 53A:
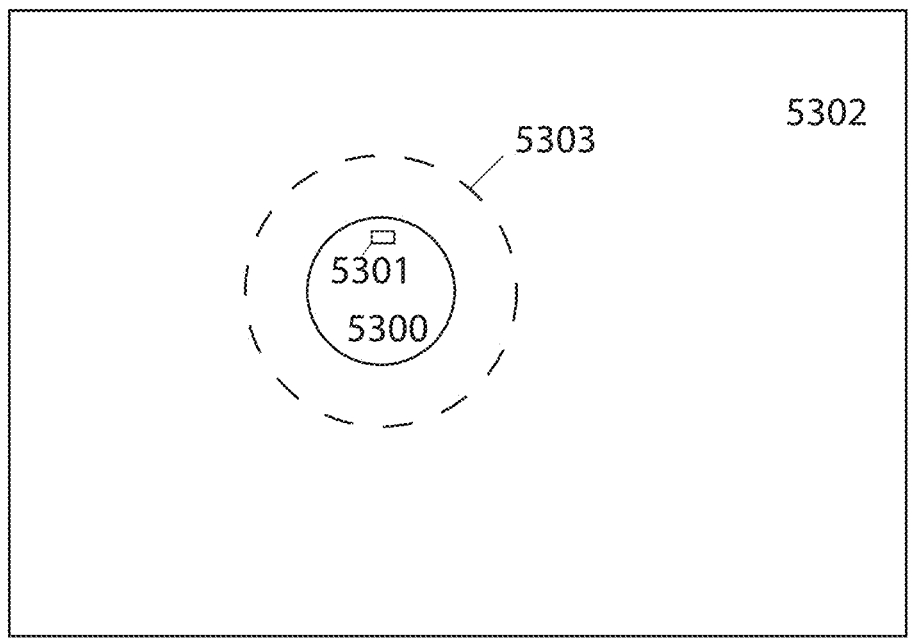
FIGS. 53A-53C illustrate an example of seed localization, according to some embodiments.
Figure 53B:
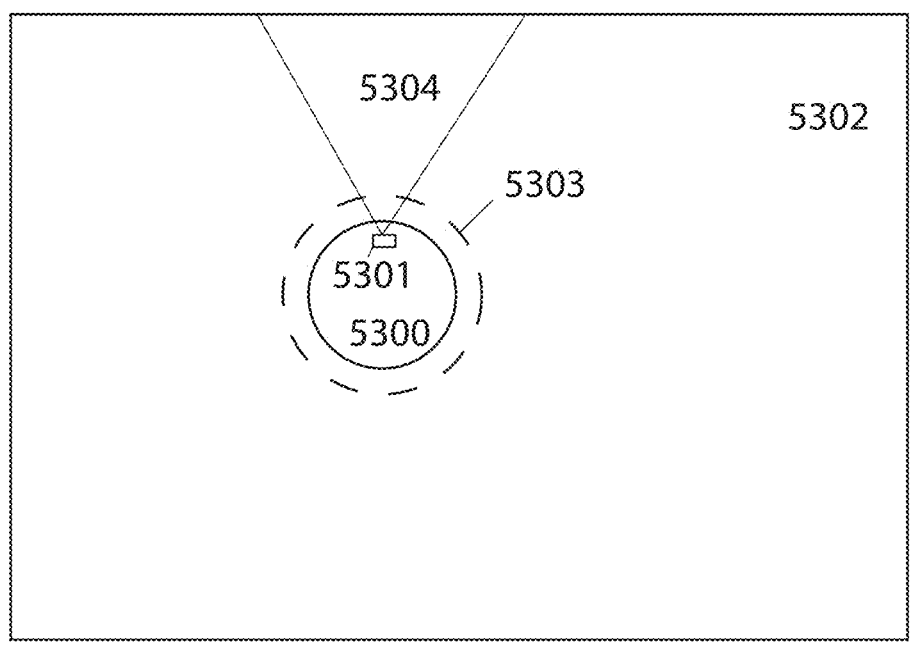
Figure 53C:
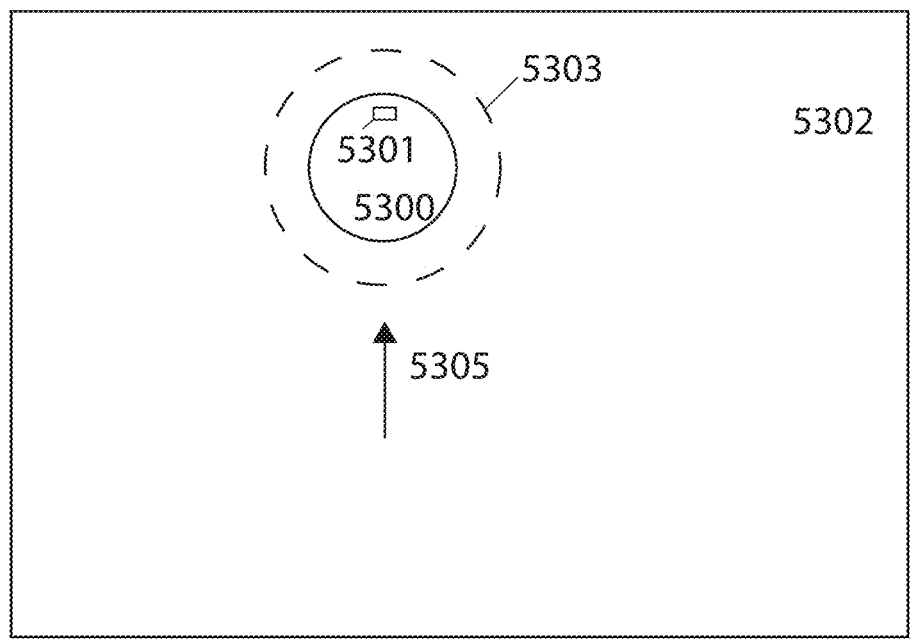
Figure 54:
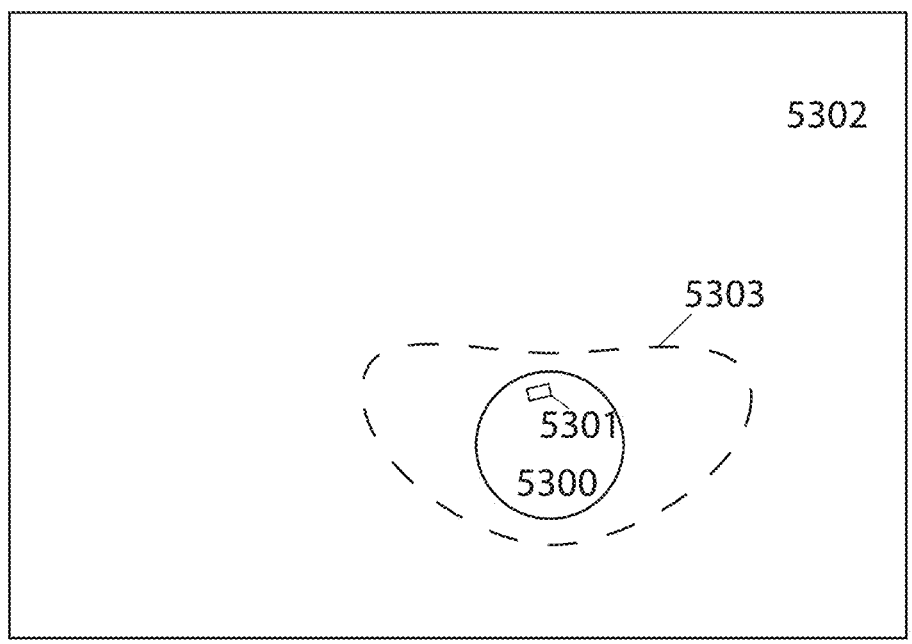
FIG. 54 illustrates an example of a shape of a region with which a robot is located, according to some embodiments.

FIGS. 53A-53C illustrate an example of how the area within which the robotic floor-cleaning device is assumed to be located changes in size with the collection of data and movement of the robotic floor-cleaning device. FIG. 53A illustrates robotic floor-cleaning device 5300 with sensor 5301 within environment 5302. Robotic floor-cleaning device 5300 rotates 360 degrees while sensor 5301 captures data of the environment. The processor of robotic floor-cleaning device 5300 uses a subset of the data to create a low-resolution map of the environment. Initially, the processor of robotic floor-cleaning device 5300 assumes robotic floor-cleaning device 5300 is located somewhere within area 5303, greater in size than robotic floor-cleaning device 5300 as there is uncertainty in the location of robotic floor-cleaning device 5300. For example, the true rotation of the robotic floor-cleaning device may not actually be exactly 360 degrees or the robotic floor-cleaning device may not actually rotate exactly in place resulting in uncertainties in position and heading of the robotic floor-cleaning device relative to the surrounding environment. FIG. 53B illustrates sensor 5301 capturing data of the environment within field of view 5304. As more data is captured and processed, the processor becomes more certain of the predicted location of robotic floor-cleaning device 5300 and hence reduces the size of area 5303 within which the robotic floor-cleaning device is assumed to be located. FIG. 53C illustrates robotic floor-cleaning device 5300 moving within environment 5302 in direction 5305. As robotic floor-cleaning device 5300 moves, noise, such as movement noise, is introduced and the processor increases area 5303 within which the robotic floor-cleaning device is assumed to be located as uncertainty in the location of the robotic floor-cleaning device 5300 increases. FIG. 54 illustrates an example of a shape of area 5303 within which robotic floor-cleaning device 5300 with sensor 5301 is assumed to be located. As robotic floor-cleaning device 5300 moves within environment 5302, the processor of robotic floor-cleaning device 5300 adjusts the shape of area 5303 based on deviation between the measured and true heading and translation of robotic floor-cleaning device 5300 as it moves. In some embodiments, the processor uses information on linear and angular undershoot and overshoot to help determine the shape of area 5303.

The multi-dimensionality in quantum localization described above provides robustness that may be useful in various applications. In some embodiments, the processor uses localization for controlling the operation, settings, and functionality of the robotic floor-cleaning device. For example, the processor uses localization to control the behavior of the robotic floor-cleaning device in different areas, where for instance, certain cleaning functions or settings are desired for different environments. These functions or settings may be triggered once the processor has localized the robotic floor-cleaning device against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic floor-cleaning device. If the processor localizes the robotic floor-cleaning device against a boundary, for example, it may choose to select a path along the boundary or it may trigger a polymorphic or other type of path planning algorithm. Or, localizing the robotic floor-cleaning device against a boundary may trigger a path planning algorithm for cleaning central areas of the environment and, once completed, a wall follow algorithm for cleaning along the boundaries of the environment.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used.

In embodiments, other methods of localization may be used independently or in combination. Examples of localization methods are described in U.S. Patent Application Nos. 62/746,688, 62/688,497 16/297,508, 62/740,573, 62/740,580, 15/955,480, 15/425,130, and 15/955,344 the entire contents of which are hereby incorporated by reference.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, the localization techniques described herein may be implemented on a localization chip or a processing chip with localization processing unit.

In some embodiments, the processor determines the settings of the robotic cleaner (e.g., which cleaning tools to use or speed of a main brush or impeller) based on characteristics of the environment using methods similar to those described in U.S. Patent Application No. 62/735,137, Ser. Nos. 16/239,410 and 16/163,530, the entire contents of which are hereby incorporated by reference. For example, in some embodiments, the processor of the robotic floor-cleaning device uses the data from one or more environmental sensors (e.g., sensors that sense attributes or can observe or provide data from which inferences can be made about characteristics of an environment, such as those of a driving surface, the weather, obstacles, etc.) to determine actions in real-time. Examples of sensors include, but are not limited to, floor sensors, debris sensors, obstacle sensors, cliff sensors, acoustic sensors, cameras, optical sensors, distance sensors, motion sensors, tactile sensors, electrical current sensors, gyroscopes, odometers, optical encoders, IR sensors, and the like. Sensors may sense various attributes of one or more features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robot indicating the location of the robot at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, motor, etc.) based on the environmental characteristics inferred. In some embodiments, the processor activates or deactivates (or modulates intensity of) functions (e.g., vacuuming, mopping, UV, mowing, plowing, mining, etc.) based on the environmental characteristics inferred. In other instances, the processor adjusts a movement path, operational schedule (e.g., time when various designated areas are worked upon, such as when cleaned), and the like based on sensory data. Examples of environmental characteristics include floor type, obstacle density, activity level, room or area type, level of debris accumulation, level of user activity, time of user activity, weather conditions, road conditions, accident frequency, etc.

In some embodiments, the processor of the robotic floor-cleaning device determines a movement path of the robot based on the map of the environment. For example, in some embodiments, the robotic floor-cleaning device is configured to implement a path planning method that is responsive to stimulus from an observed environment using the processor of the robot. Some embodiments segment a working environment into regions and then dynamically adjust a coverage pattern within each of those regions based on sensed attributes of the environment. In some embodiments, a topological graph represents the route plan of the robot and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robot as it follows along edges linked at vertices. While executing the movement path, in some embodiments, rewards may be assigned as the robot takes actions to transition between states and the net cumulative reward may be used to evaluate a particular movement path comprised of actions and states. The processor may iteratively calculate a state-action value function during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment.

In some embodiments, the processor of the robotic floor-cleaning device may employ topological geometry to spatially relate objects. In some embodiments, the processor of the robotic floor-cleaning device may use topological geometry to perform transformation of objections, such as, translation, rotation, reflection, stretching, bending and twisting, but neighborhoods, i.e. spatial relations, may remain preserved. For example, a circular curve centered within a larger circular curve contains a point P between the two circular curves and a point Q within the smaller circular curve. After transformation, the smaller circular curve has been stretched and bent to become a rectangular slit but remains within the larger circular curve. To preserve neighborhoods, the point P must remain between the two curves while the point Q must remain within the inner curve. In some embodiments, the topological graph is similar to a Euclidean graph, such that the movement path described by the graph consists of a set of vertices and edges. However, in a Euclidean graph the edges are limited to being lines and the lines connecting vertices are equal to the Euclidean distance. This means the path between two vertices is always equal to the shortest path between them. In topological geometry, the edge may be a line, arc, or curve, hence the path between two vertices may not necessarily be the shortest path as in Euclidean geometry. Further, with topological graph, the elements of the graph, namely vertices and edges, may be deformed by means of variation in assigned properties. With topological geometry, any movement path may be devised with path elements, such as vertices, edges, and their associated properties. For example, a boustrophedon movement path, characterized by back and forth movement, may be considered equivalent to a set of vertices linked by edges, the vertices having properties defining position and angular orientation of linked vertices and the edges having properties defining edge type, such as a line, with given length, angular orientation and connecting vertices. As a further example, a spiraling movement path may be defined by a set of vertices linked by edges having edge type property of an arc, the radius of the arc increasing linearly at each step to achieve the spiraling movement.

In some embodiments, the processor implements the movement path within a taxicab coordinate system thereby reducing the dimensionality of the topological graph. In taxicab geometry, all paths follow along gridlines of the coordinate system, thereby limiting edge type to a line. Further, the distance metric between vertices is the rectilinear distance or L1 norm $$d(p, q) = |p - q| = \sum_{i=1}^{n} |p_i - q_i|,$$

wherein (p,q) are vectors $p=(p_1, p_2, \ldots, p_n)$ and $q=(q_1, q_2, \ldots, q_n)$. With taxicab geometry, the rectilinear distance between the two points is independent of the structure of the path following along the gridlines of the taxicab coordinate system.

In some embodiments, sensory data is assumed to be independent and identically distributed (IID), where each observation has the same probability distribution as all other observations and all observations are mutually independent. If observations are defined to assume values in $\mathbb{I} \subseteq \mathbb{R}$, then two random variables X and Y are identically distributed if and only if $P[x \geq X] = P[x \geq Y]$, $\forall x \in \mathbb{I}$ and are independent if and only if $P[y \geq Y] = P[y \geq Y | x \geq X] \wedge P[x \geq X] = P[x \geq X | y \geq Y]$, $\forall x, y \in \mathbb{I}$. In some embodiments, the sensory input may go through various layers of mathematical processing, such as feature scaling, Bayesian probabilistic methods, and the like. Sensory input may include distance measurements or other measurements from which distance of objects may be inferred, such as time-of-flight or pixmap. As the robotic floor-cleaning device moves along the devised topological path, the processor of the robotic floor-cleaning device continues to receive sensory data. The sensory data is used to revise and expand the map as well as revise the properties of vertices and edges defining the topological path. As more sensor data is collected a better perception of the environment is revealed and the map becomes more accurate and inclusive of the area. The topological path may consist of any number of vertices and edges, depending on the shape, size, etc., of the area discovered, and may be arranged in any number of ways. Because of the stochastic nature of the work place and partial observability, despite the efforts of processor to propose an optimal path, there may exist better paths which were not obvious to the processor at the time of decision making. However, over time the topological path is optimized by, for example, combining vertices by passing or eliminating an edge, removing or adding vertices, and/or edges and changing the direction or position of vertices and/or edges. In embodiments, the robotic floor-cleaning device may begin to start performing work before exploration of the entire area is complete. In such cases, the processor is likely to choose movements that are locally optimal but not globally optimal.

In some embodiments, the processor of the robotic floor-cleaning device evaluates different movement paths while offline (e.g., between work sessions) using sensory input of the working environment previously collected and stored in memory of, or otherwise accessible to, the robotic floor-cleaning device. Or in some cases, such processing may be offloaded to a remote application, e.g., a processor in a charging state or cloud-based infrastructure. In some embodiments, the processor of robotic floor-cleaning device experiments with (e.g., simulates and determines outcomes from) previously executed and new movement paths. Properties of vertices and edges are inferred from previously collected sensory input. In some embodiments, the processor of the robotic floor-cleaning device is able to enhance and fine-tune movement paths while offline (or some embodiments may perform these actions online). The estimated time required to complete a task (e.g., cleaning a room with greater than threshold area coverage) is used to calculate a theoretical net reward value. The movement path with the greatest theoretical net reward value may be executed at the next cleaning cycle and based on measured performance (e.g., time to clean) the true net reward value may be determined. Some embodiments may determine a difference between estimated and measured performance and adjust model parameters to reduce the difference.

In some embodiments, the processor instructs the robotic floor-cleaning device to avoid entering and working in areas with high density of obstacles until finishing work in other areas such that the robotic floor-cleaning device can finish majority of the work before potentially becoming stuck. In some embodiments, the processor recognizes an area being covered as an enclosed room and completes coverage within the enclosed room before covering another area.

In some embodiments, the next action or movement of the robot along a path defined by properties of vertices and edges chosen based on real-time sensory input is determined using a Markov Decision Process (MDP). As the robotic floor-cleaning device executes an action, it transitions from a current state to a new state and movement from one state to the next is defined by a discrete time slot. This may be represented by a Markov Chain comprised of a sequence of random variables $s_1$, $s_2$, $s_3$, . . . . The random variables are states the robotic floor-cleaning device may experience and form a set S called the state space. The topological graph defining the movement path of the robotic floor-cleaning device may therefore be thought of as a sequence of states $s \in S$, where states are connected by paths and are each defined with a discrete time stamp $t \in T$. For the robotic floor-cleaning device to transition from a current state s to next state s', the robotic floor-cleaning device performs an action a $\in$ A over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state is dependent only on the present state. This is mathematically represented by P(s'|s). A Markov chain may, therefore, be represented by a topological graph, where the edges of graph t are labelled by the probabilities of transitioning from one state at time t to another at time t'. A Markov chain may be further extended to a MDP through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor $\gamma$, representing the difference in importance between future and present rewards. The goal of MDP is to find an optimal policy function $\pi$ that specifies the highest rewarded action a to take for each state s. For a MDP, after completing each action and transitioning to a new state, a reward is assigned and a state-action value function is iteratively calculated as the expected value of the current reward plus the discounted maximum future reward at the next state. The state-action value function provides the value of a state. The processor of the robot does not require any visualization in choosing the next action of the robot, it only involves, in some embodiments, optimization of the state-action value function. In optimizing the state-action value function, the highest rewarded actions from each state are concurrently (e.g., simultaneously) identified and used in deriving the optimal policy. In embodiments, where the time is not considered discrete, the value of the reward may be dependent on sequential time required to complete the action and transition to a new state, where a greater negative reward is assigned for longer times. In such a case, the robot is always incurring negative reward and actions having smaller negative reward are considered superior. (Of course, the selection of sign is arbitrary, and embodiments may also implement the reverse arrangement, which is not to suggest that any other description is limiting.) Events that increase the time required to complete an action and transition to the next state may therefore indirectly increase the amount of negative reward incurred. Other optimization factors may also assign negative reward, including but not limited to, collisions with obstacles, number of U-turns, repeat coverage, transitions between different types of flooring or switching rooms. Once the robot completes its task, and hence the movement path required to complete the task, a predetermined positive reward value is assigned. A net reward value for the executed movement path, consisting of a sequence of states and actions, is then calculated as the sum of the cumulative negative reward from the multiple actions taken while transitioning from one state to another and the positive reward upon completion of the task.

Over time, the goal is to find optimal state-action value function and optimal policy from which actions from different states are selected. For a single state, there may be several actions that can be executed. The sequence of states and actions that result in the maximum net reward provide the optimal state-action value function for a given state. The action for a given state that results in maximum reward provides the optimal policy for the given state. An optimal policy for a state space may then contain the highest valued action corresponding to multiple states. As different movement paths are executed over time, the number of states experienced, actions taken from each state, and transitions increase. The path devised by the processor of the robot may iteratively evolve to become more efficient by choosing transitions that result in most favorable outcomes and by avoiding situations which previously resulted in low net reward. After convergence, assuming the system did not fall into a local minimum or is able to get out of a local minimum, the evolved movement path is trusted to be more efficient than alternate paths which may be devised using real-time sensory input of the working environment. In order to get out of local maximin, stochastic optimization is employed. This provides a reliable and efficient method for a robotic floor-cleaning device to devise path plans as their movements are evaluated and optimized in real-time such that the most efficient movements are eventually executed and factors reducing efficiency, including but not limited to, repeat coverage, collisions with obstacles, transitions between different types of flooring, and U-turns, are reduced with the fine-tuning of properties over time.

Figure 55:
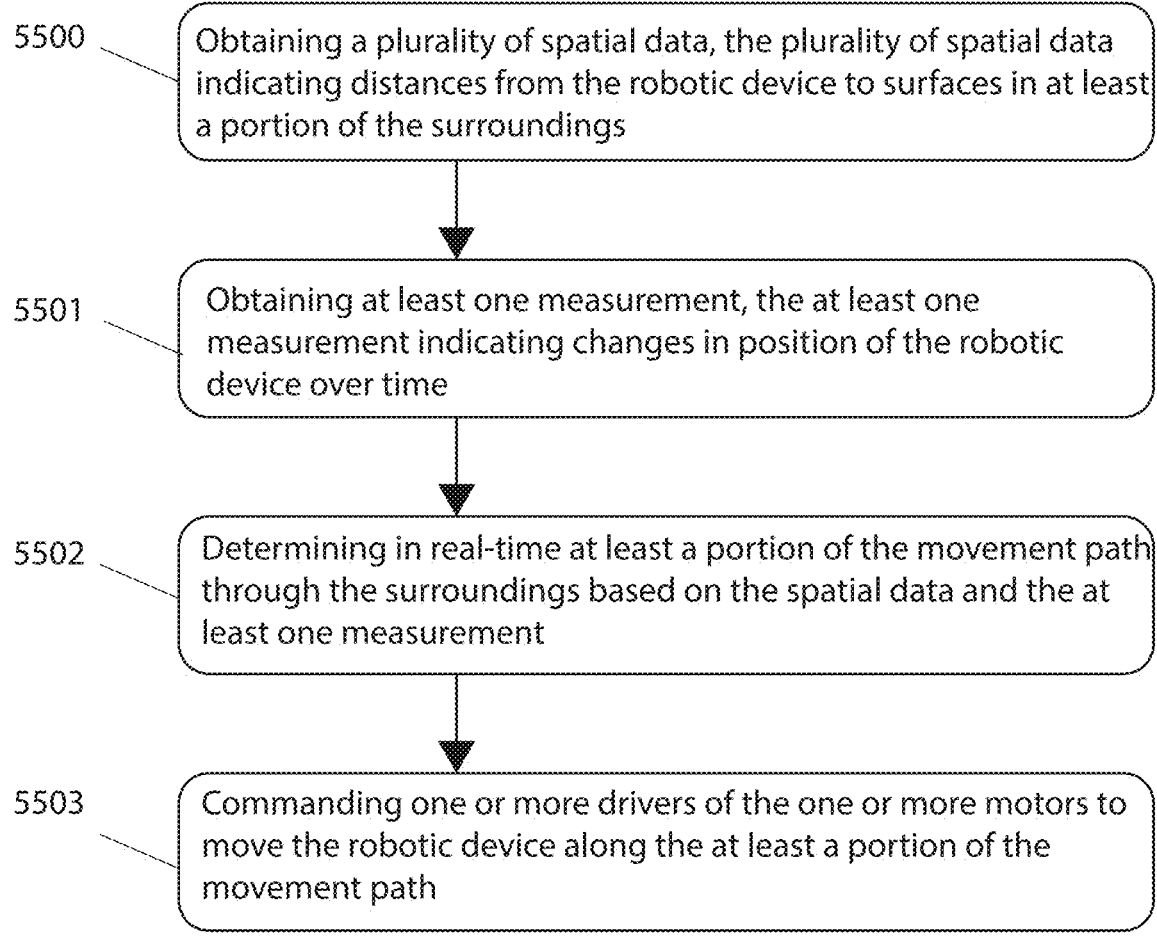
FIG. 55 illustrates a flowchart describing an example of a path planning method, according to some embodiments.

The MDP consisting of a sequence of states and actions followed by rewards is mathematically notated below. Actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t, a_t, r_{t+1}, s_{t+1}, a_{t+1}, r_{t+2}, s_{t+2}, a_{t+2}, r_{t+3}, \ldots a_T, r_T, s_T$. In some embodiments, the processor determines the net return $R_T = r_{t+1} + \gamma^1 r_{t+2} + \ldots + \gamma^{T-t-1} r_T$ to be expected in the future as the sum of the rewards received for the sequence of states and actions beginning from state $s_t$ and ending with terminal state $s_T$, wherein $0 \leq \gamma < 1$ is a discount factor applied as distant rewards are less important. In some embodiments, the processor determines the value of a state-action pair using $Q(s,a) = E[R_T | s_t = s, a_t = a]$ which is equivalent to the expected return $R_T$ for the sequence of states and actions beginning with state $s_t$ and action $a_t$ and ending with terminal state $s_T$. By finding the sequence of states and actions which maximize the state-action value function $Q^*(s,a)$, the processor determines the optimal value function $Q^*(s,a) = \max E[R_T | s_t = s, a_t = a]$. And the optimal policy $\pi^*(s) = \text{argmax } Q^*(s,a)$ for each state can be derived by the processor by identifying the highest valued action which can be taken from each state. To iteratively calculate the state-action value function for a given state s and action a, the processor may apply the Bellman Optimality equation. In some embodiments, the processor uses the optimal value function $Q^*(s,a) = E[r + \gamma \max Q^*(s', a')]$, obeying the Bellman Optimality equation. The equation expresses that the value for a given state s and action a should represent the current reward r observed at state s plus the maximum discounted $\gamma$ future reward for the next state s' the robot would end up in. In some embodiments, the processor uses the optimal value function to iteratively calculate the state-action value for a given state s and action a as the sequence of states and action are executed using $Q_{i+1}(s,a) = E[r + \gamma \max Q_i(s', a')]$. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s,a) = \Sigma P(s'|s)[r + \gamma \max Q_i(s', a')]$, wherein $P(s'|s)$ is the probability that action a will lead to state s', as previously described above. In some embodiments, the sequence of states and actions corresponds to the states visited and actions taken while executing the movement path from start to finish, where actions are defined by the properties of vertices and edges chosen based on sensory input of the robot. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions. Detailed examples of path planning methods are described in U.S. patent application Ser. Nos. 16/041,286, 15/406,890, 14/673,633, 14/817,952, and 16/198,393, the entire contents of which are hereby incorporated by reference. FIG. 55 illustrates a flowchart describing an example of a method for generating a movement path of a robotic floor-cleaning device, the method including steps 5500, 5501, 5502, and 5503.

In some embodiments, the processor of the robotic floor-cleaning device may learn a path, such as a path between a first location and a second location, in a variety of ways. In some embodiments, the processor of the robotic floor-cleaning device may be taught a path by directing the robotic floor-cleaning device along the desired path by physically moving the robotic floor-cleaning device or by using a remote control or an application of a communication device paired with the processor of the robotic floor-cleaning device. Other methods of moving the robotic floor-cleaning device along the desired path may also be used, such as voice commands. In some embodiments, a live video feed (or real-time images) of a camera mounted on the robot is transmitted to a remote operator that controls movement of the robot using an input device (e.g., joystick, keyboard, mouse, touchscreen of communication device, etc.). In some embodiments, the processor of the robotic floor-cleaning device may be taught a path between the first location and second location by physically wheeling the robotic floor-cleaning device from the first location, through the environment, to the second location. In some embodiments, the first location is the same as the second location. In some embodiments, the path is a cleaning coverage path. In some embodiments, the processor of the robotic-floor cleaning device is taught the same path or different paths multiple times in the same area. In some embodiments, the processor of the robotic floor-cleaning device is taught one or more paths for one or more different areas (e.g., kitchen, bathroom, bedroom, etc.) and paths to navigate between one or more areas. Over time, as the processor learns more and more paths, the processor becomes more efficient at covering areas or navigating between two areas or locations. In some embodiments, the processor collects data using one or more sensors during learning one or more paths and uses data collected to learn most efficient coverage of an area or navigation between areas or locations. In some embodiments, the processor of the robotic floor-cleaning device uses similar methods and techniques as those described above for learning and converging to the most efficient movement path during manual training, wherein the robotic floor-cleaning device is controlled to move along a particular path.

In some embodiments path learning may be initiated by, for example, a user pressing a start button on the robotic floor-cleaning device or on any other device capable of communicating with the processor of the robotic floor-cleaning device, voice activation or autonomously upon startup, prior to beginning the process of teaching a path to a processor of the robotic floor-cleaning device. In some embodiments, path learning may be completed by, for example, pressing an end button on the robotic floor-cleaning device or on any other device capable of communicating with the processor of the robotic floor-cleaning device, voice activation, or autonomously upon detecting no movement of the robotic floor-cleaning device for a predetermined amount of time. Path learning may be initiated when the robotic floor-cleaning device is positioned at a first location and completed after the robotic floor-cleaning device has navigated along the desired path and returned back to the first location or any other location. In some embodiments, path learning may be initiated when the robotic floor-cleaning device is positioned at a first location and completed after the robotic floor-cleaning device has navigated along the desired path to the second location. Alternatively, in some embodiments, path learning may be initiated and completed using an application of a communication device, such as a mobile device, laptop or smart phone, capable of communicating with the robotic floor-cleaning device. In some embodiments, an application of a communication device may be used to mark a path of the robotic floor-cleaning device within a map of the working environment that may be shared with the processor of the robotic floor-cleaning device and the processor actuates the robotic floor-cleaning device to move along the path. During path learning, the processor of the robotic floor-cleaning device may determine its location within an internal map of the working environment while simultaneously mapping the environment. In some instance, the processor of the robotic floor-cleaning device may mark observed obstacles in the working environment within an internal map of the environment. In some embodiments, the robotic floor-cleaning device include extendable handle that a user may use to physically wheel the robotic floor-cleaning device along a path.

In some embodiments, the path learning methods and techniques described may be used with other types of robotic devices. For example, the path planning method may be used for a food delivery or other type of delivery robotic device. For instance, an operator may remotely guide the delivery robotic device using an input device based on a live video feed from a camera of the robot transmitted to a communication device (e.g., laptop, smartphone, tablet, etc.) of the operator. In some embodiments, the operator directs the delivery robotic device, from a first location to a second location. For example, if a customer orders a pizza to a specific location, the operator remotely navigates the robot along a path from the pizza store to the specific location. In the future, the processor of the delivery robotic device autonomously navigates to the specific location when an order for pizza is requested to the specific location. In some embodiments, the robot is manually navigated to the specific location a predetermined amount of times before it autonomously navigates to the specific location. In some embodiments, the details learned by a processor during path learning may be shared with one or more other processors of one or more robotic devices, such that details learned by a single processor may improve SLAM of other processors of other robotic devices. For example, during manual training a processor may learn to avoid a particular road due to continuous traffic and may mark it in the map. This may be shared with processors of other robots operating in the same environment. In some embodiments, a robot is manually taught a path by driving the robot. For example, the processor of an autonomous car may be taught the most efficient movement paths within an environment by manually driving the autonomous vehicle within the environment for a predetermined amount of time.

In some embodiments, the processor of the robotic floor-cleaning device may determine an optimal (e.g., locally or globally) coverage of the environment by minimizing a cost function or by maximizing a reward function. The processor of the robotic floor-cleaning device may divide an environment A into n zones $A_1, A_2, \ldots, A_n \subset A$ wherein the index indicates the order of coverage of the zones. For example, the robotic floor-cleaning device may first clean zone $A_1$, followed by zone $A_2$, and so on. In some embodiments, zones $A_1, A_2, \ldots, A_n$ may overlap. For example, there may be indices i and j, for which i≠j and $A_i \cap A_j \neq 0$. In some embodiments, zones $A_1, A_2, \ldots, A_n$ may not collectively represent the entire area of environment A, wherein the condition $U_i A_i = A$ may not be fulfilled. In some embodiments, the overall cost function C of a zone or an environment may be calculated by the processor of the robotic floor-cleaning device based on a travel and cleaning cost K and coverage L. In some embodiments, other factors may be inputs to the cost function. For example, the processor may use $C = \omega_1 K - \omega_2 L$ to determine cost, wherein weights $\omega_1, \omega_2 \geq 0$ may be used to adjust importance of travel and cleaning cost and coverage. The processor attempts to minimize the travel and cleaning cost K and maximize coverage L. In some embodiments, the processor determines the travel and cleaning cost K by computing individual cost for each zone and adding the required driving cost between zones. The driving cost between zones may depend on where the robot ended coverage in one zone, and where it begins coverage in a following zone. An operating cost function F for a zone $A_i$ may be specified, such that given zone $A_i$ and starting position $g_i$ of the robotic floor-cleaning device, the processor may compute cleaning cost $h_i$ and final position $f_i$ of the robotic floor-cleaning device using $h_i$, $f_i = F(A_i, g_i)$. The cleaning cost $h_i$ may be dependent on factors such as the movement path of the robotic floor-cleaning device, coverage time, etc. Upon completion of coverage of zone $A_i$, the processor may actuate the robotic floor-cleaning device to move towards the closest position $g_{i+1}$ within the next zone $A_{i+1}$ to be covered, $$\text{i.e., } g_{i+1} = \underset{g \in A_{i+1}}{\operatorname{argmin}} D(f_i, g).$$

The function $D(f_i, g)$ may be used by the processor to determine distance from final position $f_i$ to every possible position $g \in A_{i+1}$. In some embodiments, the processor uses a travel cost function $T(f_i, g_{i+1})$ for driving from final position $f_i$ of zone $A_i$ to starting position $g_{i+1}$ of zone $A_{i+1}$, given final position $f_i$ and starting position $g_{i+1}$, to determine travel cost $p_{i+1} = T(f_i, g_{i+1})$. Therefore, the processor determines the travel and cleaning cost $K_i$ for a zone $A_i$ using $K_i = h_i + p_i$. And, the processor determines the total travel and cleaning cost for all zones $A_1, A_2, \ldots, A_n$ of environment A using $$K = \sum_{i=1}^{n} K_i = \sum_{i=1}^{n} h_i + p_i.$$

In some embodiments, the processor determines the coverage for the environment using $L = \|U_i A_1\|$, wherein the norm may refer to the square meters of area covered by the robotic floor-cleaning device.

Figure 56A:
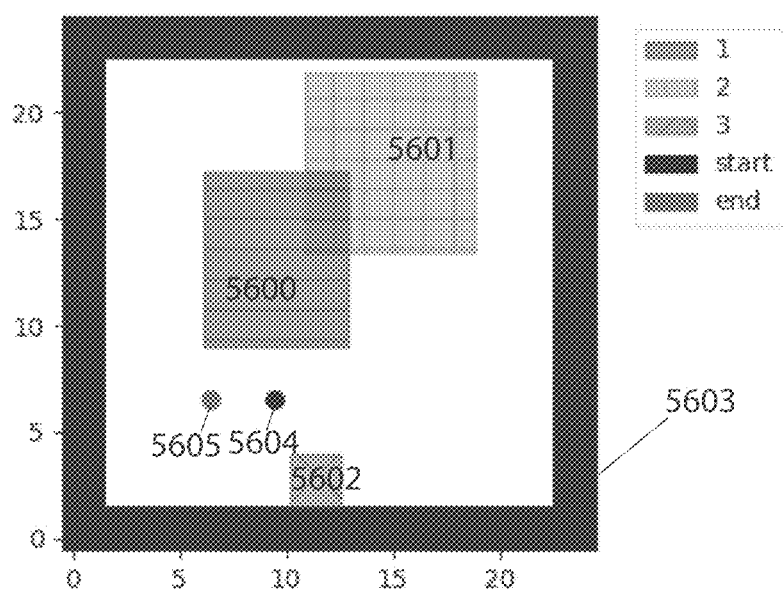
FIGS. 56A-56C illustrate embodiments of a method for optimizing surface coverage of a continuous space with rectangular zones, embodying features of the present techniques and executed by some embodiments.
Figure 56B:
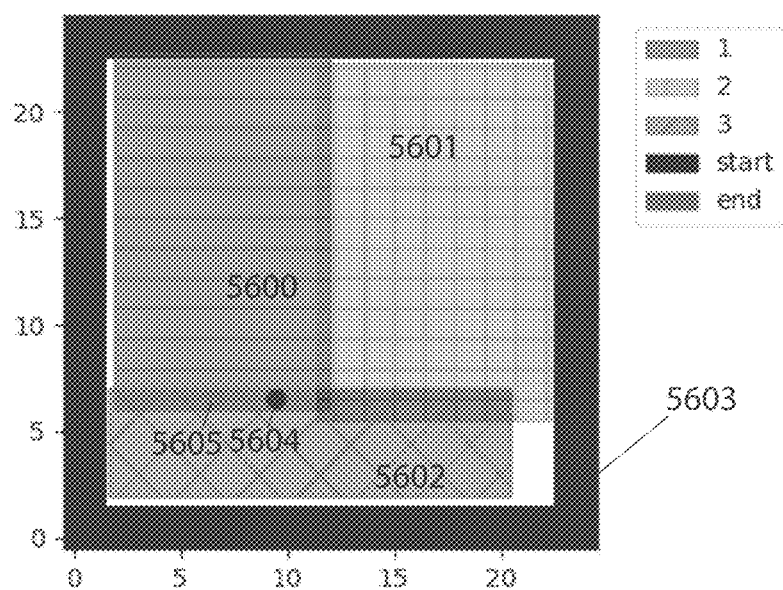
Figure 56C:
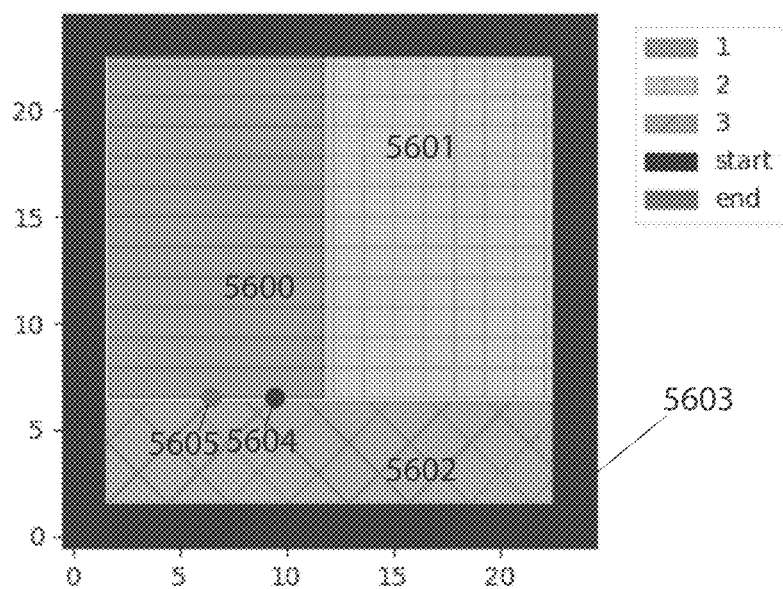

In some embodiments, the processor of the robotic floor-cleaning device minimizes the total cost function $C = \omega_1 K -$ ω₂L by modifying zones of environment A by, for example, removing, adding, shrinking, expanding, moving and switching the order of coverage of zones. For example, in some embodiments the processor may restrict zones to having rectangular shape, allow the robotic floor-cleaning device to enter or leave a zone at any surface point and permit overlap between rectangular zones to determine optimal zones of an environment. In some embodiments, the processor includes or excludes additional conditions. Since a rectangle may be defined by x,y coordinates of its center, its width and its height, the processor defines zones of an environment using an n×4 array of floating point numbers. The processor may initially create and order rectangular zones for coverage by the robotic floor-cleaning device. In some embodiments, the processor uses gradient descent to compute the division of zones (i.e. size, location) that results in minimal cost, as defined by the cost function C, by iteratively modifying division of zones based on a partial derivative of the cost function with respect to each respective parameter defining the zones. The processor determines gradient descent for a zone $A_i$ using $$A_i = A_i - h \frac{\partial C}{\partial A_i},$$

wherein h is the step size of the gradient descent. In some embodiments, the processor determines derivatives of the cost function C with respect to each of the four variables defining the rectangle by using, in some embodiments, a finite difference approximation. FIGS. 56A-56C illustrate an implementation of gradient descent. In FIG. 56A rectangular zones 5600, 5601 and 5602 of environment 5603 are shown. Units along the x- and y-axis may be feet or other unit of measurement. A robotic floor-cleaning device begins at point 5604 then sequentially covers zones 5600, 5601, and 5602 and ends at point 5605. The initial coverage is not ideal. To improve coverage, the processor applies gradient descent. Since the cost function is based on coverage, the zones may be expanded by embodiments in the direction of uncovered areas and avoid overlap. For instance, embodiments may determine partial derivative of the cost function with respect to parameters of the zones that indicate such an adjustment will tend to reduce the cost locally. To lower traveling cost, the proximity of zones with respect to other zones to be covered immediately before and after is increased (i.e. distance between sequentially ordered zones is reduced) by the processor. FIGS. 56B and 56C illustrate the steps in an iterative process of gradient descent and optimization of coverage. Some embodiments may iteratively adjust until a stopping condition is reached, e.g., until there is less than a threshold amount of change between sequential iterations in cost. FIG. 56B illustrates expansion of rectangular zones 5600, 5601, and 5602 to improve coverage while FIG. 56C illustrates further optimization of coverage and traveling cost by the processor such that there is no overlap between zones 5600, 5601, and 5602 and the border of each zone is adjacent to the border of those zones to be covered immediately before and after.

Figure 57A:
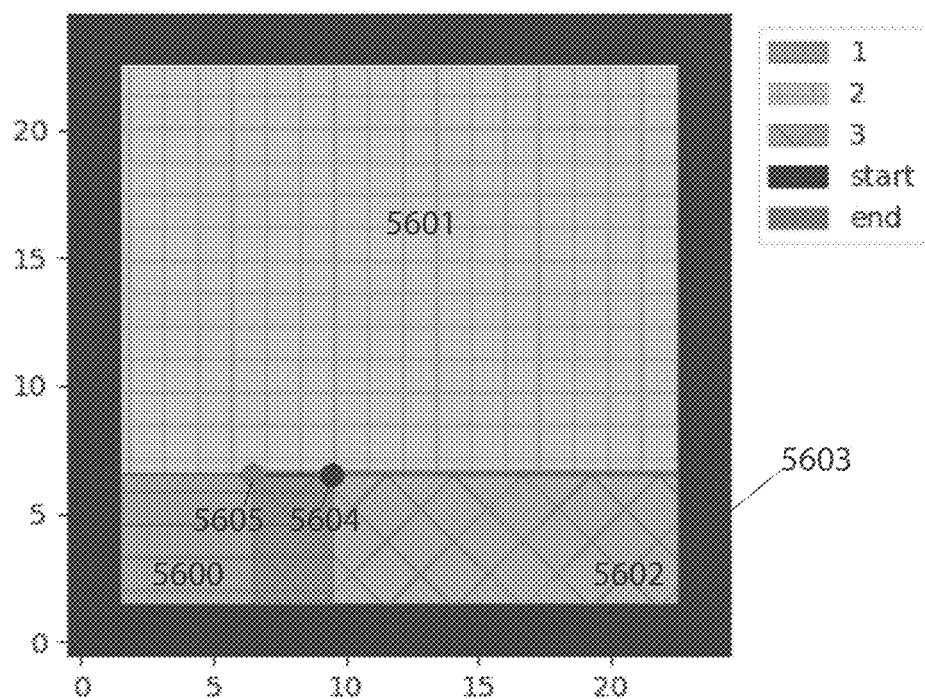
FIGS. 57A and 57B illustrate an example of deadlock encountered during optimizing surface coverage of a workspace.
Figure 57B:
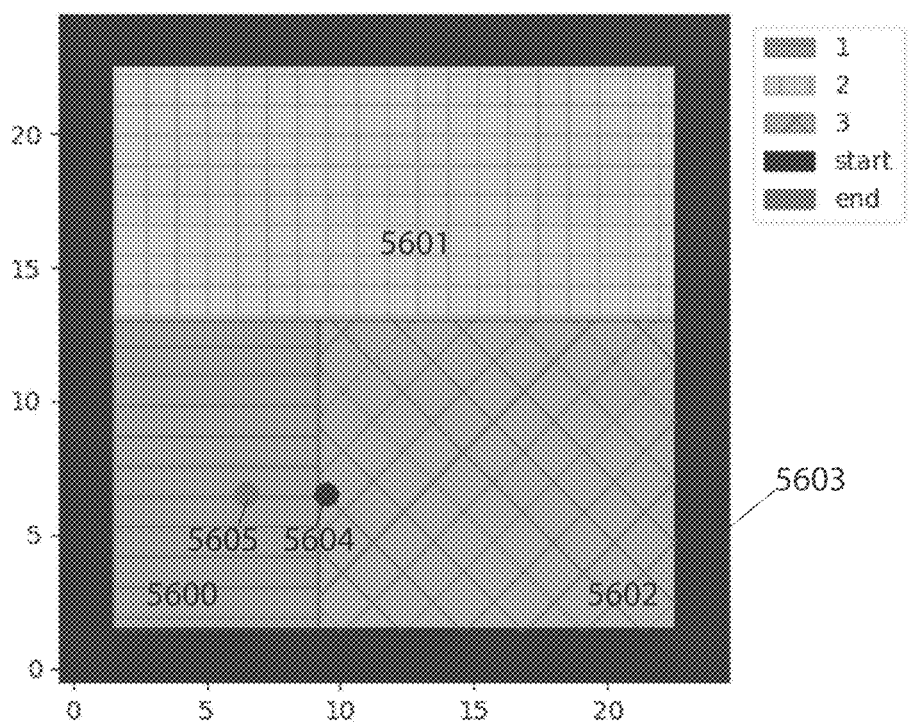

In some embodiments, the processor may use various functions to further improve optimization of coverage of the environment. These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual operating cost below a certain threshold may be deleted, and a fast grow function wherein any space adjacent to a zone that is predominantly unclaimed by any other zone may be quickly incorporated into the zone. In some embodiments, deadlocking may occur when, for example, stuck in local maximum or minimum or when driving distance measure fails to account for perimeters (e.g., walls, furniture, or other areas the robot cannot travel). Some embodiments may implement stochastic gradient descent to reduce the effects of local minima or maxima. Another example of deadlock is illustrated in FIG. 57A between zones 5600 and 5602 as they are both competing for the same area with the same priority. Zone 5600 desires expansion towards starting point 5604 as coverage begins in zone 5600 and zone 5603 desires expansions towards ending point 5605 as coverage ends in zone 5603. Such a situation may be avoided by beginning coverage in zone 5603 and ending in zone 5600. Alternatively, the weights in the cost function for coverage and travel and operating cost may be adjusted. For example, if more weight is given to travel and operating cost, zones 5600, 5601 and 5603 may be as illustrated in FIG. 57B wherein overlap between zones 5601 and 5603 is observed as traveling distance between zones results in larger penalty than overlap between zones.

In some embodiments, the cost accounts for additional features other than or in addition to travel and cleaning cost and coverage. Examples of features that may be inputs to the cost function may include, coverage, size, and area of the zone, zone overlap with perimeters (e.g., walls, furniture, or other areas the robot cannot travel), location of zones, overlap between zones, location of zones and shared boundaries between zones. In some embodiments, a hierarchy may be used by the processor to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid perimeters, tier three may be to avoid overlap with other zones and tier four may be to increase coverage.

In some embodiments, the cost function may be integrated with MDP wherein the processor of the robotic floor-cleaning device finds the division of zones, order of coverage of zones, movement path, etc. that minimizes the cost function, thereby maximizing the reward of the MDP.

Figure 58A:
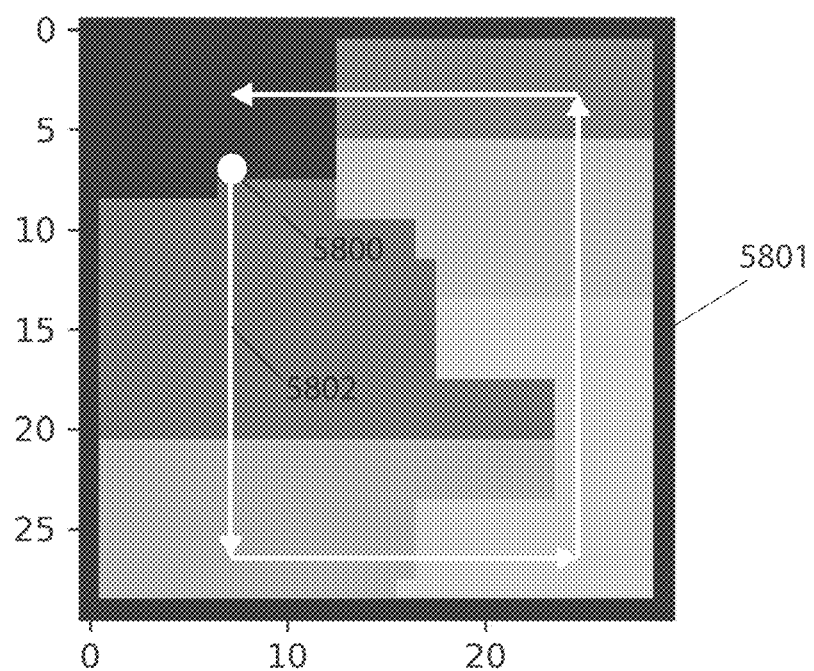
FIGS. 58A and 58B illustrate patterns followed by embodiments implementing a method for optimizing surface coverage of a discrete space with rectangular zone, according to some embodiments.
Figure 58B:
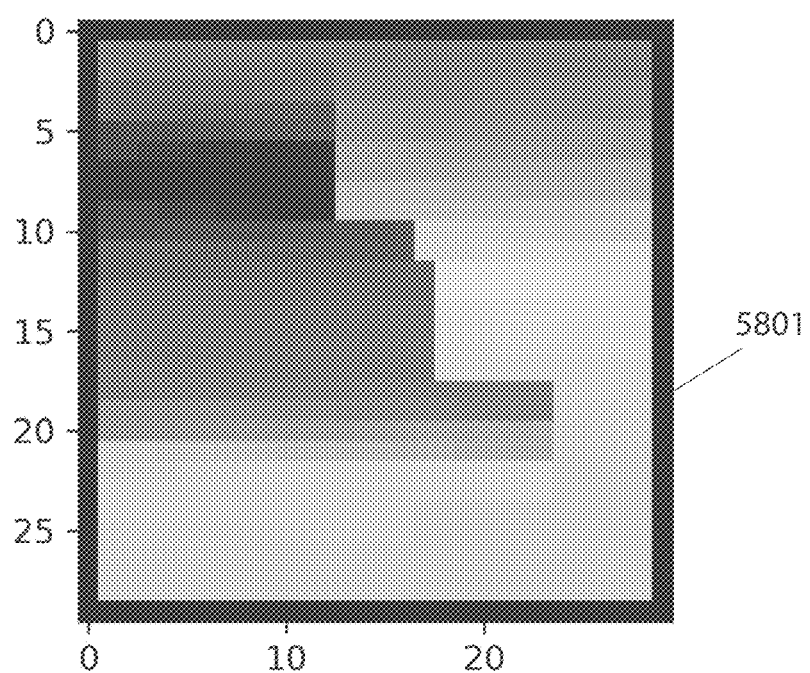

In some embodiments, the processor represents the environment using a coordinate map including a collection of cells, and zones may have the form of any connected component on the coordinate map. In such embodiments, the coordinate map of the environment is represented using a matrix wherein each entry corresponds to a coordinate cell of the environment and zones may be represented using a matrix corresponding to a portion of the coordinate cells of the environment. In some embodiments, each cell of the environment can only belong to a single zone, overlap between zones is avoided by construction. Entries in the matrices of zones may have a value of zero if the corresponding cell of the environment is empty or may have a value of one if the cell is occupied by, for example, a wall or furniture or other static object. Zones may initially be created and ordered for coverage by the processor of the robotic floor-cleaning device. In some embodiments, to optimize division of zones of an environment, the processor proceeds through the following iteration for each zone of a sequence of zones, beginning with the first zone: expansion of the zone if neighbor cells are empty, movement of the robotic floor-cleaning device to a point in the zone closest to the current position of the robotic floor-cleaning device, addition of a new zone coinciding with the travel path of the robotic floor-cleaning device from its current position to a point in the zone closest to the robotic floor-cleaning device if the length of travel from its current position is significant, execution of a coverage pattern (e.g. boustrophedon) within the zone, and removal of any uncovered cells from the zone. In some embodiments, additional steps may be included in the iteration or certain steps described may be omitted, which is not to suggest that any other process herein is not also amenable to such variation. In some embodiments, additional functionalities may be used by the processor such as, placement of a new zone in any large, uncovered areas to increase discovery speed, deletion of areas with size below a certain threshold and aggressive growth of efficient zones wherein efficiency may be measured by for example, coverage time or coverage path. FIG. 58A illustrates zone segmentation resulting from execution of some examples of the iteration described herein with coverage beginning and ending at point 5800 of environment 5801. Order of coverage is shown by arrow 5802. FIG. 58B illustrates the boustrophedon pattern executed for coverage of environment 5801 represented by the back and forth striations within each zone and leading from one zone into another.

Figure 59A:
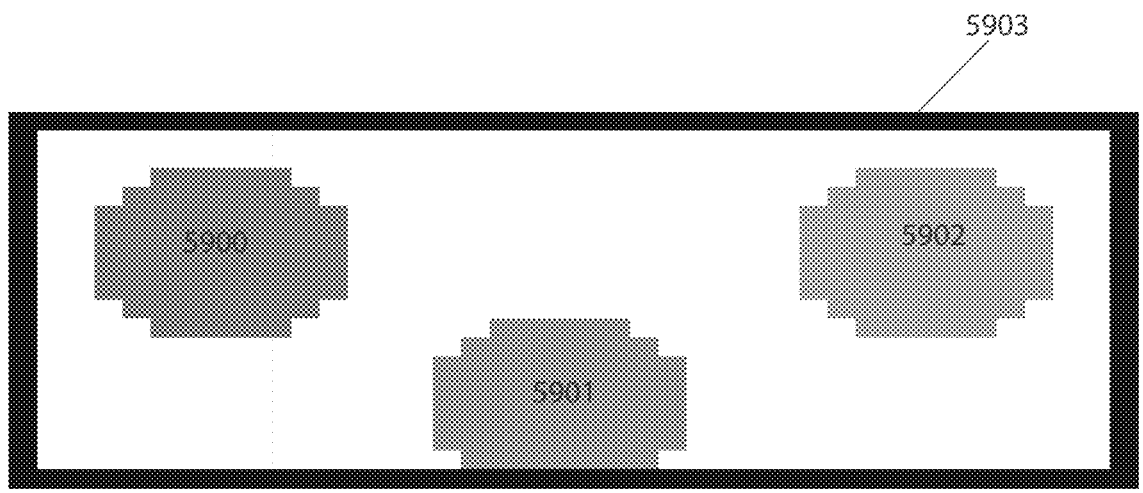
FIGS. 59A and 59B illustrate patterns followed by embodiments implementing a method for optimizing surface coverage of a discrete space with arbitrarily shaped zones, according to some embodiments.
Figure 59B:
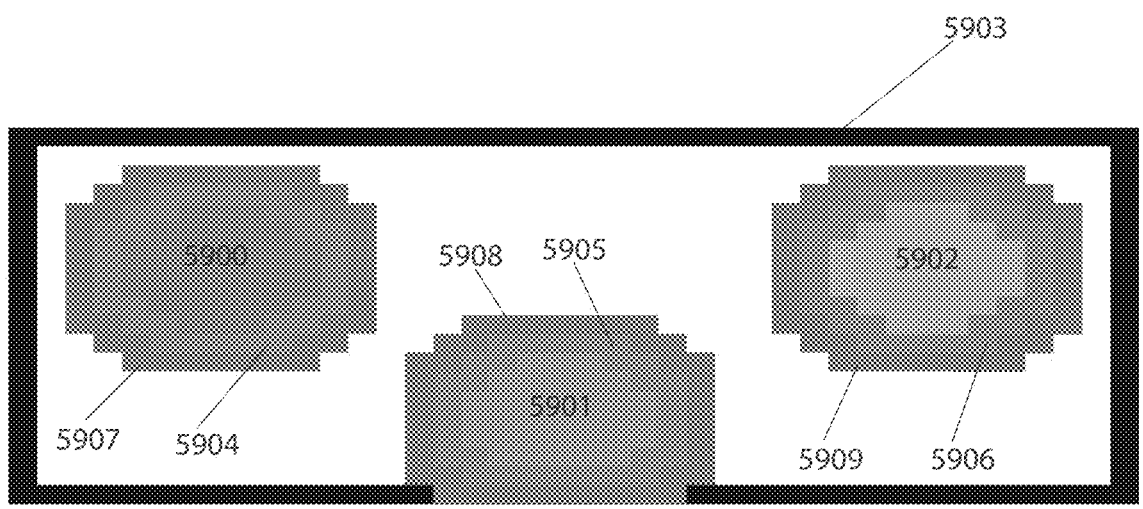

In some embodiments, the processor determines optimal division of zones of an environment by modeling zones as emulsions of liquid, such as bubbles. For instance, some embodiments may determine a Euclidean Steiner tree with Steiner vertices that define zone corners and correspond to obstacles. In some embodiments, the processor creates zones of arbitrary shape but of similar size, avoids overlap of zones with static structures of the environment and minimizes surface area and travel distance between zones. In some embodiments, behaviors of emulsions of liquid, such as minimization of surface tension and surface area and expansion and contraction of the emulsion driven by an internal pressure are used in modeling the zones of the environment. To do so, in some embodiments, the environment is represented by a grid map and divided into zones by the processor. In some embodiments, the processor converts the grid map into a routing graph G consisting of nodes N connected by edges E. The processor represents a zone A using a set of nodes of the routing graph wherein $A \subset N$. The nodes are connected and represent an area on the grid map. In some embodiments, the processor assigns a zone A a set of boundary edges E wherein a boundary edge $e=(n_1, n_2)$ connects a node $n_1 \in A$ with a node $n_2 \notin A$. Thus, the set of boundary edges clearly defines the set of boundary nodes BA, and gives information about the nodes, which are just inside zone A as well as the nodes just outside zone A. Boundary nodes in zone A may be denoted by $\partial A^{in}$ and boundary nodes outside zone A by $\partial A^{out}$. The collection of $\partial A^{in}$ and $\partial A^{out}$ together are all the nodes in $\partial A$. FIG. 59A illustrates zones 5900, 5901, and 5902 and wall 5903 of a environment. FIG. 59B illustrates zones 5900, 5901, and 5902 with $\partial A^{in}$ boundary nodes 5904, 5905, and 5906 and $\partial A^{out} \partial A_{in}$ boundary nodes 5907, 5908, and 5909, respectively. In some embodiments, the processor expands a zone A in size by adding nodes from $\partial A^{out}$ to zone A and reduces the zone in size by removing nodes in $\partial A^{in}$ from zone A, allowing for fluid contraction and expansion.

Figure 60B:
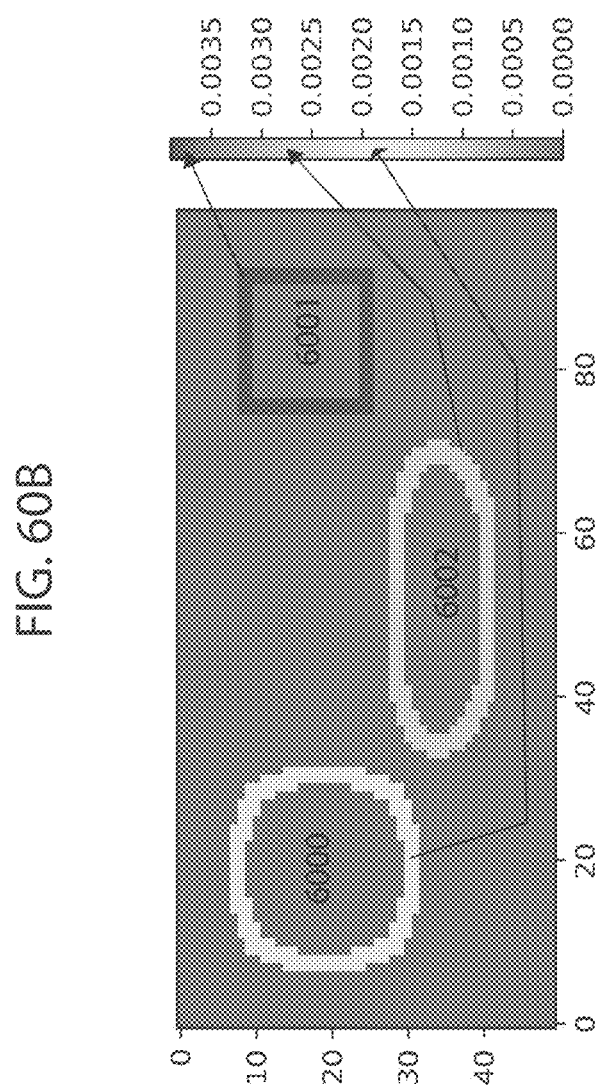

In some embodiments, the processor determines a numerical value to assign to each node in $\partial A$, wherein the value of each node indicates whether to add or remove the node from zone A. The processor may, for example, compute a numerical value for each node in $\partial A$ for each zone $A_1, A_2, \ldots, A_n$, of an environment. Depending on the value of each node in $\partial A$, each node is either removed from zone A, added to zone A or moved to another zone by the processor. In some embodiments, the numerical value computed may be dependent on growth (if the area is small) and decay (if the area is large) of the zone, distance of the node from the center of the zone, order of zone coverage, and a surface smoother score. For example, for a boundary node of a zone, the processor evaluates growth and decay of the zone and distance of the node from the center of the zone by using $$\frac{c_1}{a} + \frac{c_2}{d^2},$$

wherein a is area of the zone, d is the distance of the node from the center of the zone and $c_1$, $c_2$ are constants which dictate the importance of each term in the equation. FIG. 60A illustrates zones 6000, 6001, and 6002 with same start and end point 6003. In FIG. 60B values for 1/a are shown for boundary nodes of zones 6000, 6001 and 6002. 1/a for each boundary node within the same zone is equal in value as indicated by the consistent color of boundary nodes in each zone. Arrows indicate approximate value of boundary nodes for each zone. In comparing boundary nodes from different zones, boundary nodes belonging to smaller zones result in a greater value for 1/a as indicated by the color of boundary nodes of different zones. Smaller areas with greater value for 1/a may indicate desired growth of the zone.

Figure 60C:
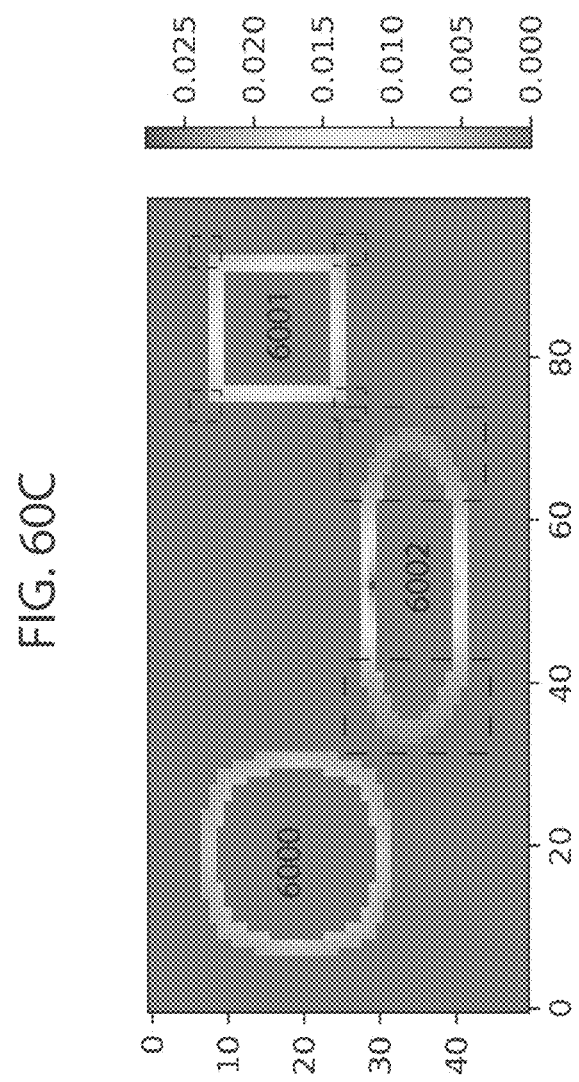

FIG. 60C illustrates values of $$\frac{1}{d^2}$$

for boundary nodes of zones 6000, 6001, and 6002. There is not significant difference in the value of $$\frac{1}{d^2}$$

for boundary nodes in zone 6000 as it is circular. For zone 6001 boundary nodes located at the corners, bounded by dashed lines, are further from the center and therefore have a smaller value for $$\frac{1}{d^2}$$

as compared to boundary nodes along the edges of zone 6002. This is indicated by the inconsistent color between boundary nodes further away from and closer to the center of the zone. Similarly, with zone 6002 being long and slender, boundary nodes located in the middle section are closer to the center of the zone and therefore have greater value for $$\frac{1}{d^2}$$

while boundary nodes on the ends of zones 6002, bounded by dashed lines, are further away and have smaller value for $$\frac{1}{d^2}.$$

In embodiments, wherein the processor of the robotic floor-cleaning device uses the order of zone coverage to compute the numerical value of each node in ∂A, nodes closer to the previous or next zone to be covered increase the numerical value of each node in ∂A. In some embodiments, the processor calculates an order score using, for example, $$c\left(\frac{1}{az+1}+b\right)$$

wherein a, b, c are constants and $$z = \frac{x - x_{min}}{x_{max} - x_{min}}$$

wherein x is the distance between the boundary node of interest and the closest boundary node in the next zone to be covered, $X_{min}$ is the distance between the closest boundary nodes between the current zone and the next zone to be covered while $x_{max}$ is the distance between the furthest boundary nodes between the current zone and the next zone to be covered. In some embodiments, the order score is then computed by the processor, with z calculated using the current zone and previous zone covered and the order score calculated using the next zone to be covered and previous zone covered are combined by the processor. The constant a controls how sharp the drop of the function is between $x_{min}$ and $x_{max}$, b shifts the entire function along the y-axis such that the threshold for assigning negative score may be controlled and c scales the value of the function.

Figure 61:
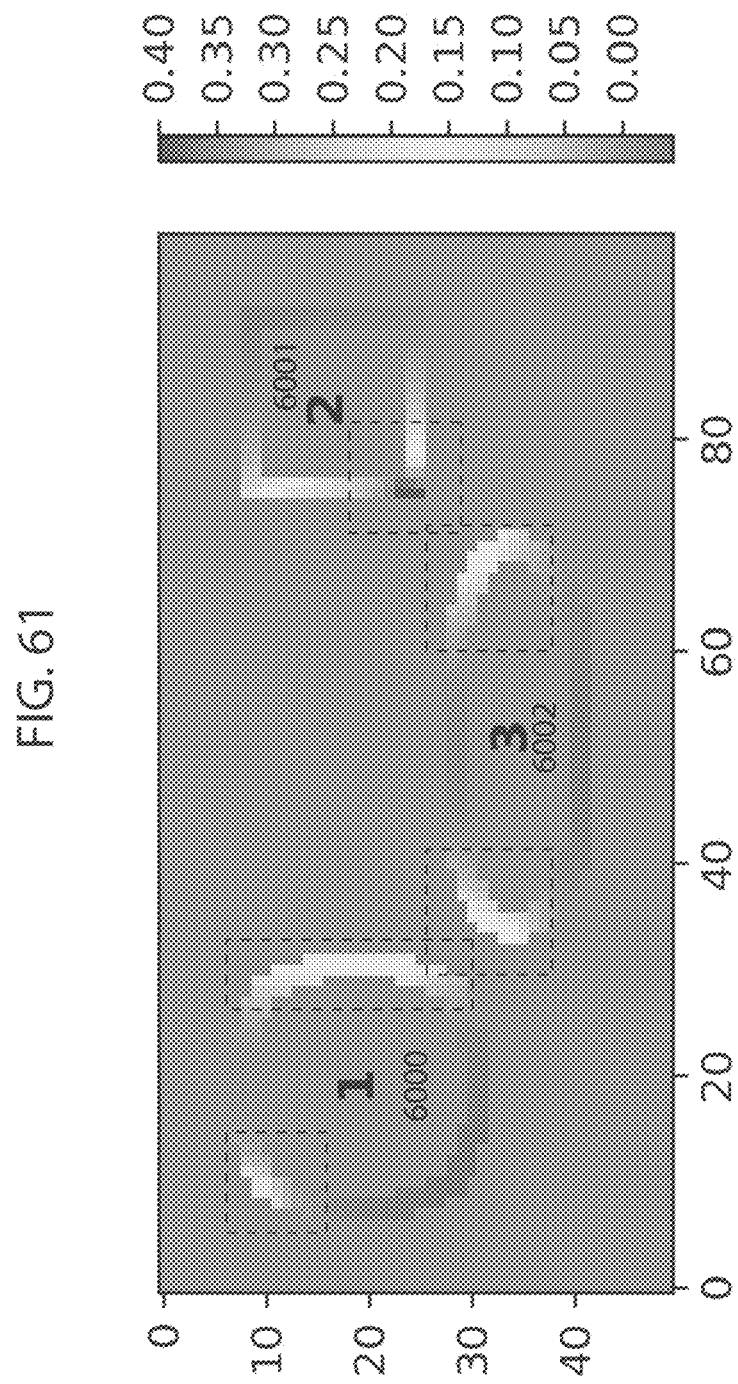
FIG. 61 illustrates an example measure for order of zone coverage used in assigning a numerical value to boundary nodes of a zone, according to some embodiments.

FIG. 61 illustrates the order score for boundary nodes of zones 6000, 6001, and 6002 with same start and end point 6003 (FIG. 60A). The constants used in the illustrated example are a=15, b=−0.2, c=0.1. Boundary nodes of each zone closer to the previous zone covered (or start point) and next zone to be covered (or end point), bounded by dashed lines, have greater score. In some embodiments, individual scores based on growth and decay of the zone, distance of the node from the center of the zone and order of zone coverage are combined by the processor to determine overall numerical value of each node in BA, wherein areas of zone A containing nodes with high numerical value indicate expansion while those containing nodes with low numerical value indicate contraction. However, in some embodiments the result produced by the processor may be segmented and have non-smooth borders. Therefore, in embodiments a surface smoother score may also be used by the processor in determining the numerical value of each node in ∂A. For each node in ∂A, the processor uses a local 3-by-3 grid, wherein for example, the node is at the center of the grid. In some embodiments, other grid sizes may be used. The number of nodes within the grid within the same area (e.g. inner or outer boundary areas) as the boundary node of interest may be counted by the processor and the overall score of the boundary node may be multiplied by the counted number in order to smoothen boundaries. In some embodiments, the processor of the robot may determine the numerical value of each node in ∂A of zone A by combining scores for growth and decay of the zone, distance of the node from the center of the zone, order of zone coverage and surface smoother.

Figure 62A:
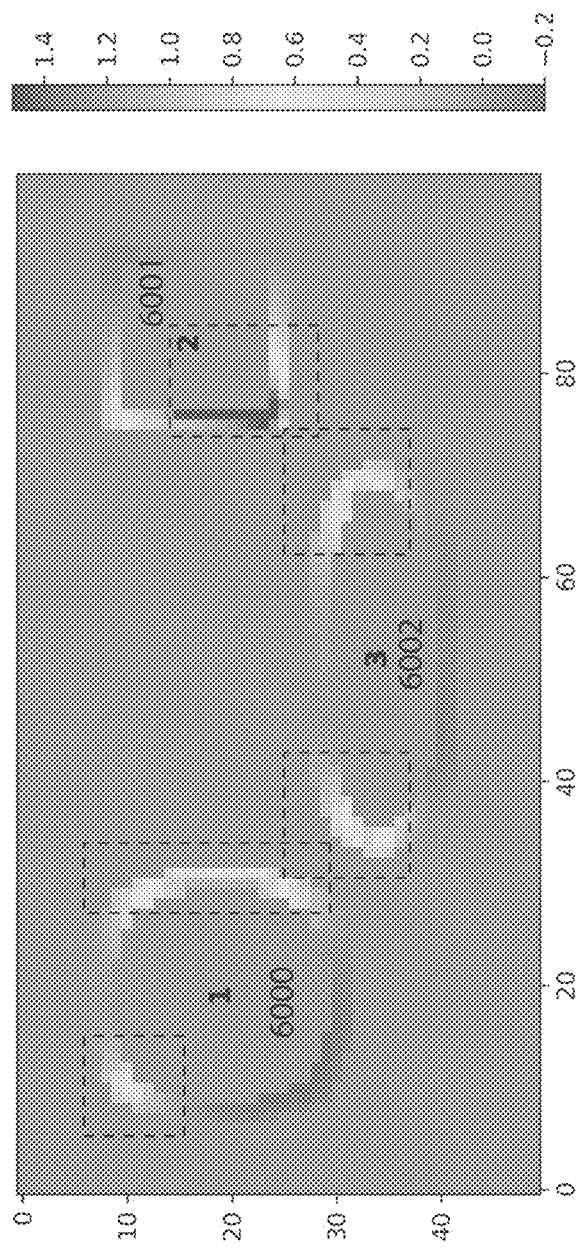
FIGS. 62A and 62B illustrate example numerical values of boundary nodes of zones and expansion/contraction of zones based on magnitude of numerical values of boundary nodes, according to some embodiments.

For example, FIG. 62A illustrates numerical values of boundary nodes for zones 6000, 6001 and 6002 with start and end point 6003 (FIG. 60A) computed by the processor by combining scores for growth and decay of the zone, distance of the node from the center of the zone, order of zone coverage and surface smoother. Areas of zones 6000, 6001, and 6002 containing nodes with high numerical value, bounded by dashed lines, indicate expansion while nodes in other areas with low numerical value indicate contraction. For example, boundary nodes with numerical value less than some value may be removed by the processor while those with numerical value above some value may be added. In this way, the processor may expand a zone A in size by adding nodes from $\partial A^{out}$ (outer boundary nodes) to zone A and may reduce its size by removing nodes in $\partial A^{in}$ (inner boundary nodes) from zone A. Some embodiments may iteratively make such adjustments until a stopping condition, such as an equilibrium, is detected.

Figure 62B:
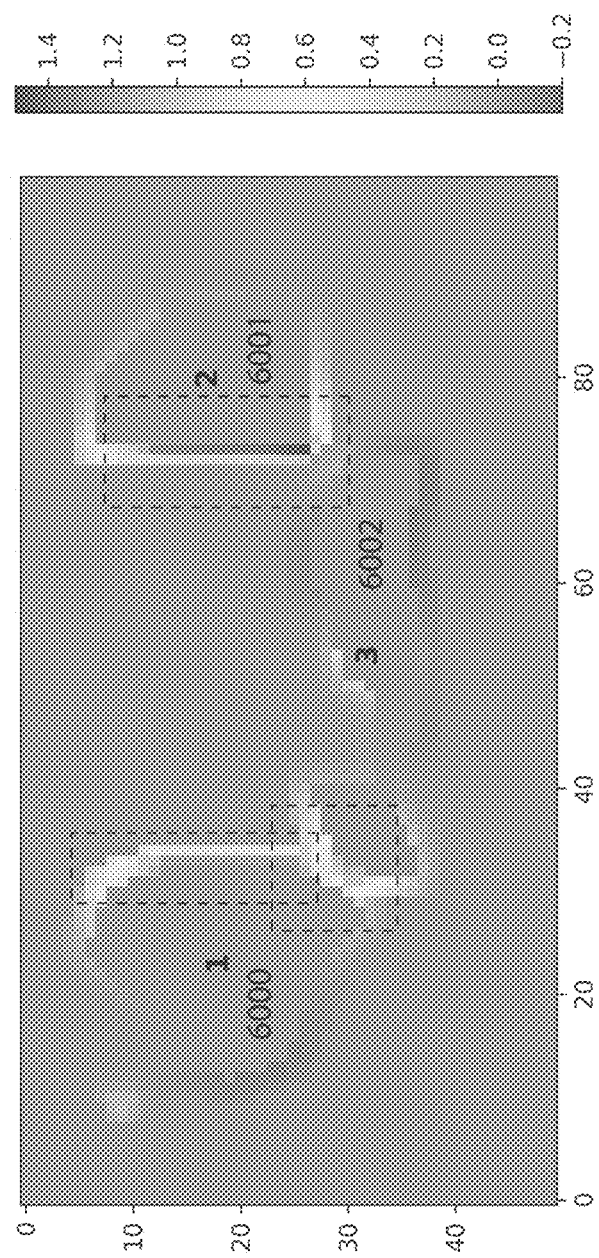

The expansion and contraction are depicted in FIG. 62B as areas of zone 6000, 6001, and 6002 containing nodes with high numerical values as shown in FIG. 62A have expanded after several iteration steps while those with low numerical values have contracted. This allows ordered zones to come closer together to reduce travel distance between sequentially ordered zones while expanding to cover more area of the environment. Areas of zones 6000, 6001, and 6002 bounded by dashed lines in FIG. 62B contain boundary nodes with high numerical value therefore the processor will continue to expand those areas with more iterations while areas with boundary nodes with low numerical value will contract. In embodiments, additional functions may be used by the processor to improve performance of zone optimization such as discover, delete and aggressive growth functions described earlier. Furthermore, additional features may be used in computing the numerical value of boundary nodes, which is not to suggest that other descriptions are limiting.

In some embodiments, the processor determines the best division of an environment by minimizing a cost function defined as the difference between theoretical (e.g., modeled with uncertainty) area of the environment and the actual area covered. The theoretical area of the environment may be determined by the processor using a map of the environment. The actual area covered may be determined by the processor by recorded movement of the robotic floor-cleaning device using, for example, an odometer or gyroscope. In some embodiments, the processor may determine the best division of the environment by minimizing a cost function dependent on a movement path taken by the robotic floor-cleaning device comprising the movement paths taken within each zone and in between zones. The processor may restrict zones to being rectangular (or having some other defined number of vertices or sides) and may restrict the robotic floor-cleaning device to entering a zone at a corner and to driving a serpentine routine (or other driving routine) in either x- or y-direction such that the trajectory ends at another corner of the zone. The cost associated with a particular division of an environment and order of zone coverage may be computed as the sum of the distances of the serpentine path travelled for coverage within each zone and the sum of the distances travelled in between zones (corner to corner).

Figure 63:
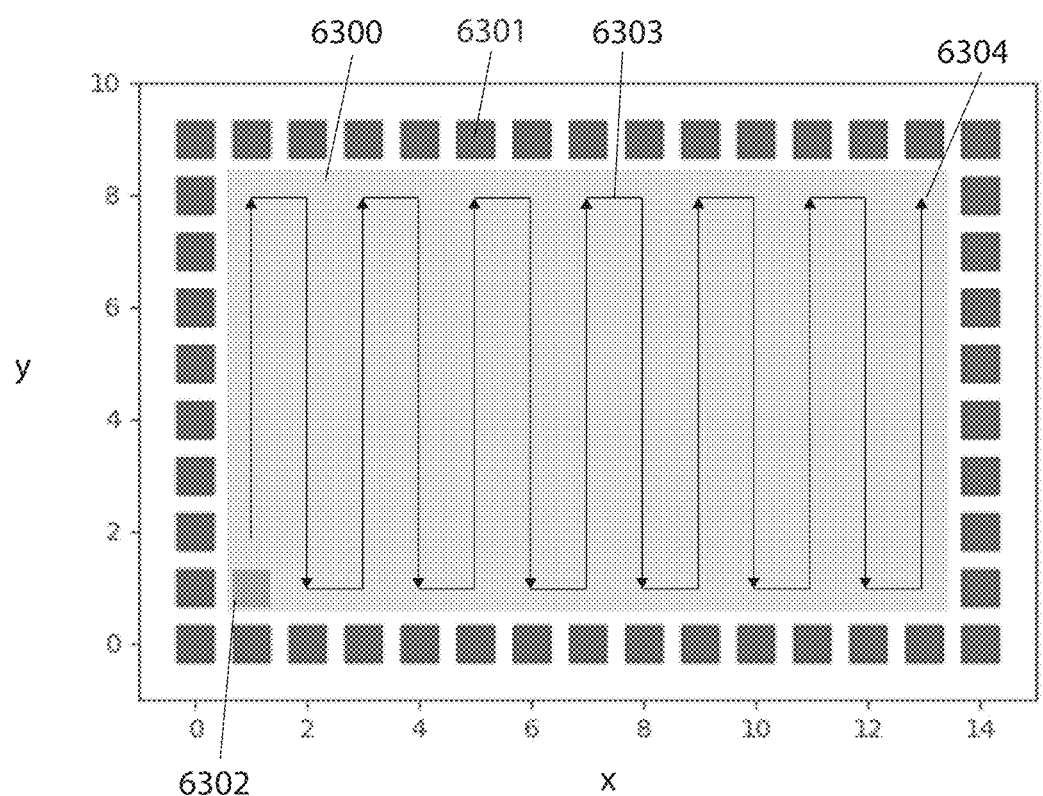
FIGS. 63, 64A-64C, 65, 66A, and 66B illustrate patterns followed by embodiments implementing a method for optimizing surface coverage of a workspace with rectangular zones, according to some embodiments.

For example, FIG. 63 illustrates an example of rectangular zone 6300 of the environment with perimeter 6301. Each square division may represent a single unit and may be used by the processor to compute distance travelled within the zone. From starting position 6302 at the lower left corner the robotic floor-cleaning device may follow serpentine path 6303 to position 6304 at the top right corner of the zone. Assuming zone 6300 is the only zone of the environment, the robotic floor-cleaning device returns back to initial position 6302. The processor computes the distance of serpentine path 6303 and the return path to position 6304 as 122 units and assigns the cost to this particular division of the environment and order of zone coverage. In some cases, a portion of the area of a zone is covered with a serpentine path, e.g., some embodiments may navigate around some or all of a perimeter of a zone before covering the interior with a serpentine path. To minimize cost function and improve coverage efficiency zones may be further divided, merged, reordered for coverage and entry/exit points of zones may be adjusted. In some embodiments, the processor of the robotic floor-cleaning device may initiate these actions at random or may target them. In some embodiments, wherein actions are initiated at random (e.g., based on a pseudorandom value) by the processor, the processor may choose a random action such as, dividing, merging or reordering zones, and perform the action. The processor may then optimize entry/exit points for the chosen zones and order of zones. A difference between the new cost and old cost may be computed as $\Delta$=new cost−old cost by the processor wherein an action resulting in a difference <0 is accepted while a difference >0 is accepted with probability $\exp(-\Delta/T)$ wherein T is a scaling constant. Since cost, in some embodiments, strongly depends on randomly determined actions the processor of the robotic floor-cleaning device, embodiments may evolve 10 different instances and after a specified number of iterations may discard a percentage of the worst instances.

Figure 64A:
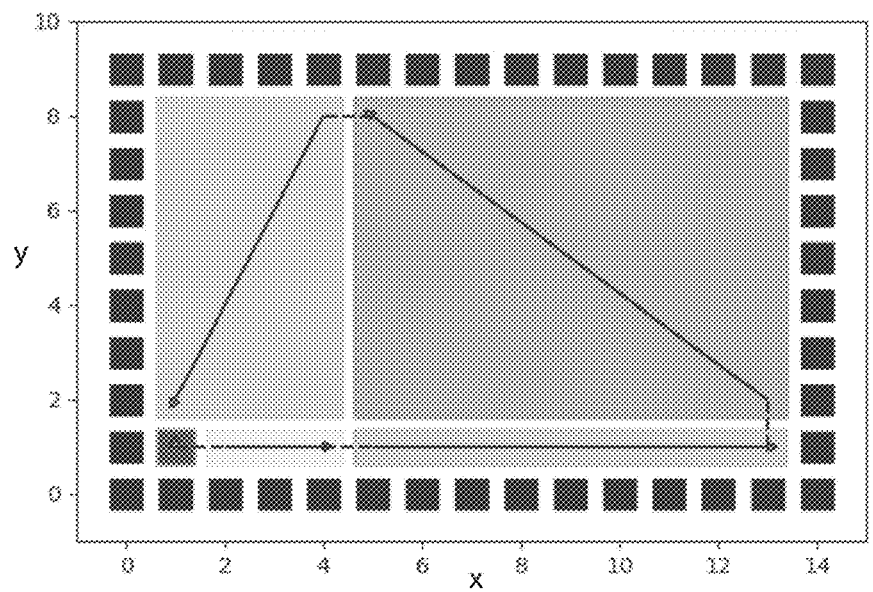
Figure 64B:
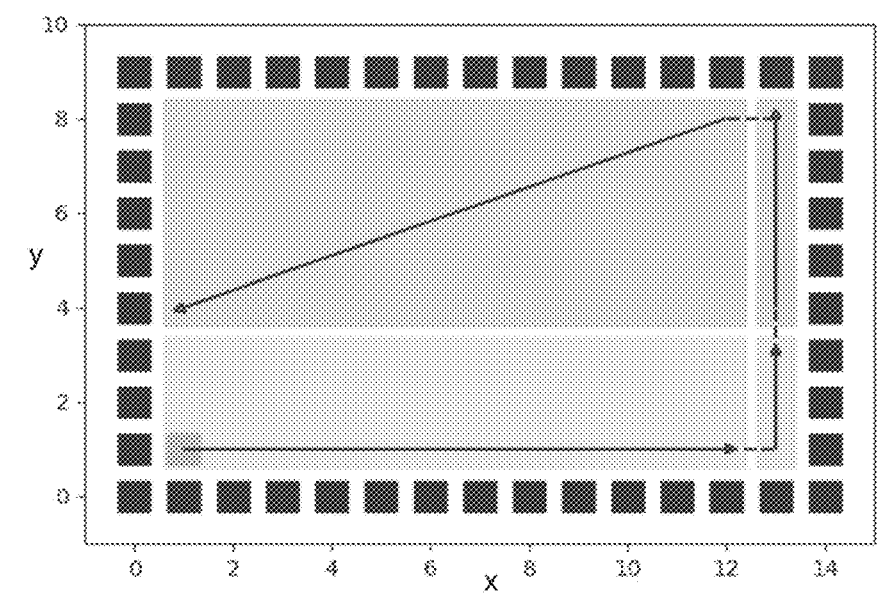
Figure 64C:
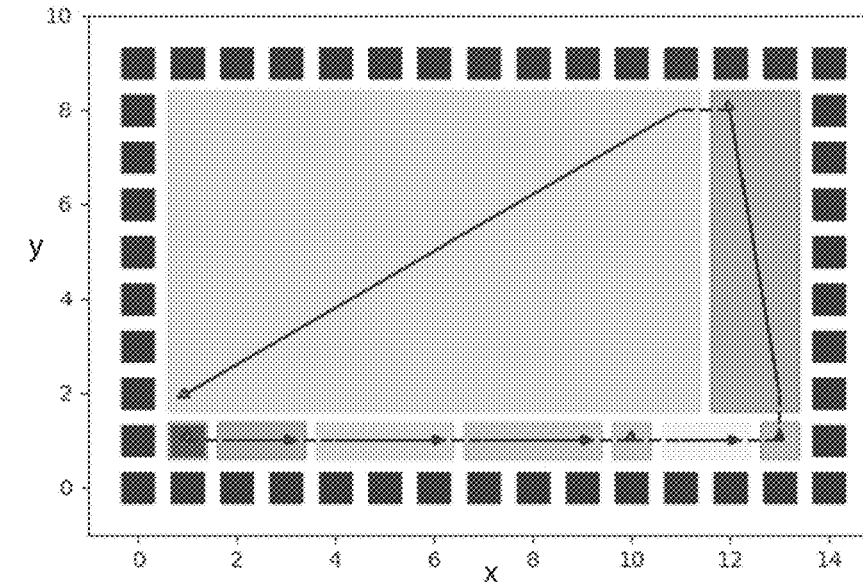
Figure 65:
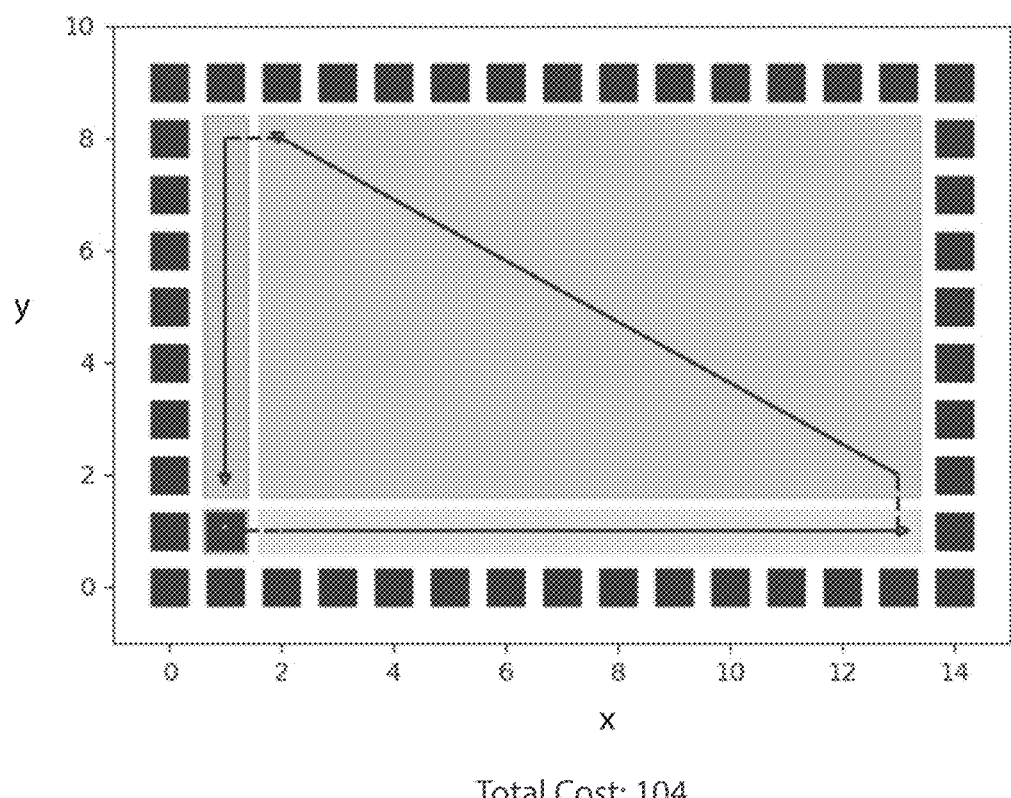
Figure 66A:
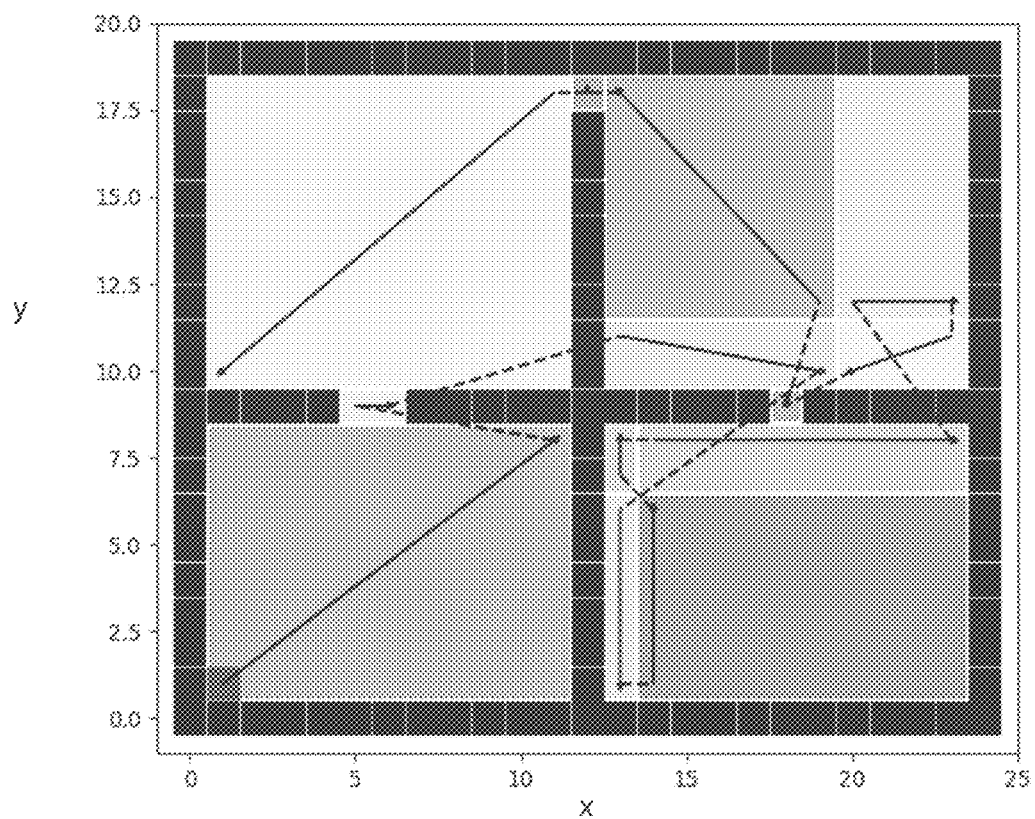
Figure 66B:
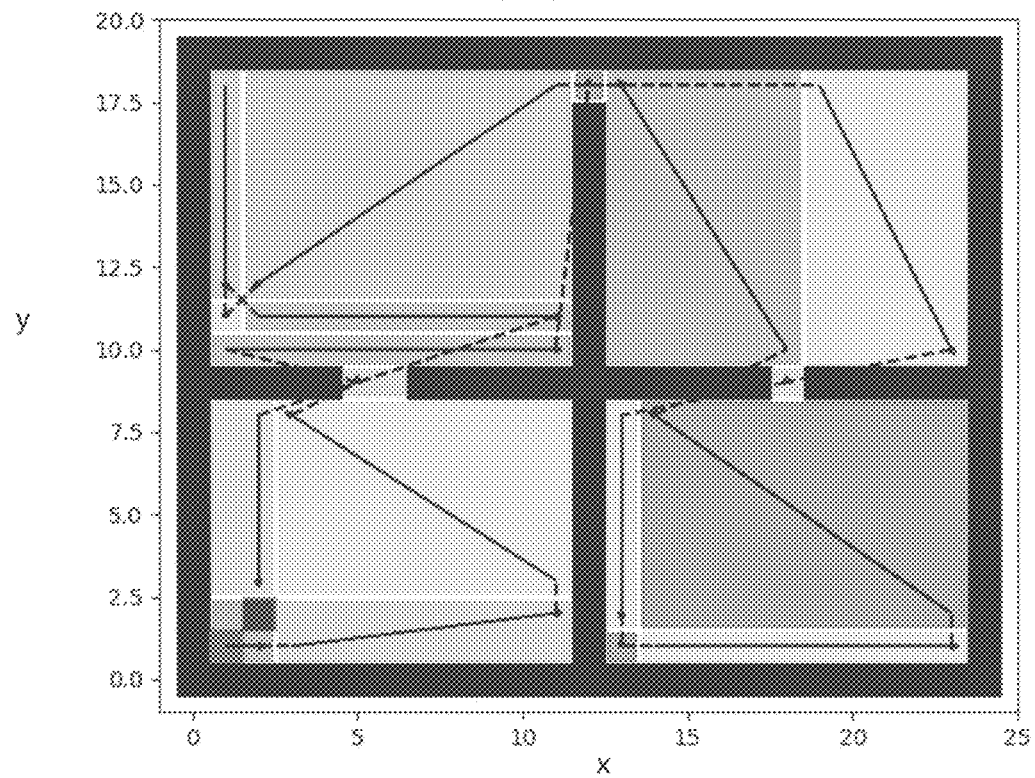

In some embodiments, the processor actuates the robotic floor-cleaning device to execute the best or a number of the best instances and calculate actual cost. For example, FIG. 64A illustrates a random action approach to minimizing the cost function resulting in improved division and order of zones of the same environment shown in FIG. 63. Rectangular divisions indicate different zones and arrows indicate order of coverage of the zones as well as entry and exit points of each zone. Serpentine coverage of each zone is not shown, but may be implemented. The new cost is 104 as compared to 122 for the zone coverage in FIG. 63 and avoids repeat coverage of areas. FIGS. 64B and 64C illustrate other instances resulting from random action approach to minimizing the cost function, with cost 106 and 104, respectively. In embodiments, wherein actions are targeted, the processor may find the greatest cost contributor, such as the largest travel cost, and initiate a targeted action to reduce the greatest cost contributor. For example, FIG. 65 illustrates a targeted action approach to minimizing the cost function wherein greatest cost generator in FIG. 63, caused by travel distance from end point 6303 back to starting position 6301, is identified and eliminated by the processor resulting in improved division and order of zones of the same environment. The new cost is 104 as compared to 122 for zone coverage shown in FIG. 63 and avoids repeat coverage of areas. In embodiments, random and targeted action approaches to minimizing the cost function may be applied to workspaces comprising multiple rooms by the processor of the robotic floor-cleaning device. For example, FIGS. 66A and 66B illustrate zone division and order of zone coverage of an environment comprising four rooms determined by the processor from minimizing the cost function by random and targeted action approaches, respectively. Arrows illustrate the order of zone coverage and entry/exit points of each zone. Serpentine paths within each zone are not illustrated. In embodiments, the processor may directly actuate the robotic floor-cleaning device to execute coverage for a specific division of the environment and order of zone coverage without first evaluating different possible divisions and orders of zone coverage by simulation. In embodiments, the processor may determine the best division of the environment by minimizing a cost function comprising some measure of the theoretical area of the environment, the actual area covered, and the path taken by the robotic floor-cleaning device within each zone and in between zones.

In some embodiments, the processor of the robotic floor-cleaning device divides the map of the environment into zones wherein each zone is defined by a zone matrix including the respective portion of the cells of the map as entries. In some embodiments, the processor updates a coverage matrix of a zone corresponding to the zone matrix to indicate actual coverage or work completed. For a given zone, in some embodiments, each entry of its coverage matrix corresponds to an entry of its zone matrix and hence a cell of the environment. When a cell of a workspace is covered by the robotic floor-cleaning device, the value of the corresponding entry in the coverage matrix is updated to indicate coverage or work completed. For example, each time a cell of a zone is covered, the value of the corresponding entry in the coverage matrix of the zone may be increased by one, with all entries beginning with a value of zero to indicate no coverage. (Or values may be decremented by some amount in systems in which reversed signs convey the sematic equivalent to that described herein-a qualification that applies generally to this document, e.g., discussion of maximizing a reward function should be read as indicating the inventors also contemplate minimizing a cost function). In some embodiments, the processor determines a reward and assigns it to a policy based on performance of coverage of the environment by the robotic floor-cleaning device. In some embodiments, the policy may include the zones created, the order in which they were covered, and the movement (or coverage) path (i.e., it may include data describing these things). In some embodiments, the policy may include a collection of states and actions experienced by the robotic floor-cleaning device during coverage of the environment as a result of the zones created, the order in which they were covered and movement path. In some embodiments, the reward is based on actual coverage, repeat coverage, total coverage time, travel distance between zones, etc. In some embodiments, the process may be iteratively repeated to determine the policy that maximizes the reward. In some embodiments, the processor determines the policy that maximizes the reward using a MDP as described above.

Figure 67A:
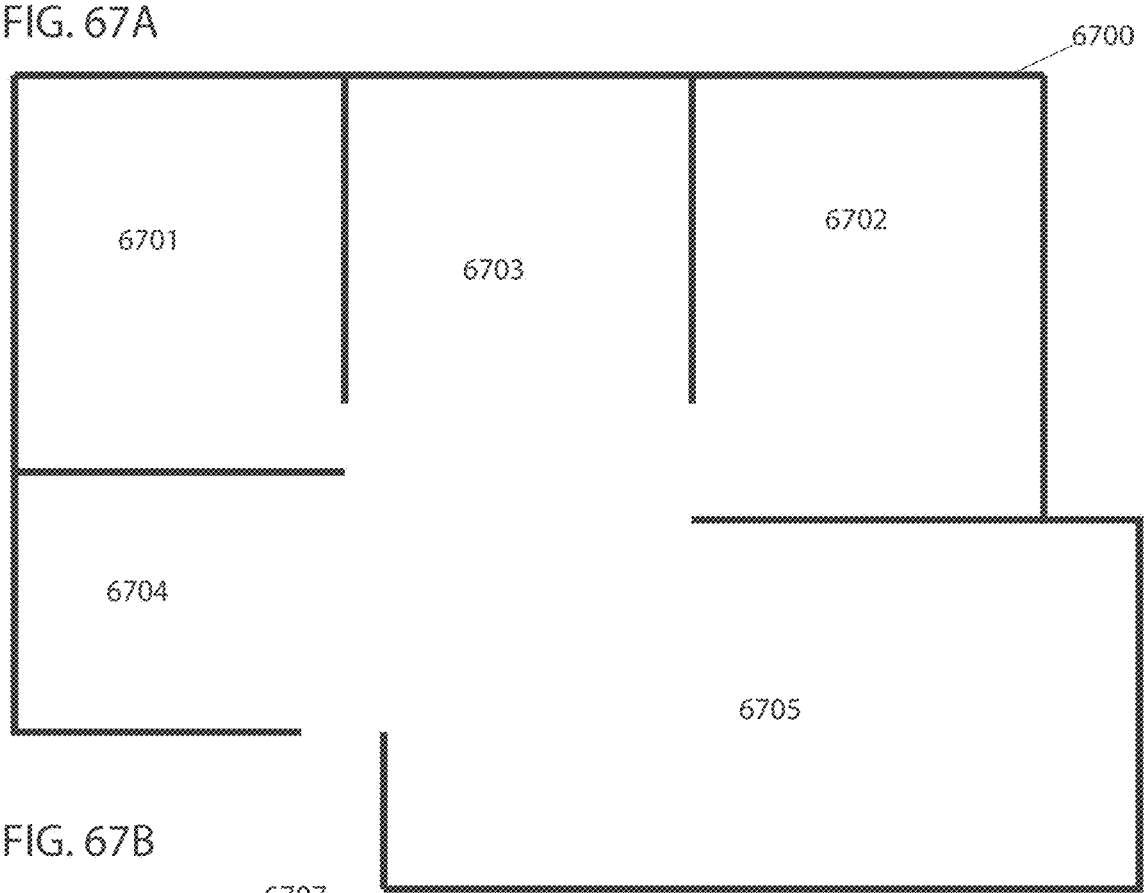
FIGS. 67A-67C illustrate optimization of zone division and order of zone coverage of a workspace, according to some embodiments.
Figure 67B:
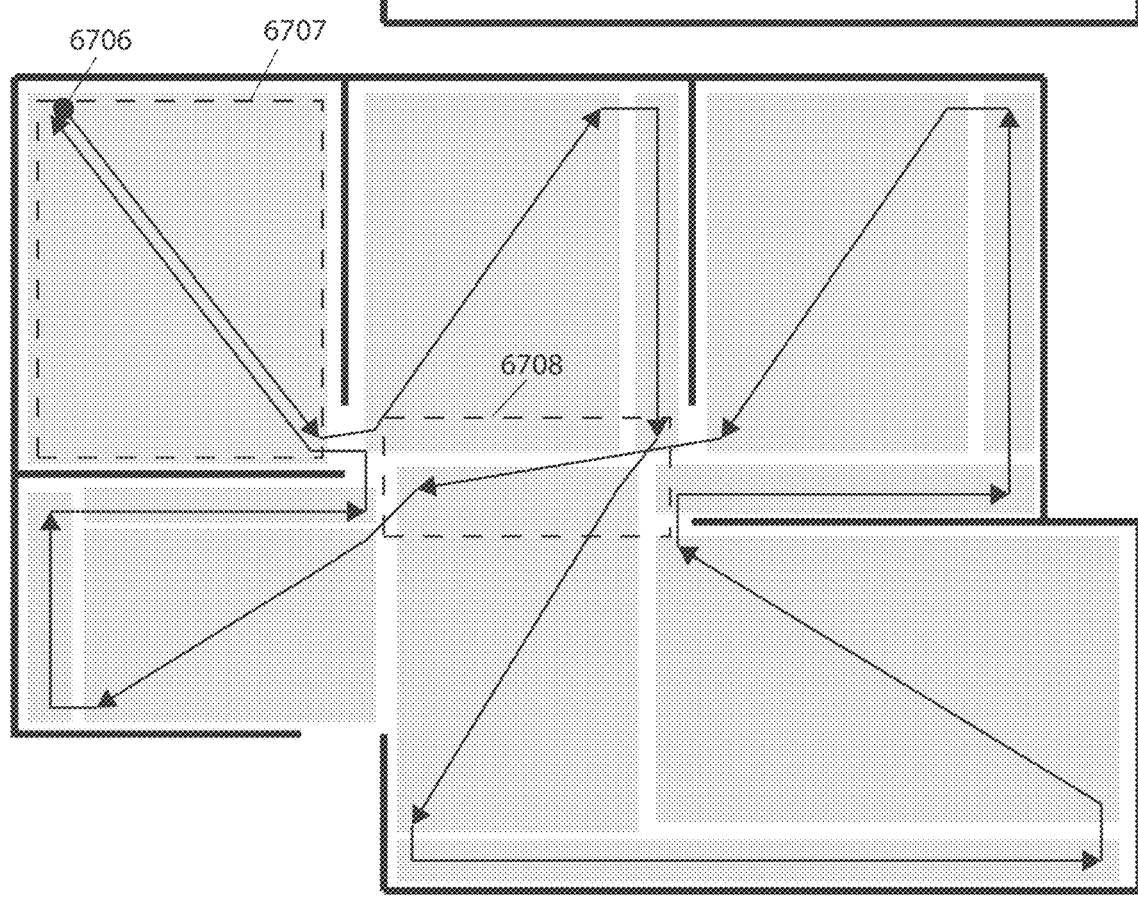
Figure 67C:
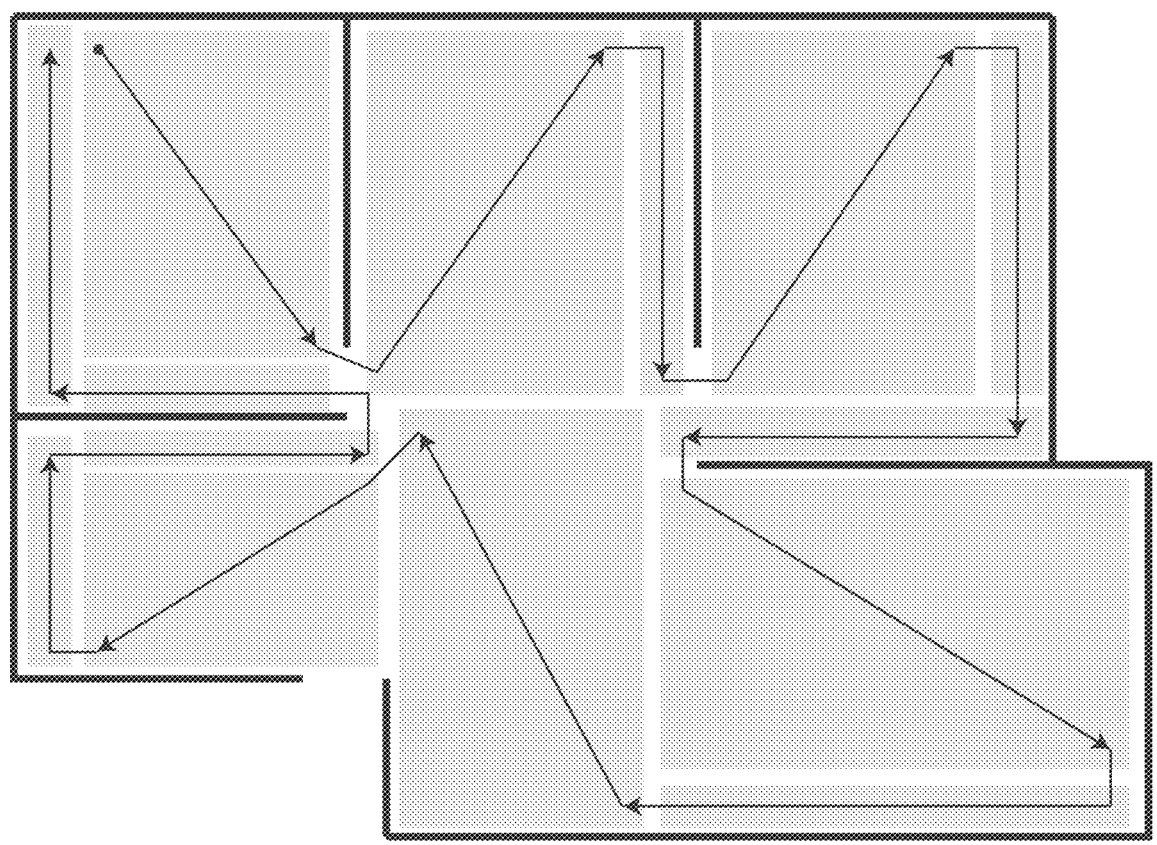

In some embodiments, a processor of a robotic floor-cleaning device may evaluate different divisions of an environment while offline. For example, environment 6700 in FIG. 67A includes bedrooms 6701 and 6702, living room 6703, entry area 6704 and kitchen/dining area 6705. While offline, the processor may initially divide and order zones of environment 6700 for coverage as shown in FIG. 67B, wherein zones are shown by rectangular divisions and the order of zone coverage as well as entry/exit points of each zone is indicated by arrows with starting position 6706. Before starting coverage of environment 6700 the processor may iterate through divisions of the environment and order of zone coverage to find the division and order of zone coverage that optimizes (e.g., locally or globally) the movement path for an objective function like those described above. For example, the order of zone coverage in FIG. 67B is not efficient as the robotic floor-cleaning device would need to back track resulting in repeat coverage in areas within dashed lines 6707 and 6708. The processor may iterate and divide and order zones of the environment for coverage as shown in FIG. 67C, wherein back tracking and hence repeat coverage of areas is minimized.

In some embodiments, the memory of the robotic floor-cleaning device may contain an internal database of obstacles likely to be encountered within the environment. In some embodiments, the database may further include humans likely to be encountered. In some embodiments, the camera of the robotic floor-cleaning device or of a communication device held by the robotic floor-cleaning device captures images of obstacles (and humans in some cases) in the environment. In some embodiments, the processor (of the robot or the communication device) identifies an obstacle by extracting features of the obstacle and comparing it with features of obstacles stored in the internal database. Similar methods may be applied for identifying humans captured in images. In some embodiments, the processor increases the likelihood of encountering that type of obstacle in the region of the environment in which it was encountered. For example, when a robot encounters a remote, image sensors of the robot capture images of the remote and the processor determines it is a remote based on features of remote extracted from the image matching with features of a remote stored in an internal database. The processor of the robot may mark the region in which the remote was encountered within an internal map as a region with increased likelihood of containing a remote. In some embodiments, regions wherein obstacles are consistently encountered may be classified by the processor as a high obstacle density area. In some embodiments, the processor of the robot may attempt to alter its movement path to avoid areas with high obstacle density. In some embodiments, the date, time, location, and type of obstacle encountered may be catalogued for use in future working sessions. In some embodiments, for example, where obstacles are encountered frequently at a similar time, a robot may plan a working session for such an area when obstacles are encountered less frequently, and may prioritize working in other locations at such times.

In some embodiments, all data are processed on the robot. In other embodiments, some data are processed on at least one separate device, such as a docking station of the robot, a communication device, or another external computing device.

The techniques described herein, e.g., such as localization, mapping, path planning, area division, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a localization and mapping chip or a processing chip such as a CPU or MCU with a localization and mapping processing unit may be used.

Figure 68A:
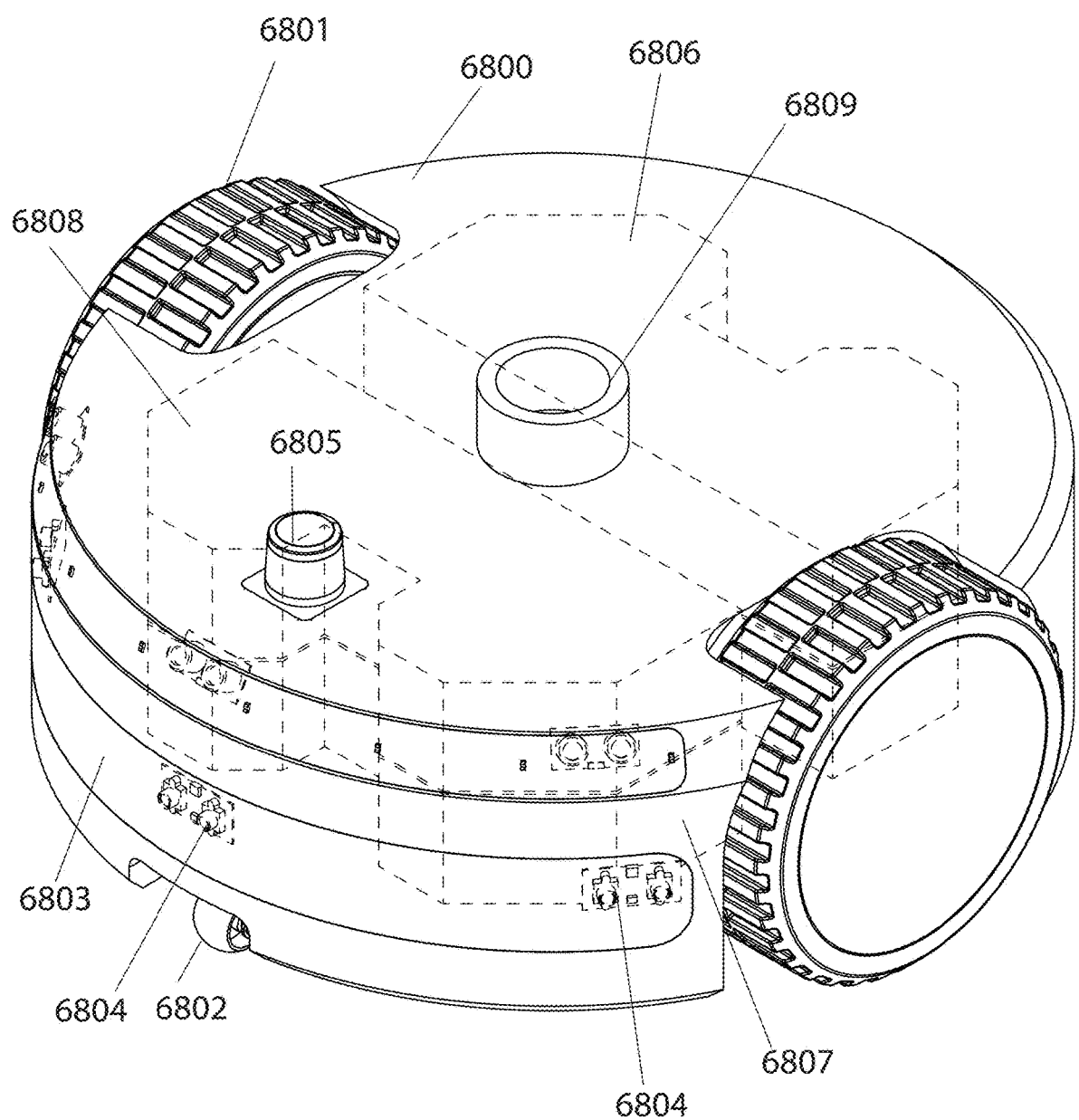
FIGS. 68A and 68B illustrate an example of a modular robot, according to some embodiments.
Figure 68B:
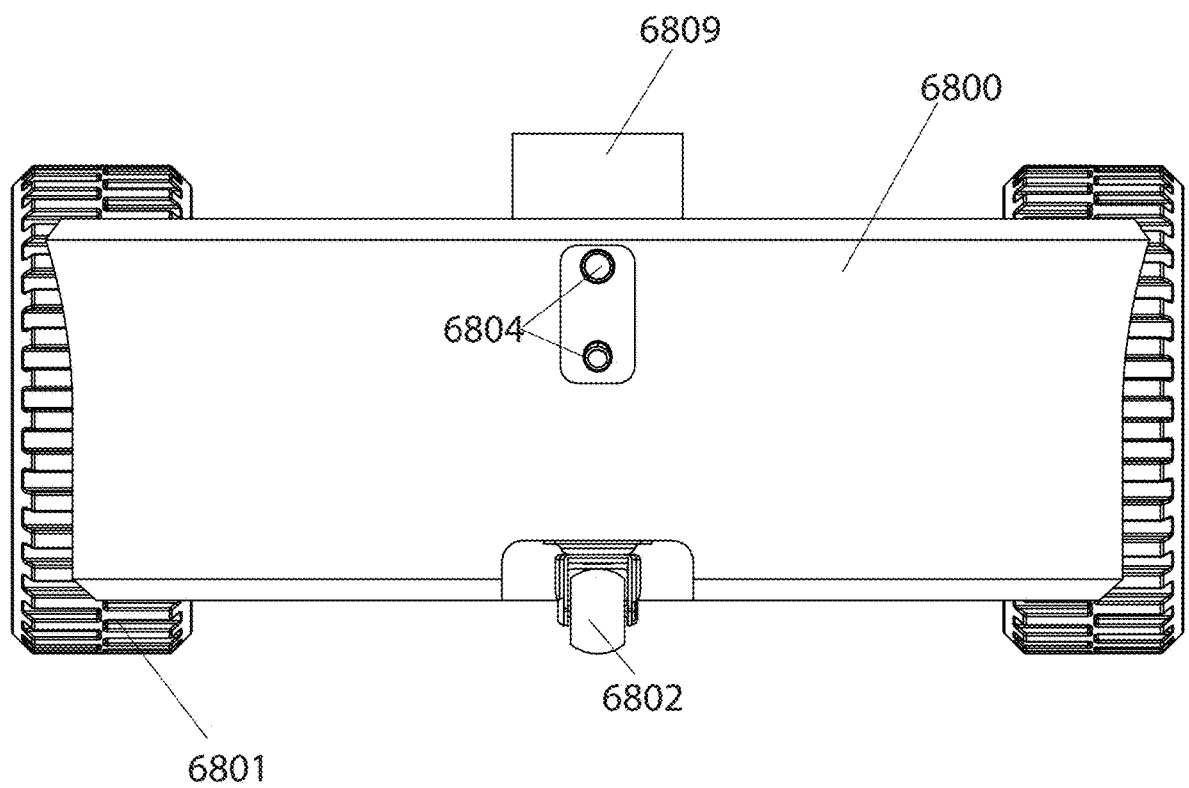
Figure 69:
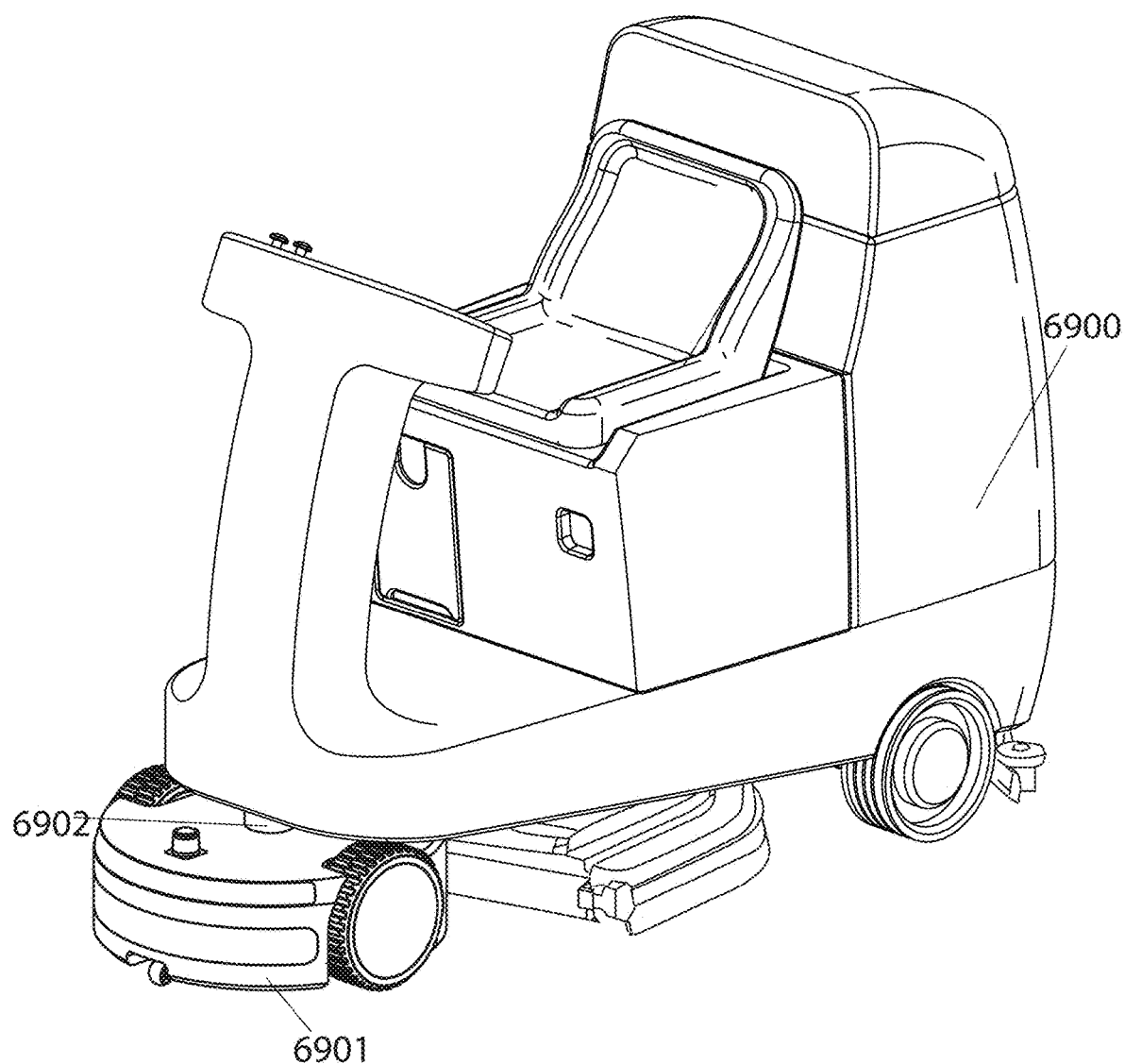
FIG. 69 illustrates an example of a robotic scrubber, according to some embodiments.
Figure 70B:
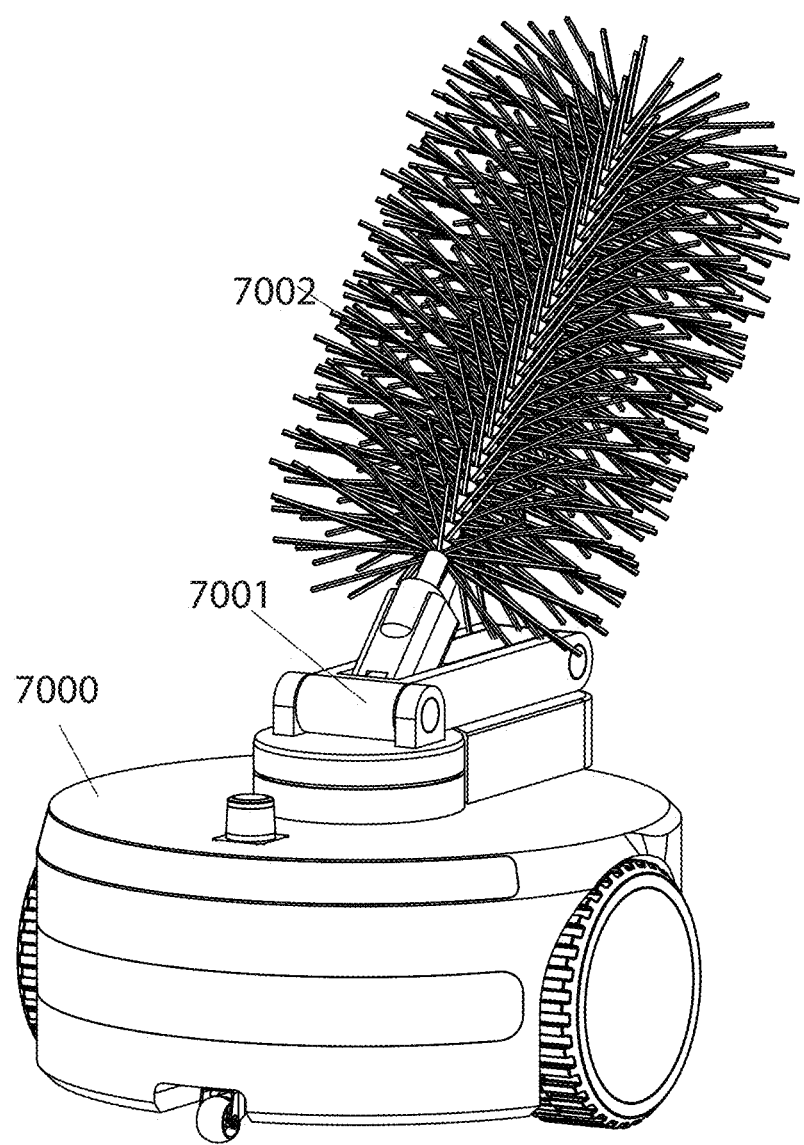
Figure 71A:
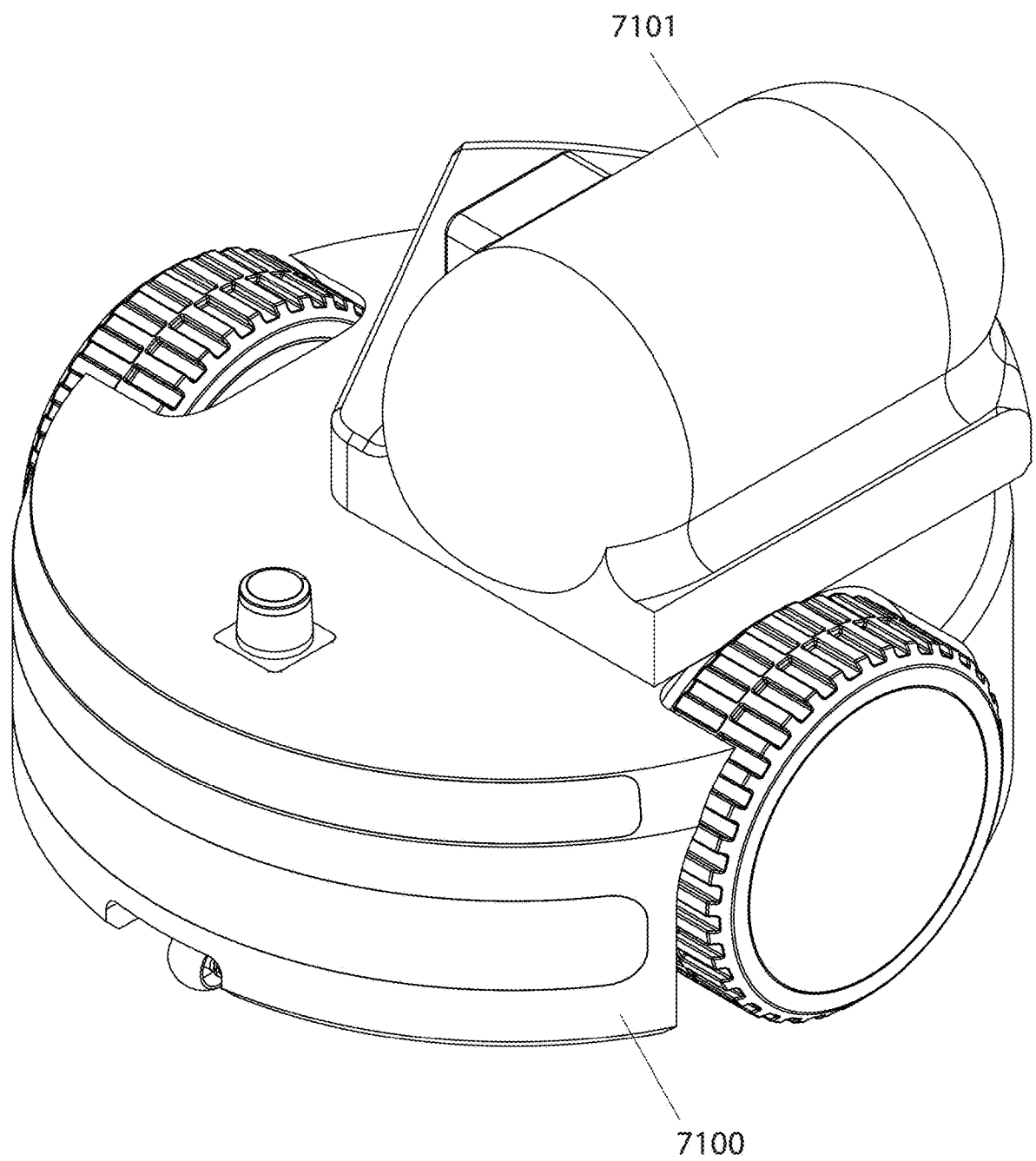
FIGS. 71A and 71B illustrate an example of an air compressor robot, according to some embodiments.
Figure 71B:
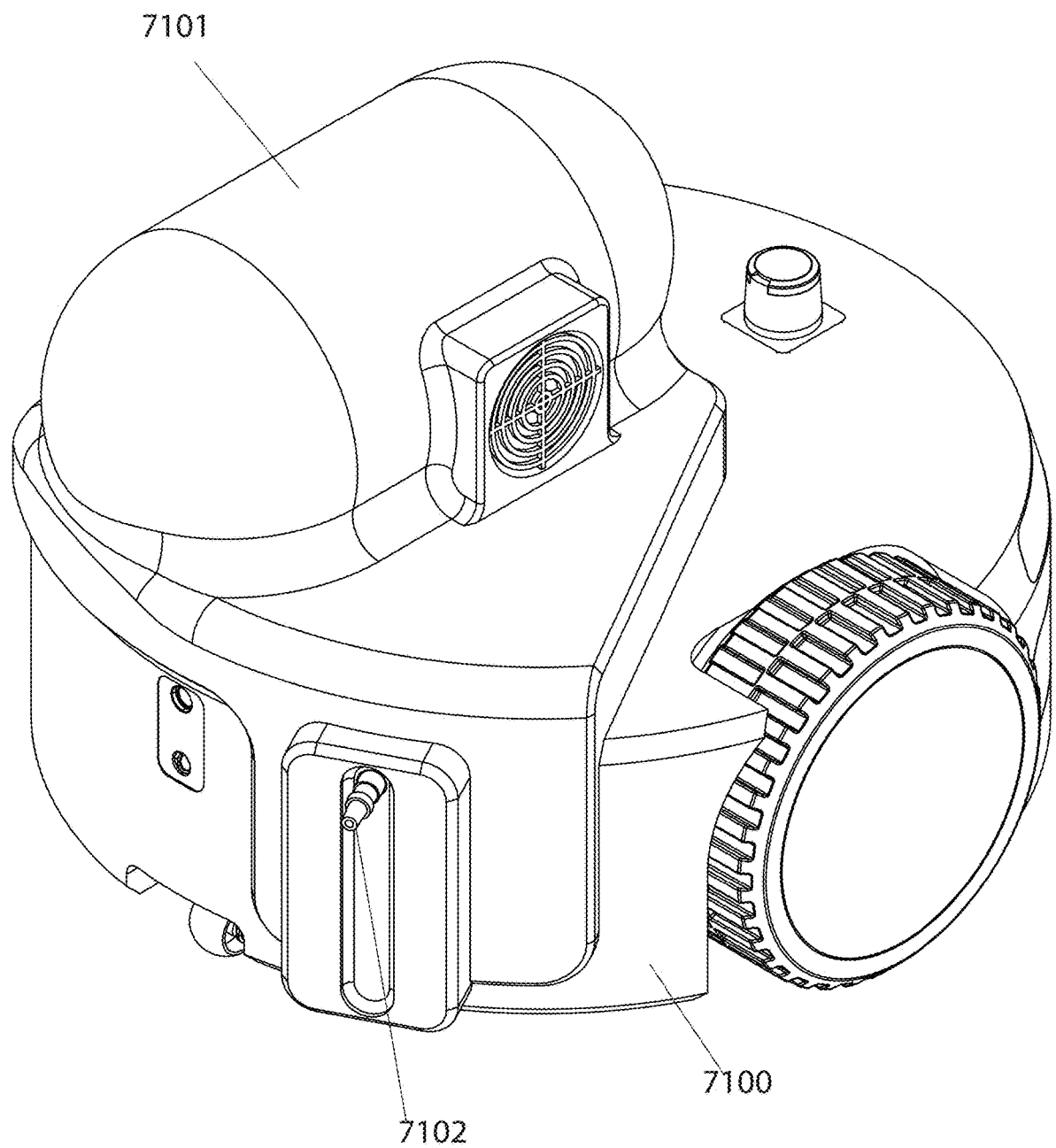
Figure 72:
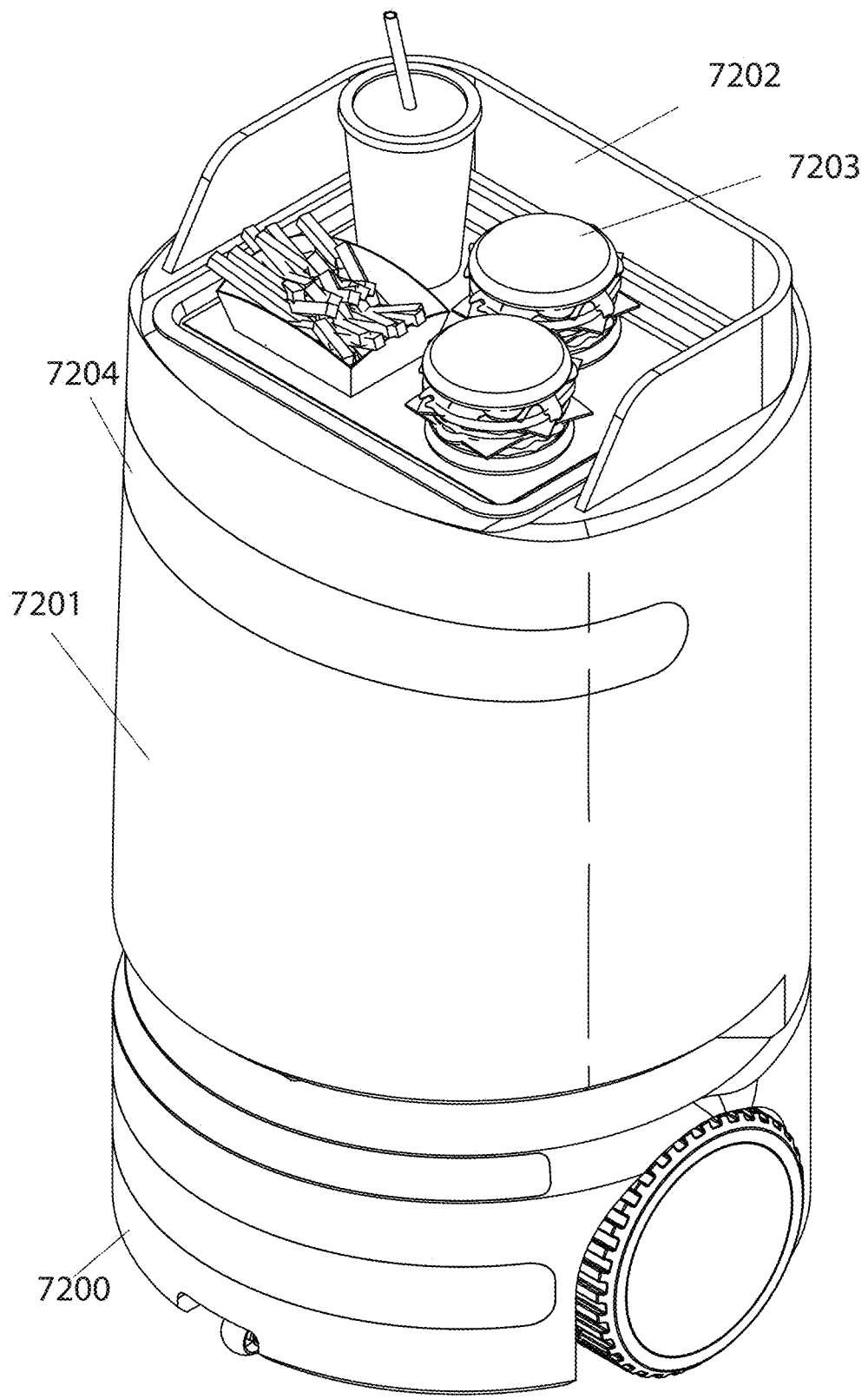
FIG. 72 illustrates an example of a food delivery robotic device, according to some embodiments.
Figure 73A:
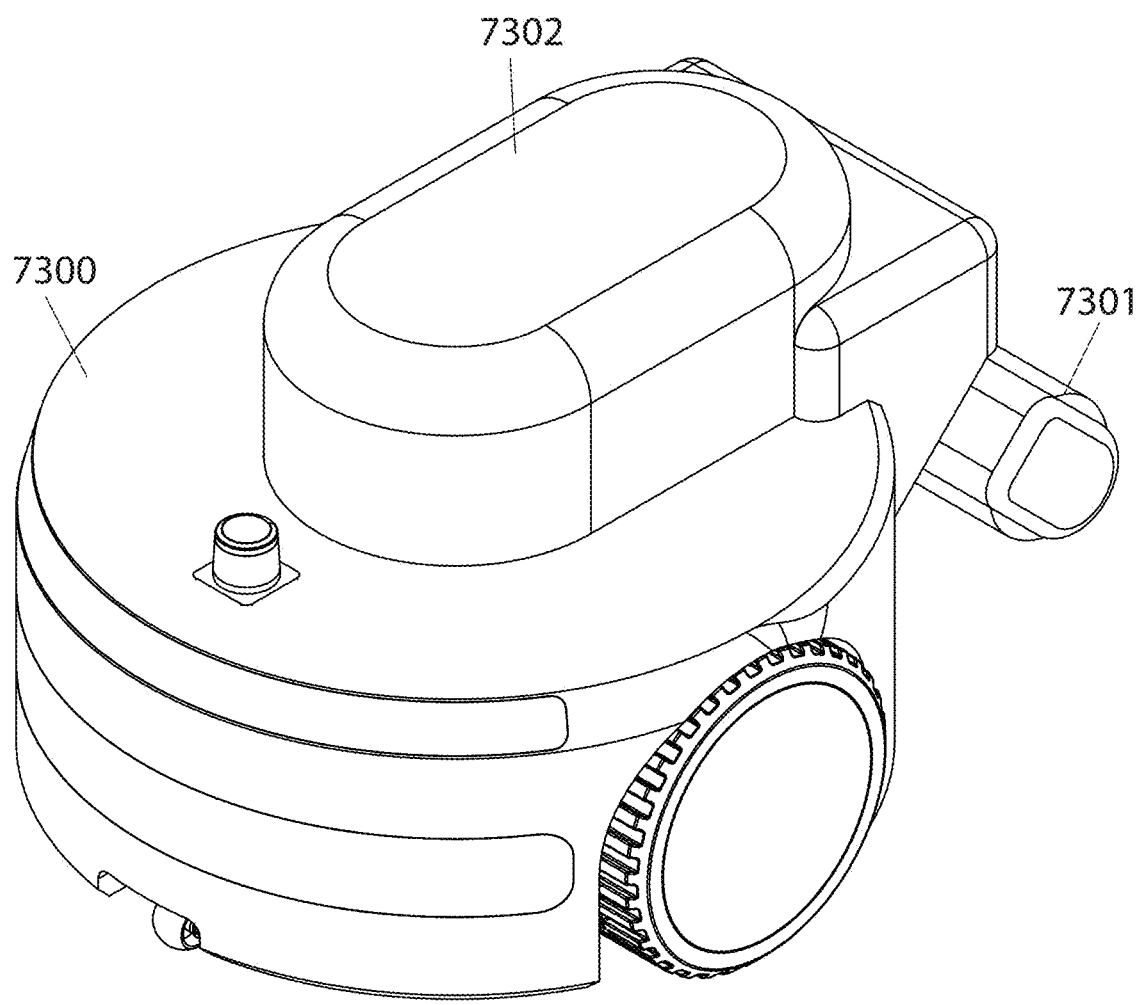
FIGS. 73A-73D illustrate an example of a painting robotic device, according to some embodiments.
Figure 73B:
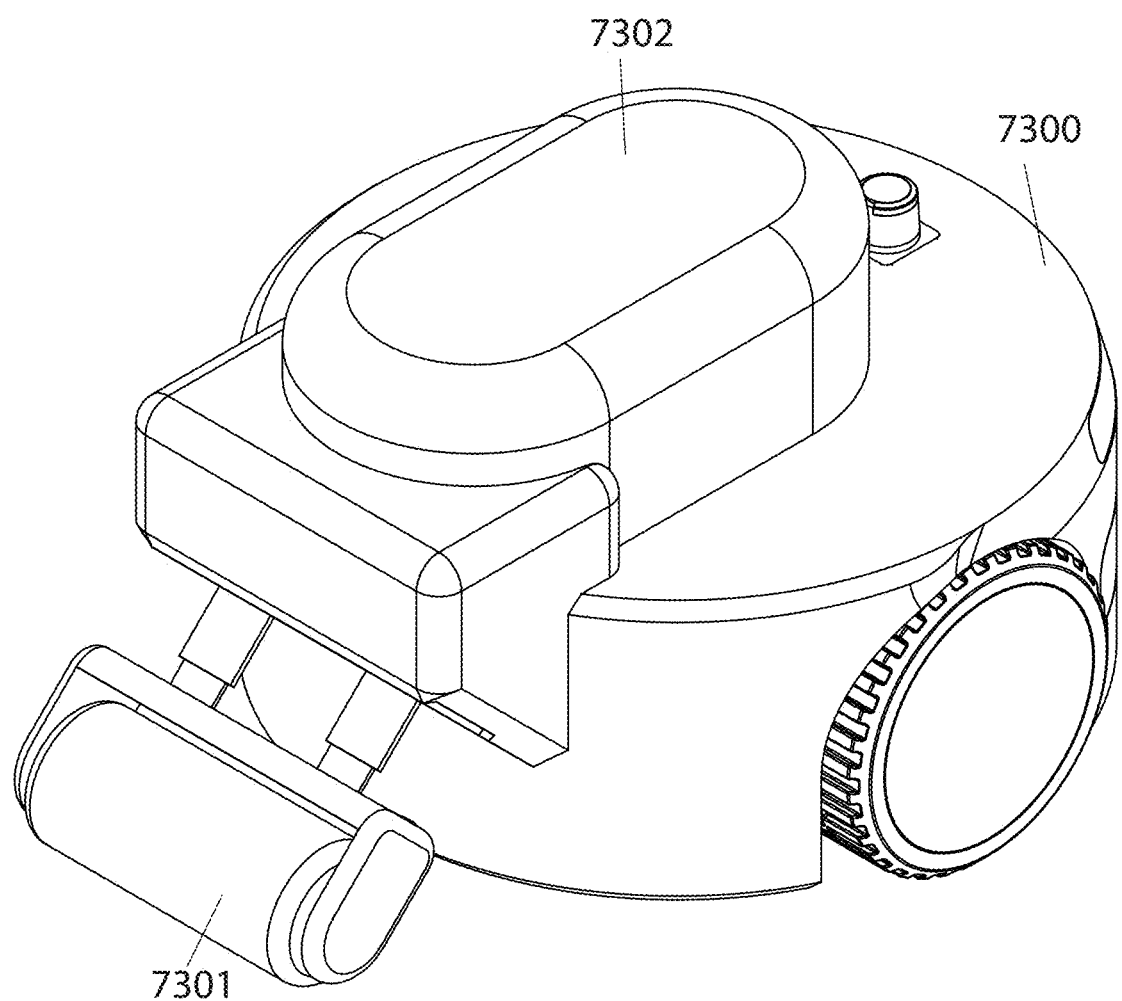
Figure 73C:
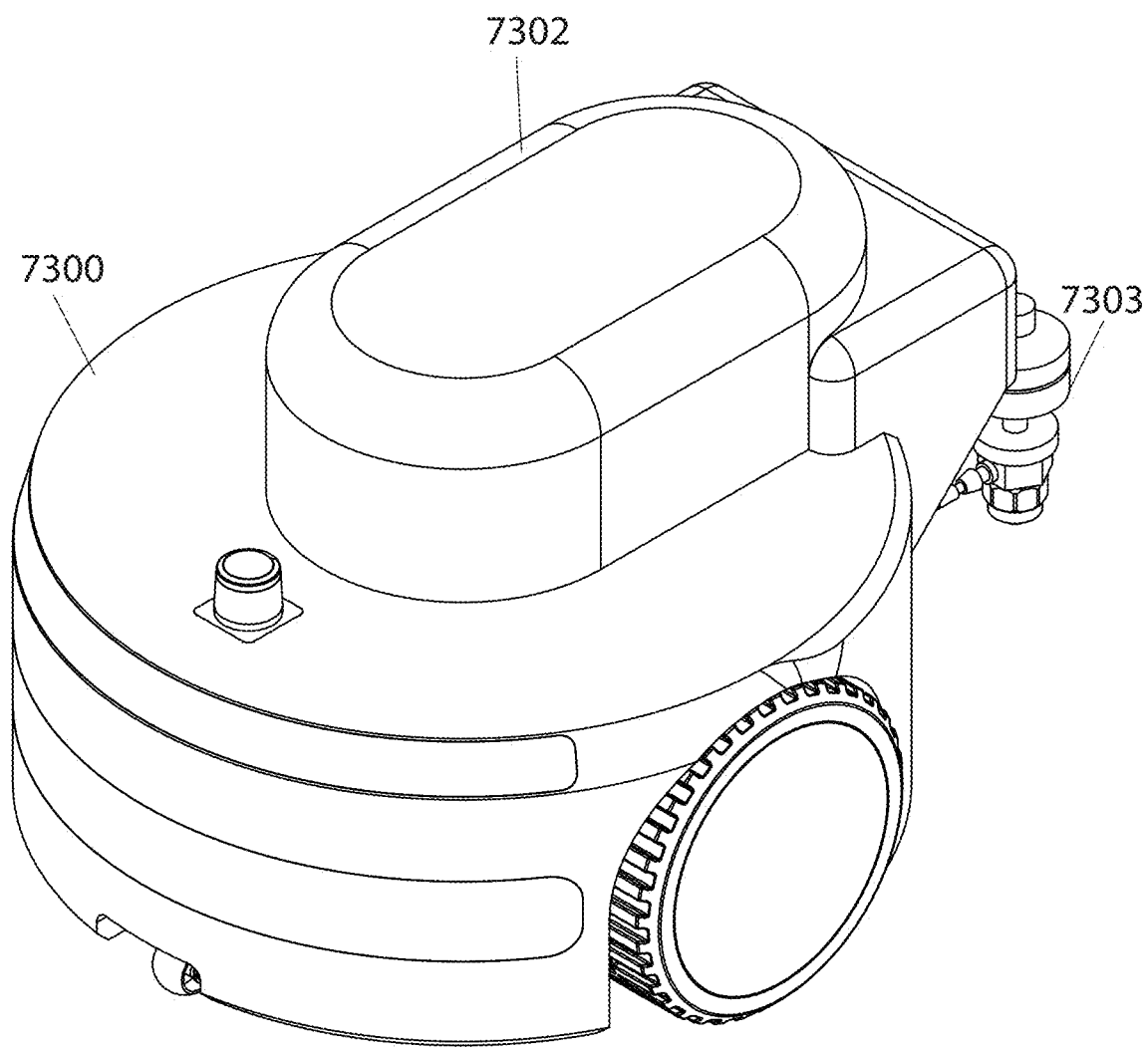
Figure 73D:
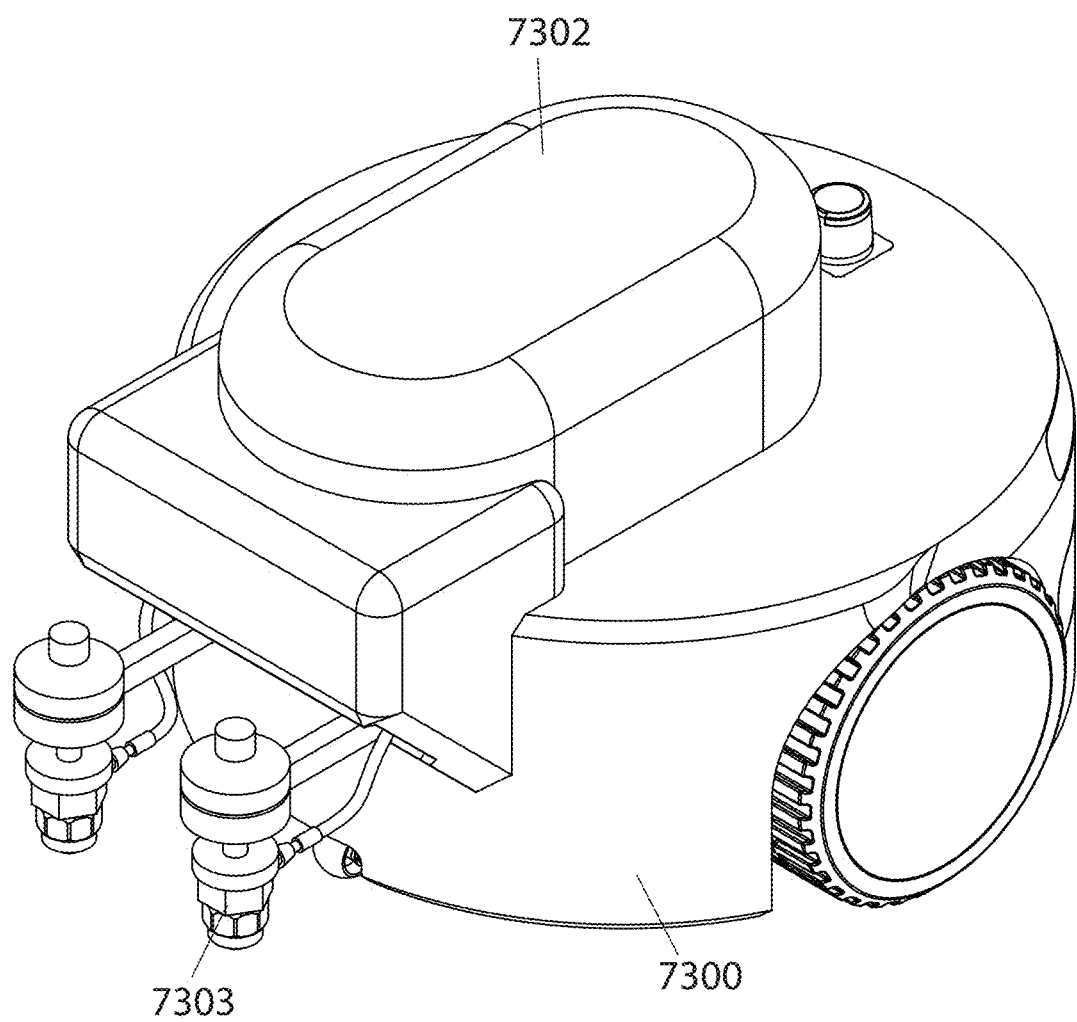

The methods and techniques described herein may be applied to various types of robotic devices. For example, a modular robot with a connector to which different structures may be coupled to customize the function of the modular robot. FIG. 68A illustrates an example of a modular robot including a casing 6800, drive wheels 6801, castor wheels 6802, sensor windows 6803, sensors 6804, omnidirectional LIDAR 6805, battery 6806, memory 6807, processor 6808, and connector 6809, that may implement the methods and techniques described herein. FIG. 68B illustrates the modular robot without internal components shown from a rear view. The sensors 6804 shown in FIG. 68B in the rear view of the modular robot may include a line laser and image sensor that may be used by the processor of the modular robot to align the robot with payloads, charging station, or other machines. In some embodiments, program code stored in the memory 6807 and executed by the processor 6808 may effectuate the operations described herein. In some embodiments, connector 6809 may be used to connect different components to the modular robot, such that it may be customized to provide a particular function. For example, FIG. 69A illustrates a robotic scrubber 6900 pivotally coupled to modular robot 6901, such as the modular robot in FIGS. 68A-68D, using connector 6902. The modular robot is customized to provide surface cleaning via the coupled robotic scrubber 6900. Modular robot 6901 navigates throughout the environment while towing robotic scrubber 6900 which scrubs the driving surface while being towed by modular robot 6901. In other instances, modular robot 6901 may tow other objects such as a vehicle, another robot, a cart of items, a wagon, a trailer, etc. In another example, FIGS. 70A and 70B illustrate a modular robot 7000 customized to provide car washing via a robotic arm 7001 with brush 7002 coupled to the modular robot 7000 using a connector. In some instances, robotic arm 7001 has six degrees of freedom and is installed on top of the modular robot 7000. In some instances, the end of robotic arm 7001 includes the rotating brush 7002 for cleaning cars. In some cases, there may be a spray nozzle near the brush 7002 to spray cleaning liquid while brush 7002 is spinning. In some embodiments, robotic arm 7001 retracts as in FIG. 70B when not in use. FIGS. 71A and 71B illustrate a front and rear perspective view another example, with a modular robot 7100 fitted with an air compressor 7101. FIG. 71B shows nozzle 7102 of air compressor 7101. In some instances, the modular robot 7100 maps an area around a vehicle, for example, and autonomously connects nozzle 7102 to the tires of the vehicle to fill them with air. In some cases, air compressor 7101 includes an air pressure sensor such that tires may autonomously be filled to a particular pressure. In another example, FIG. 72 illustrates modular robot 7200 customized to provide food delivery. In some cases, main compartment 7201 may be one or more of: a fridge, a freezer, an oven, a warming oven, a cooler, or other food preparation or maintenance equipment. For example, the food delivery robot may cook a pizza in an oven on route to the delivery destination such that is freshly cooked for the customer. A tray 7202 for food items 7203 may also be included for delivery to tables of customers in cases where the food delivery robot functions as a server. Due to the increased height, main compartment 7201 may also include additional sensors 7204 that operate in conjunction with modular robot 7200. FIGS. 73A and 73B illustrates yet another example, wherein modular robot 7300 is customized to functions as a painting robot including a paint roller 7301 for painting streets or roofs, for example, and paint tank 7302. FIGS. 73C and 73D illustrate an alternative painting robot wherein nozzles 7303 are used instead of paint roller 7301.

Figure 74:
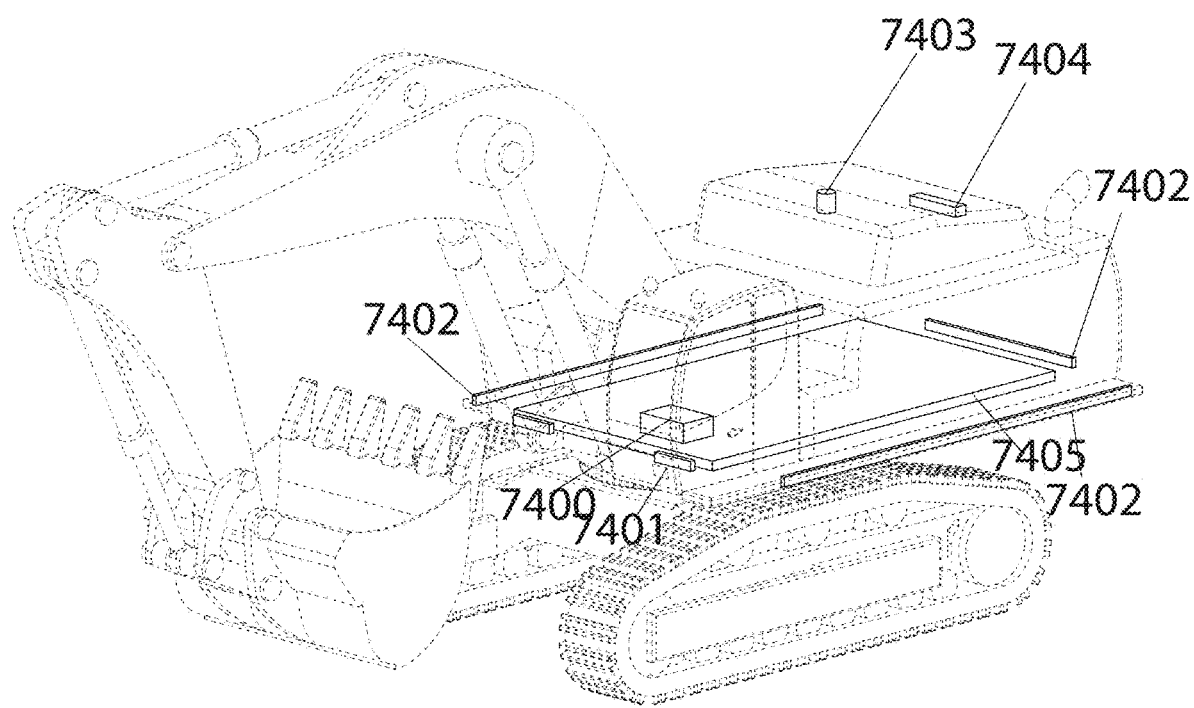
FIG. 74 illustrates an example of a robotic excavator, according to some embodiments.
Figure 75:
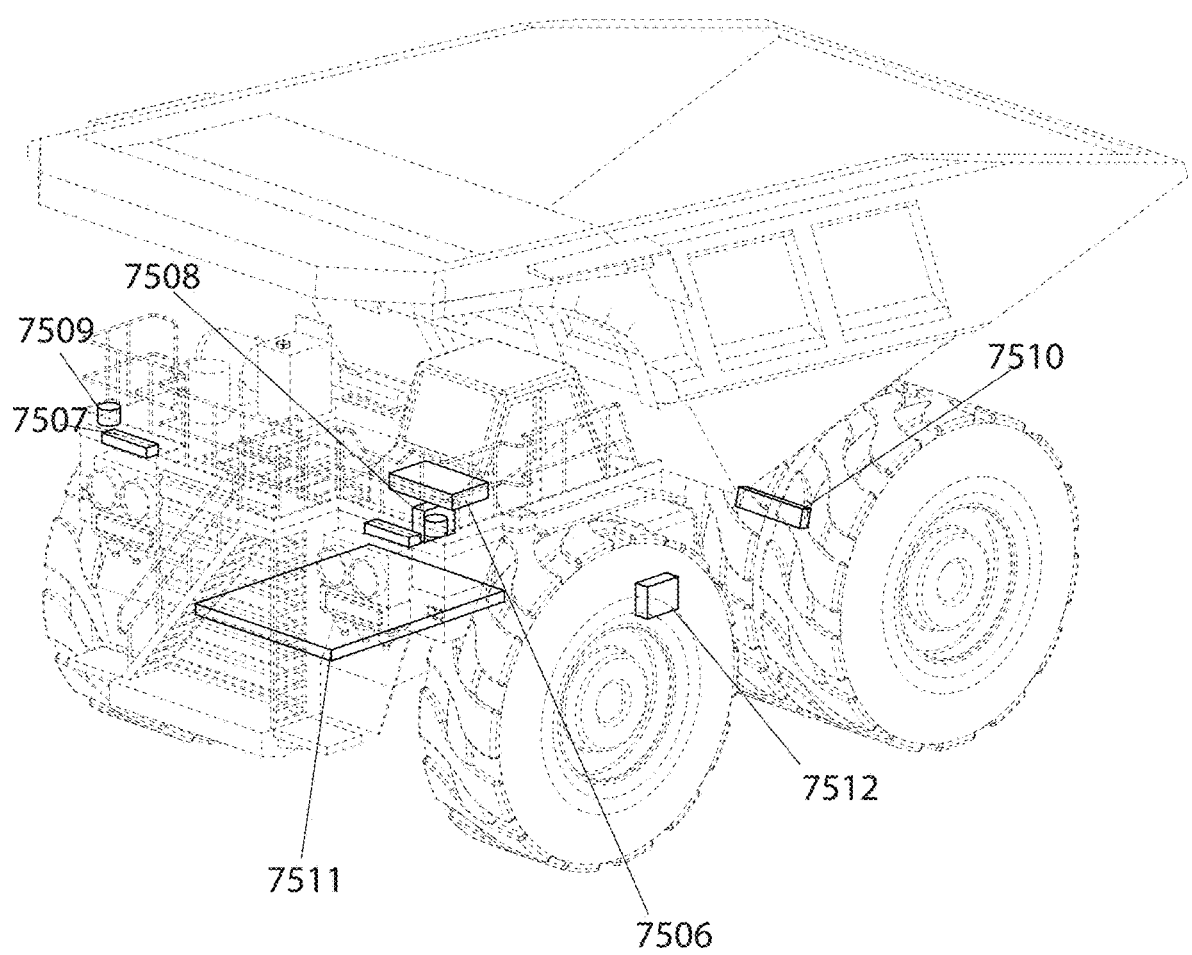
FIG. 75 illustrates an example of a robotic dump truck, according to some embodiments.
Figure 76A:
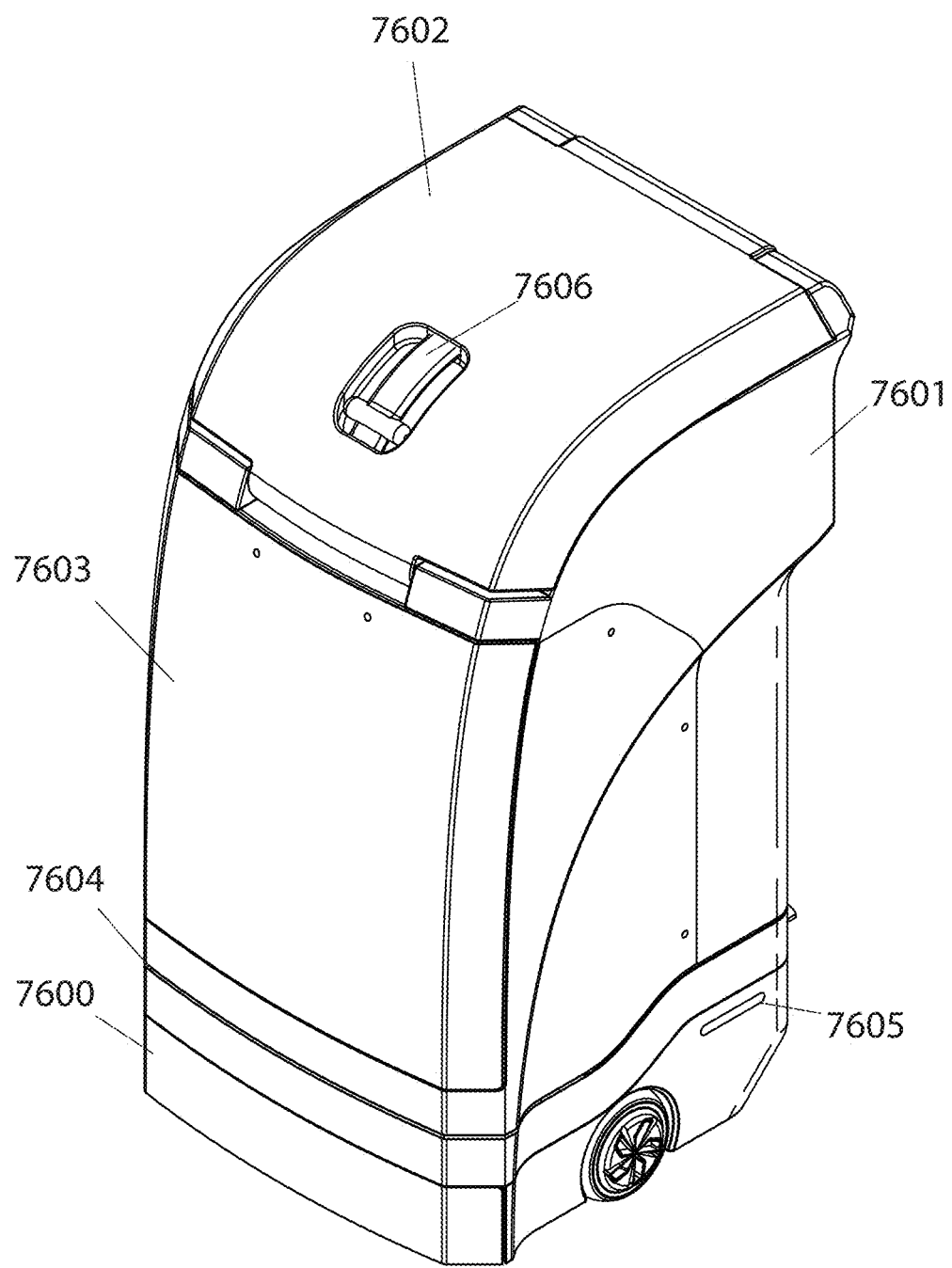
FIGS. 76A-76C illustrate an example of a smart bin, according to some embodiments.
Figure 76B:
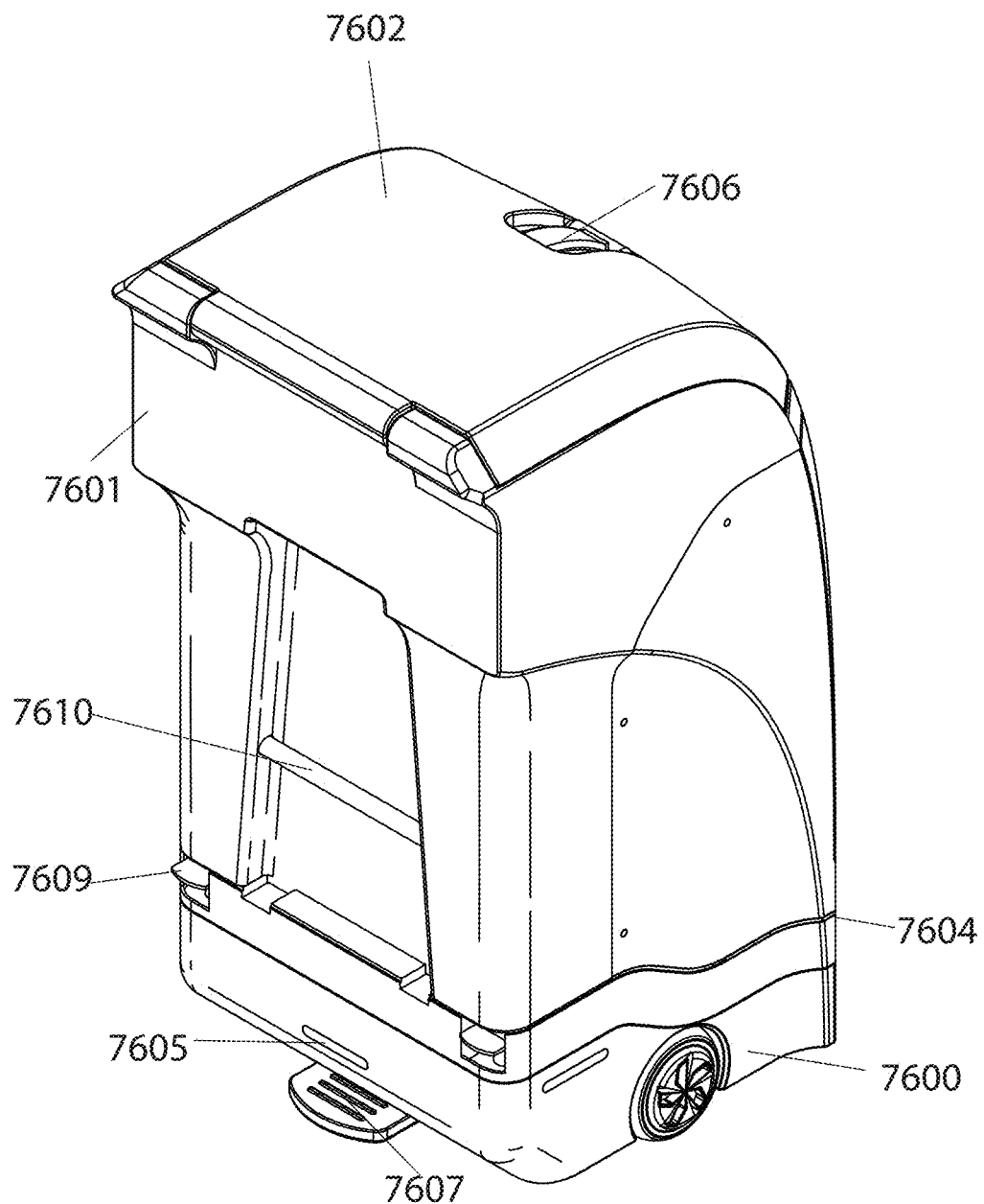
Figure 76C:
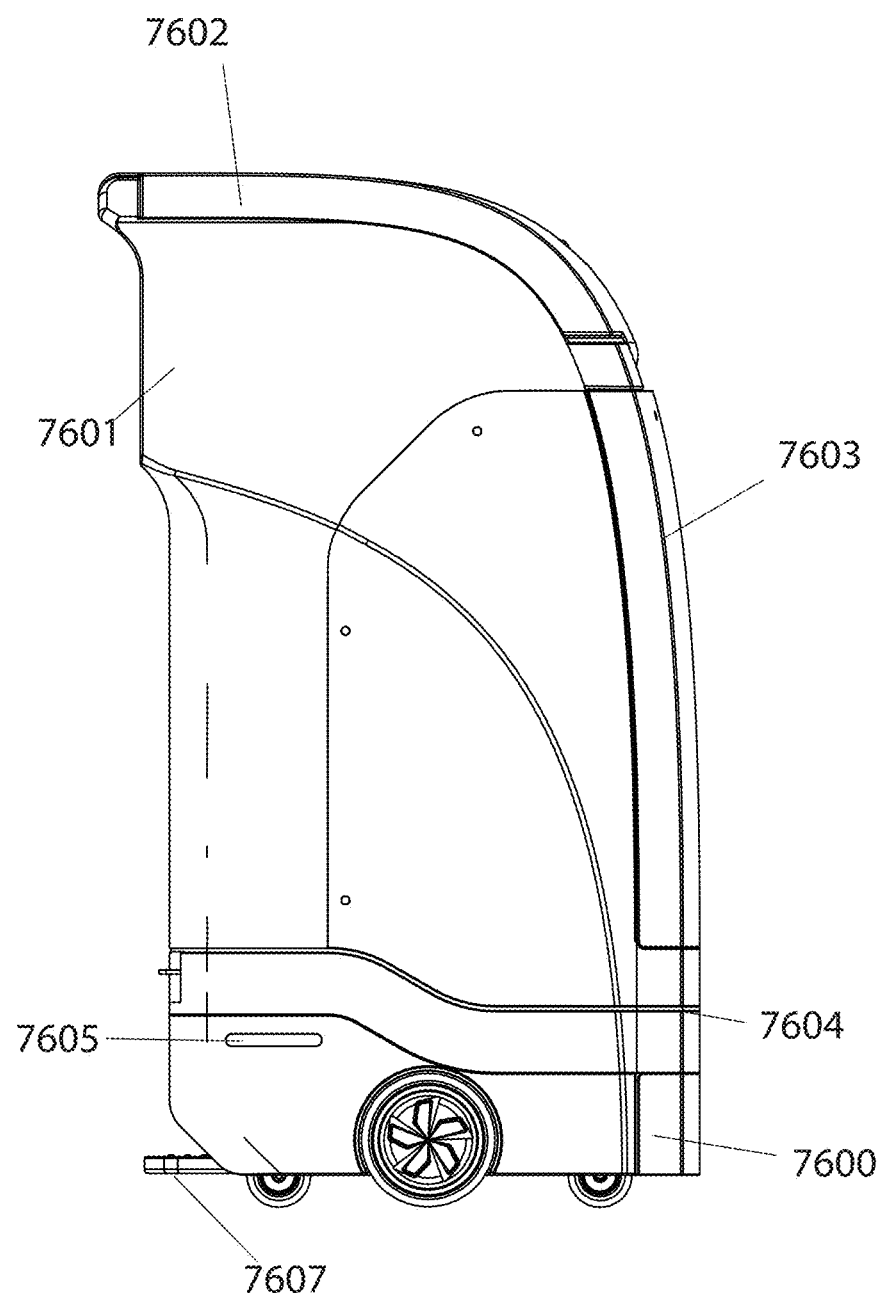
Figure 77:
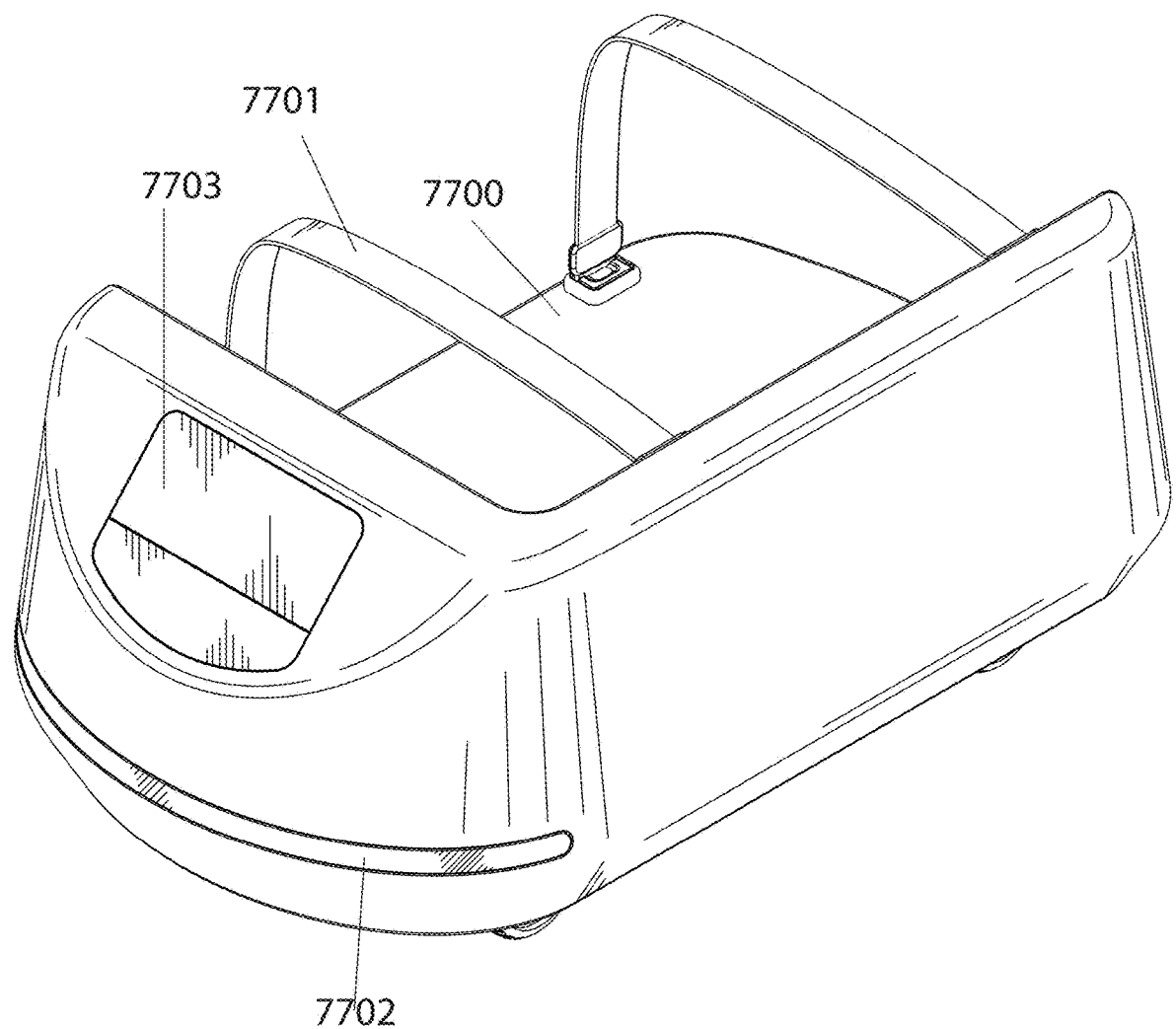
FIG. 77 illustrates an example of a luggage robot, according to some embodiments.
Figure 78:
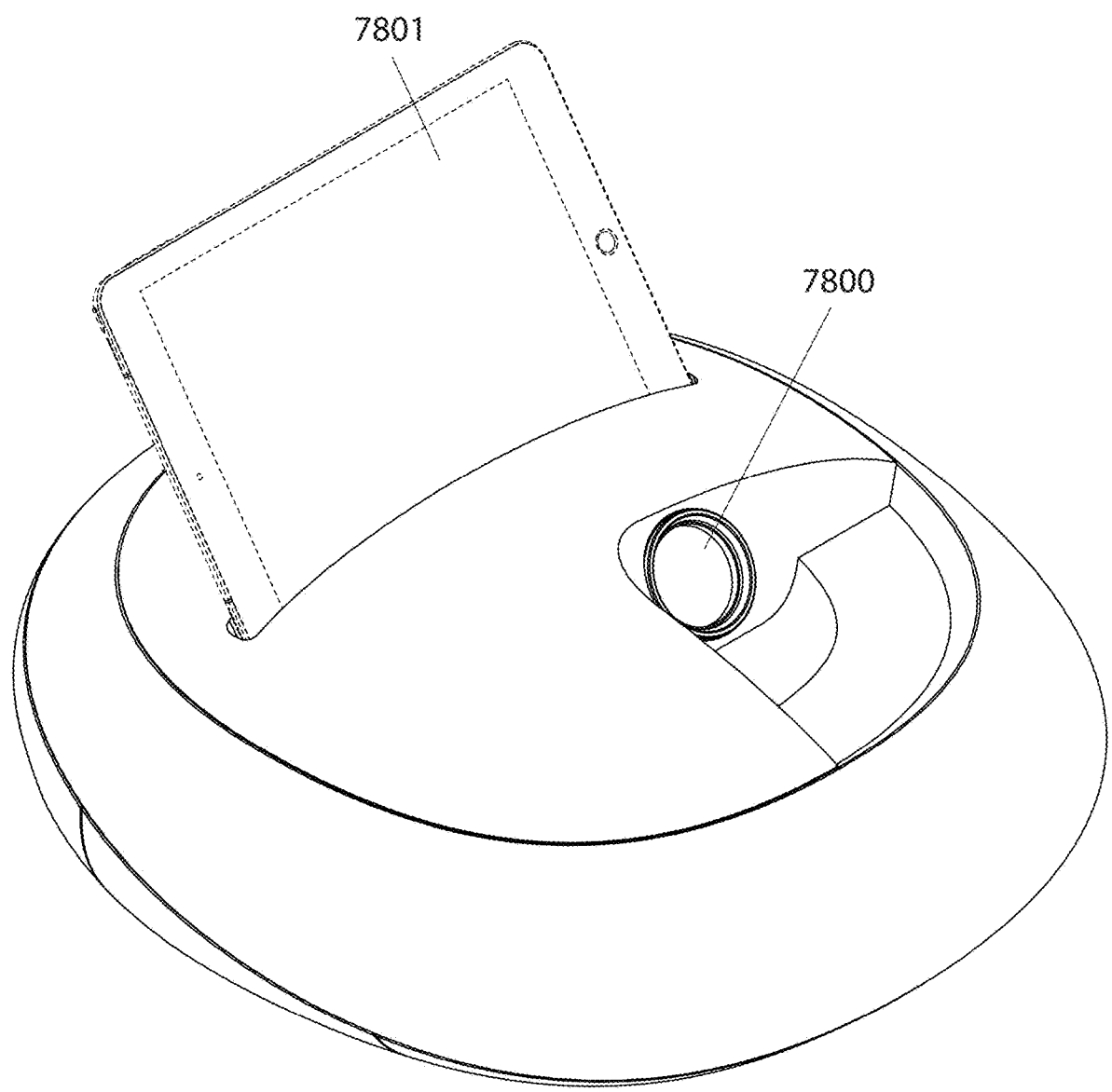
FIG. 78 illustrates an example of an audio and video robot, according to some embodiments.
Figure 79A:
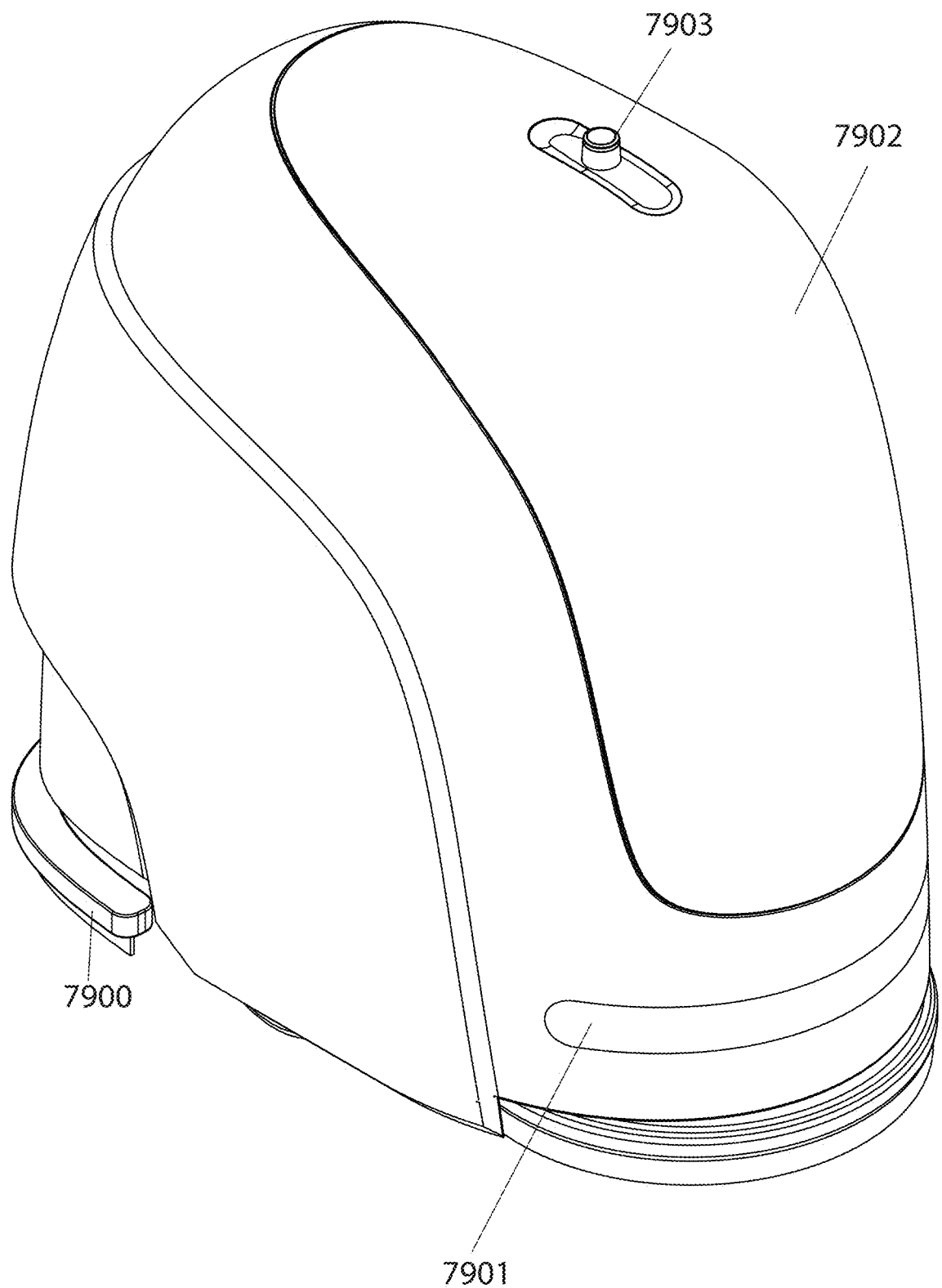
FIGS. 79A and 79B illustrate an example of commercial cleaning robot, according to some embodiments.
Figure 79B:
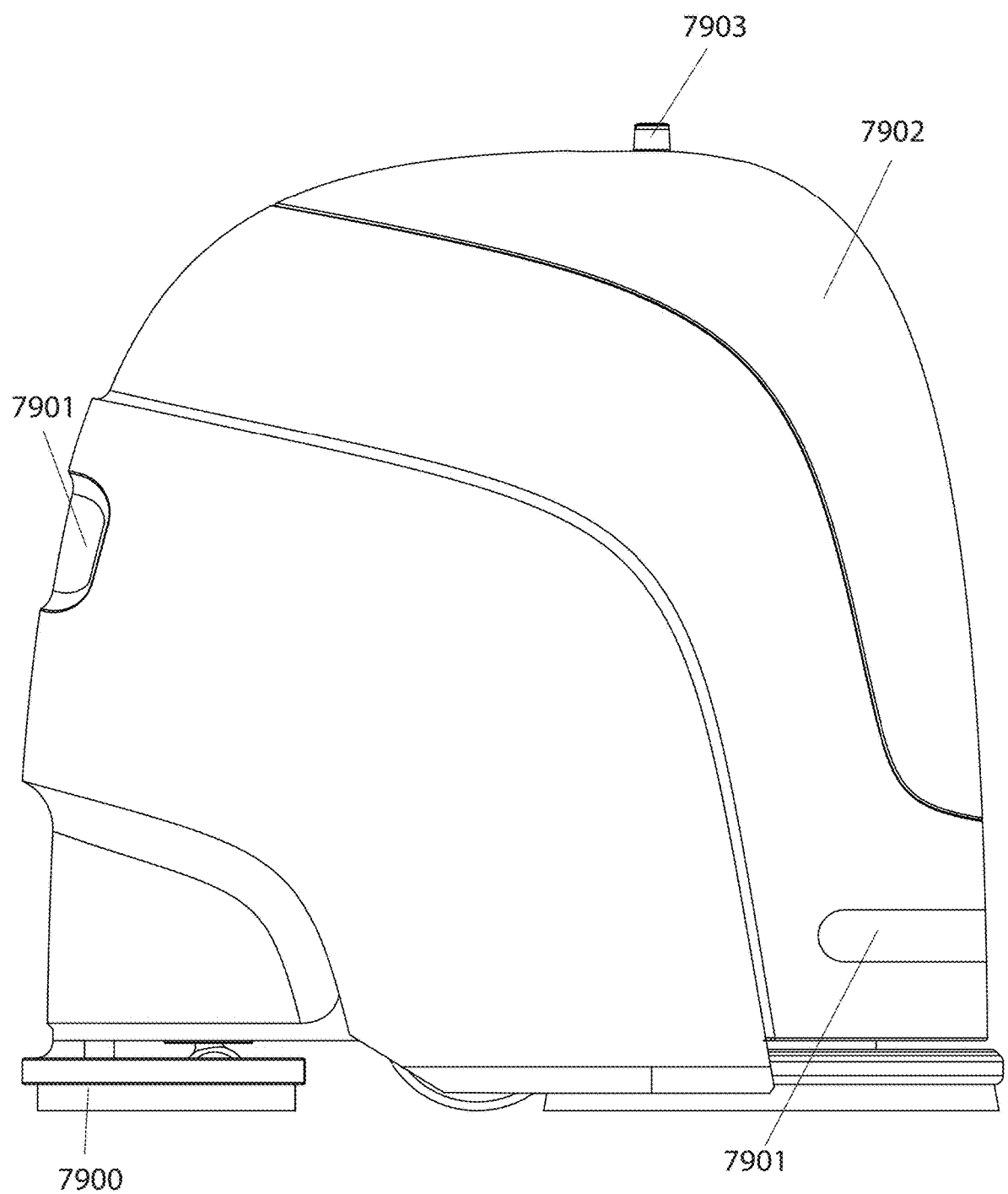
Figure 80A:
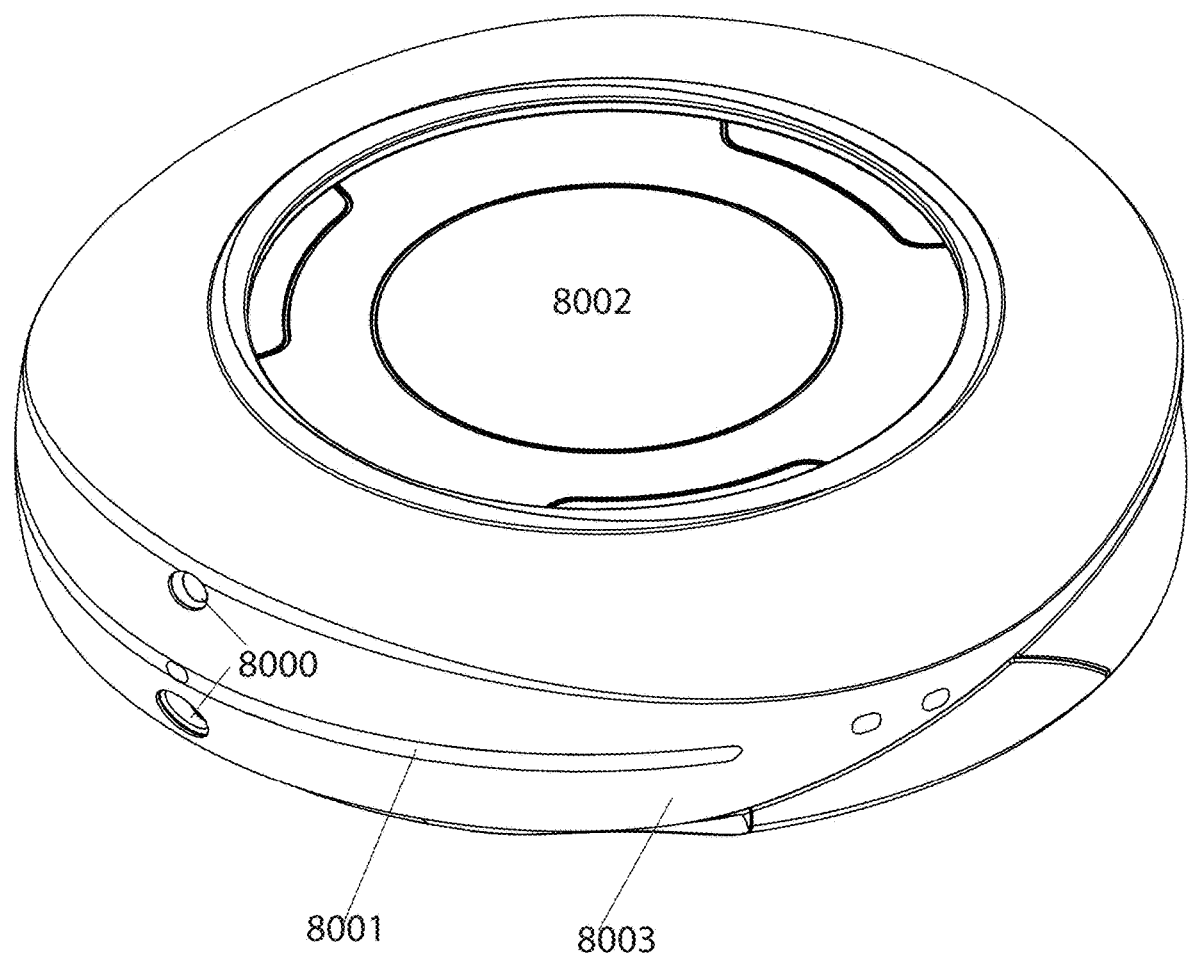
FIGS. 80A-80E illustrate an example a robotic surface cleaner according to some embodiments by which the techniques described herein may be implemented.
Figure 80B:
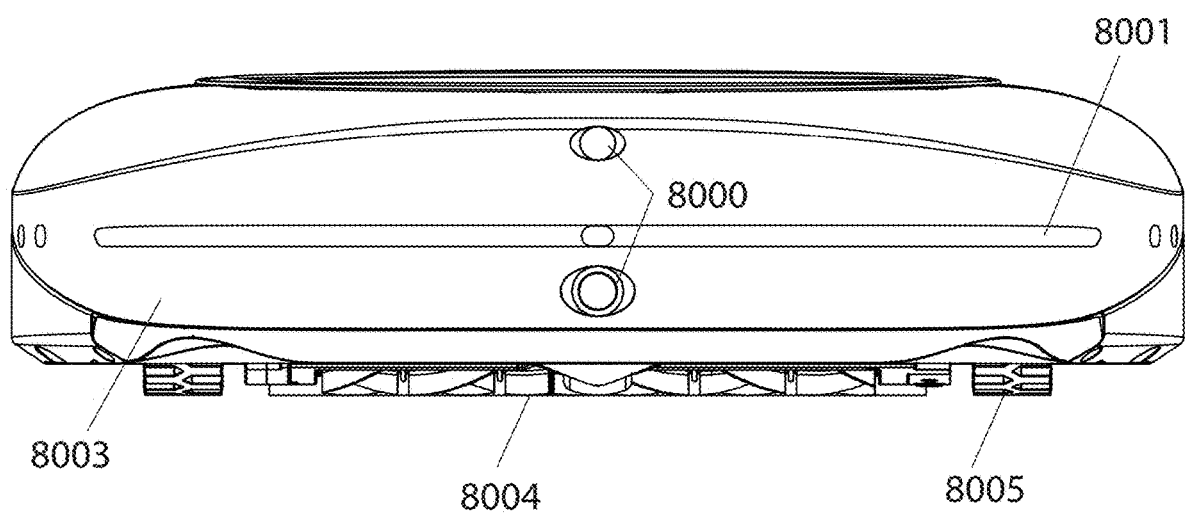
Figure 80C:
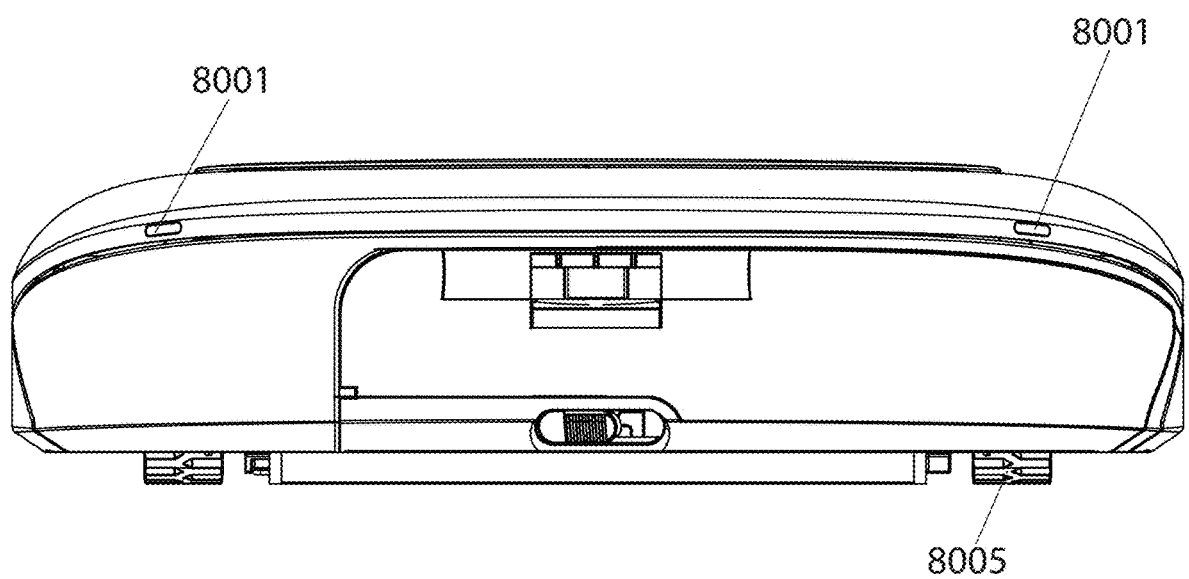
Figure 80D:
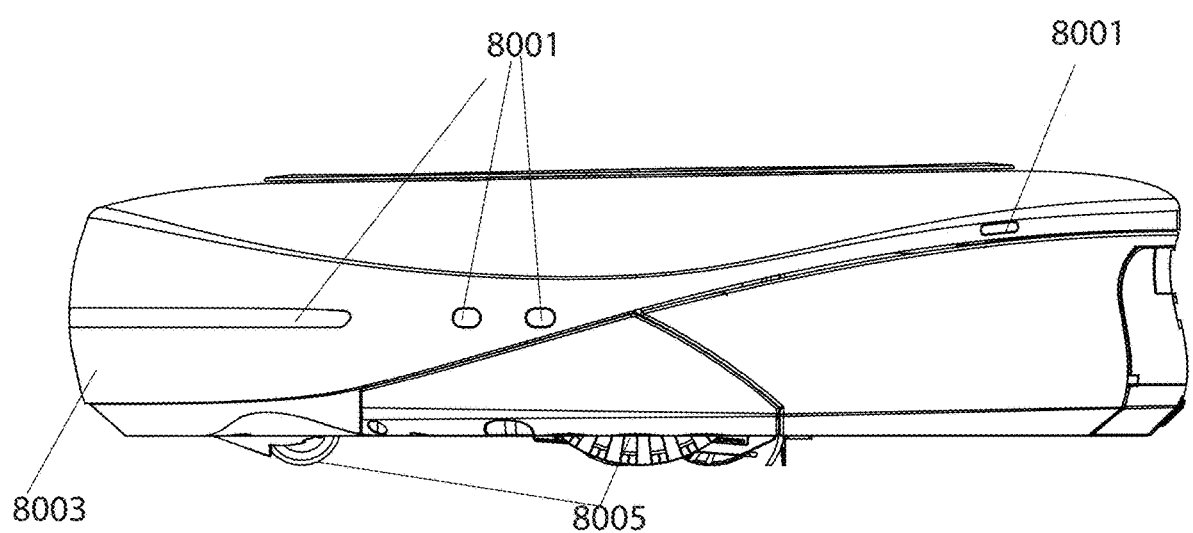
Figure 80E:
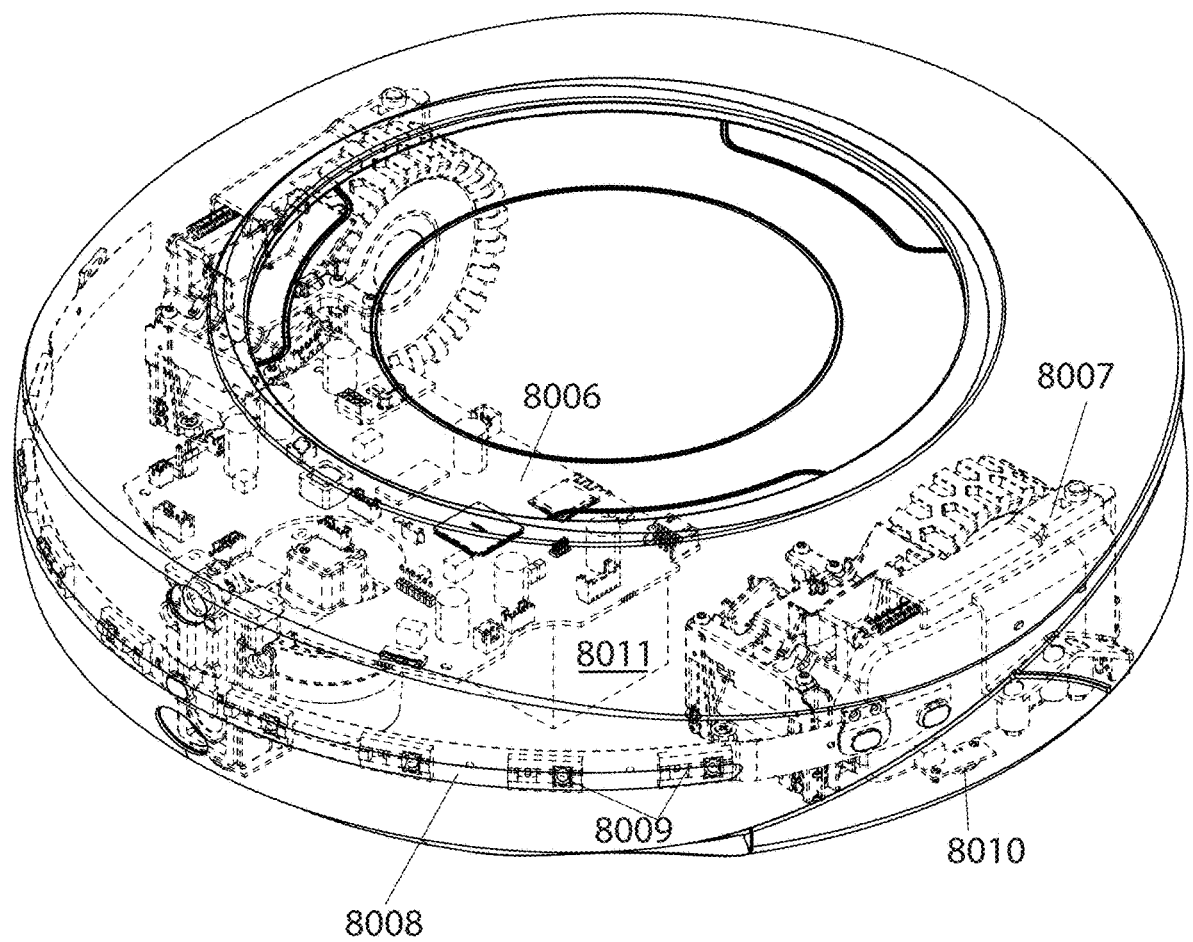

Another example includes a robotic excavator illustrated in FIG. 74 including a compartment 7400 including a processor, memory, network card, and controller, a camera 7401 (the other is unlabeled due to spacing), sensor arrays 7402 (e.g., TOF sensors, sonar sensors, IR sensors, etc.), a LIDAR 7403, rear rangefinder 7404, and battery 7405. FIG. 75 illustrates an example of a robotic dump truck that may also implement the techniques and methods described within the disclosure including a compartment 7506 including a processor, memory, and controller, a camera 7507 (the other is unlabeled due to spacing), sensor array 7508 (e.g., TOF sensors, sonar sensors, IR sensors, etc.), a LIDAR 7509, rear rangefinder 7510, battery 7511, and movement measurement device 7512. Another example includes a smart bin in FIG. 76A including a robotic platform 7600, bin 7601 with bin lid 7602, bumper 7603, LIDAR window 7604, sensor window 7605, and lid handle 7606. FIG. 76B illustrates a rear perspective view of the smart bin with manual brake 7607, lift handle 7608 for the bin 7601, sensor window 7605, foot pedals 7609 that control pins (not shown) used to hold the bin in place, and lift handle 7610. FIG. 76C illustrates a side view of the smart bin. Different types of sensors, as described above, are positioned behind sensor windows. Other examples include a robotic airport luggage holder in FIG. 77 including luggage platform 7700, luggage straps 7701, sensor window 7702 behind which sensors are positioned, and graphical user interface 7703 that a user may use to direct the robot to a particular location in an airport; a mobile audio and video robot in FIG. 78 including a projector 7800 for projecting videos and holder for a communication device, such as a tablet 7801 that may display a video or play music through speakers of the robot or the tablet; and a commercial cleaning robot in FIGS. 79A and 79B including cleaning tool 7900, sensor windows 7901 behind which sensors are positioned, bumper 7902, and LIDAR 7903. FIGS. 80A-80D illustrate another example, a robotic surface cleaner including camera and LIDAR module 8000, sensor windows 8001 behind which obstacle sensors are positioned, graphical user interface 8002, bumper 8003, cleaning tool 8004, and wheels 8005 (drive and castor wheels). FIG. 80E illustrates internal components including PCB 8006, wheel suspension modules 8007, sensor array 8008 with sensors 8009 (e.g., TSSP sensors, TOF sensors, LED transmitters and receivers) positioned around the front perimeter of the robot, floor sensor 8010, and battery 8011. Other examples of robots include a lawn mowing robot, a pizza delivery robot with an oven for baking the pizza, a grocery delivery robot, a shopping cart robot with a freezer compartment for frozen food, a fire proof first aid robot including first aid supplies, a defibrillator robot, a hospital bed robot, a pressure cleaner robot, a dog walking robot, a marketing robot, an ATM machine robot, a snow plowing and salt spreading robot, and a passenger transporting robot.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must).

The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A tangible, non-transitory, machine readable medium storing instructions that when
executed by a processor of a robotic device effectuates operations comprising:
receiving, by the processor, a sequence of one or more commands;
executing, by the robotic device, the sequence of one or more commands;
saving, by the processor, the sequence of one or more commands in memory after a predetermined amount of time from receiving a most recent one or more commands; and
re-executing, by the robotic device, the saved sequence of one or more commands.

2. The media of claim 1, wherein the sequence of one or more commands is received from a user via an input device.

3. The media of claim 2, wherein the saved sequence of one or more commands is re-executed after a prompt is accepted by the user via the input device.

4. The media of claim 2, wherein the input device is any of a remote control, a user interface on the robotic device, a computer, a smartphone, or a tablet.

5. The media of claim 2, wherein the user provides inputs and receives outputs from the processor of the robotic device through a software application installed on the input device.

6. The media of claim 5, wherein the software application is configured to:
display a map of an environment of the robotic device and a suggested navigation path of the robotic device;
receive inputs designating at least one of: a modification to the map, an addition of or modification to a navigation path of the robotic device, an acceptance or rejection of the suggested navigation path of the robotic device, an addition of or modification to a subarea of the environment, an addition of or modification to a label for a subarea, a driving speed of the robotic device, a vacuum suction intensity, activation or deactivation of a mop or a vacuum or UV sterilization, an obstacle density of an area or subarea, a floor type in an area or subarea, a floor transition, and an activity level in an area or subarea.

7. The media of claim 1, wherein the operations further comprise:
associating, by the processor, the sequence of one or more commands with a location at which the robotic device was located when the sequence of one or more commands was received; and
re-executing, by the robotic device, the saved sequence of one or more commands when the robotic device returns to the location.

8. The media of claim 1, wherein the operations further comprise:
associating, by the processor, the sequence of one or more commands with a day and time on which the sequence of one or more commands was received; and re-executing, by the robotic device, the saved sequence of one or more commands on the same day and time on a repetitive basis.

9. The media of claim 1, wherein the sequence of one or more commands comprises a sequence of one or more navigation commands.

10. The media of claim 8, wherein the sequence of one or more navigation commands comprises a path plan of the robotic device.

11. The media of claim 9, wherein the processor saves multiple path plans in the memory.

12. The media of claim 1, wherein the operations further comprise:
capturing, by a camera mounted on the robotic device, images of an environment of the robotic device;
aligning, by the processor, images based on overlapping image data of the captured images;
stitching, by the processor, the images together at overlapping points to generate a map of the environment;
determining, by the processor, a probability of the robotic device existing at different possible locations within the environment; and
determining, by the processor, a most feasible current location of the robotic device by comparing newly collected sensor data against simulated representations of the environment corresponding with each possible location of the robotic device.

13. The media of claim 1, wherein the operations further comprise:
determining, by the processor, an obstacle probability for each location within a map of an environment of the robotic device, wherein:
the obstacle probability determined for a location comprises a probability that an obstacle exists at the location;
the probability that an obstacle exists at the location increases each time an obstacle is observed at the location; and
an obstacle is determined to exist at the location when the obstacle probability determined for the location exceeds a predetermined threshold.

14. The media of claim 1, wherein the operations further comprise:
determining, by the processor, rooms with a map of the environment of the robotic device.

15. The media of claim 1, wherein the operations further comprise:
determining, by the processor, any of a brush speed, a vacuum suction intensity, a driving speed, a brush height, a movement path, a next action, and a work schedule of the robotic device based on environmental characteristics comprising floor type, obstacle density, activity level, room or area type, level of debris accumulation, level of user activity, time of user activity, weather conditions, road conditions, and accident frequency; and
associating, by the processor, the environmental characteristics with corresponding locations within a map of an environment of the robotic device.

16. The media of claim 1, wherein:
the robotic device performs work in low obstacle density areas before performing work in high obstacle density areas;
the robotic device is configured to execute point-to-point navigation; and
at least a portion of the operations are offloaded to the cloud.

17. The media of claim 1, wherein the operations further comprise:
adjusting, by the processor, a size and a shape of an area occupied by the robotic device based on at least one of: a linear overshoot or undershoot, an angular rotation overshoot or undershoot, movement of the robotic device, and sensor data used in localizing the robotic device.

18. The media of claim 1, wherein the operations further comprise:
determining, by the processor, an object type of an obstacle by comparing features of the obstacle to those of different types of objects; and
marking, by the processor, the object type at a location in a map of an environment of the robotic device corresponding with a location at which the obstacle was encountered.

19. The media of claim 18, wherein the operations further comprise:
determining, by the processor, a probability of encountering different object types at different locations within the map of the environment based on sensor data.

20. The media of claim 1, wherein the operations further comprise:
identifying, by the processor, a particular person by comparing features of the particular person to those of different persons stored within a database;
marking, by the processor, a time and a location in a map of an environment of the robotic device corresponding with a location at which the particular person was encountered; and
determining, by the processor, a time to perform work in different areas based on an activity level of the different areas.

* * * * *